US006324782B1

(12) United States Patent
Gaston

(10) Patent No.: US 6,324,782 B1
(45) Date of Patent: Dec. 4, 2001

(54) LANDSCAPE EDGING SYSTEM HAVING BLOCK WITH RECESS

(76) Inventor: Johannes N. Gaston, 5139 Mayview Rd., Minnetonka, MN (US) 55345

( * ) Notice: Subject to any disclaimer, the term of this patent is extended or adjusted under 35 U.S.C. 154(b) by 0 days.

(21) Appl. No.: 08/910,921

(22) Filed: Aug. 8, 1997

Related U.S. Application Data

(60) Provisional application No. 60/030,027, filed on Nov. 2, 1996.

(51) Int. Cl.[7] .................................................. A01G 1/00

(52) U.S. Cl. ................................................................ 47/33

(58) Field of Search ...................................... 47/33

(56) References Cited

U.S. PATENT DOCUMENTS

| | | |
|---|---|---|
| D. 276,494 | 11/1984 | Novak et al. . |
| D. 312,881 | 12/1990 | Naether . |
| D. 315,026 | 2/1991 | Castonguay et al. . |
| D. 335,429 | 5/1993 | Scott, Jr. et al. . |
| D. 343,908 | 2/1994 | Naether . |
| D. 361,853 | 8/1995 | Northrop . |
| D. 363,801 | 10/1995 | Nauseda . |
| D. 366,191 | 1/1996 | Gay . |
| D. 378,857 | 4/1997 | Hale . |
| 425,890 | 4/1890 | Landis . |
| 1,166,664 | 1/1916 | Dargentu . |
| 1,677,829 | 7/1928 | Jack . |
| 1,746,169 | 2/1930 | Swanson . |
| 1,813,055 | 7/1931 | Kannen . |
| 1,977,021 | 10/1934 | Spencer . |
| 2,094,519 | 2/1937 | Ballard . |
| 2,235,356 | 3/1941 | Byers . |
| 2,471,226 | 5/1949 | Maccario . |
| 2,713,751 | 7/1955 | Hendrixson . |
| 2,744,357 | 5/1956 | Foote . |
| 2,746,723 | 5/1956 | Freeman . |
| 2,769,277 | 11/1956 | Keelor . |
| 2,794,375 | 6/1957 | Di Falco et al. . |
| 2,809,809 | 10/1957 | Johnston . |
| 2,821,809 | 2/1958 | Collier et al. . |
| 2,865,136 | 12/1958 | Scott et al. . |
| 2,877,600 | 3/1959 | Slate . |
| 2,888,779 | 6/1959 | Hustetter . |

(List continued on next page.)

OTHER PUBLICATIONS

Edge Rock Brochure.
Anchor Edging brochure.
The Concrete Edge brochure.
E–Z Border brochure.
Colora brochure.
Bric–Edg brochure.
Master–Mark brochure.
Windsor Lawn Edging brochure.
Power Light brochure.
Let's Edge It brochure.
Permaloc Clean Line brochure.
Brick Stop brochure.
Patio Pal brochure.
Pave Edge brochure.
Bric–Edg Power Restraint brochure.
Curv–Rite brochure.

*Primary Examiner*—Charles T. Jordan
*Assistant Examiner*—Francis T. Palo
(74) *Attorney, Agent, or Firm*—T. Woods

(57) ABSTRACT

A landscape edging system and corresponding components and methods are disclosed. The system comprises an edging member having a top rail and a barrier extending downwardly therefrom, and corresponding interconnecting or adjoining blocks having recesses within which the top rail is received disposed therein. The blocks, in combination with the edging member, may be employed to separate adjoining lawn, garden, walkway, driveway or other areas from one another. The present invention permits the effects of undesired displacement forces acting on the blocks, such as frost heave, to be reduced or minimized.

30 Claims, 136 Drawing Sheets

U.S. PATENT DOCUMENTS

| | | |
|---|---|---|
| 2,912,792 | 11/1959 | Venable . |
| 2,920,184 | 1/1960 | Kessler . |
| 3,198,057 | 8/1965 | Moore . |
| 3,258,282 | 6/1966 | Koenigshof . |
| 3,289,349 | 12/1966 | Valdez . |
| 3,373,668 | 3/1968 | Moore et al. . |
| 3,378,949 | 4/1968 | Dorris . |
| 3,387,786 | 6/1968 | Rynberk . |
| 3,415,013 | 12/1968 | Galbraith . |
| 3,484,989 | 12/1969 | Lazinsky . |
| 3,485,449 | 12/1969 | Wilson . |
| 3,495,352 | 2/1970 | Sbare . |
| 3,520,082 | 7/1970 | Smith . |
| 3,545,127 | 12/1970 | Jenson . |
| 3,545,128 | 12/1970 | La Fontaine et al. . |
| 3,636,829 | 1/1972 | Palmer . |
| 3,676,952 | 7/1972 | Watts . |
| 3,724,128 | 4/1973 | Tabane . |
| 3,745,701 | 7/1973 | Marvin . |
| 3,762,113 | 10/1973 | O'Mullan et al. . |
| 3,777,421 | 12/1973 | Bomba et al. . |
| 3,788,001 * | 1/1974 | Balfanz .................................... 47/33 |
| 3,916,563 | 11/1975 | Tedesh . |
| 4,031,676 | 6/1977 | Dally . |
| 4,074,479 | 2/1978 | Krupka . |
| 4,125,964 | 11/1978 | Wagoner . |
| 4,281,473 | 8/1981 | Emalfarb et al. . |
| 4,314,431 | 2/1982 | Rabassa . |
| 4,361,983 | 12/1982 | Wilson . |
| 4,372,079 | 2/1983 | Tragesar . |
| 4,454,699 | 6/1984 | Strubl . |
| 4,543,745 | 10/1985 | Beck . |
| 4,544,305 | 10/1985 | Harr . |
| 4,601,140 | 7/1986 | Russo . |
| 4,628,632 | 12/1986 | Zwier . |
| 4,644,685 | 2/1987 | Tisbo et al. . |
| 4,695,502 | 9/1987 | Rush . |
| 4,702,034 | 10/1987 | Ferguson et al. . |
| 4,747,231 | 5/1988 | LeMay et al. . |
| 4,761,923 | 8/1988 | Reum et al. . |
| 4,773,790 | 9/1988 | Hagenah . |
| 4,809,459 | 3/1989 | Bruller et al. . |
| 4,834,575 | 5/1989 | Barth et al. . |
| 4,858,379 | 8/1989 | West . |
| 4,897,973 | 2/1990 | Foster, Jr. et al. . |
| 4,934,093 | 6/1990 | Yanna . |
| 4,945,675 | 8/1990 | Kendrick . |
| 4,969,289 | 11/1990 | Trifiletti . |
| 4,976,063 | 12/1990 | Young . |
| 5,020,272 | 6/1991 | Herrema et al. . |
| 5,027,551 | 7/1991 | Rodriguez . |
| 5,067,273 | 11/1991 | Richwine . |
| 5,078,940 | 1/1992 | Sayles . |
| 5,080,523 | 1/1992 | Steiner . |
| 5,092,076 | 3/1992 | Temeta . |
| 5,119,587 | 6/1992 | Waltz . |
| 5,121,569 | 6/1992 | Thomas . |
| 5,133,163 | 7/1992 | Christensen et al. . |
| 5,134,817 | 8/1992 | Richardt . |
| 5,139,721 | 8/1992 | Castonguay . |
| 5,154,399 | 10/1992 | Swanson . |
| 5,157,867 | 10/1992 | Fritch . |
| 5,168,678 | 12/1992 | Scott, Jr. et al. . |
| 5,201,154 | 4/1993 | Thomas . |
| 5,212,917 | 5/1993 | Kurtz et al. . |
| 5,224,792 | 7/1993 | Hagenah . |
| 5,233,806 | 8/1993 | Hightower et al. . |
| 5,236,179 | 8/1993 | Schropp . |
| 5,240,343 | 8/1993 | Strobl, Jr. . |
| 5,259,154 | 11/1993 | Lilley . |
| 5,261,760 | 11/1993 | Castonguay et al. . |
| 5,275,852 | 1/1994 | Jones et al. . |
| 5,315,780 | 5/1994 | Thomas . |
| 5,367,822 | 11/1994 | Beckham . |
| 5,375,369 | 12/1994 | Var Hoeve . |
| 5,377,447 | 1/1995 | Fritch . |
| 5,410,458 | 4/1995 | Bell . |
| 5,414,956 | 5/1995 | Kherader . |
| 5,421,118 | 6/1995 | Baver . |
| 5,426,888 | 6/1995 | Gnaedig . |
| 5,442,877 | 8/1995 | Lindhal . |
| 5,501,036 | 3/1996 | Tarp, Jr. et al. . |
| 5,519,970 | 5/1996 | Reum et al. . |
| 5,526,606 | 6/1996 | Beladakis . |
| 5,531,044 | 7/1996 | Wallenius . |
| 5,535,545 | 7/1996 | Matz . |
| 5,535,568 | 7/1996 | Quinn . |
| 5,537,796 | 7/1996 | Kliethermes et al. . |
| 5,544,445 | 8/1996 | Mantilla . |
| 5,564,240 | 10/1996 | Dean, Jr. . |
| 5,568,994 | 10/1996 | Dawson . |
| 5,588,262 | 12/1996 | Dawson . |
| 5,601,384 | 2/1997 | Dawson . |
| 5,640,801 | 6/1997 | Rynberk . |
| 5,683,170 | 11/1997 | Blaha . |

\* cited by examiner

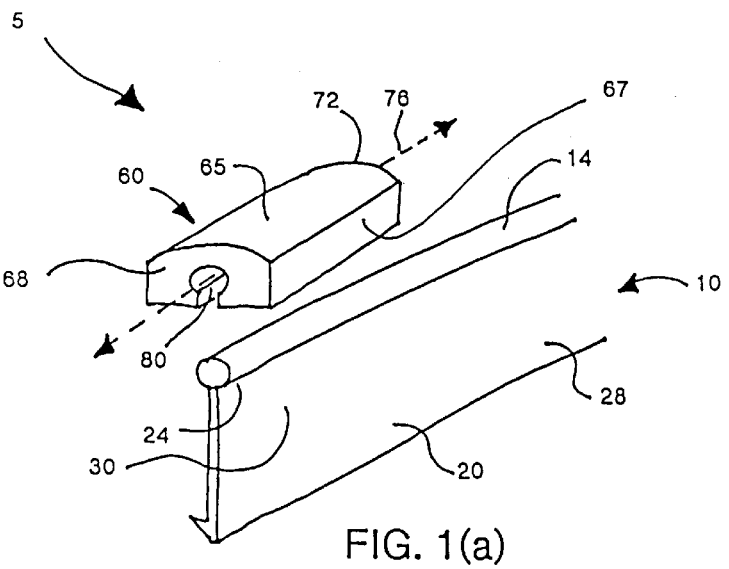
FIG. 1(a)
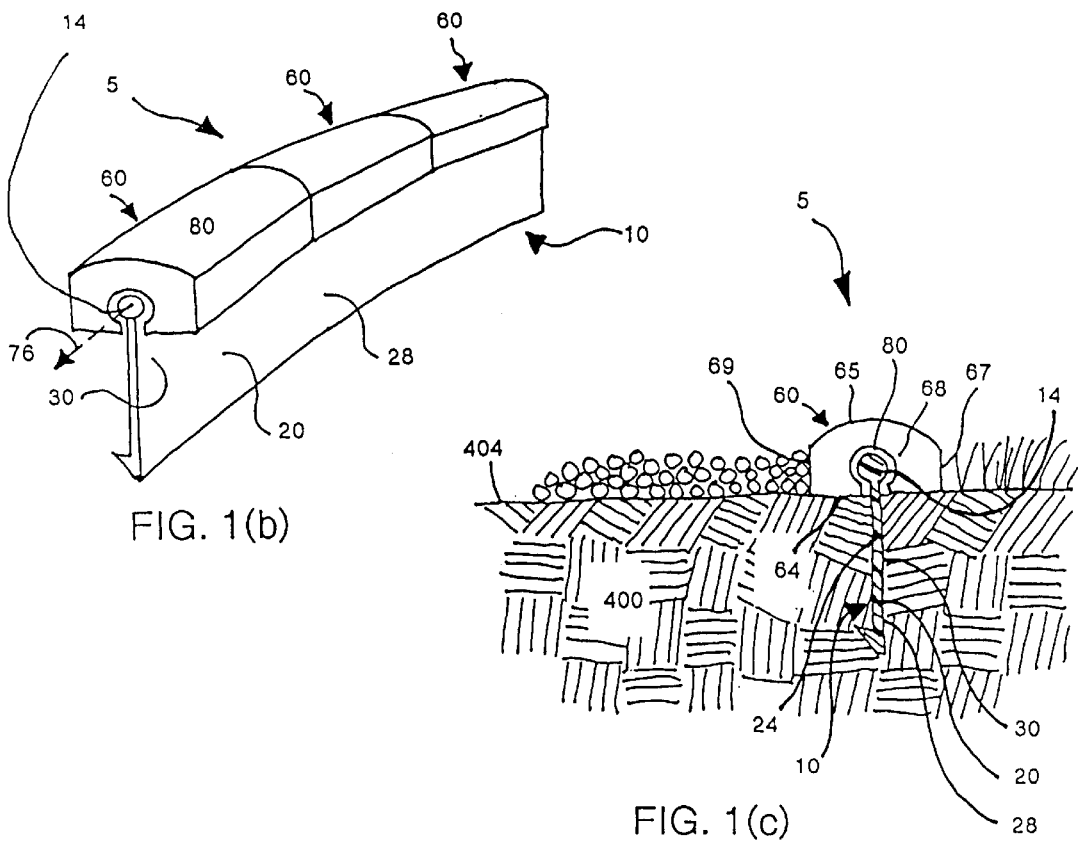
FIG. 1(b)
FIG. 1(c)

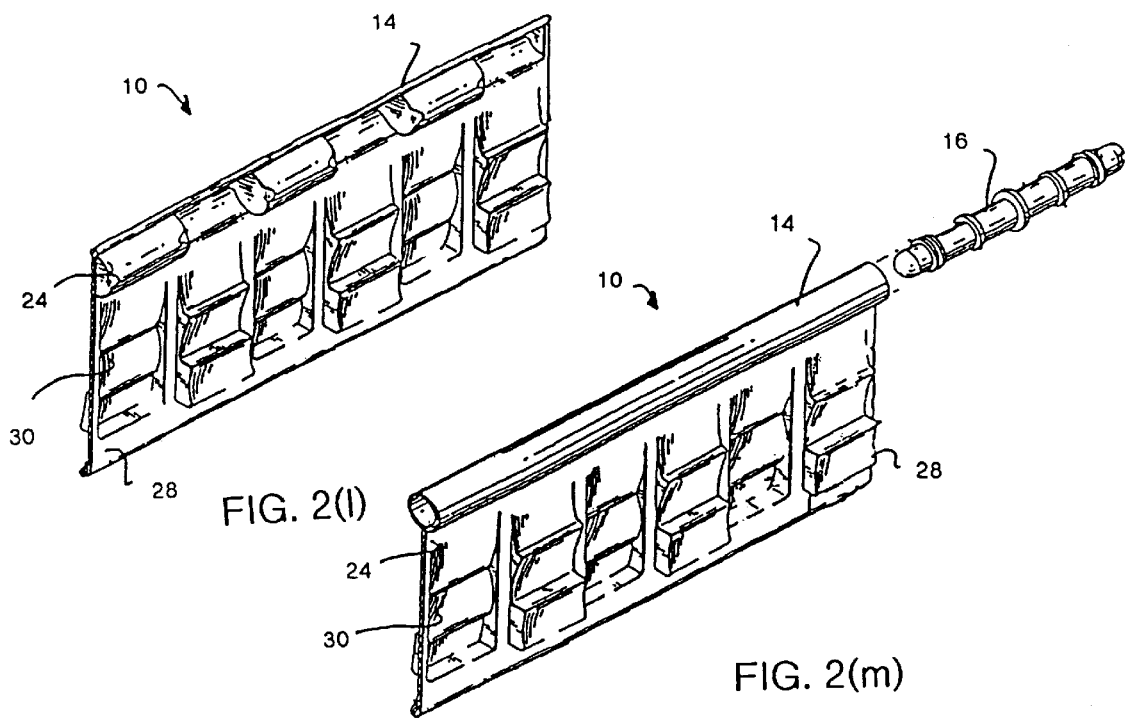

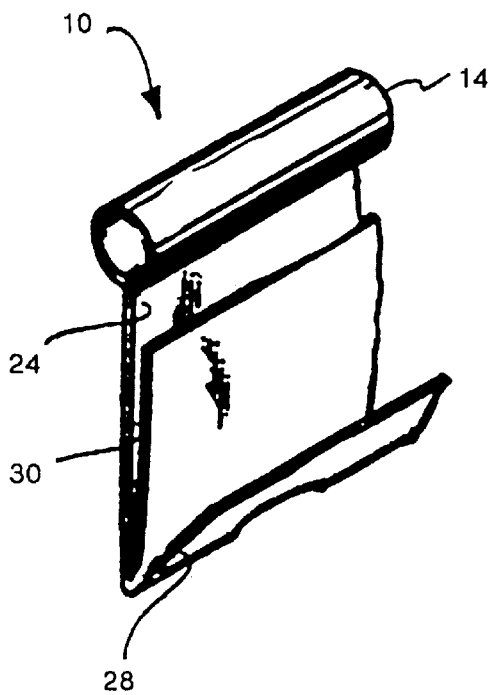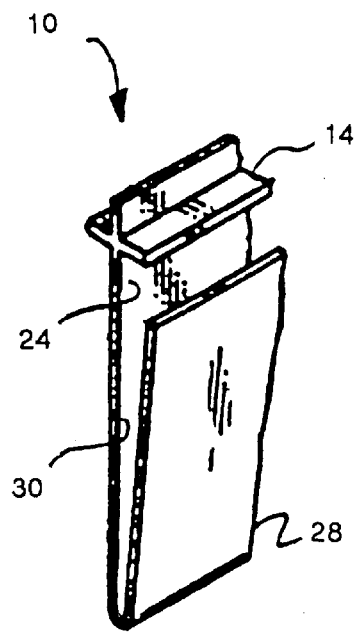
FIG. 2(p)
FIG. 2(q)

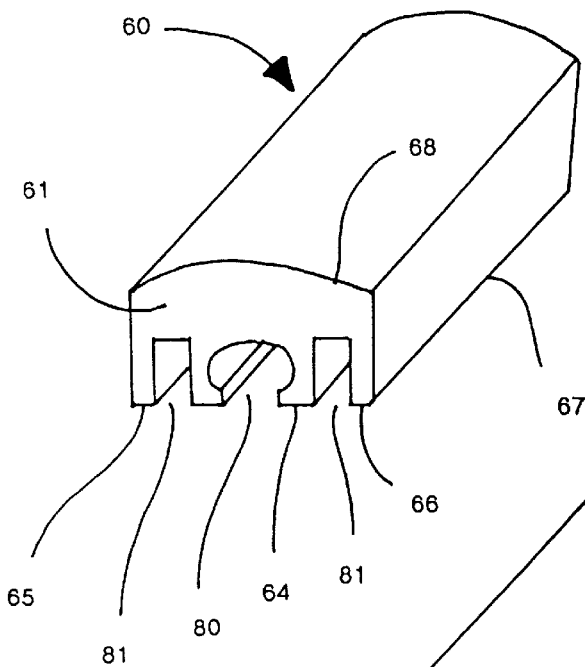
FIG. 9(a)
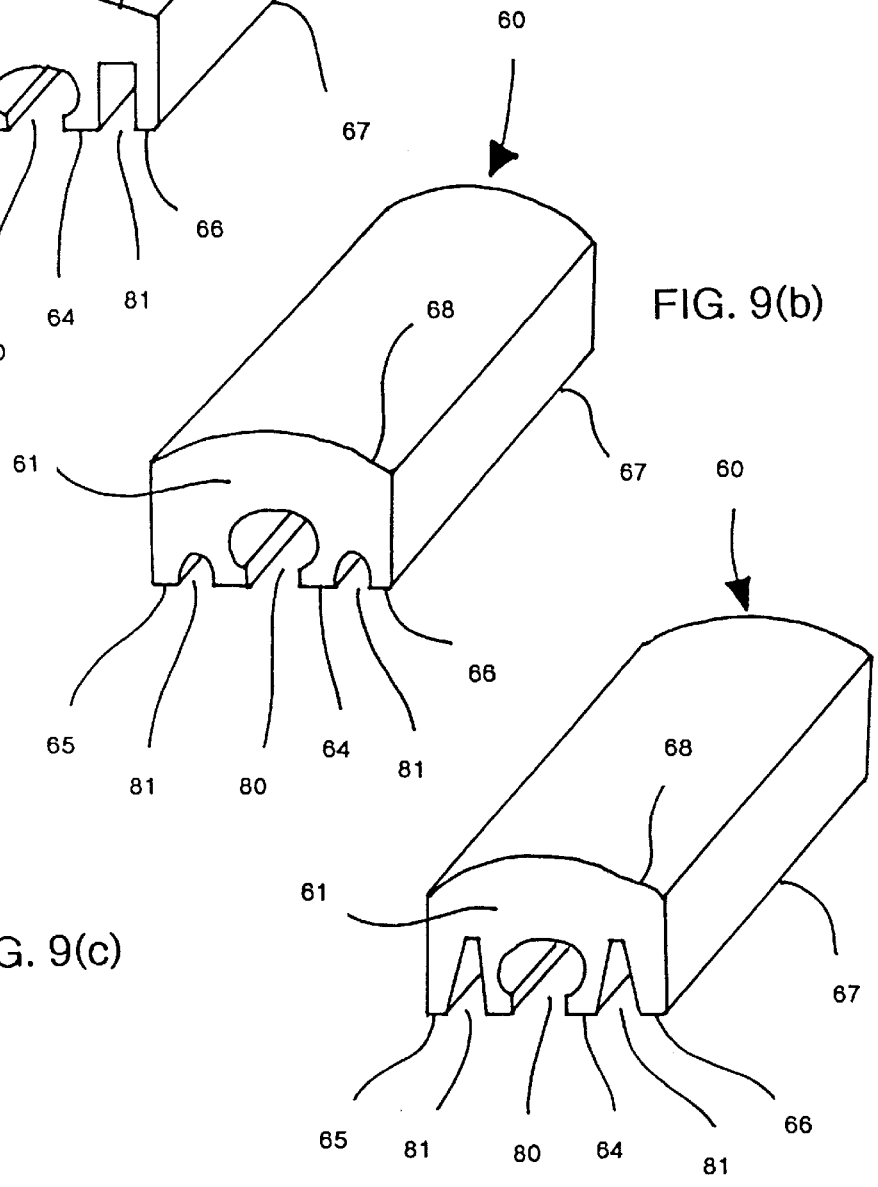
FIG. 9(b)
FIG. 9(c)
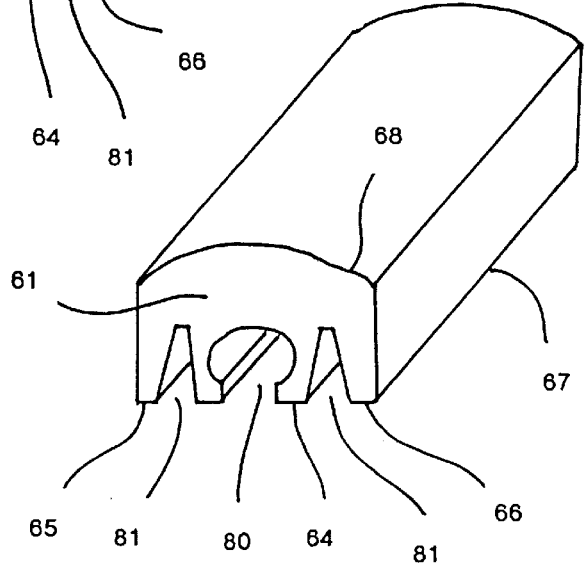

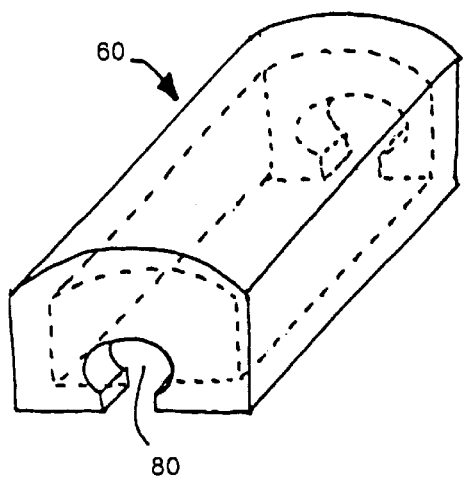
FIG. 9(j)
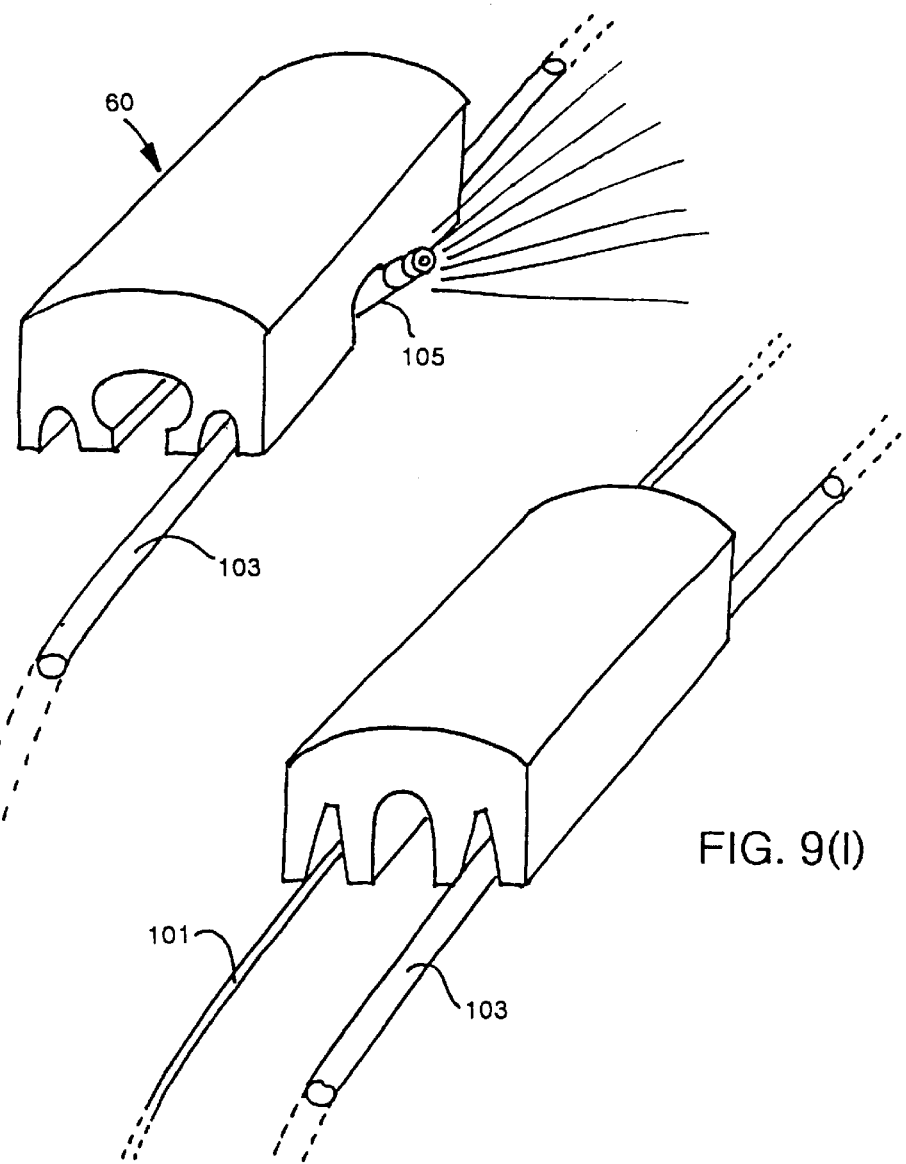
FIG. 9(k)
FIG. 9(l)

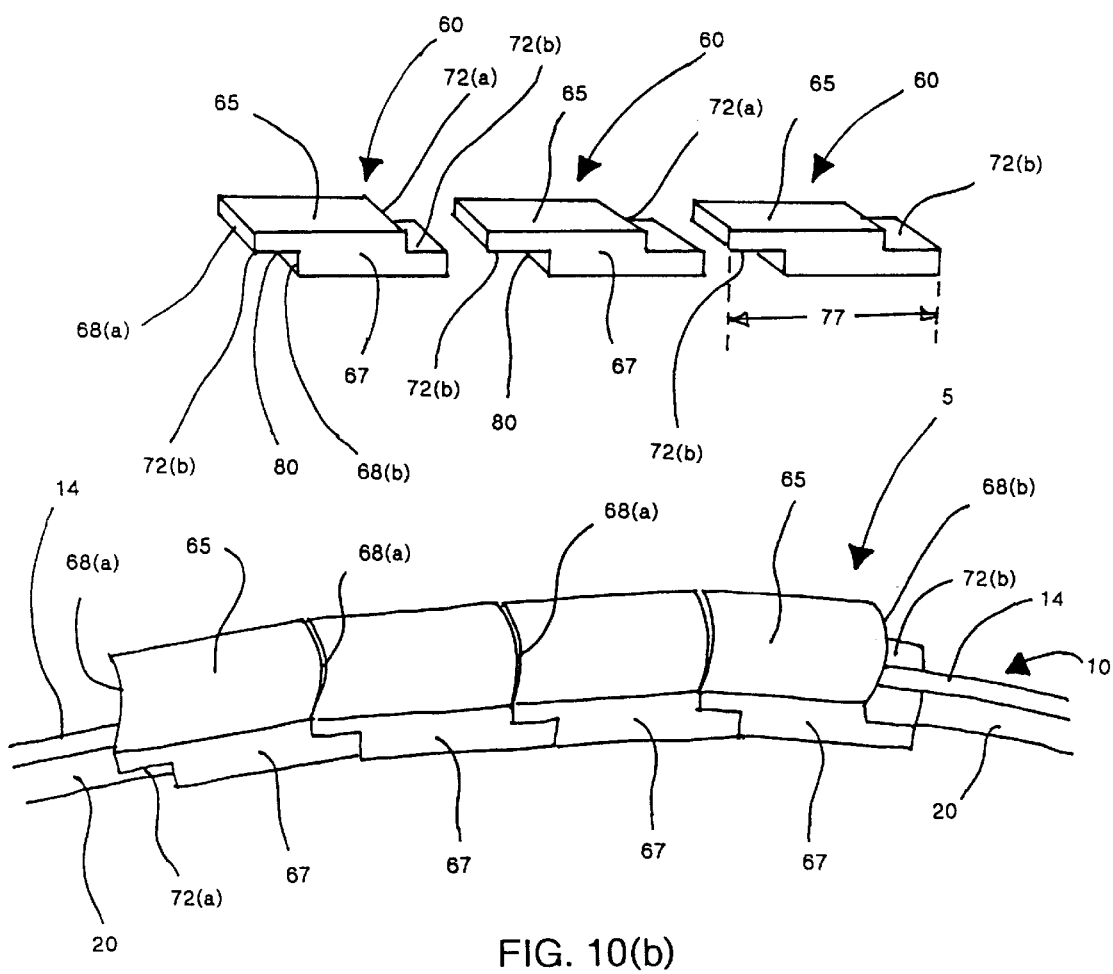

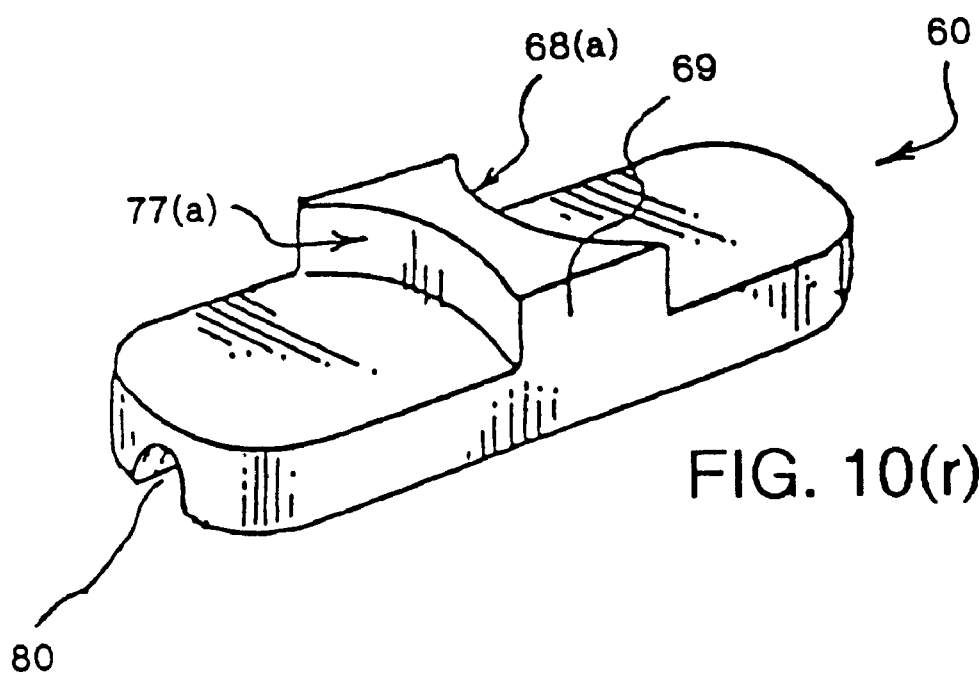

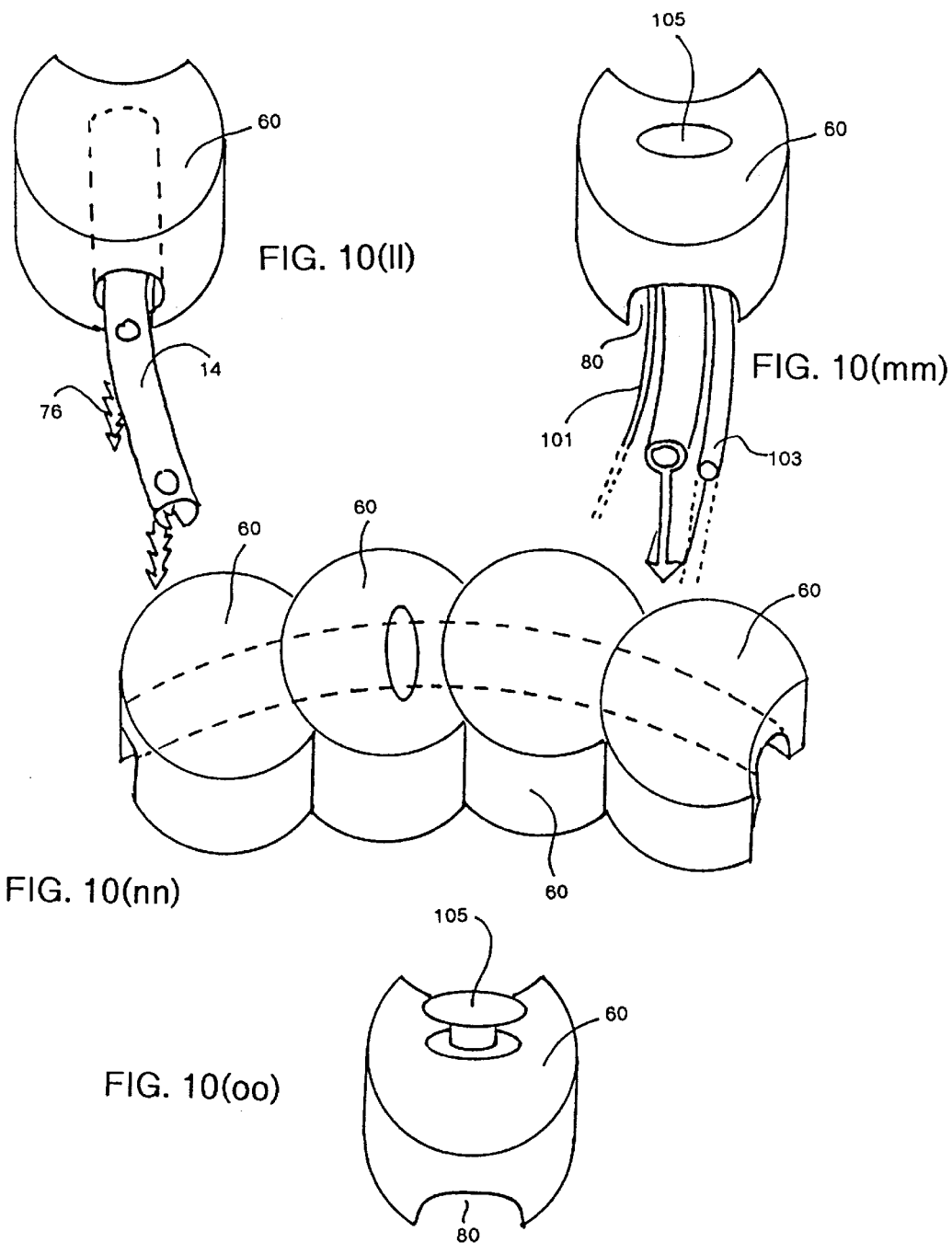

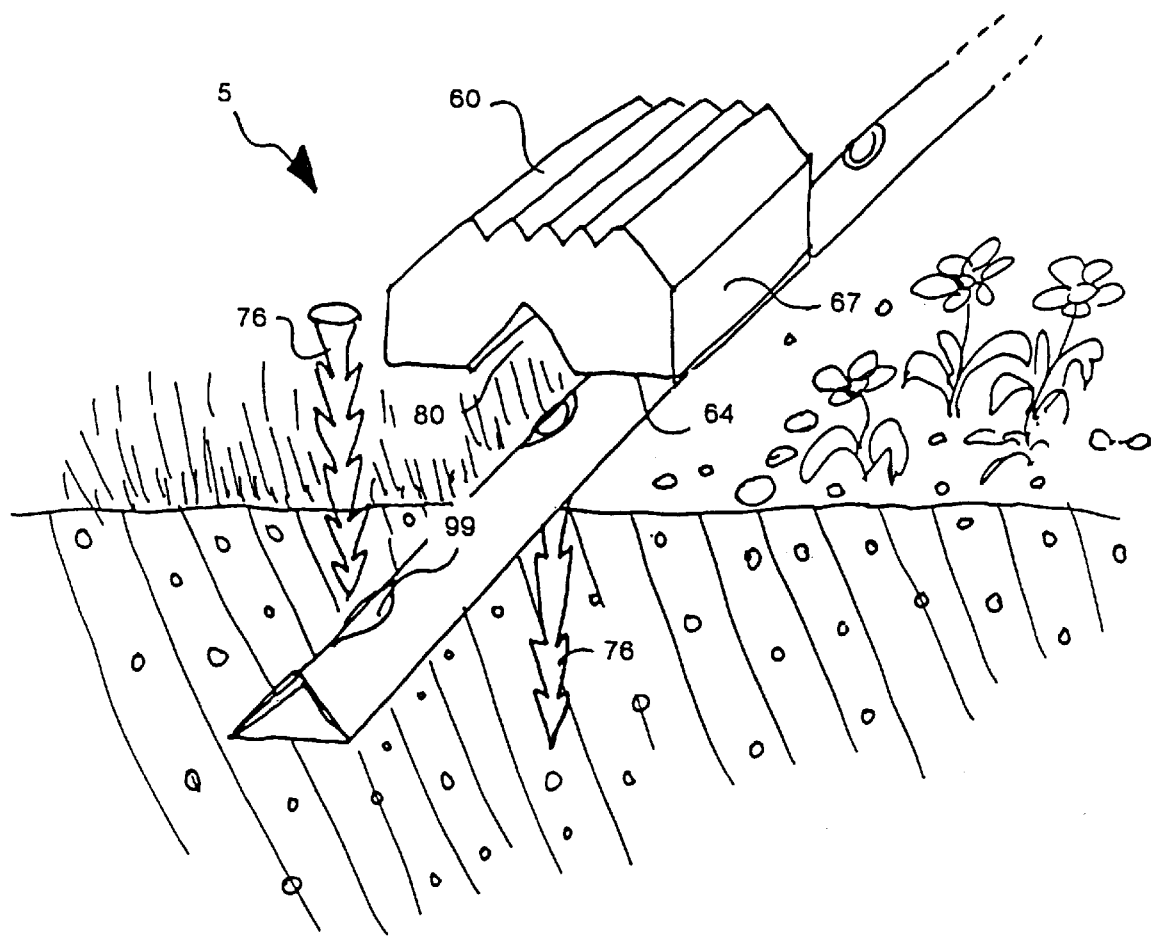
FIG. 10(aaa)

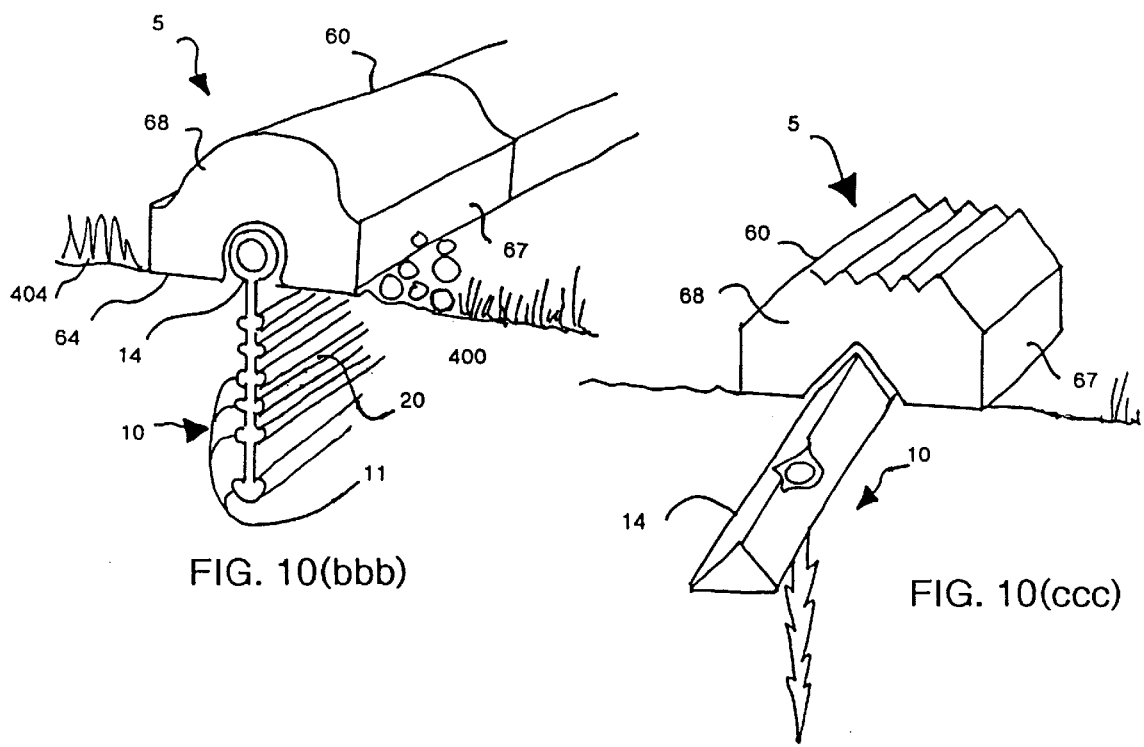
FIG. 10(bbb)
FIG. 10(ccc)

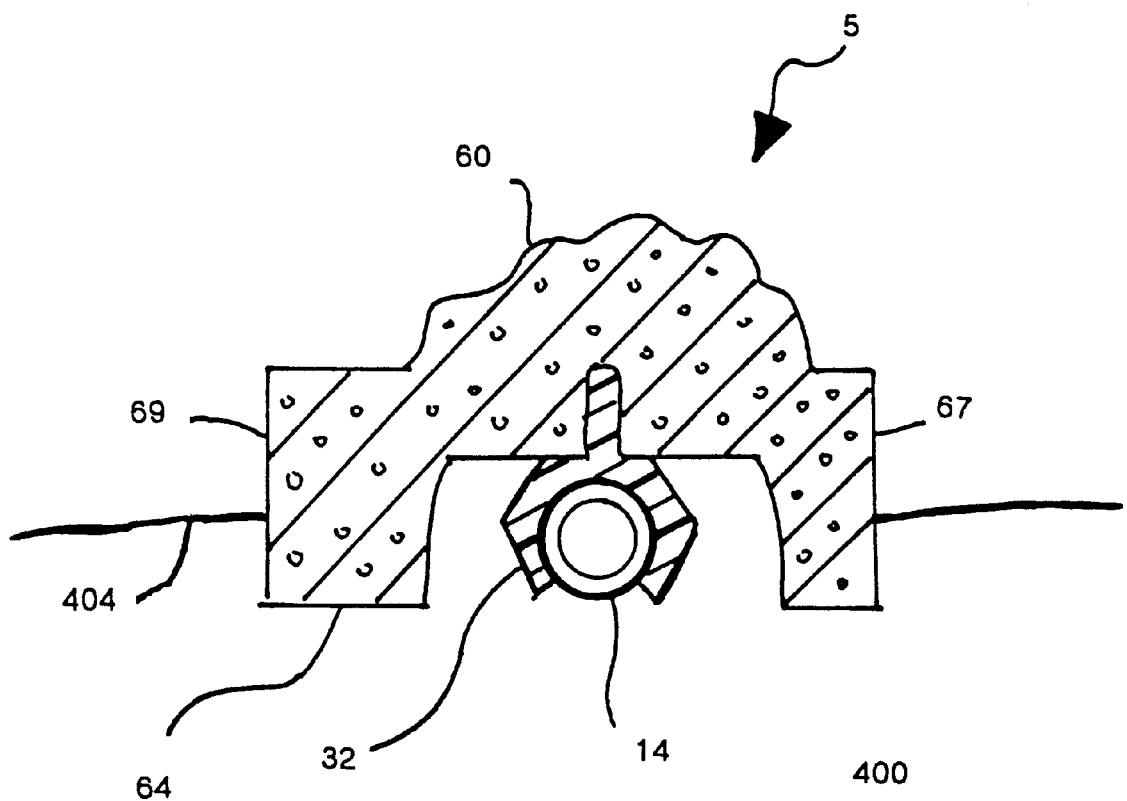
FIG. 10(ddd)

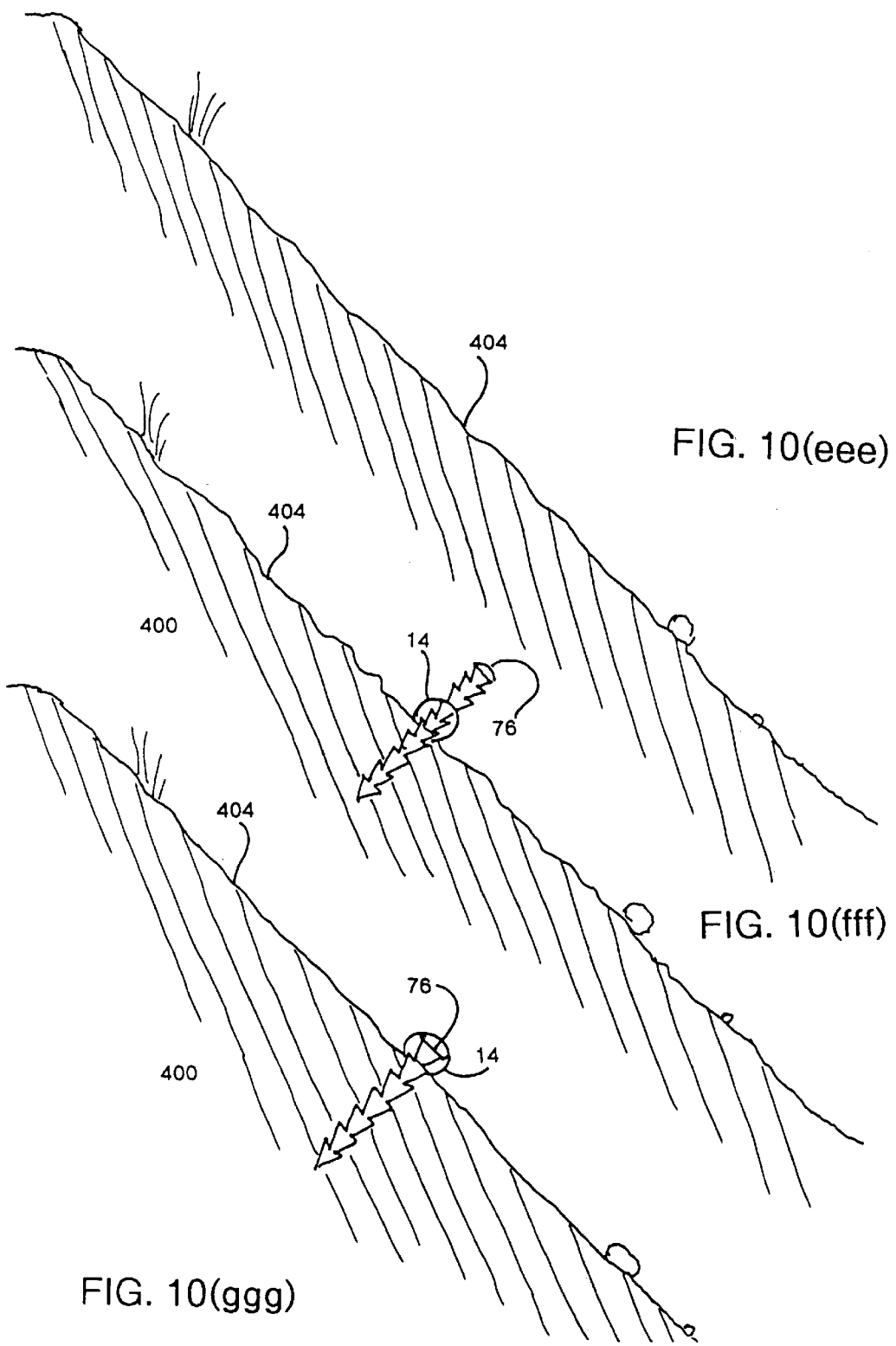
FIG. 10(eee)
FIG. 10(fff)
FIG. 10(ggg)

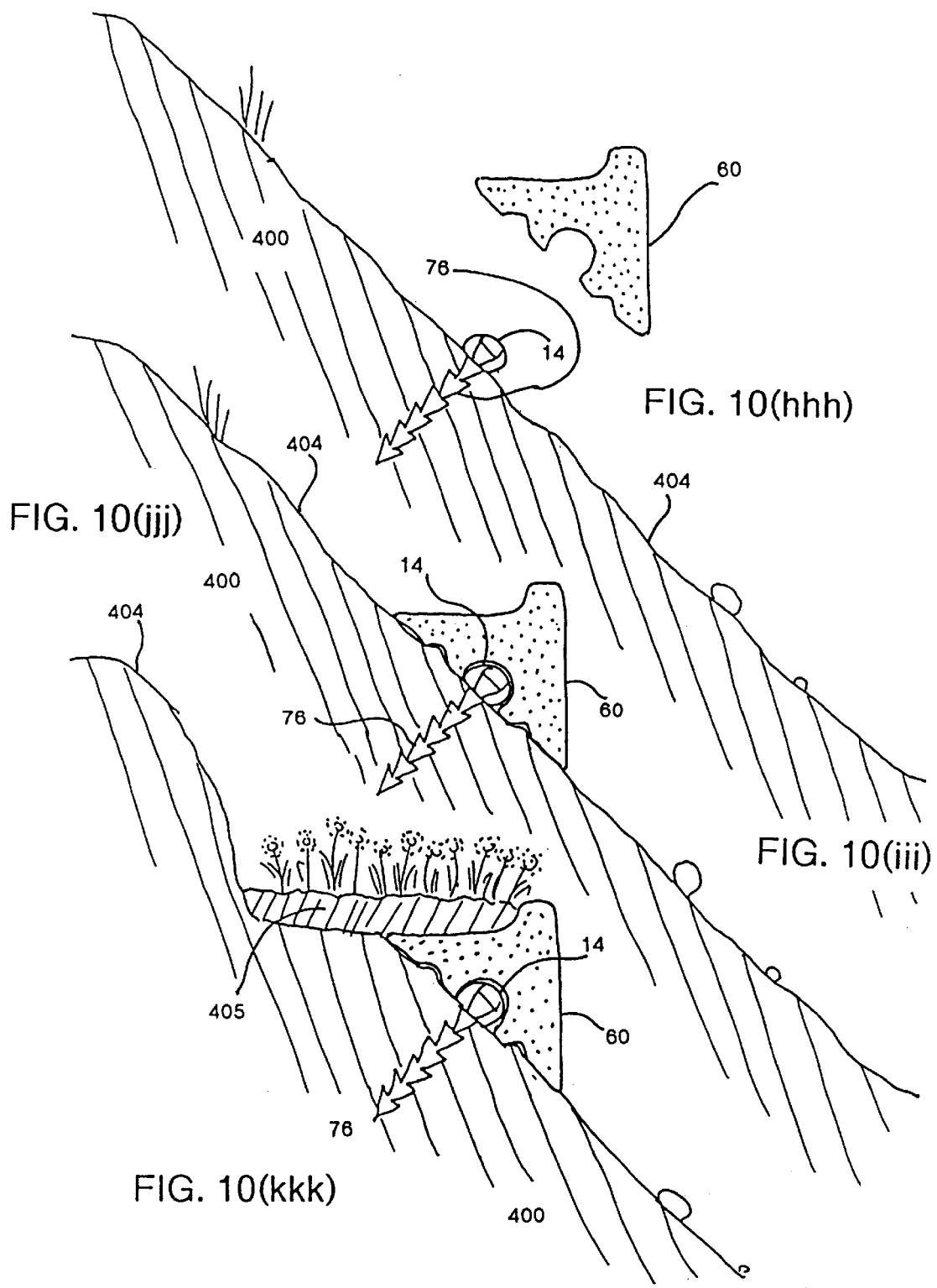

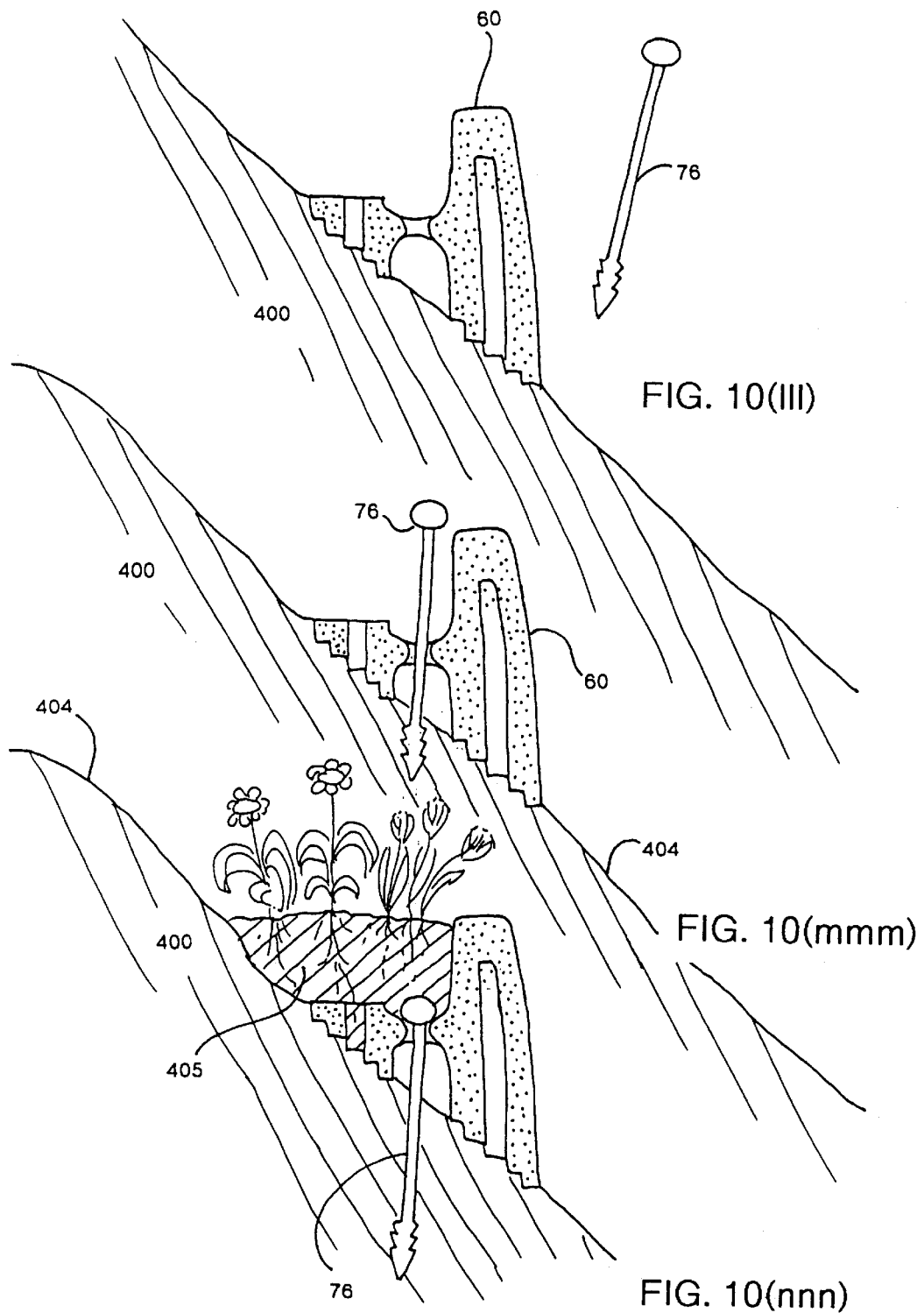

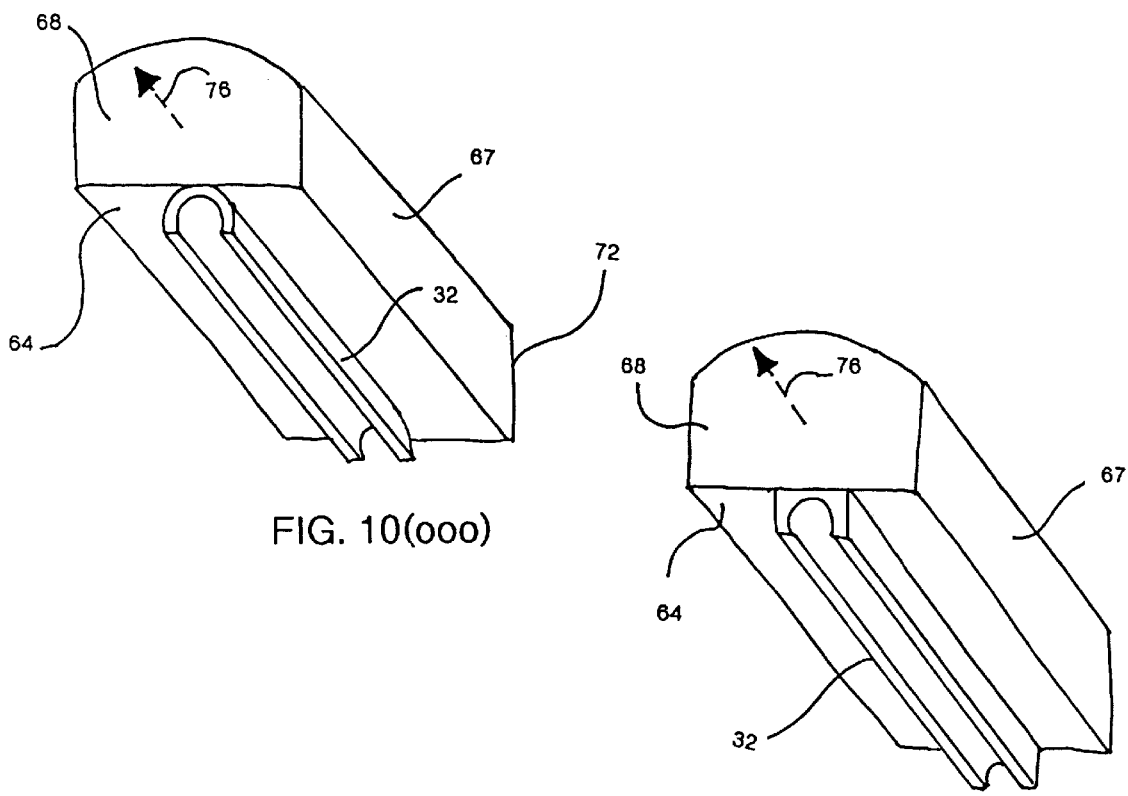
FIG. 10(ooo)
FIG. 10(ppp)

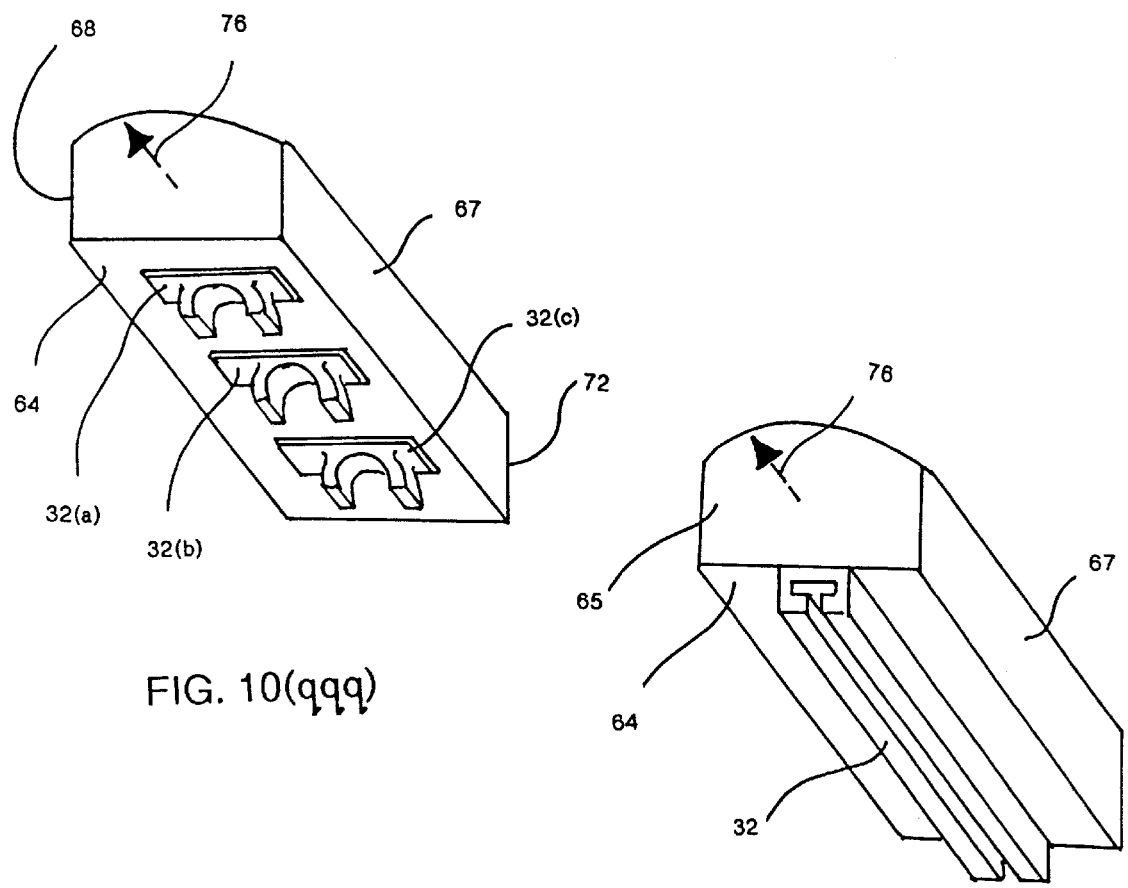
FIG. 10(qqq)
FIG. 10(rrr)

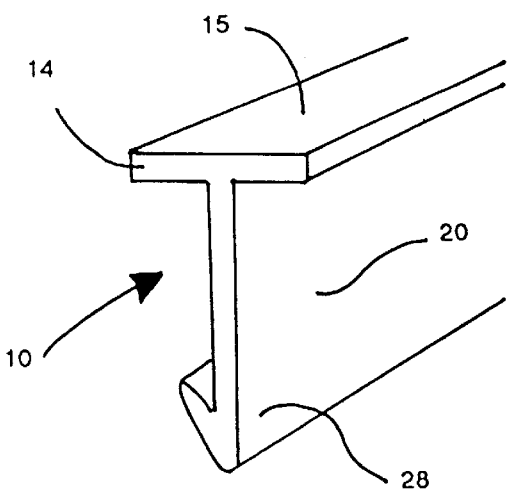
FIG. 10(sss)
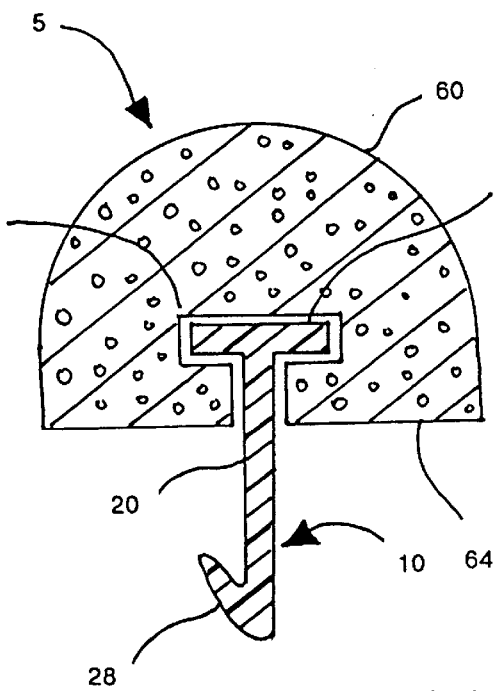
FIG. 10(ttt)
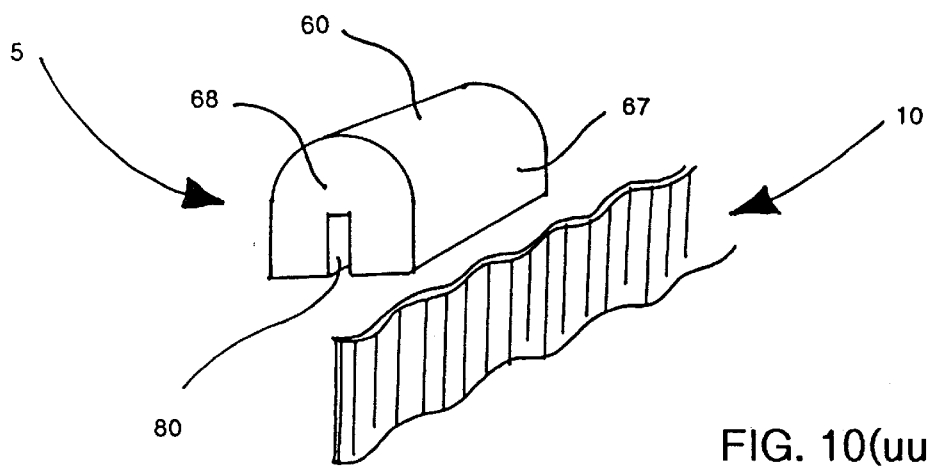
FIG. 10(uuu)

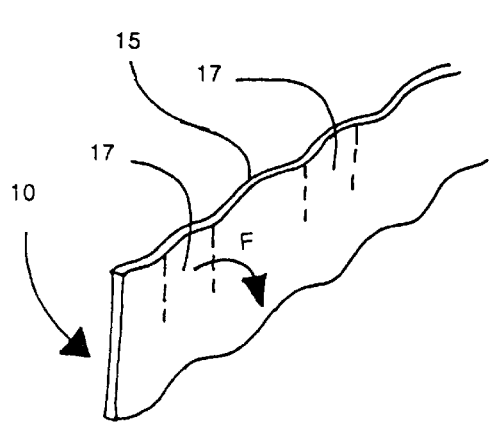
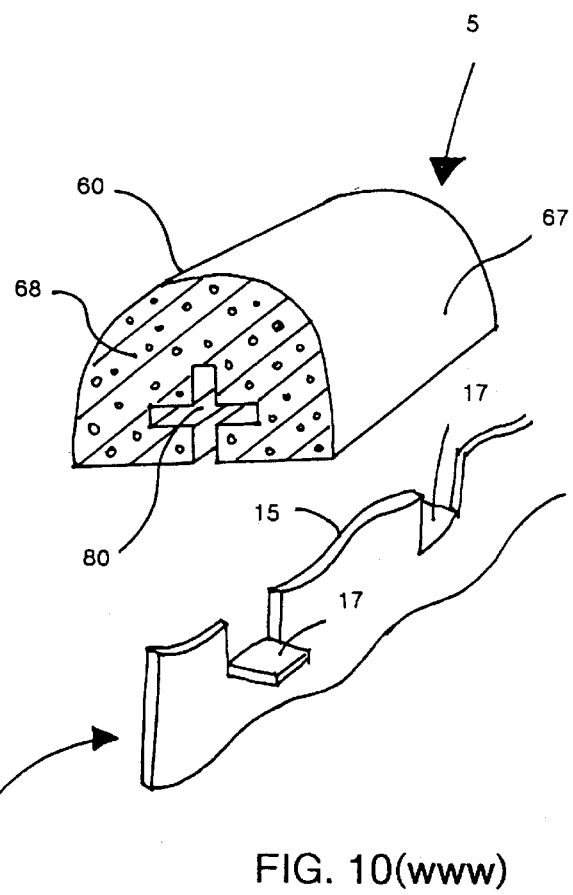
FIG. 10(vvv)
FIG. 10(www)

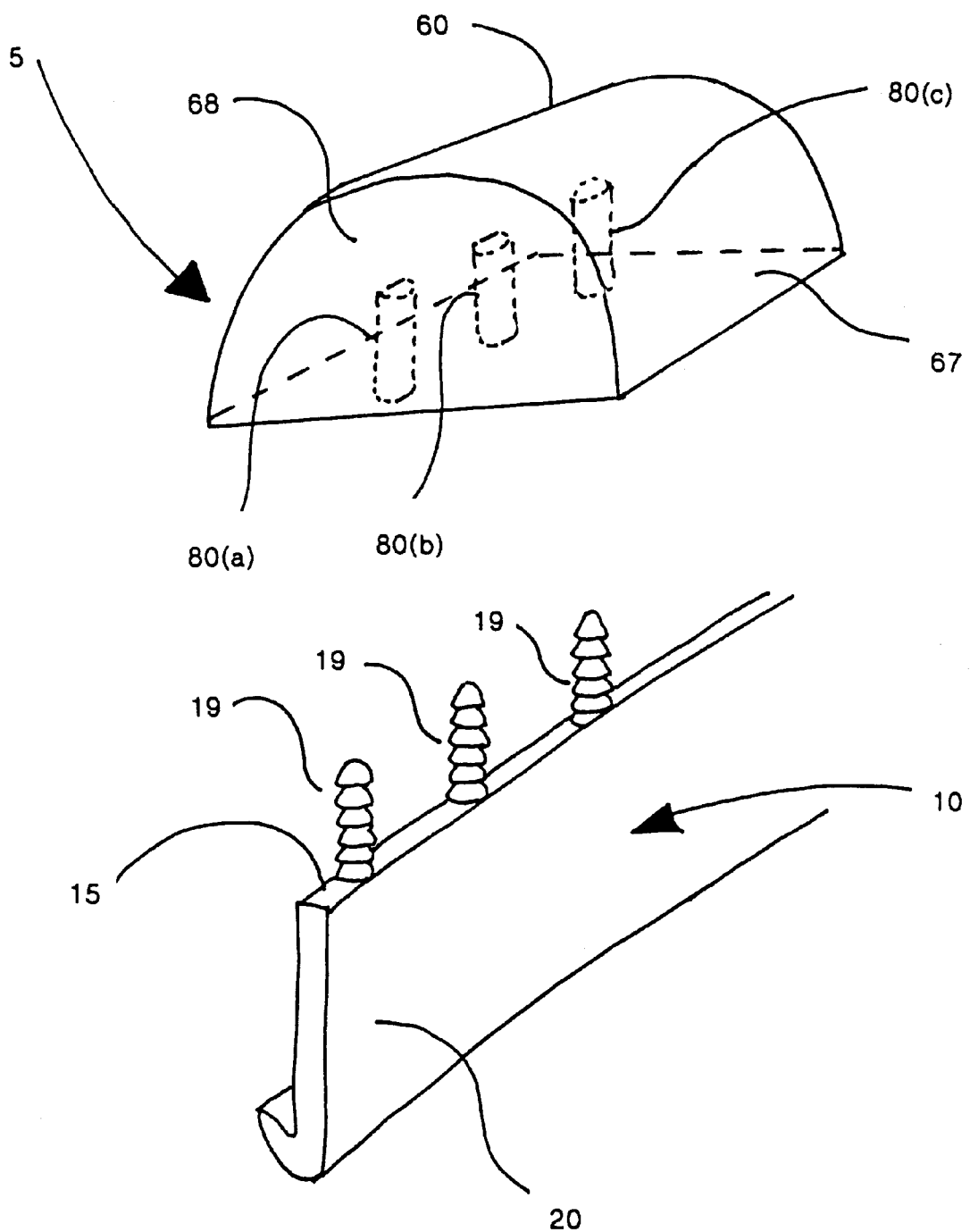
FIG. 10(xxx)

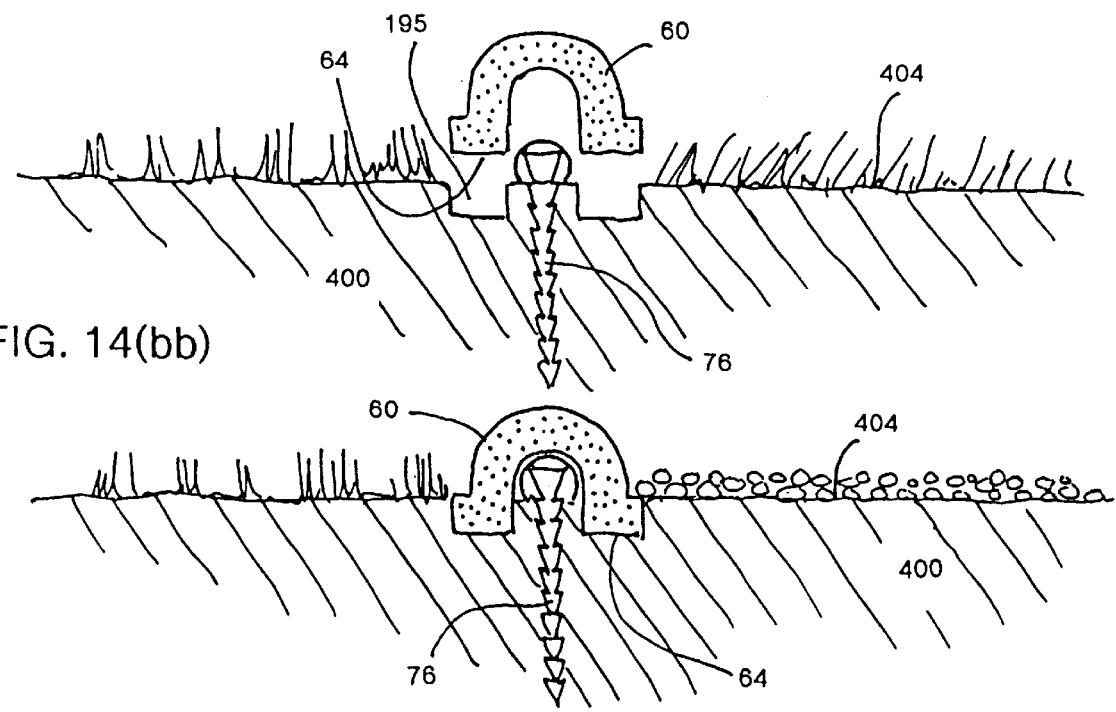
FIG. 14(bb)
FIG. 14(cc)
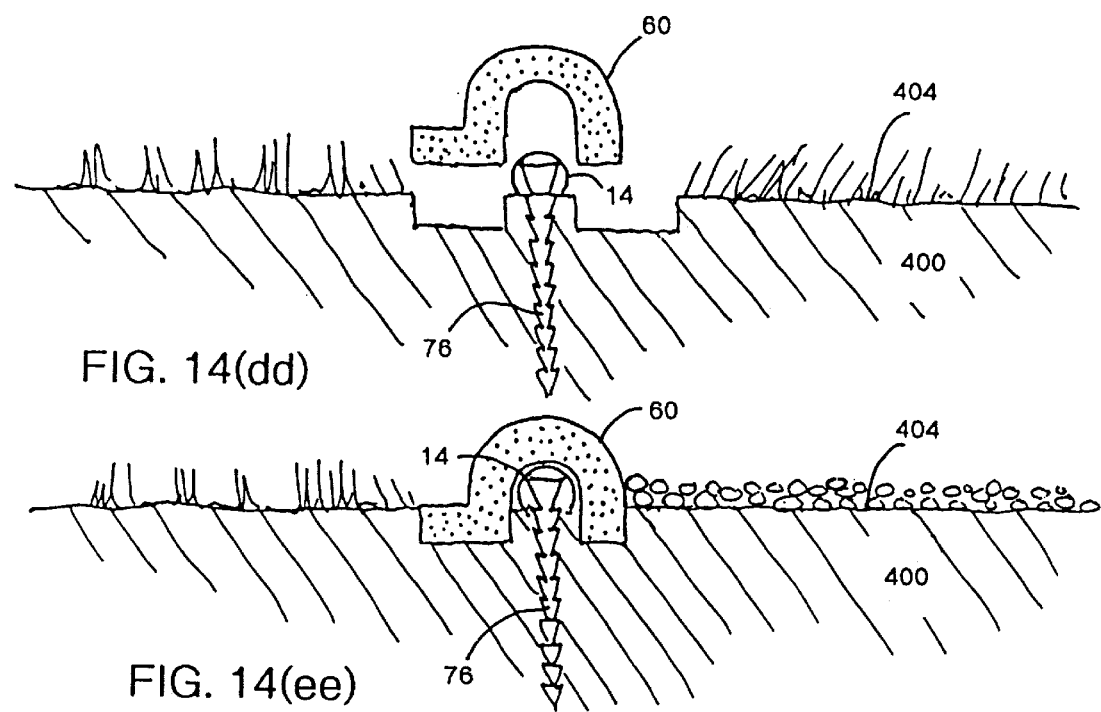
FIG. 14(dd)
FIG. 14(ee)

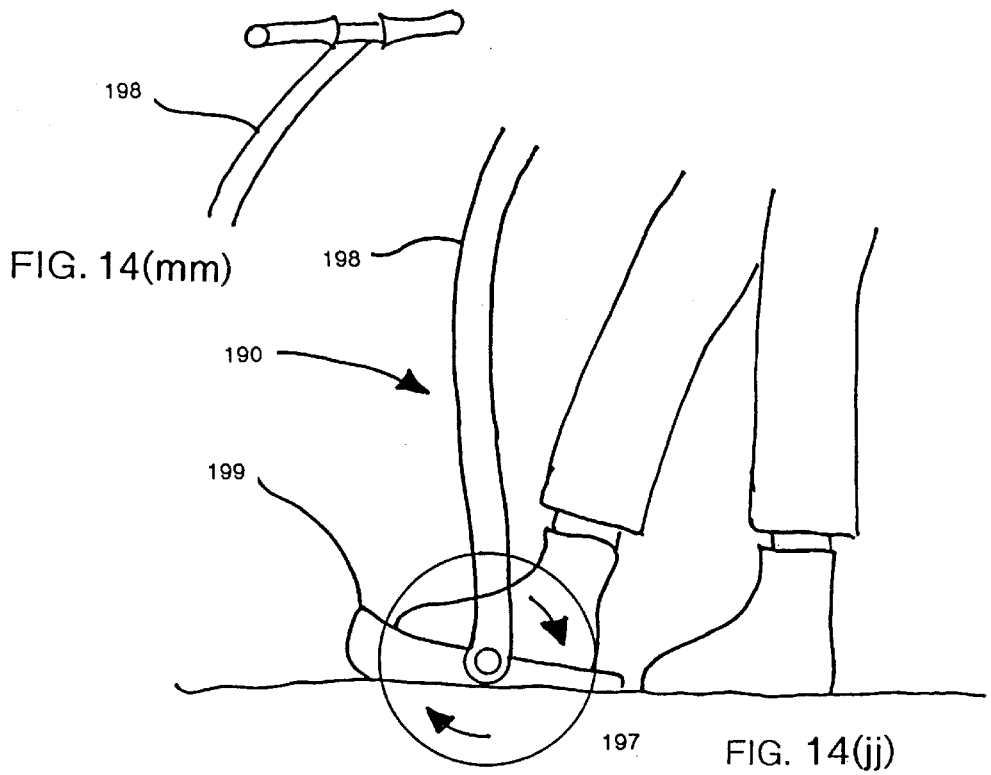
FIG. 14(mm)
FIG. 14(jj)
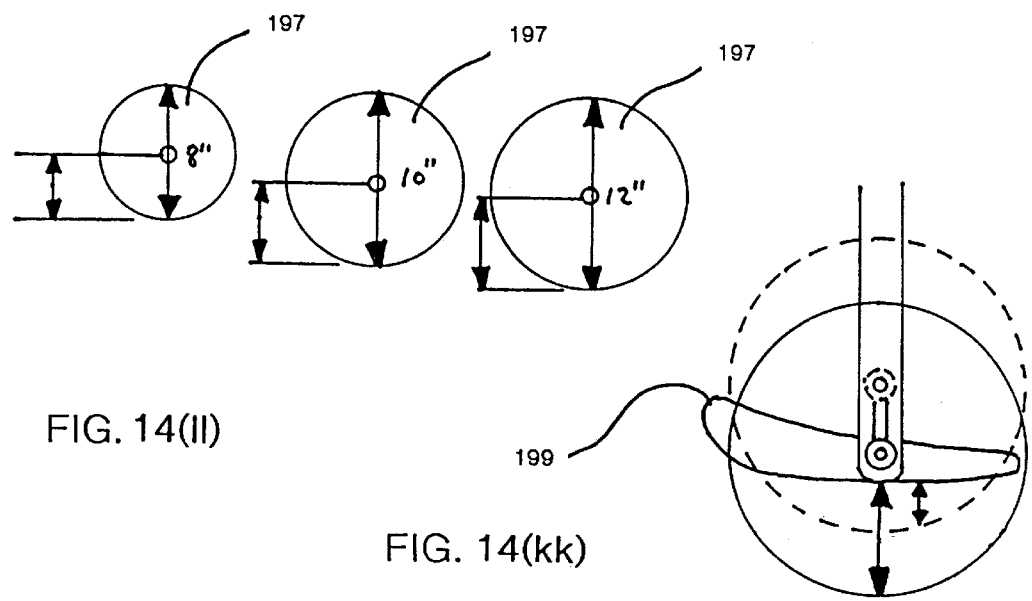
FIG. 14(ll)
FIG. 14(kk)

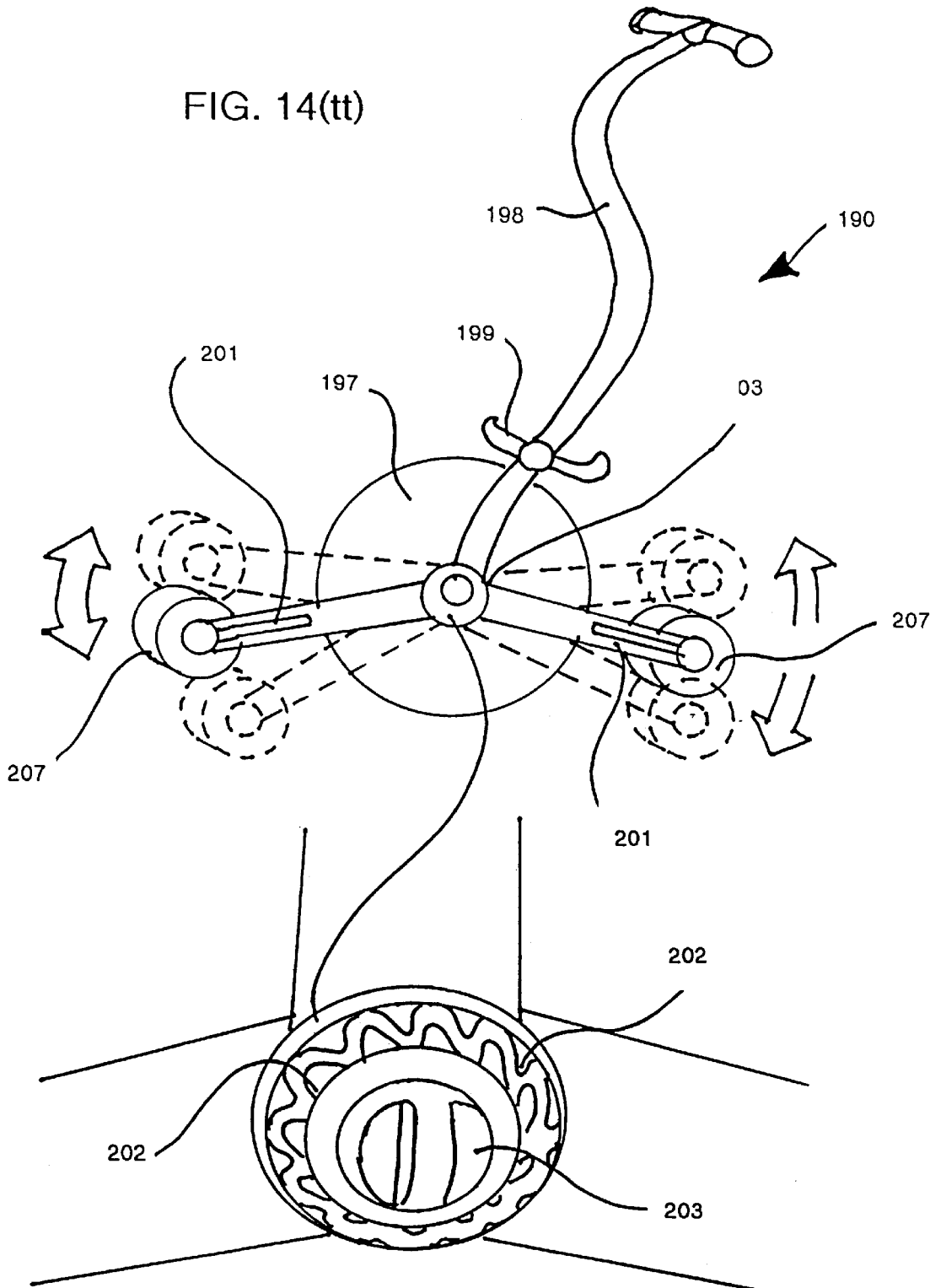

LANDSCAPE EDGING SYSTEM HAVING BLOCK WITH RECESS

REFERENCE TO RELATED APPLICATION

This application claims priority and other benefits from the filing date of U.S. Provisional Patent Appln. Ser. No. 60/030,027 entitled "Lawn Edging System, Components and Method" to Gaston filed Nov. 2, 1996.

FIELD OF THE INVENTION

The present invention relates to landscape edging systems, methods and components, and to paving block edging systems, methods and components for forming borders or walkways between adjoining garden, landscape, driveway, walkway, patio or sidewalk areas.

BACKGROUND OF THE INVENTION

Gardeners, landscapers and homeowners frequently use border or edging material such as fences, logs, railroad ties, bricks, concrete blocks and the like to provide a decorative edge for a landscape or garden. Such border or edging material is also frequently employed to physically separate landscape, garden and other areas from one another.

Plastic landscape edging is now commonly used to divide and separate different landscape areas to preclude material in one area from spilling over into an adjacent area, and to prevent grass, flowers or the like contained in one area from growing in an adjoining area. For example, plastic edging is typically used to divide grass landscape areas from adjoining garden areas, and helps prevent grass from taking root in adjoining garden areas. Plastic edging also helps prevent garden bedding material from spilling onto the adjoining landscape area. The most prevalent materials used to fabricate landscape edging today are inert, synthetic flexible plastics such as polyethylene and ethylene vinyl acetate.

In the past, landscape edging has been formed from lengths of wood, corrugated metal strips, plastic, cement blocks and poured concrete. Wood is subject to rot and insect attack and decays over time. Wood landscape timbers must therefore be replaced rather frequently. Ungalvanized metal bands oxidize and rust, and tend to become bent and misshapen over time. Even galvanized metal bands eventually corrode once the protective zinc coating has been oxidized. Concrete blocks are inflexible, difficult to install and generally heavy. Poured concrete is expensive, difficult or impossible to modify once poured and set, and difficult and time-consuming to install.

Plastic landscape edging, on the other hand, is inexpensive, readily manufactured, flexible and has a long service life. As a result of the disadvantages inhering in wood, metal and concrete landscaping materials and the unique advantages of plastic, plastic landscape edging has become the landscape edging material of choice of many consumers.

While landscape edging formed from inert synthetic plastic has many advantages such as being flexible and resisting deterioration well, problems nevertheless occur in their use. Conventional landscape edging usually consists of a longitudinally extending strip of material having a lower edge that is inserted into the ground to a predetermined depth and an upper edge or rail that generally projects above the ground. The edging is typically installed by digging a narrow trench, inserting the lower edge to a predetermined depth, refilling the trench and compacting the earth around the edging. Such installation normally maintains the edging in its intended position for a period of time.

As time progresses, however, the environment and other factors actively work against the edging remaining in its original position. The edging may be walked on, bumped, kicked, shoved aside or otherwise engaged in such a manner that it is displaced in respect of its original position. Landscape mowers or tractors may repeatedly drive over the edging and displace or damage the edging.

The winter effects of frost heave, or the freezing and thawing action of the earth surrounding the edging, are often more severe than the foregoing effects in respect of edging displacement or damage. The ground retains moisture in the fall that freezes with dropping temperatures. Water is one of the few materials having a coefficient of volume expansion that increases as temperature decreases, and the ground accordingly expands with frozen moisture in the winter. This has the effect of compressing and heaving the landscape edging, and as a result the edging breaks or is laterally or vertically displaced. When spring arrives in colder climates, plastic landscape edging is often found to have buckled upwards and protruded from the ground during the winter in response to frost heave, especially where adjacent strips of edging are connected to one another. As temperatures rise in spring, the moisture beneath the ground surface melts, again changing the volume of the subsurface ground adjoining the edging. As the seasons alternate, the landscape edging is repeatedly exposed to a variety of forces arising from changing soil volumes that, over the long term, cause the edging to become dislodged or damaged.

Landscape edging systems, components and methods are well known in the art, some examples of which may be found in the issued U.S. Patents listed in Table 1 below.

TABLE 1

Prior Art Patents

| Patent Number | Title |
| --- | --- |
| 425,890 | Border for Flower Bed |
| 1,166,664 | Curbing Block |
| 1,183,055 | Dividing Stone for Gardens or Landscapes |
| 1,843,108 | Curb or Edging for garden Paths and the Like |
| 1,977,021 | Root Fence for Flower Edges and the Like |
| 2,094,519 | Walk and Drive Edging |
| 2,235,356 | Protective Tile for Covering Underground Cables |
| 2,713,751 | Garden Edging Device |
| 2,744,357 | Landscape Edging Device |
| 2,746,723 | Border Fencing |
| 2,769,277 | Terrace Barrier or Curbing |
| 2,794,375 | Sectional Curbs for Parking Lots and the Like |
| 2,865,136 | Border Block |
| 2,920,184 | Illuminated Driveway Curbing |
| 3,289,349 | Curbing and Bordering Means |
| 3,387,786 | Divider and Sprinkler Combination |
| 3,636,829 | Parking Barrier |
| 4,074,479 | Landscape Edging |
| 4,281,473 | Landscaping Bed Divider |
| 4,601,140 | Landscape Edging System |
| 4,628,632 | Edging Strip |
| 4,644,685 | Edging Strip |
| 4,695,502 | Interlocking Landscape Planking |
| 4,702,034 | Edging Assembly |
| 4,747,231 | Landscape Edging |
| 4,761,923 | Landscape Edging |
| 4,809,459 | Building and Garden Edging |
| 4,823,521 | Landscaping Bed Divider |
| 4,897,973 | Modular Sun Block System |
| 4,945,675 | Dividing, Watering and Lighting System for Landscapes |
| 4,969,289 | Garden Edging Device |
| 5,027,551 | Decorative Landscape Edging Package |
| 5,067,273 | Landscape Edging |
| 5,080,523 | Concrete Stone for Forming Road Edges |
| 5,117,583 | Landscape Terracing Material |

TABLE 1-continued

Prior Art Patents

| Patent Number | Title |
| --- | --- |
| 5,119,587 | Method and Apparatus for Landscape Edging |
| 5,121,569 | Landscape Edging Device |
| 5,133,163 | Conduit Containing Construction Block |
| 5,154,399 | Implement for Removing Landscape Edging |
| 5,157,867 | Landscape Edging Apparatus and Method |
| 5,168,678 | Modular Landscaping System and Structures |
| 5,201,154 | Landscape Edging and Methods of Manufacturing and Using Same |
| 5,233,806 | Articulating Stone Edging Construction |
| 5,236,179 | Garden Trim Fence |
| 5,259,154 | Landscape Border |
| 5,315,780 | Landscape Edging Material Anchoring Arrangement |
| 5,317,833 | Landscape and Flower Bed Edging |
| 5,375,369 | Landscape Edgings with Stakeable Connectors |
| 5,377,447 | Landscape Edging Apparatus and Method |
| 5,410,458 | Illuminated Landscape Edging |
| 5,414,956 | Interlocking Garden Edging and Ornament |
| 5,421,118 | Landscape Edging System |
| 5,426,888 | Landscape Edging System |
| 5,438,804 | Landscape Edging |
| 5,442,877 | Modular Landscape Borders |
| 5,501,036 | Even-Coil Edging for Cartonless Packaging |
| 5,519,970 | Landscape Edging |
| 5,531,044 | Landscape Edging Device and Method |
| 5,535,568 | Self Indexing Landscape Module |
| 5,544,445, | Landscape Edging Device |
| 5,564,240 | Edging Block and Method of Enclosing an Area Utilizing a Series of Edging Blocks |
| Des. 335,429 | Male End Cap for Landscaping Terracing |
| Des. 363,801 | Border Edge |

Particular attention is directed to the following prior art patents: U.S. Pat. No. 3,762,113 to O'Mullen; U.S. Pat. No. 4,747,231 to LeMay et al.; U.S. Pat. No. 4,945,675 to Kendrick; U.S. Pat. No. 5,027,551 to Rodriguez; U.S. Pat. No. 5,119,587 to Waltz; U.S. Pat. No. 5,240,343 to Strobl, Jr.; and U.S. Pat. No. 5,421,118 to Bauer.

Those of skill in the art will appreciate readily upon reading the Summary of the Invention, Detailed Description of the Preferred Embodiments and Claims set forth below, that at least some of the devices and methods disclosed in the patents of Table 1 may be modified advantageously using the teachings of the present invention.

SUMMARY OF THE INVENTION

The present invention has certain objects. That is, the present invention provides solutions to many problems existing in the prior art respecting landscape edging systems, components and methods. Those problems include: (a) landscape edging or blocks that become displaced or pushed out of the ground by frost heave; (b) adjacent sections of landscape edging or blocks that buckle or separate at their points of connection due to frost heave; (c) difficulty of installation, especially when a trench must be excavated to receive the landscape edging or blocks; (d) lack of consistency and continuity in the appearance and depth of installation of plastic landscape edging; (e) a degree of coupling of landscape edging or blocks to underlying or surrounding earth that is insufficient to prevent or minimize frost heave or other undesired shifting or movement of the strips or blocks; (f) a degree of coupling between adjoining landscape edging strips or blocks that is insufficient to prevent or minimize frost heave or other undesired shifting or movement of the strips or blocks at the points where they connect to one another; (g) landscape edging or blocks being damaged easily by landscape mower or grass trimmer blades, or by other landscape equipment; (h) landscape edging or blocks of such a design that a grass trimming step is required after a landscape mowing step has been completed; (i) adjoining edging blocks that fall away or become separated from one another over time, or that are susceptible to being separated from, pulled or pushed away from one another over time, due to erosional, gravitational, human or other forces acting upon them; (j) wood blocks that crack, split, rot or become discolored over time; (k) metal dividing members that corrode or become discolored over time; (l) plastic landscape edging strips and connecting points that become faded, discolored, cracked or broken due to the deleterious effects of ultraviolet radiation, weathering and other forces of nature; (m) landscape edging or blocks that lack continuity of style, color, texture or material in respect of other landscape features such as retaining walls, planters, accent lighting, patios, sidewalks or the like, and (n) lack of a single landscape edging system capable of being adapted readily and easily to changing landscape or stylistic requirements such as updates or changes in color, texture, material or style. Various embodiments of the present invention have the object of solving at least some of the foregoing problems.

In comparison to known landscape edging systems, components and methods, various embodiments of the present invention provide numerous advantages including, but not limited to, one or more of the following: (a) eliminating the need to dig a trench; (b) reducing or eliminating the deleterious effects of UV radiation on plastic; (c) requiring less material to be excavated during installation of landscape edging; (d) eliminating the need to excavate a trench when installing a landscape edging system; (e) reducing the weight of edging blocks; (v) reducing the amount of material required to form landscape edging blocks; (f) strengthening the degree of anchoring of edging blocks to the soil, and (g) reducing the effects of frost heave.

Some embodiments of the invention have certain features, including: (a) block 60 having recess 80 disposed on the bottom surface thereof for receiving top rail 14 of edging member 10 therein, recess 80, top rail 14 and edging member 10 assuming any of a number of different cross-sectional shapes; (b) means for interconnecting adjoining lengths of edging members 10; (c) means for interconnecting or abutting adjoining blocks 60; (d) means for minimizing the effects of frost heave or displacement of edging members 10 such as soil pockets, barbs, anchoring stakes and the like; (e) means for attaching or securing block 60 to top rail 14; (f) adapter means for attaching or securing block 60 to top rail 14; (g) means for compensating for changes in ground elevation and depth of burial of edging member 10; (h) means for coring blocks 60; (i) means for securing blocks 60 to edging member 10 or ground 400; (j) sprinkler and lighting means incorporated into edging member 10 or block 60; (k) means for forming walkways or driveways comprising blocks 60, bottom barriers 140 and side barriers 135; (l) means for forming trenchless landscape edging systems, and (m) means for forming erosion control or soil containment systems.

BRIEF DESCRIPTION OF THE DRAWINGS

FIGS. 1(a) through 1(c) show one embodiment of landscape edging system 5 of the present invention.

FIGS. 9(a) through 9(l) show embodiments of block 60 of the present invention where blocks 60 have at least one additional recess 81 disposed therein, or an enlarged recess 80 disposed therein, for lightening and reducing the amount of material required to form blocks 60, for permitting landscape edging member 10 to bend more readily when imaginary axes 76 of blocks 60 are rotated respecting one another, or for accepting sprinkler fittings, sprinklers, plumbing means, electrical power cords or light emitting means therein.

DETAILED DESCRIPTION OF THE PREFERRED EMBODIMENTS

Figure 2A:
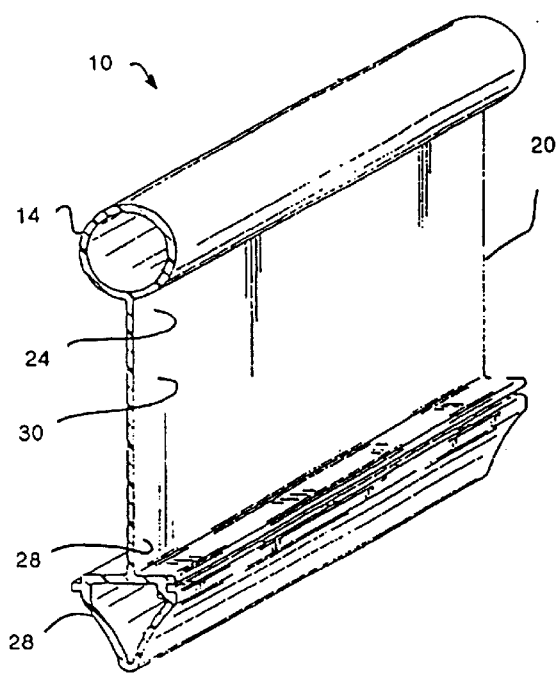
FIGS. 2(a) through 2(u) show perspective views of selected lawn edging members 10 of the present invention.

As used in the specification and claims hereof, the following terms have the particular meanings and definitions set forth below.

The terms "block" "landscape block," "landscape edging block" and "paving block" mean a block suitable for use in at least one of landscaping, walkway or driveway applications.

The term "conventional landscape edging barrier" means a landscape edging barrier formed of plastic, such as those disclosed in U.S. Patent Nos. U.S. Pat. No. 3,378,949 to Dorris; U.S. Pat. No. 3,387,786 to Rynberk; U.S. Pat. No. 3,484,989 to Lazinsky; U.S. Pat. No. 3,485,449 to Wilson; U.S. Pat. No. 3,788,001 to Balfanz, Jr.; U.S. Pat. No. 4,281,473 to Emalfarb et al.; U.S. Pat. No. 4,644,685 to Tisbo et al.; U.S. Pat. No. 4,761,923 to Reum et al.; U.S. Pat. No. 4,761,923 to Reum et al.; U.S. Pat. No. 4,809,459 to Brylla et al.; U.S. Pat. No. 4,858,379 to West; U.S. Pat. No. 4,969,289 to Trifiletti; U.S. Pat. No. 5,067,273 to Richwine; U.S. Pat. No. 5,121,569 to Thomas; U.S. Pat. No. 5,201,154 to Thomas; U.S. Pat. No. 5,438,804 to Reum et al.; U.S. Pat. No. 5,501,036 to Torp, Jr. et al.; U.S. Pat. No. 5,519,970 to Reum et al. and U.S. Pat. No. 5,535,545 to Matz.

The terms "lawn edging member," "landscape edging barrier," "landscape edging member," "strip barrier" and "edging barrier" are substantially synonymous, and mean an edging member formed of metal, plastic or other suitable material that is configured for use in at least one of landscape, walkway or driveway applications.

FIGS. 1(a) through 1(c) show one embodiment of landscape edging system 5 of the present invention. Landscape edging member 10 is preferably elongated, and has top rail 14 for separating adjacent lawn, garden, walkway or patio areas. Top rail 14 has edging barrier 20 extending downwardly therefrom for placement in ground 400. At least a portion of top rail 14 is affixed to or forms part of upper portion 24 of edging barrier 20 such that top rail 14 protrudes or extends above ground surface 404 when at least lower portion 28 of edging barrier 20 is positioned beneath ground surface 404 in ground 400. The ends of landscape edging member 10 are preferably configured for connection to adjoining similar members 10 by any of several well known means, such as by connecting member 16 shown in FIG. 2(b), to thereby form a substantially continuous downwardly extending barrier 20 and top rail 14.

Any of a variety of known landscape edging members find application in certain embodiments of the present invention. For example, landscape or lawn edging members of the types disclosed in U.S. Pat. No. 3,378,949 to Dorris; U.S. Pat. No. 3,387,786 to Rynberk; U.S. Pat. No. 3,484,989 to Lazinsky; U.S. Pat. No. 3,485,449 to Wilson; U.S. Pat. No. 3,788,001 to Balfanz, Jr.; U.S. Pat. No. 4,281,473 to Emalfarb et al.; U.S. Pat. No. 4,644,685 to Tisbo et al.; U.S. Pat. No. 4,761,923 to Reum et al.; U.S. Pat. No. 4,761,923 to Reum et al.; U.S. Pat. No. 4,809,459 to Brylla et al.; U.S. Pat. No. 4,858,379 to West; U.S. Pat. No. 4,969,289 to Trifilefti; U.S. Pat. No. 5,067,273 to Richwine; U.S. Pat. No. 5,121,569 to Thomas; U.S. Pat. No. 5,201,154 to Thomas; U.S. Pat. No. 5,438,804 to Reum et al.; U.S. Pat. No. 5,501,036 to Torp, Jr. et al.; U.S. Pat. No. 5,519,970 to Reum et al. and U.S. Pat. No. 5,535,545 to Matz find particular efficacious and advantageous application in certain preferred embodiments of the present invention.

Landscape edging member 10 is most preferably formed of a plastic such as polyethylene or ethylene vinyl acetate. Other elastomeric, polymeric or synthetic materials are also suitable for forming landscape edging member 10. Landscape edging member 10 is most preferably formed by extruding and molding a synthetic material that is resilient, flexible, inert, UV resistant and further capable of withstanding wide variations in ambient temperature and humidity.

One significant drawback to most plastics finding application in landscape edging member 10 of the present invention is the relatively rapid breakdown of such plastics, and resulting deleterious effects, caused by exposure to ultraviolet (or UV) radiation. It is an advantage of the present invention that landscape edging member 10 is protected or shielded by block 60 from UV radiation by block 60. As a result, landscape edging member 10 of the present invention, when formed of plastic, does not break down or degrade as quickly in use in comparison to landscape edging members of the prior art that relatively continuously exposed to harmful UV radiation.

FIGS. 1(a) through 1(c) further show landscape edging block 60 having bottom surface 64, opposing ends 68 and 72, and imaginary longitudinal axis 76 extending between the opposing ends 68 and 72. Bottom surface 64 has substantially longitudinally disposed recess 80 formed therein. Recess 80 is configured to receive at least a portion of top rail 14 therein, and extends over at least a portion of bottom surface 64. Two opposing ends 68 and 72 of block 60 are configured to engage, abut, or interconnect with the corresponding opposing ends of other adjoining landscape edging blocks 60 attached to the top rail by their respective recesses. Recess 80 is configured to receive at least a portion of top edge 14 therein, and extends over at least a portion of bottom surface 64. Most preferably, top rail 14 and recess 80 form complementary shapes, and are configured to prevent or impede block 60 from being removed from top rail 14 when an upward or lateral force is exerted upon block 60 and top rail 14 is disposed in recess 80.

As shown in FIG. 1(c), at least a portion of edging barrier 20 extends downwardly from the bottom surface of each block 60 into ground 400 when recesses 80 corresponding to each block 60 receive their corresponding at least portions of top rail 14 therein. Bottom surfaces 64 of the plurality of engaging, abutting or interconnected landscape blocks 60 may be disposed along or beneath ground surface 404. The embodiment of the present invention shown in FIG. 1(c), and other embodiments similar to it, lend themselves particularly well to installation applications where blocks 60 are retrofitted on existing, installed landscape edging barriers having conventional circular cross-section top rails 14. Such retrofitting avoids the requirement for removal of existing landscape edging members 10 and re-installation of new, differently configured landscape edging members 10.

Figure 2B:
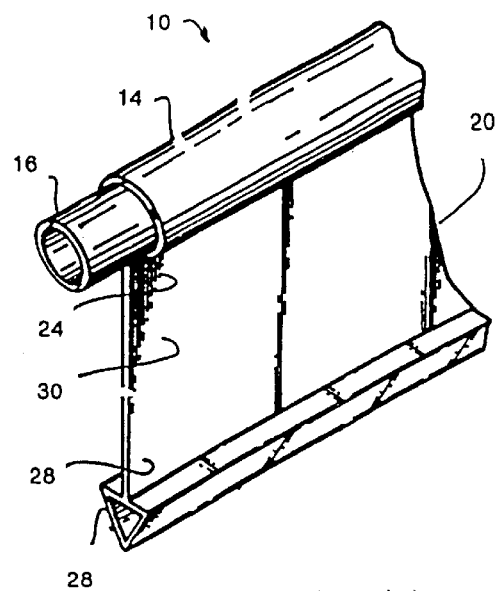
Figure 2C:
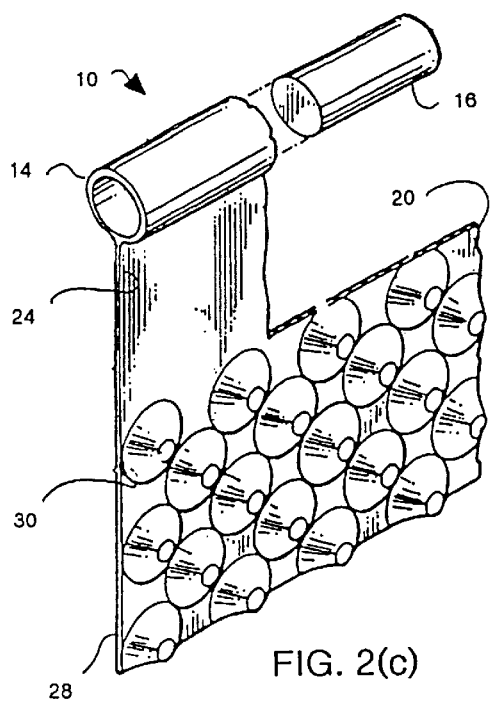
Figure 2D:
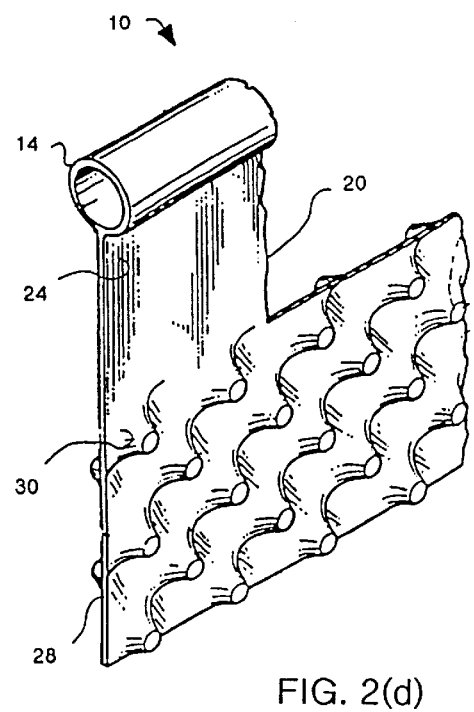
Figures 2E, 2F:
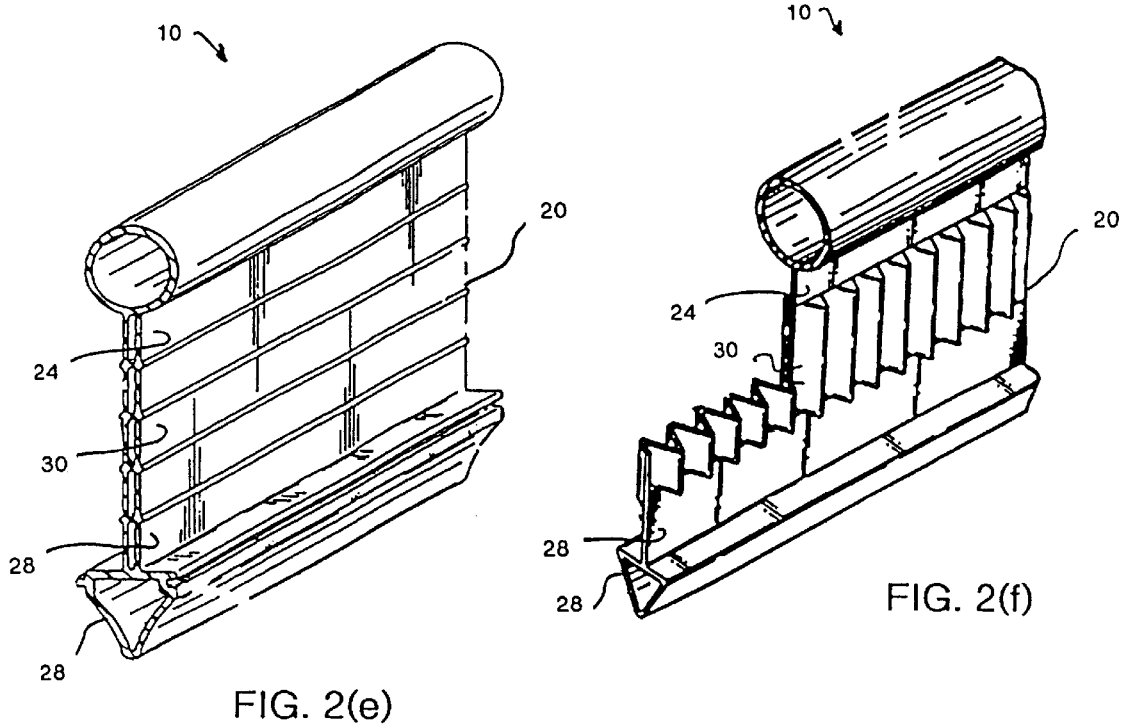
Figures 2G, 2H:
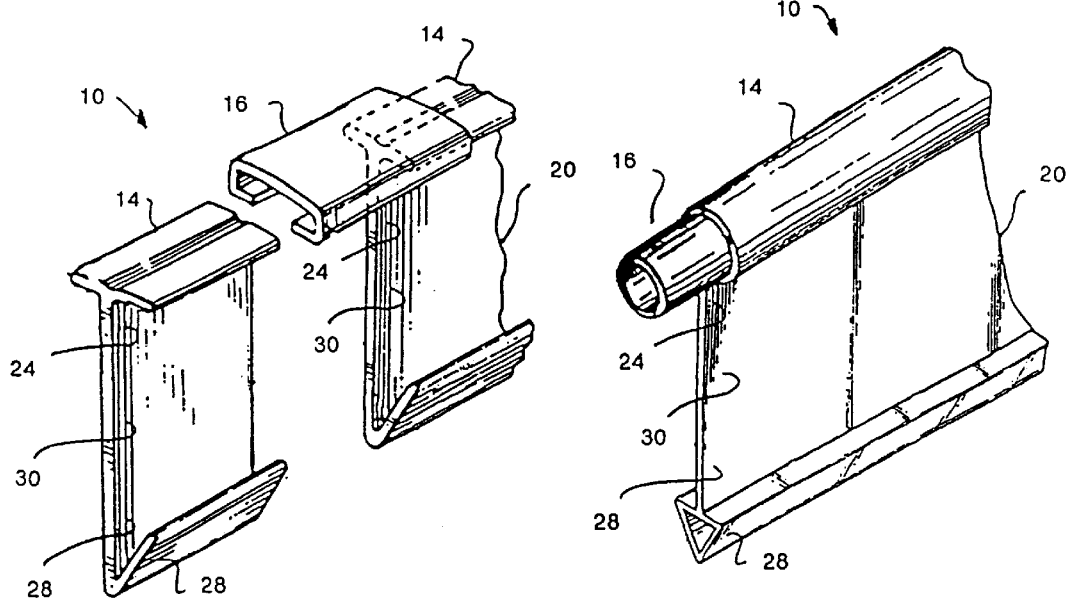
Figure 2I:
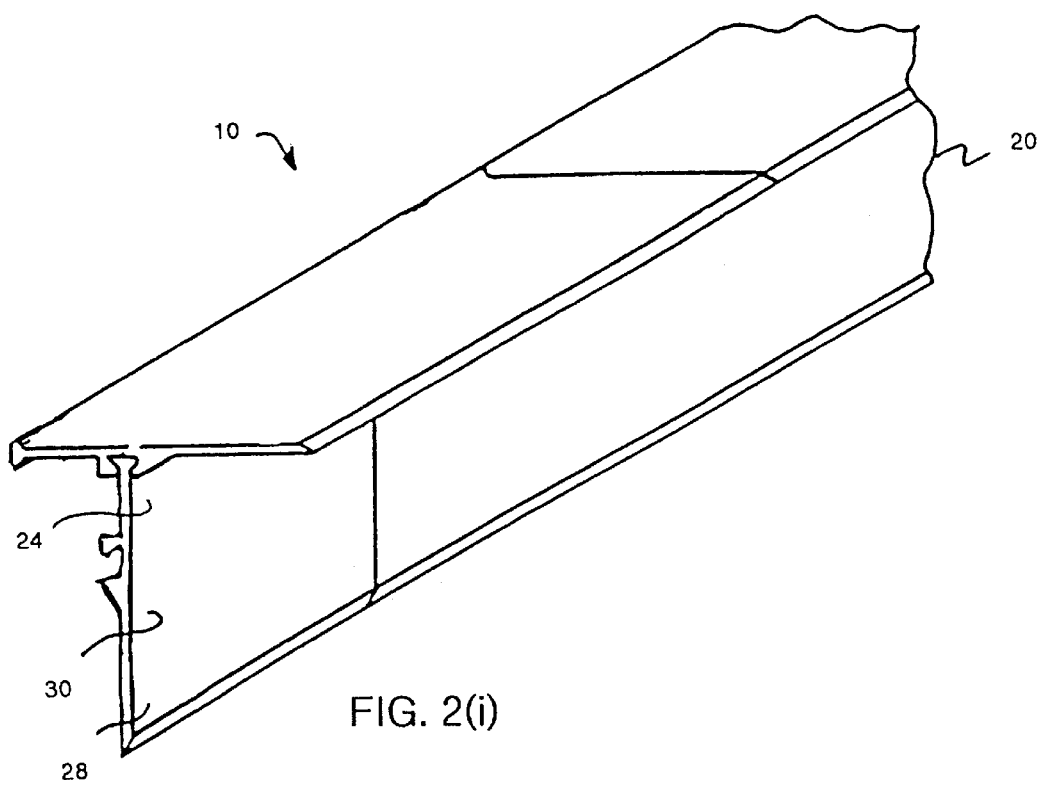
Figure 2J:
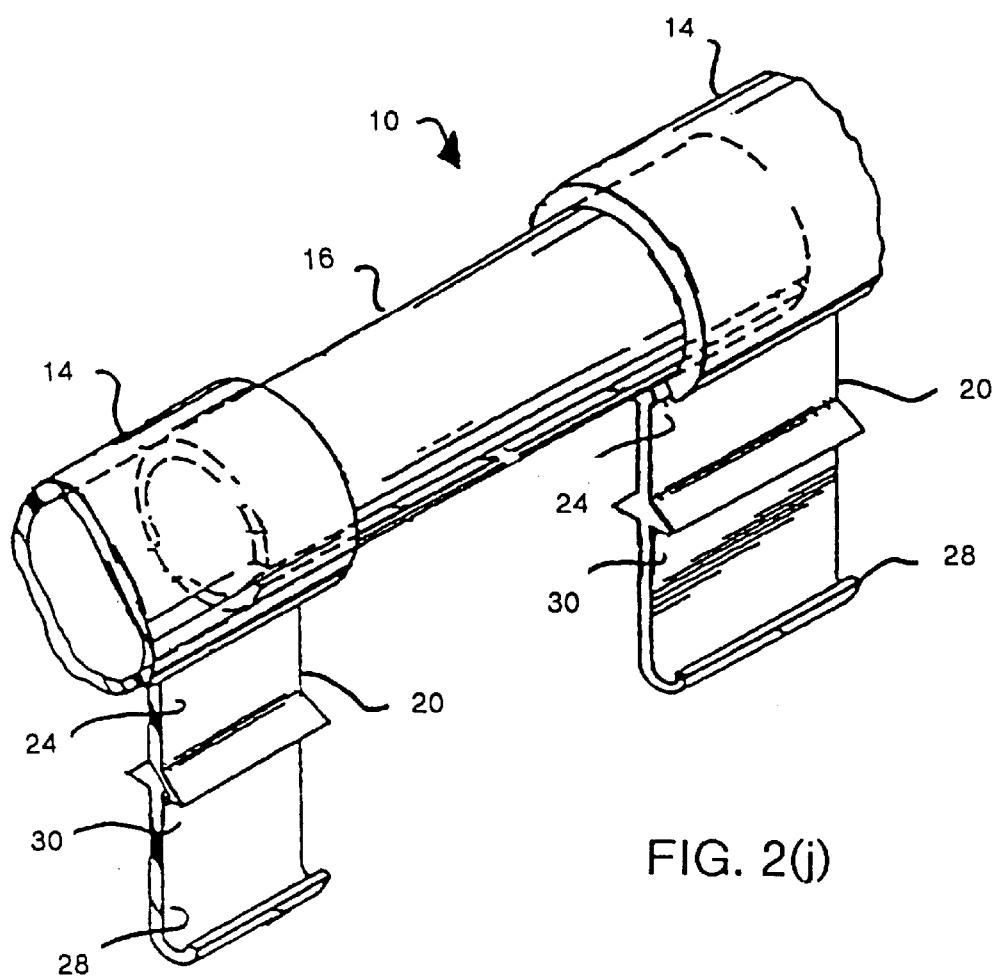
Figure 2K:
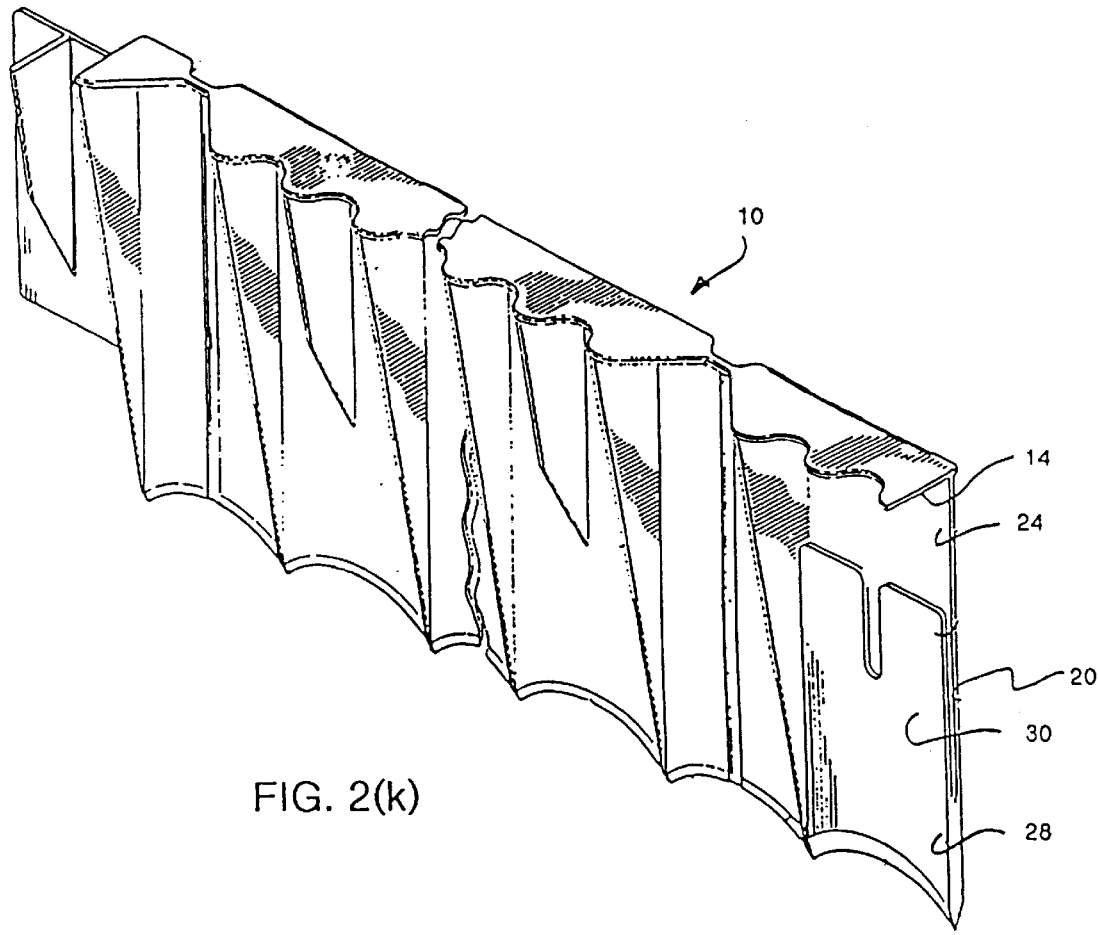
Figure 2N:
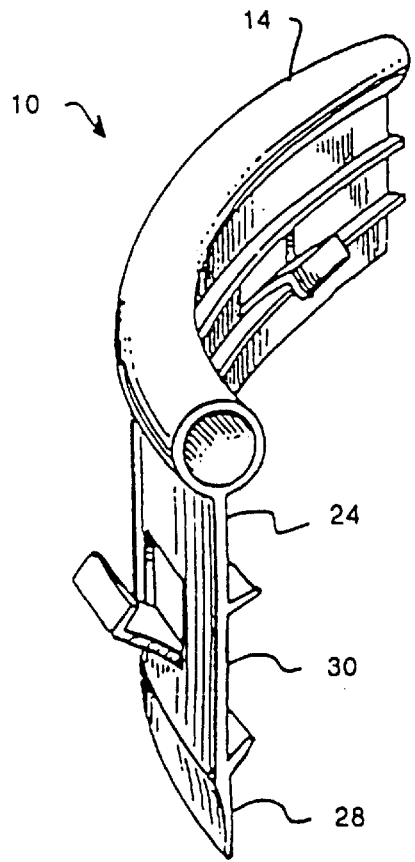
Figure 2O:
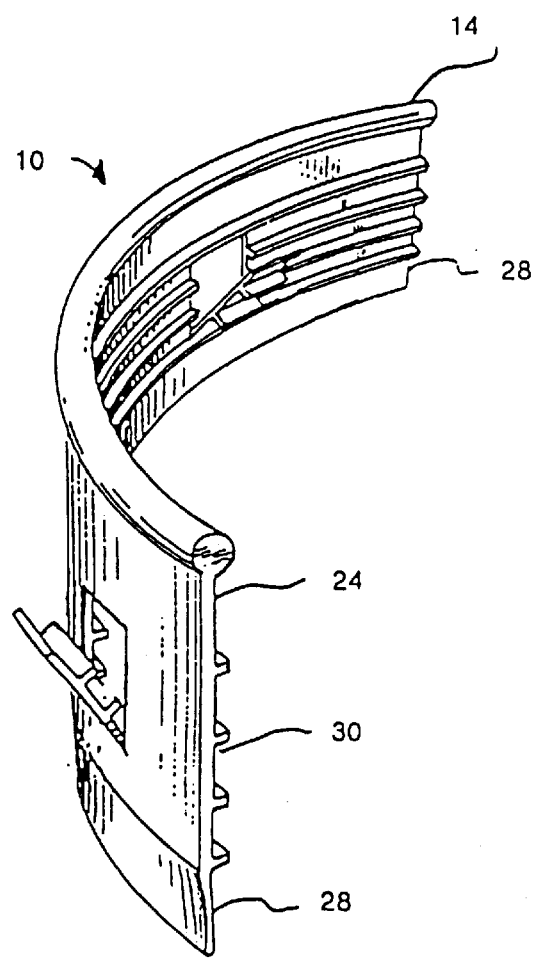
Figure 2R:
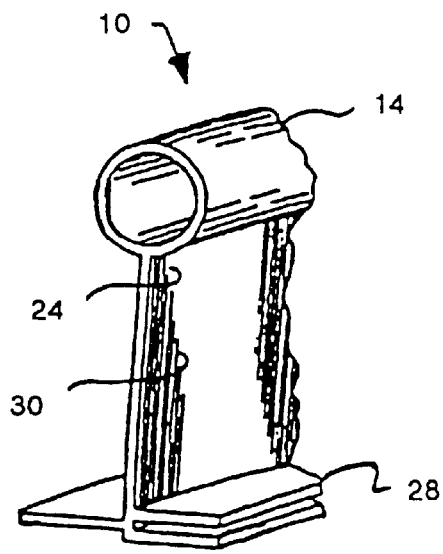
Figure 2S:
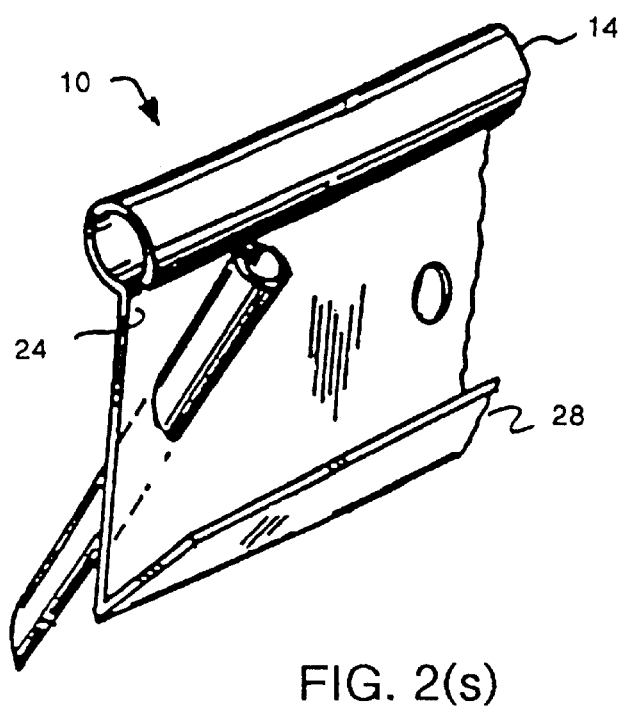
Figure 2T:
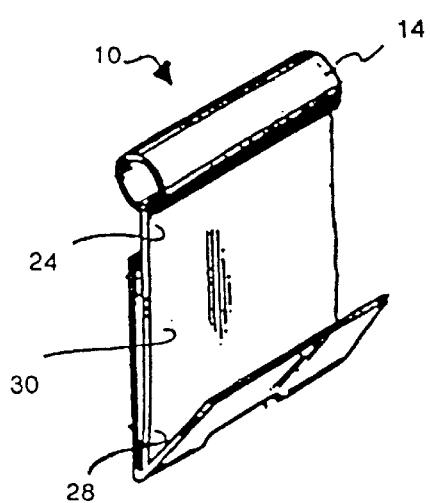
Figure 2U:
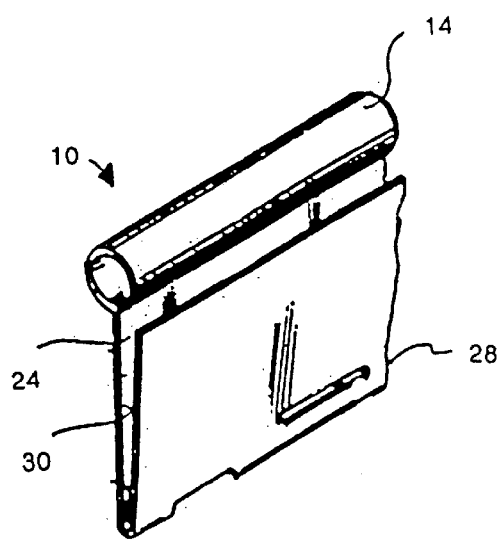
Figure 3A:
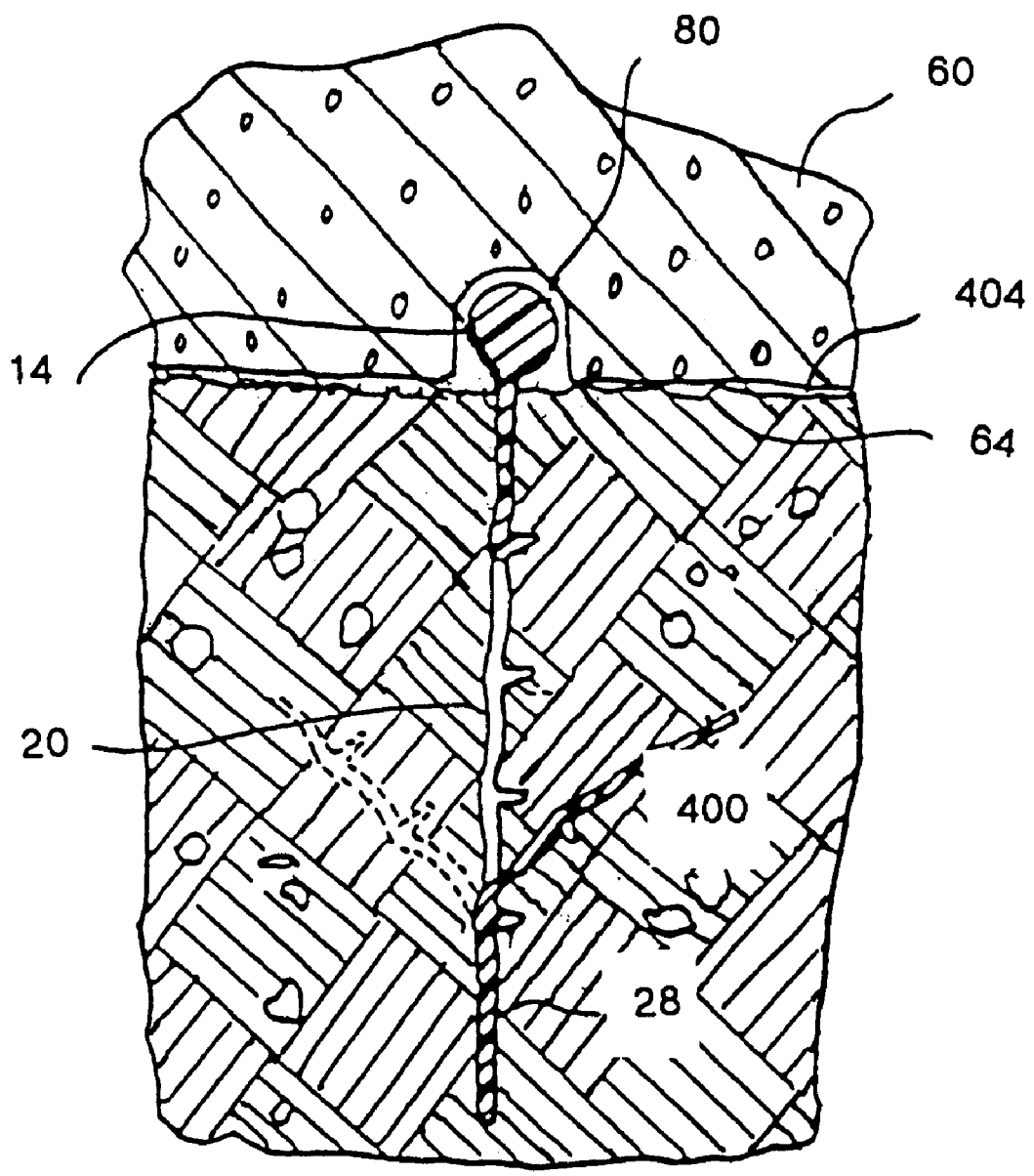
FIGS. 3(a) through 3(oo) show cross-sectional views of selected lawn edging members 10 and blocks 60 of the present invention.
Figure 3B:
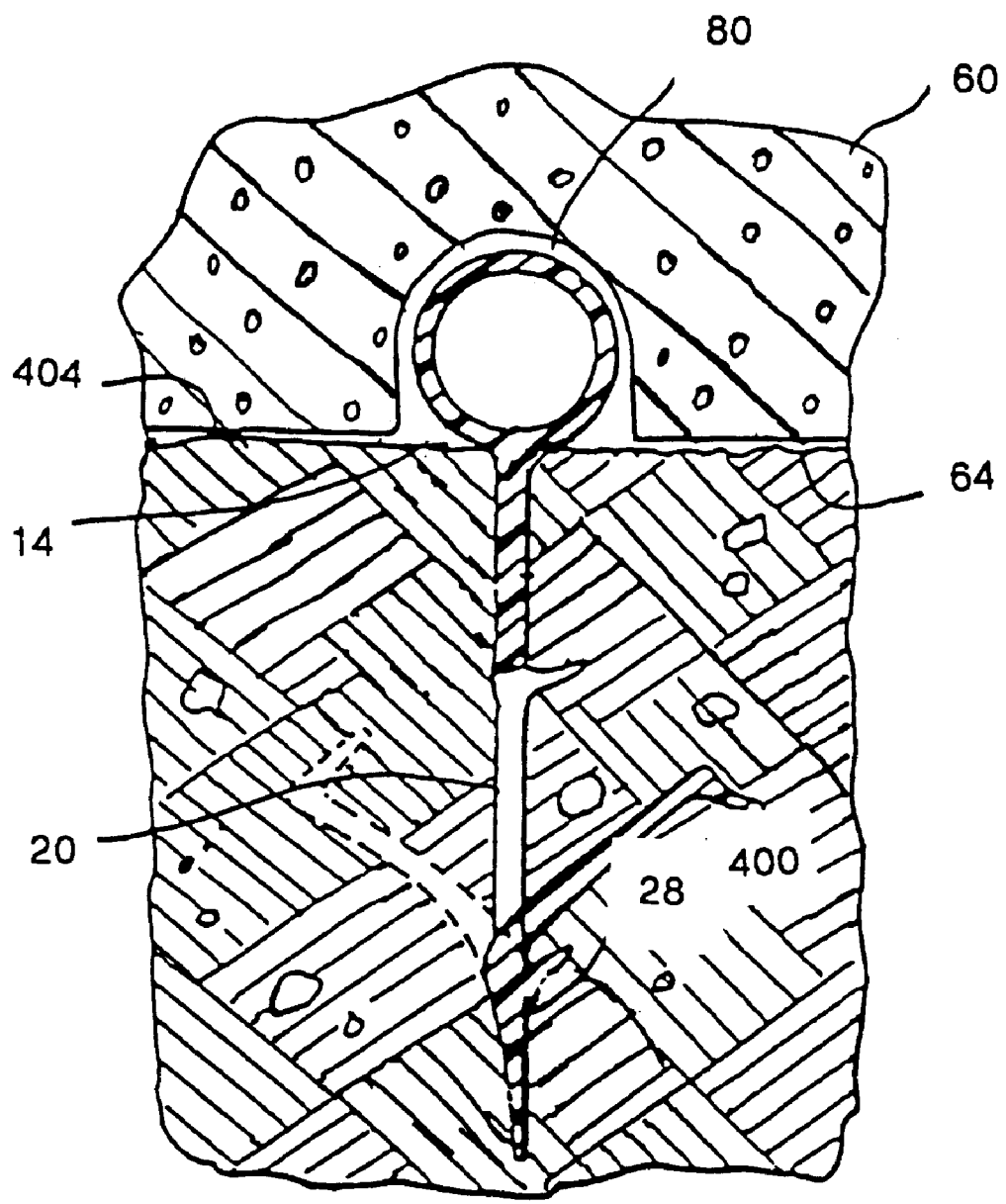
Figure 3C:
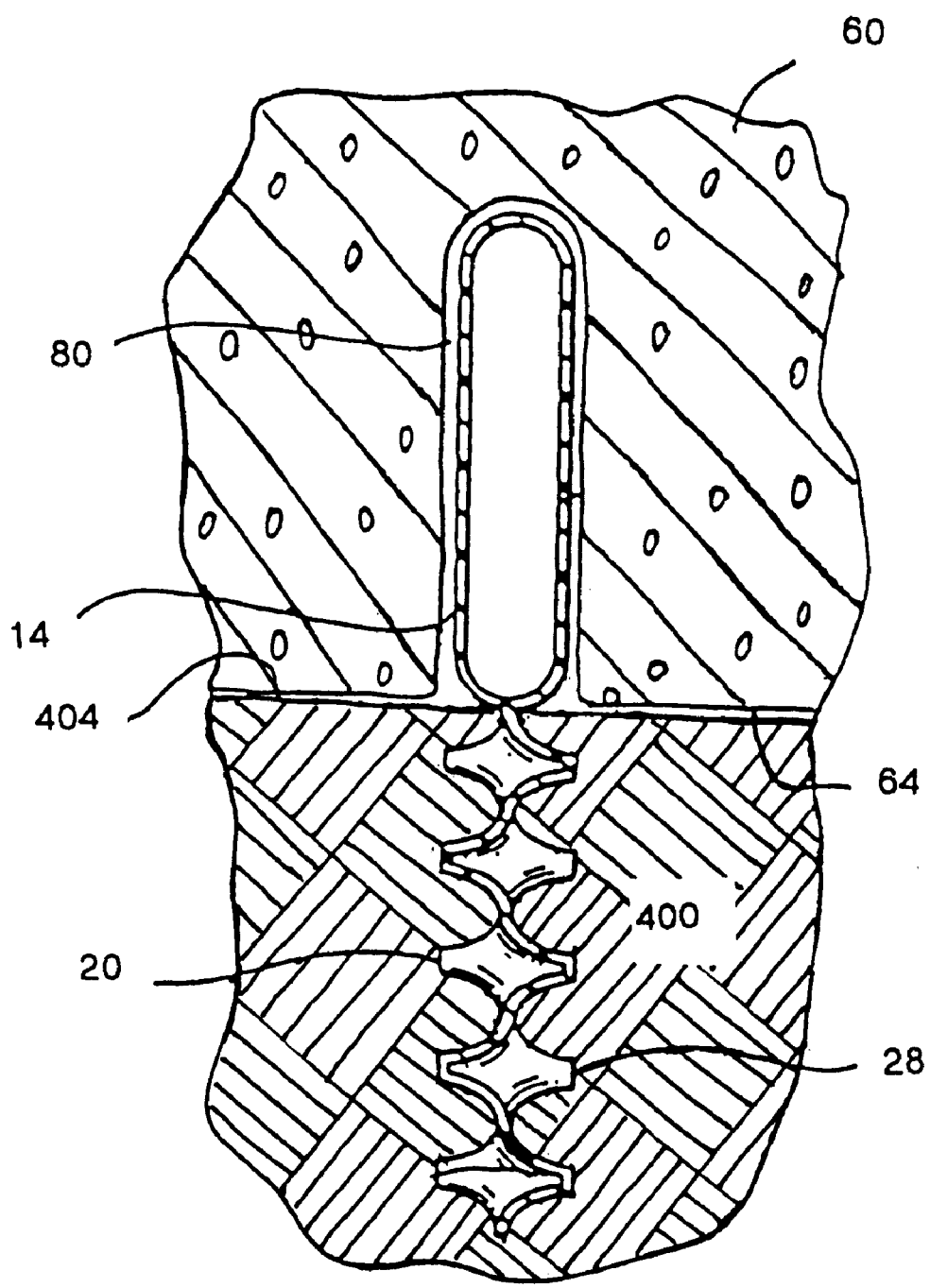
Figure 3D:
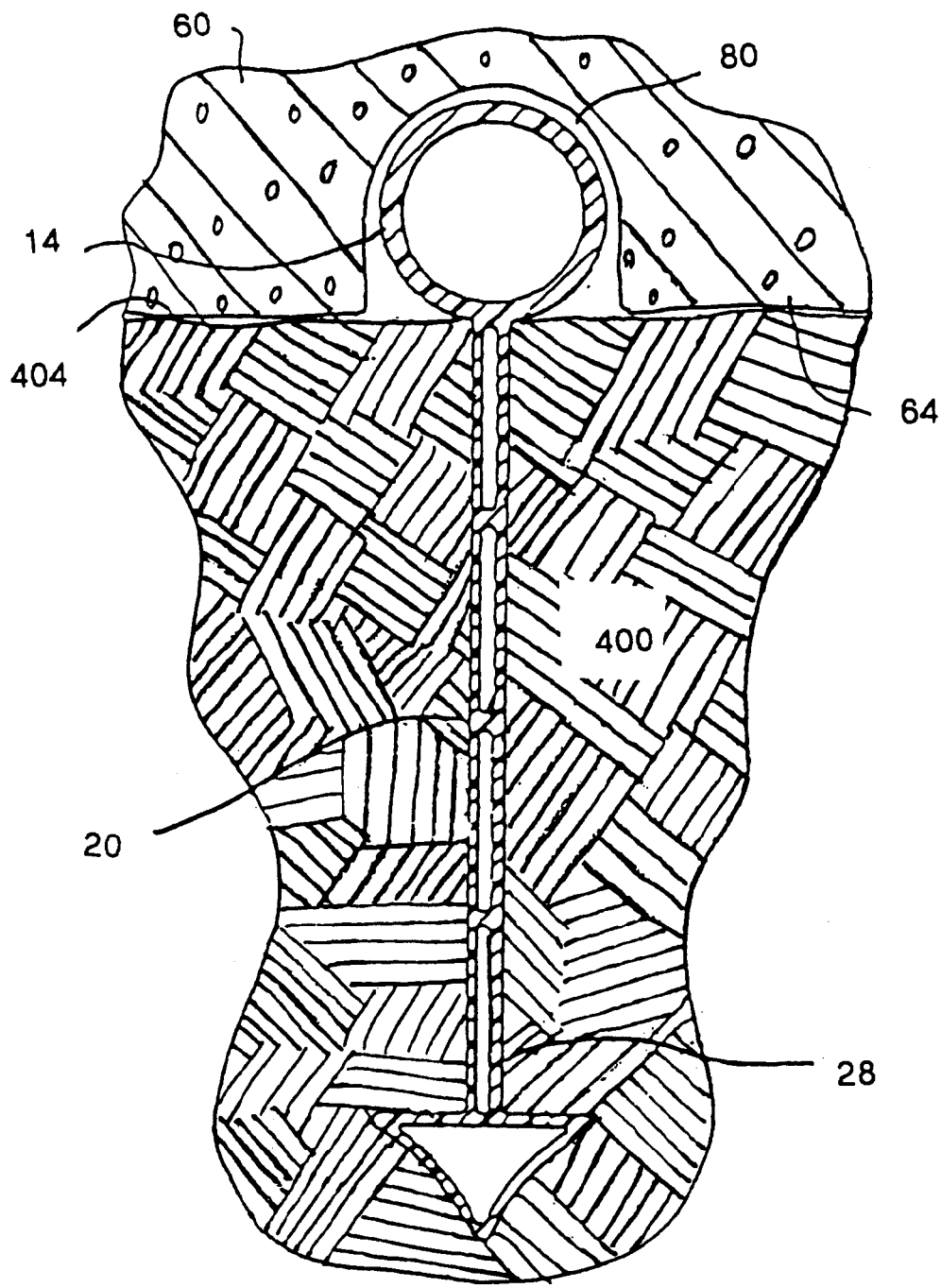
Figure 3E:
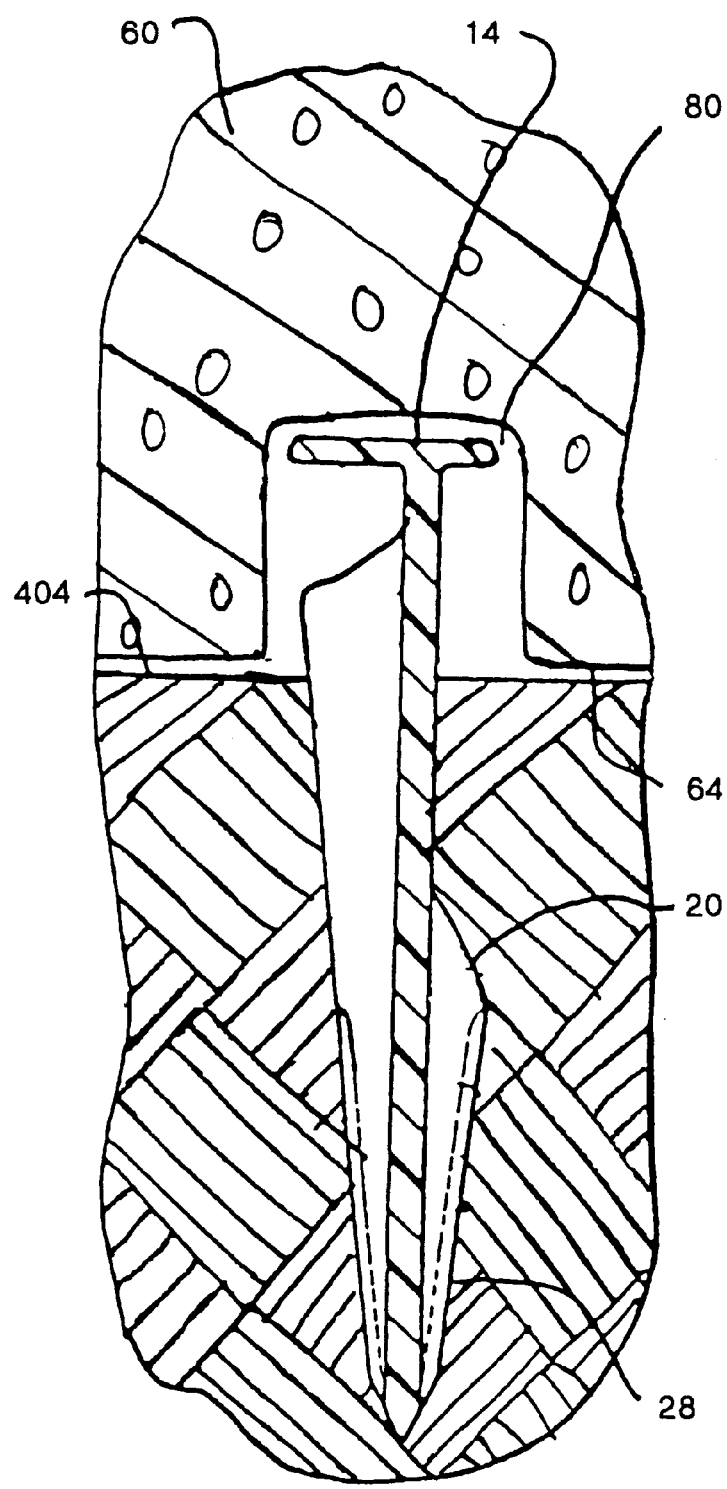
Figure 3F:
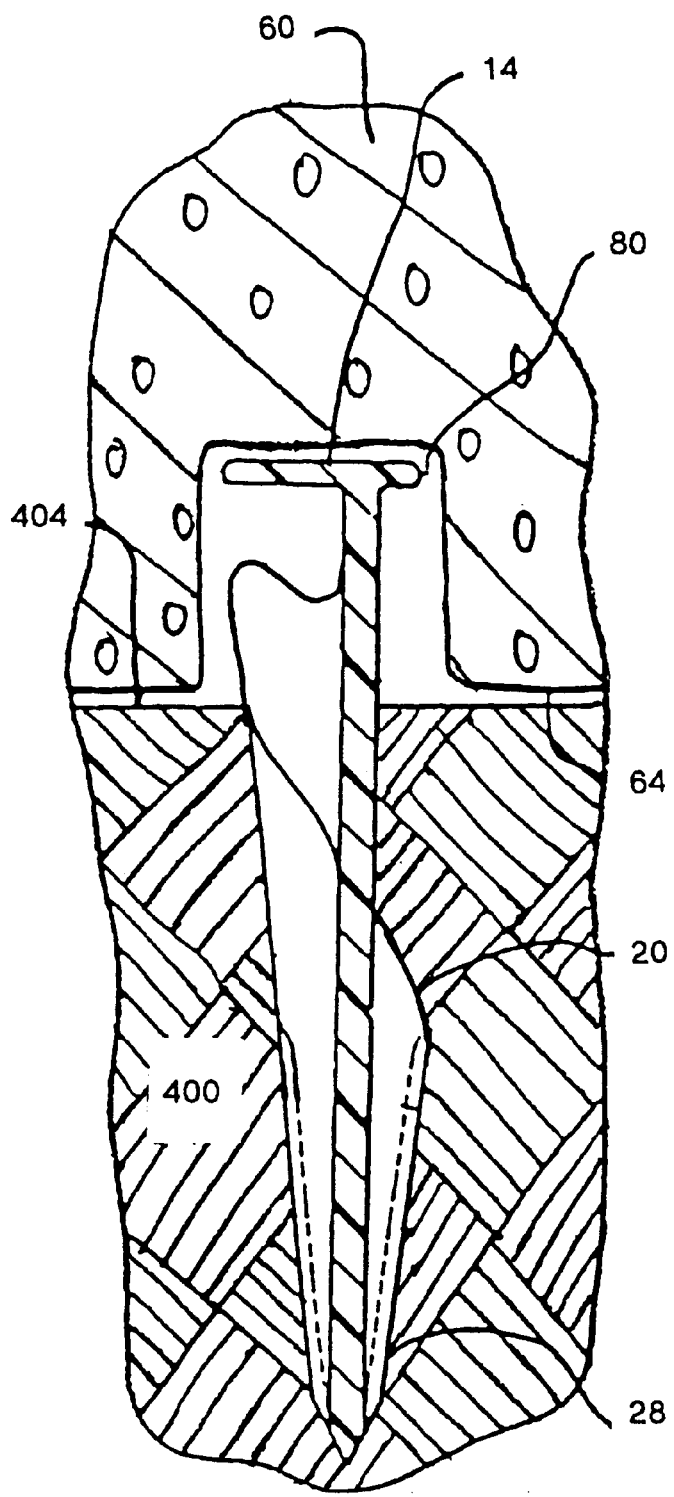
Figure 3G:
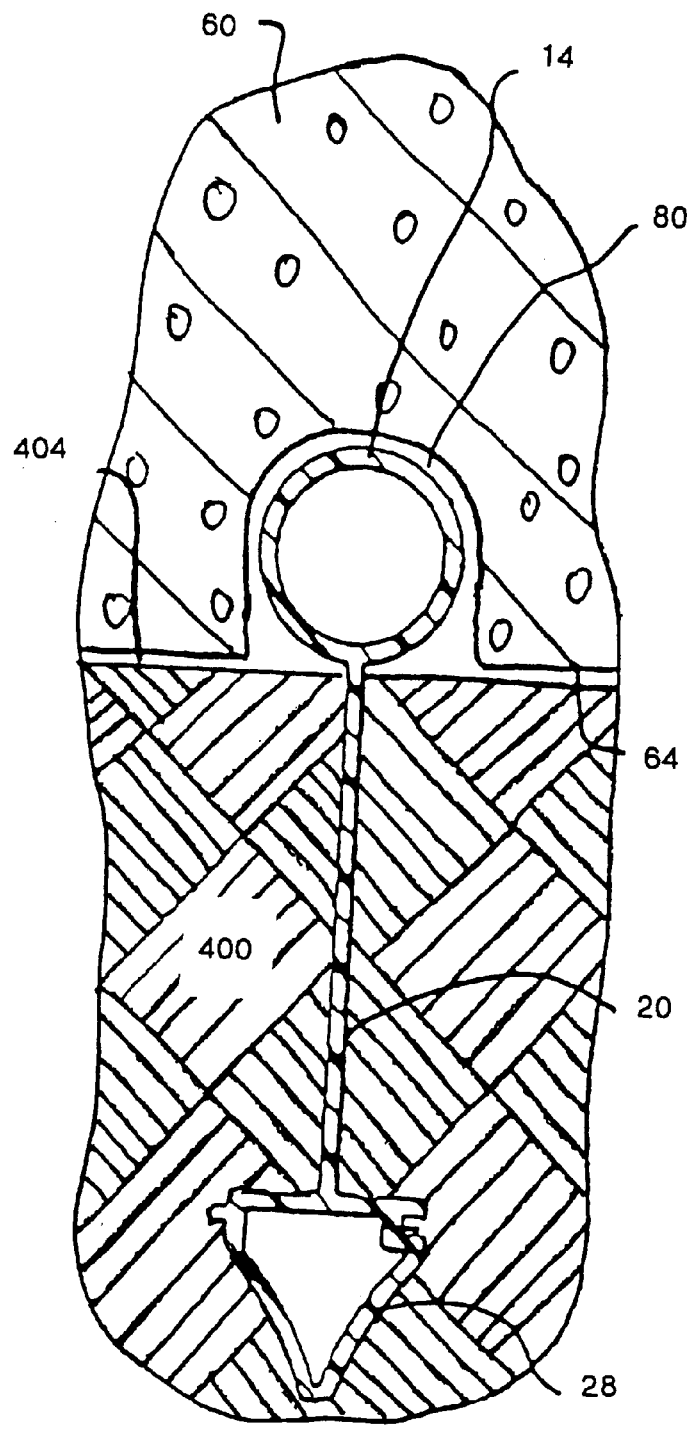
Figure 3H:
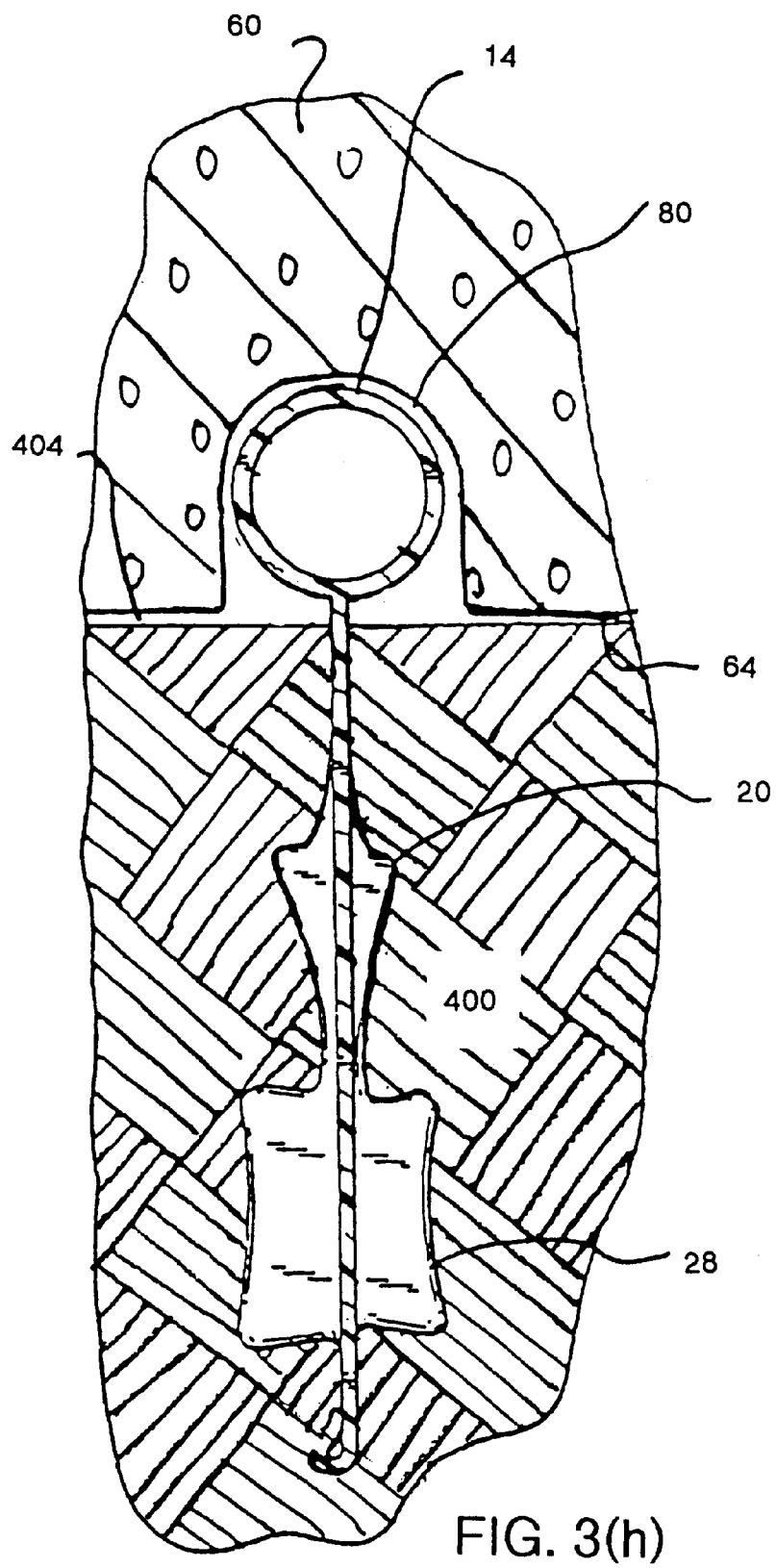
Figure 3I:
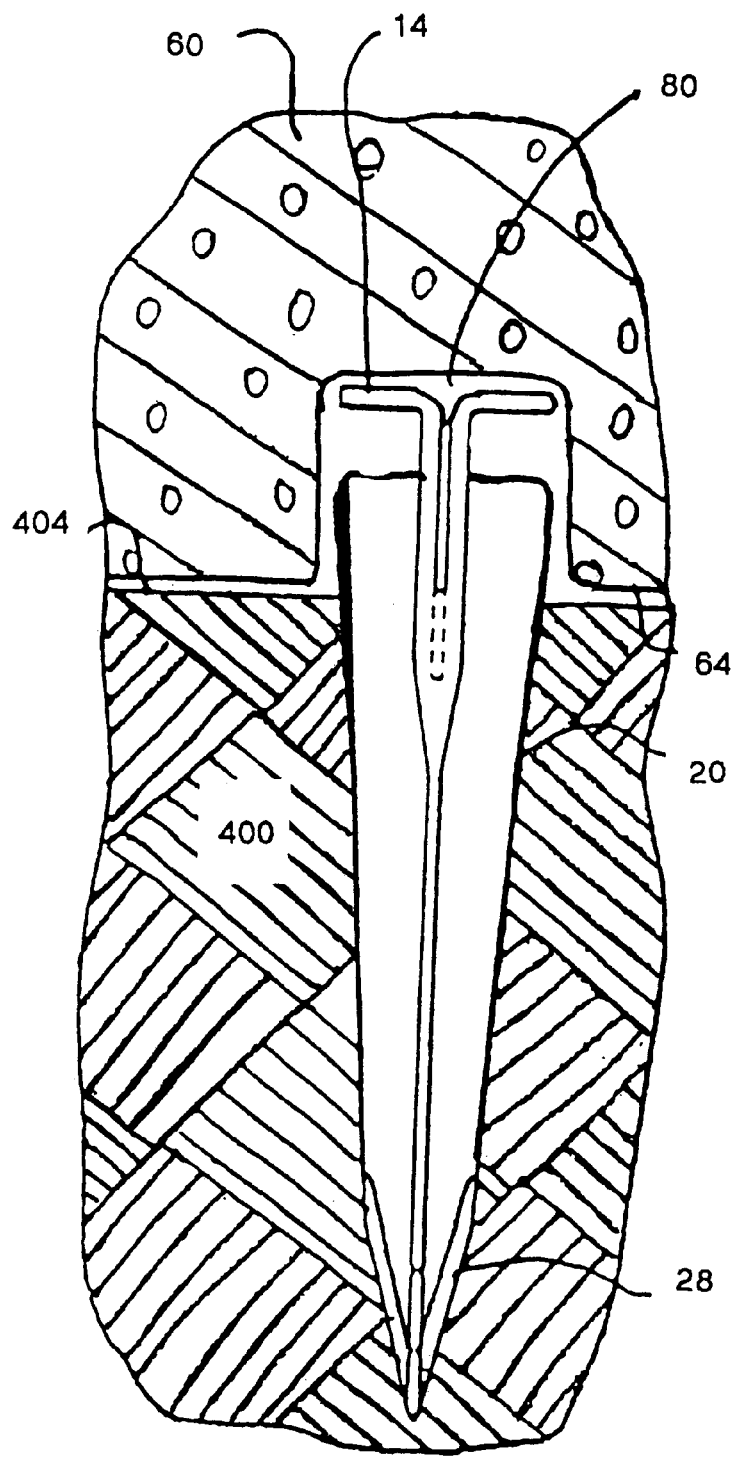
Figure 3J:
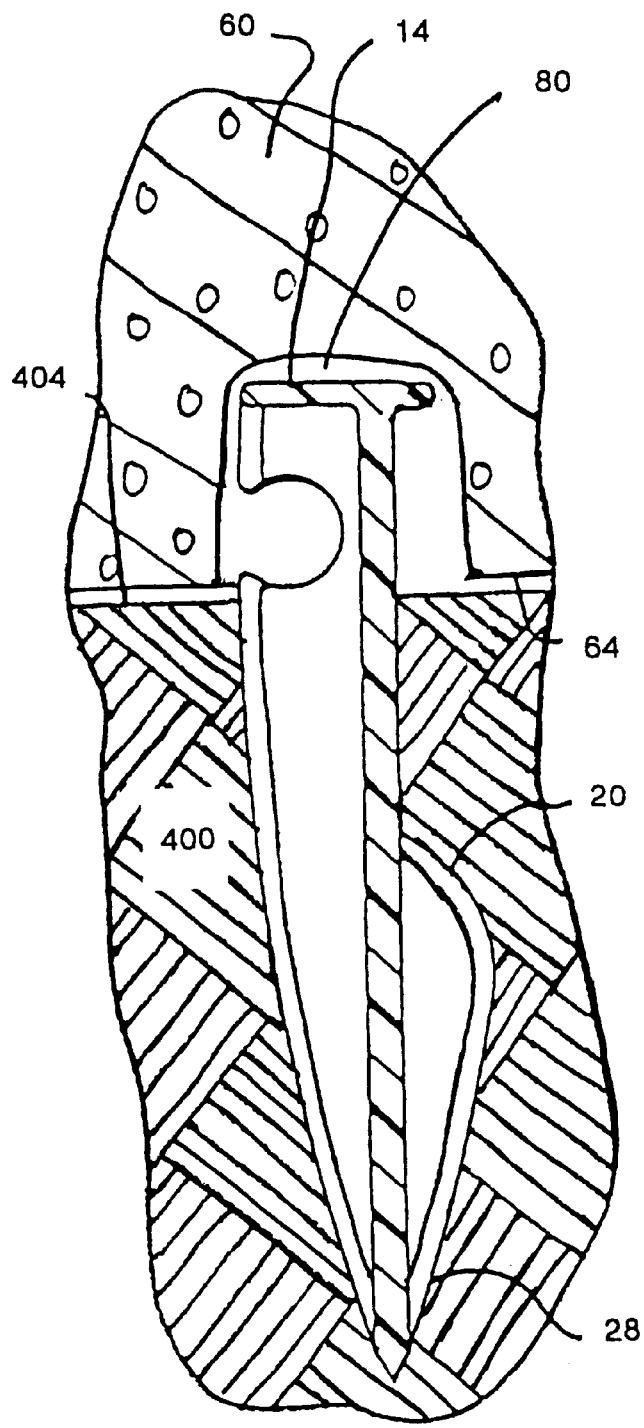
Figure 3K:
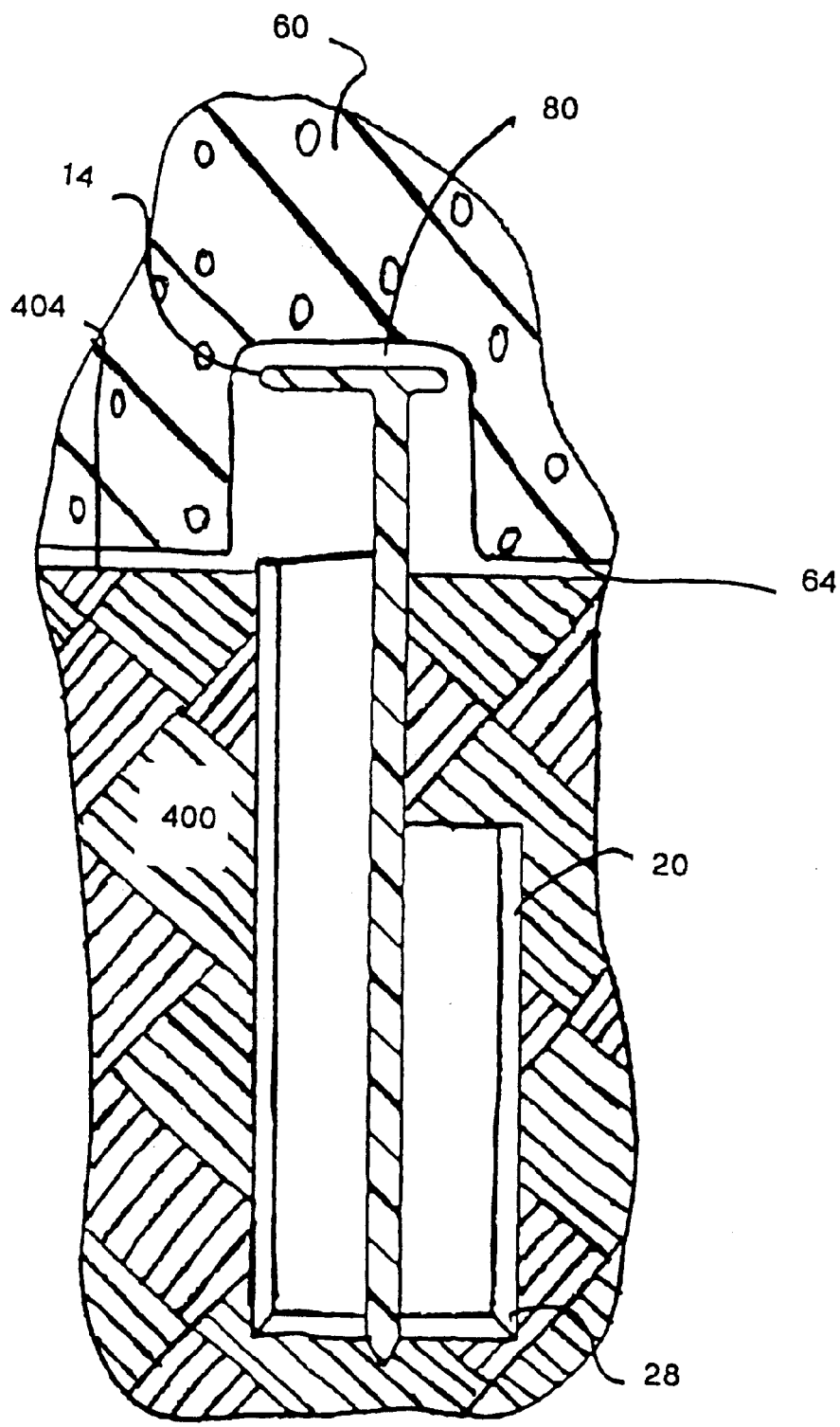
Figure 3L:
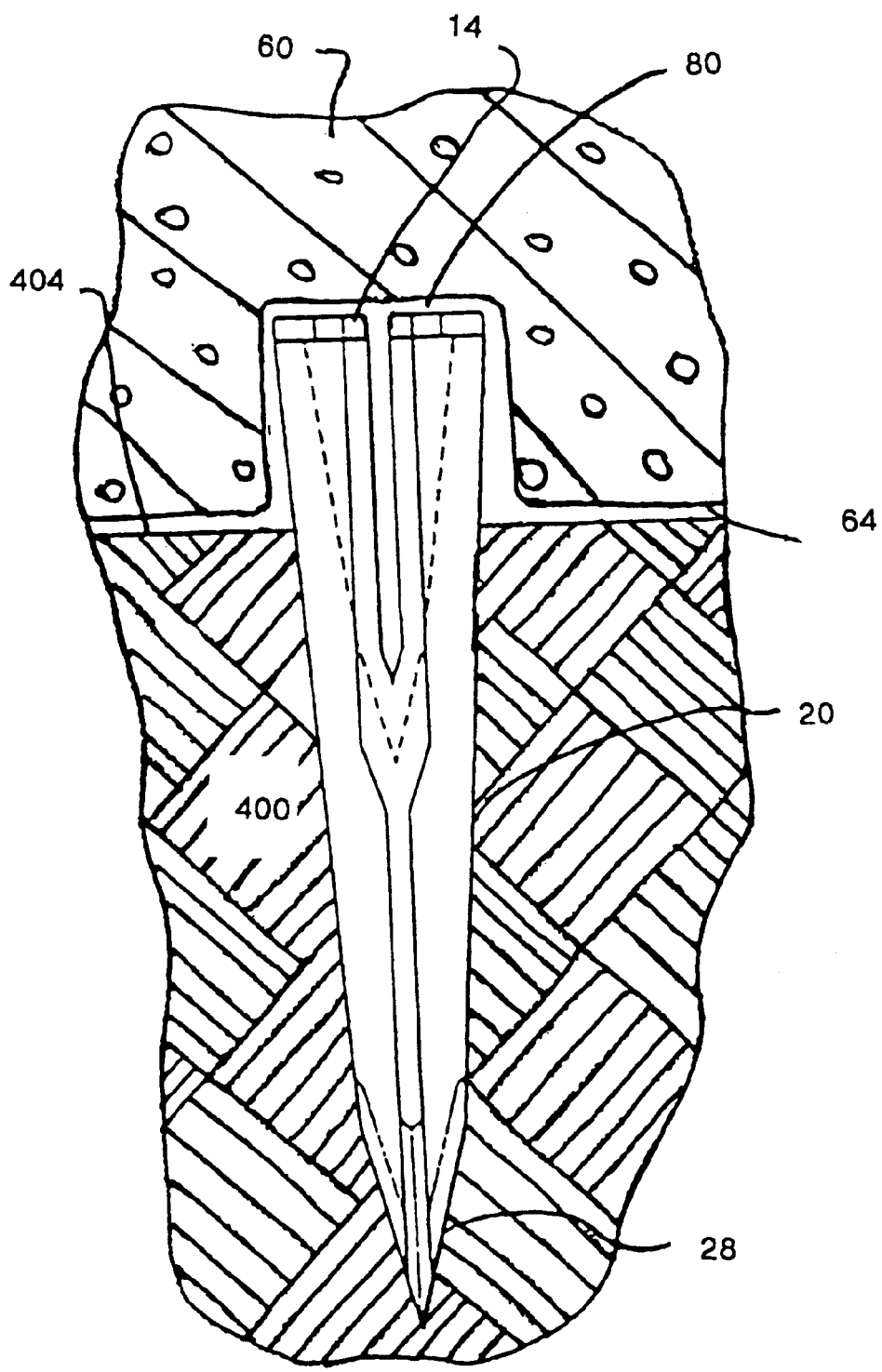
Figure 3M:
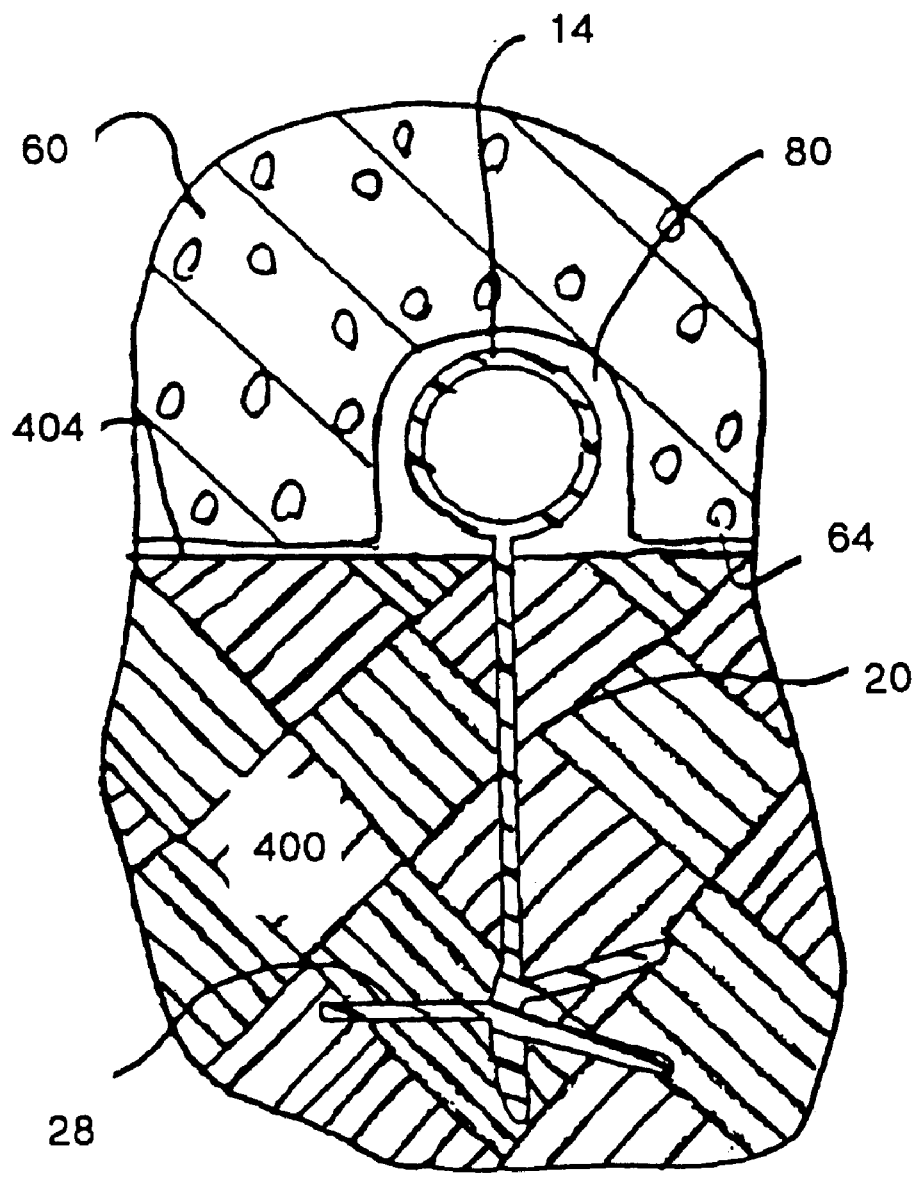
Figure 3N:
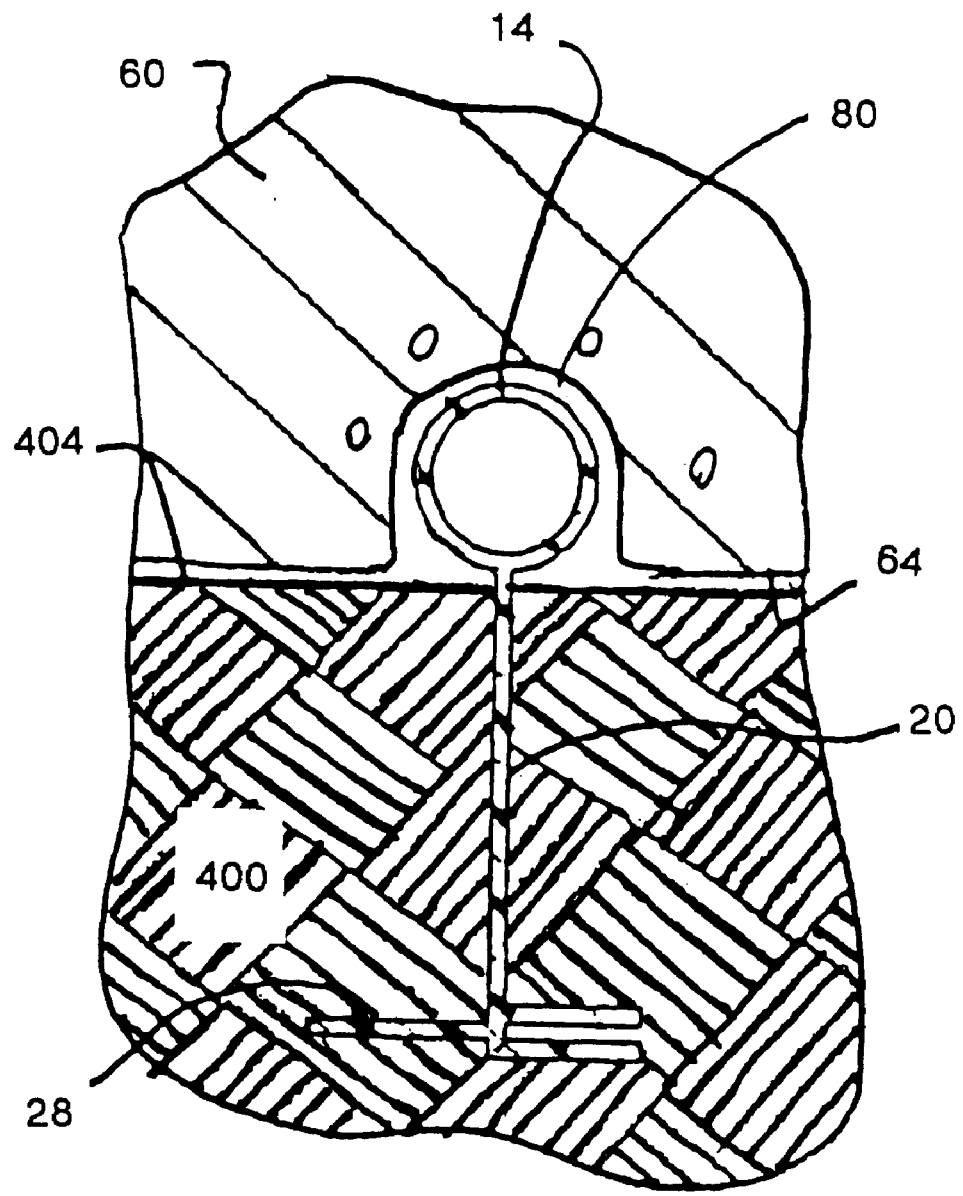
Figure 3O:
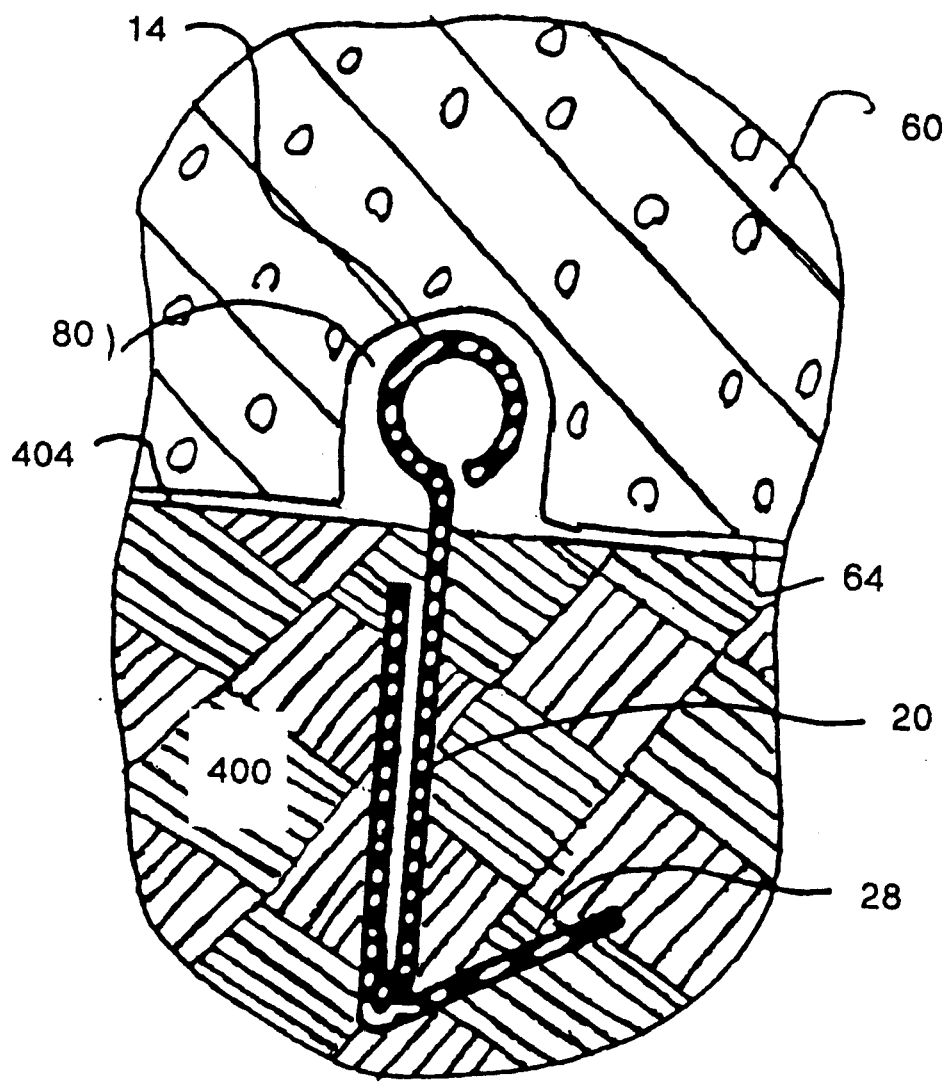
Figure 3P:
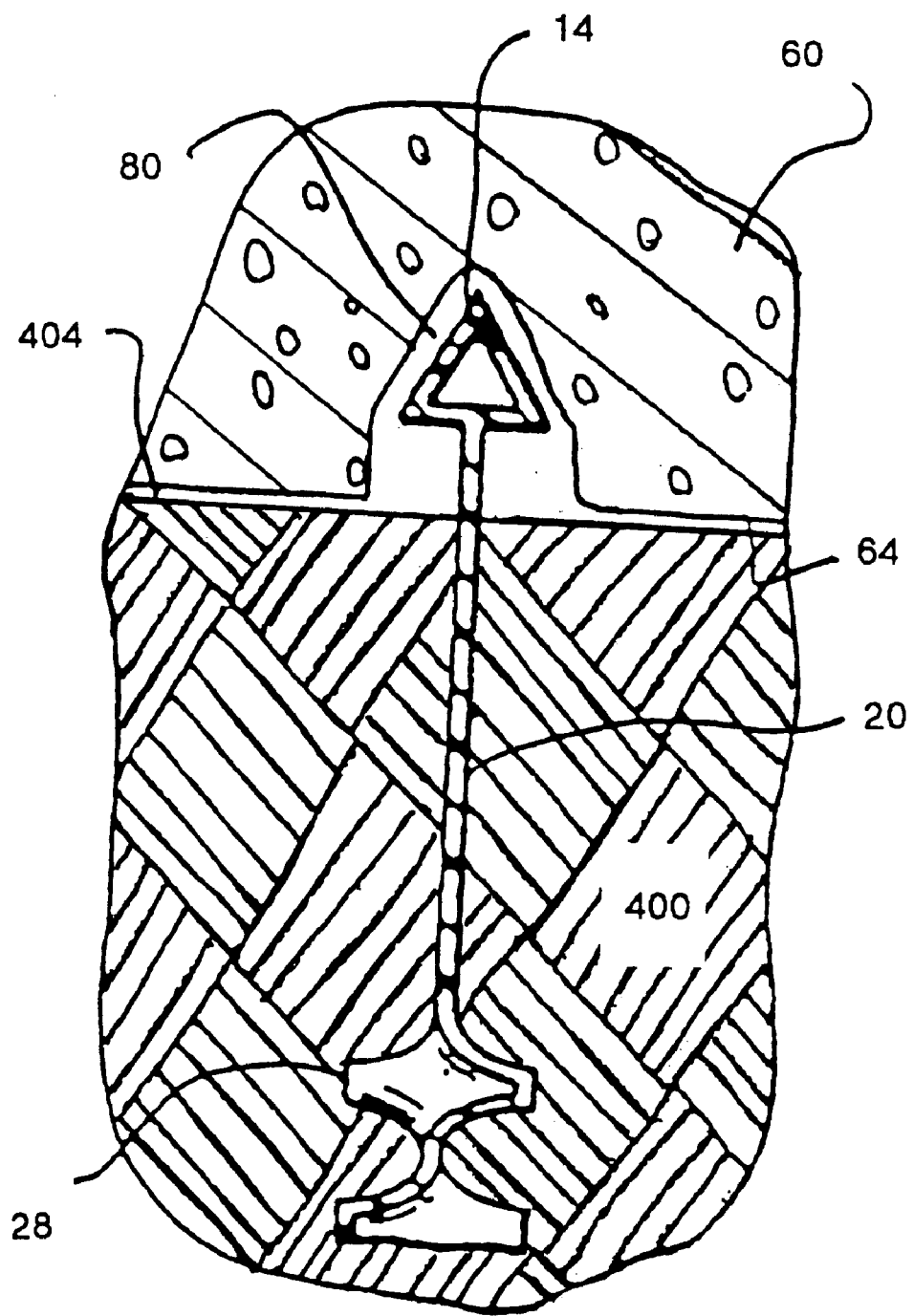
Figure 3Q:
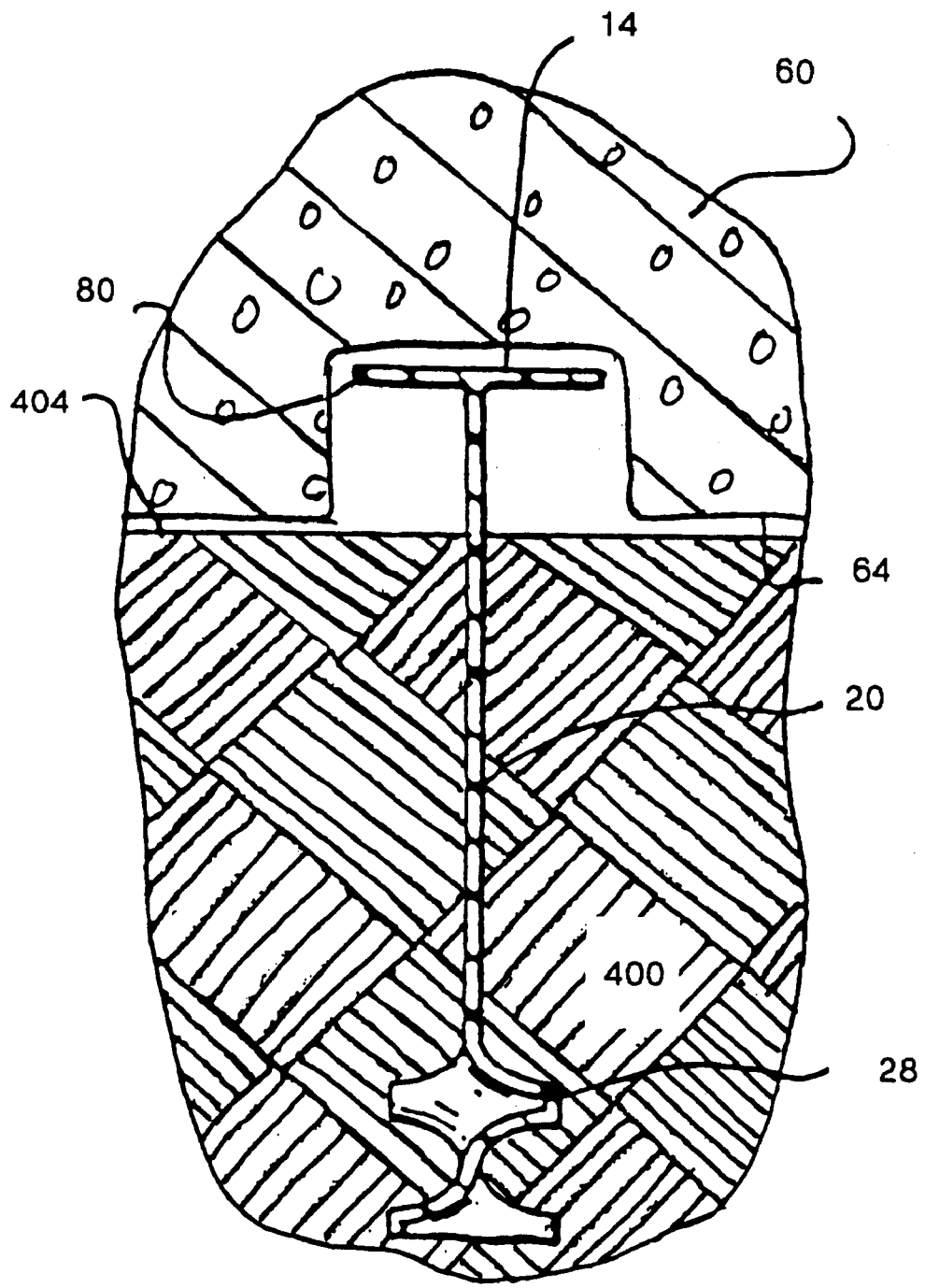
Figure 3R:
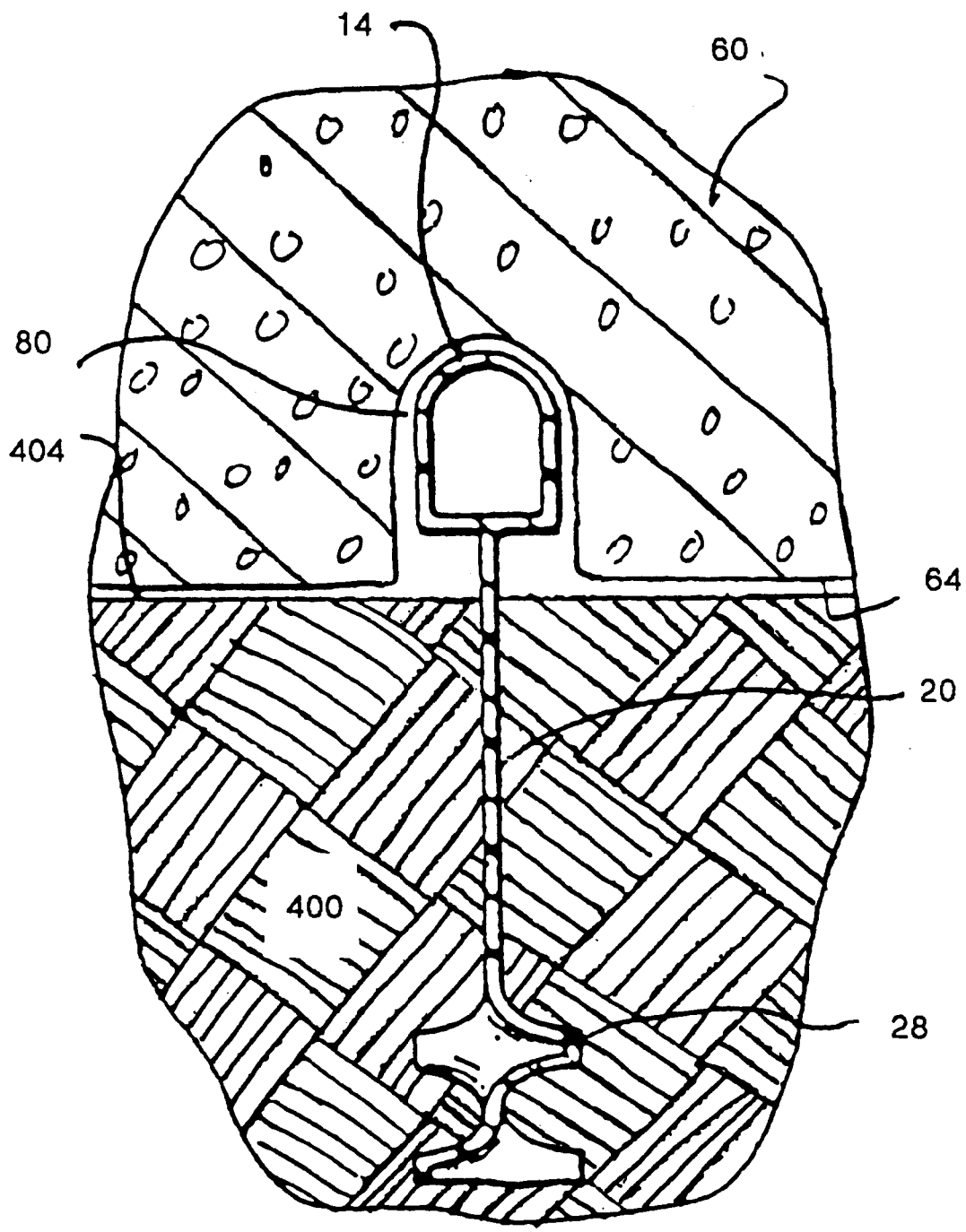
Figure 3S:
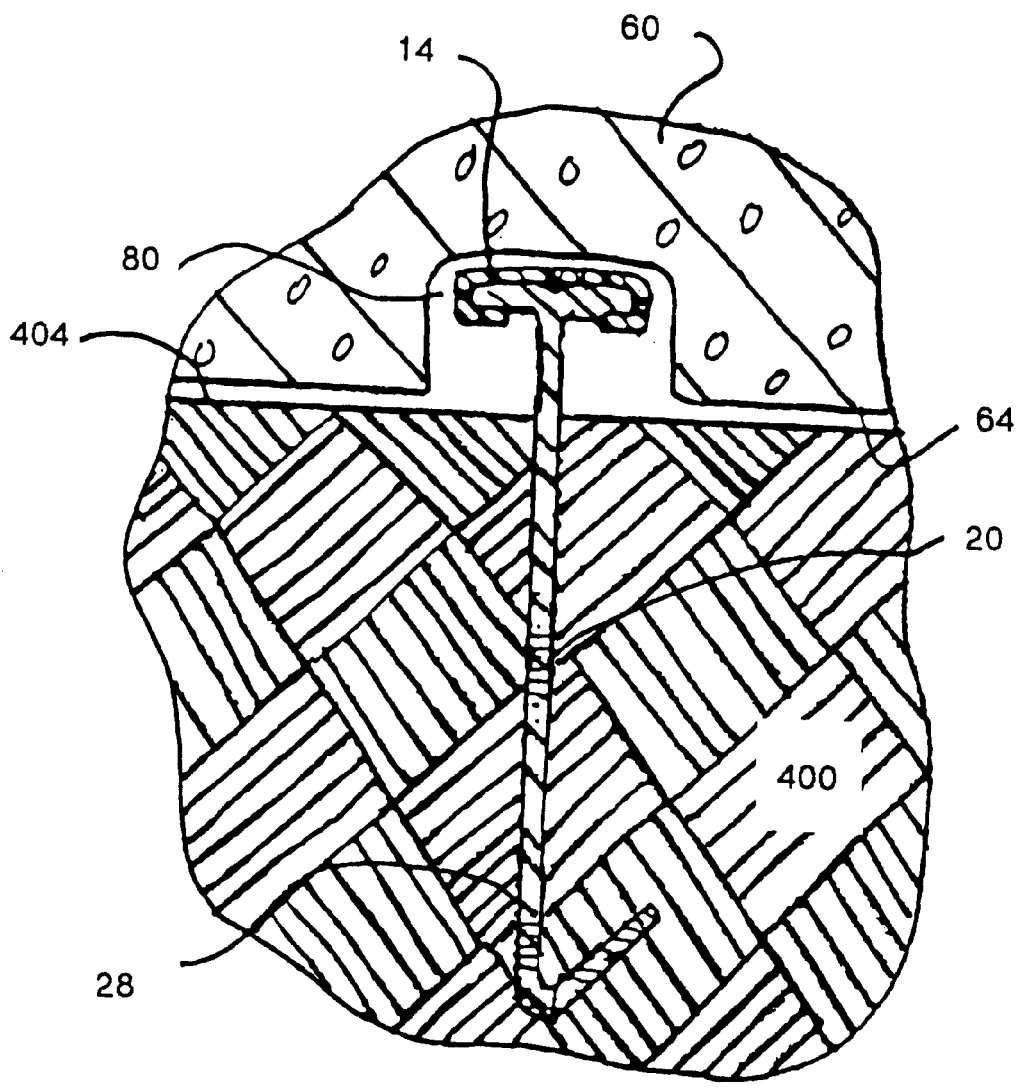
Figure 3T:
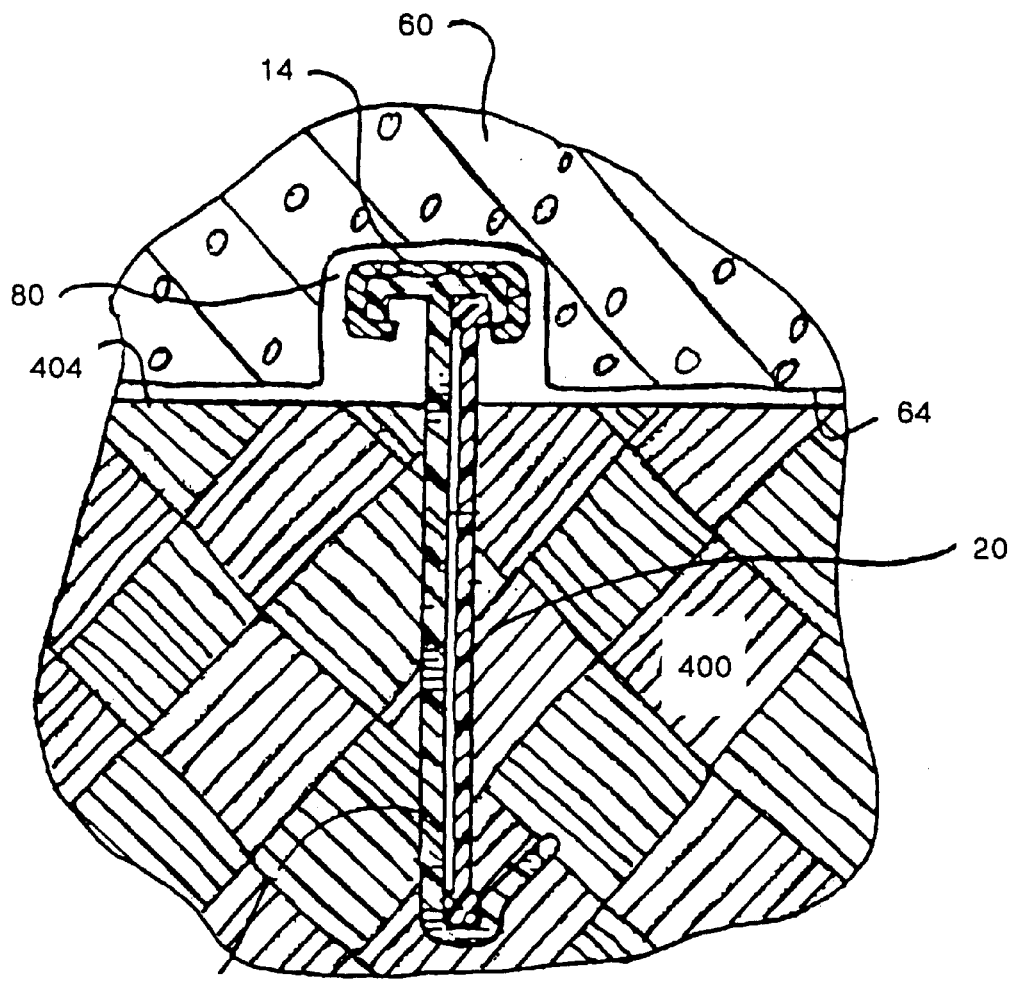

FIGS. 2(a) through 2(u) show perspective views of selected lawn edging members 10 of the present invention. Top rails 14 of the present invention having various structural configurations are also illustrated in FIGS. 2(a) through 2(u). FIGS. 3(a) through 3(t) show cross-sectional views of selected lawn edging members 10 and blocks 60 of the present invention; top rails 14 of the present invention having various cross-sectional configurations are illustrated therein, along with corresponding blocks 60 having recesses 80 formed to receive top rails 14 therein.

It will now become apparent to those skilled in the art that a virtually unlimited range of suitable cross-sectional shapes exists for top rail 14 and corresponding recess 80 of block 60 of the present invention. For example, top rail 14 may be T-shaped, round, elliptical, triangular, square, rectangular or nearly any other suitable shape in cross-section. Recess 80 is most preferably formed to receive top rail 14 engagingly, snugly or tightly therein, and thus preferably assumes a shape complementary to that of top rail 14.

Figure 3U:
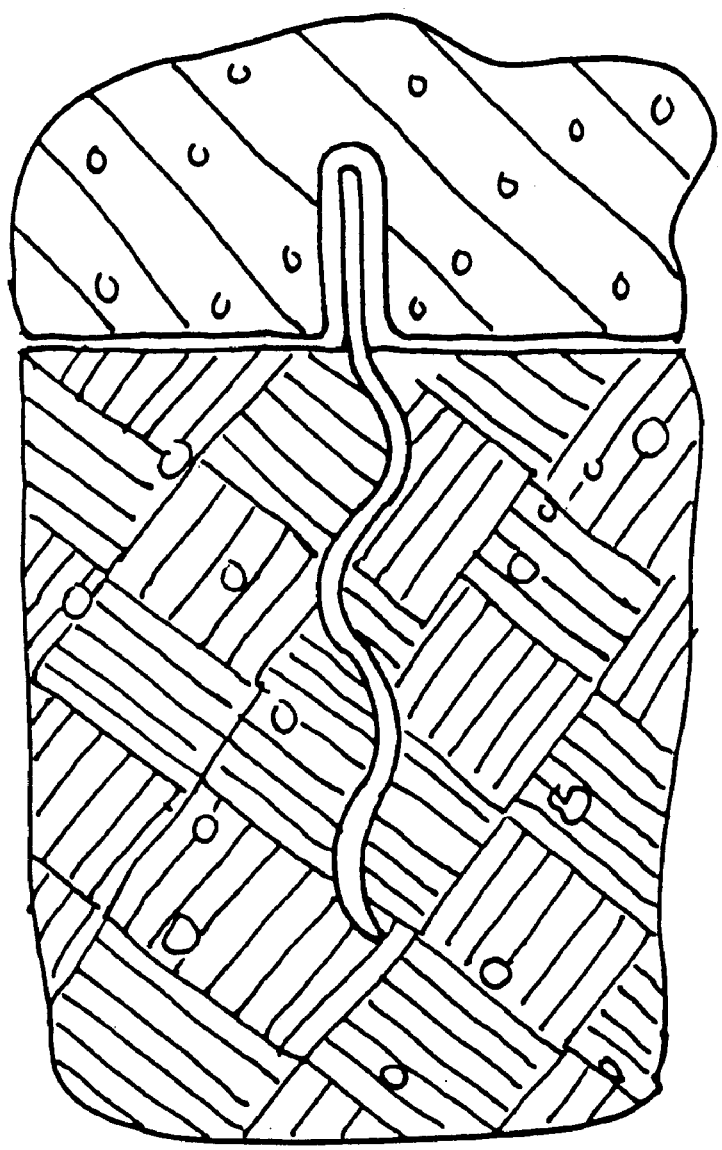
Figure 3V:
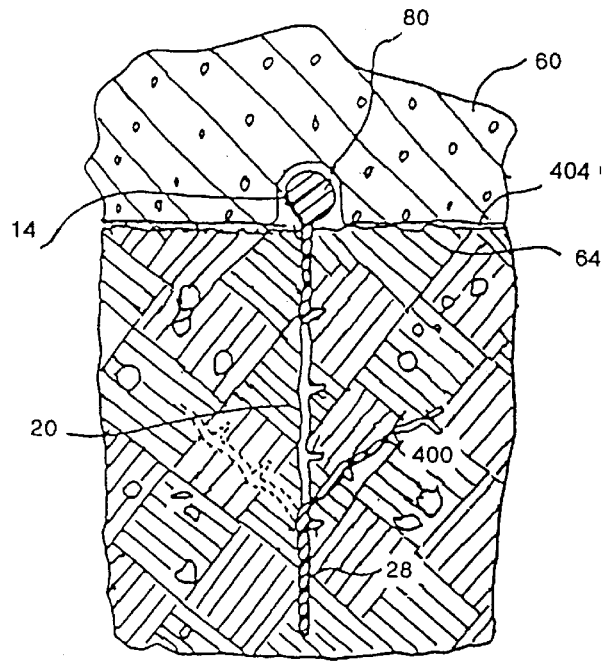
Figure 3W:
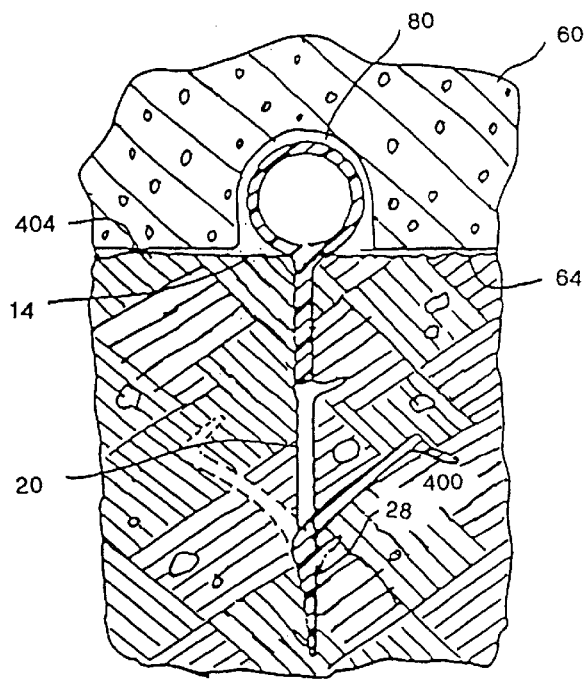
Figure 3X:
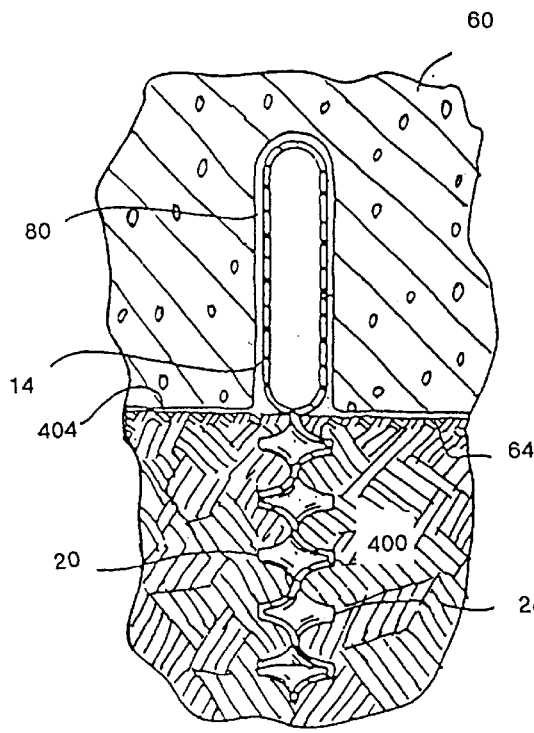
Figure 3Y:
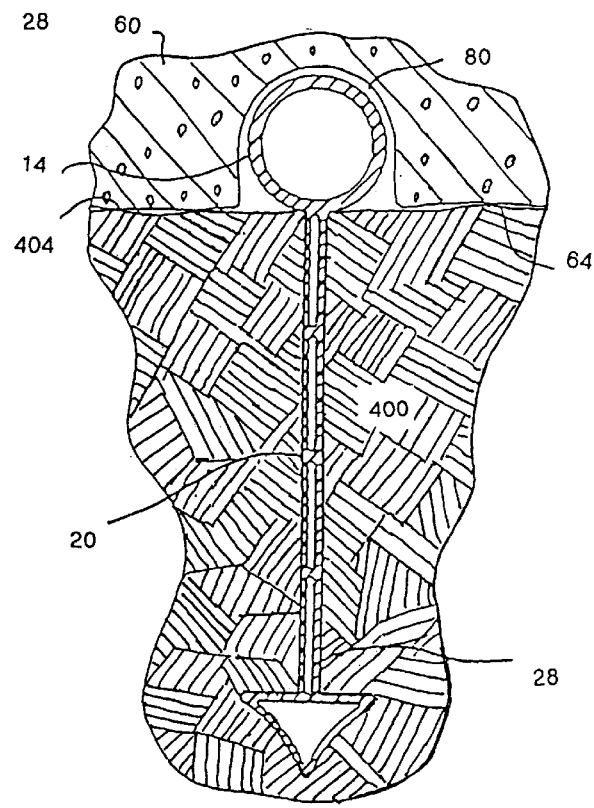
Figure 3Z:
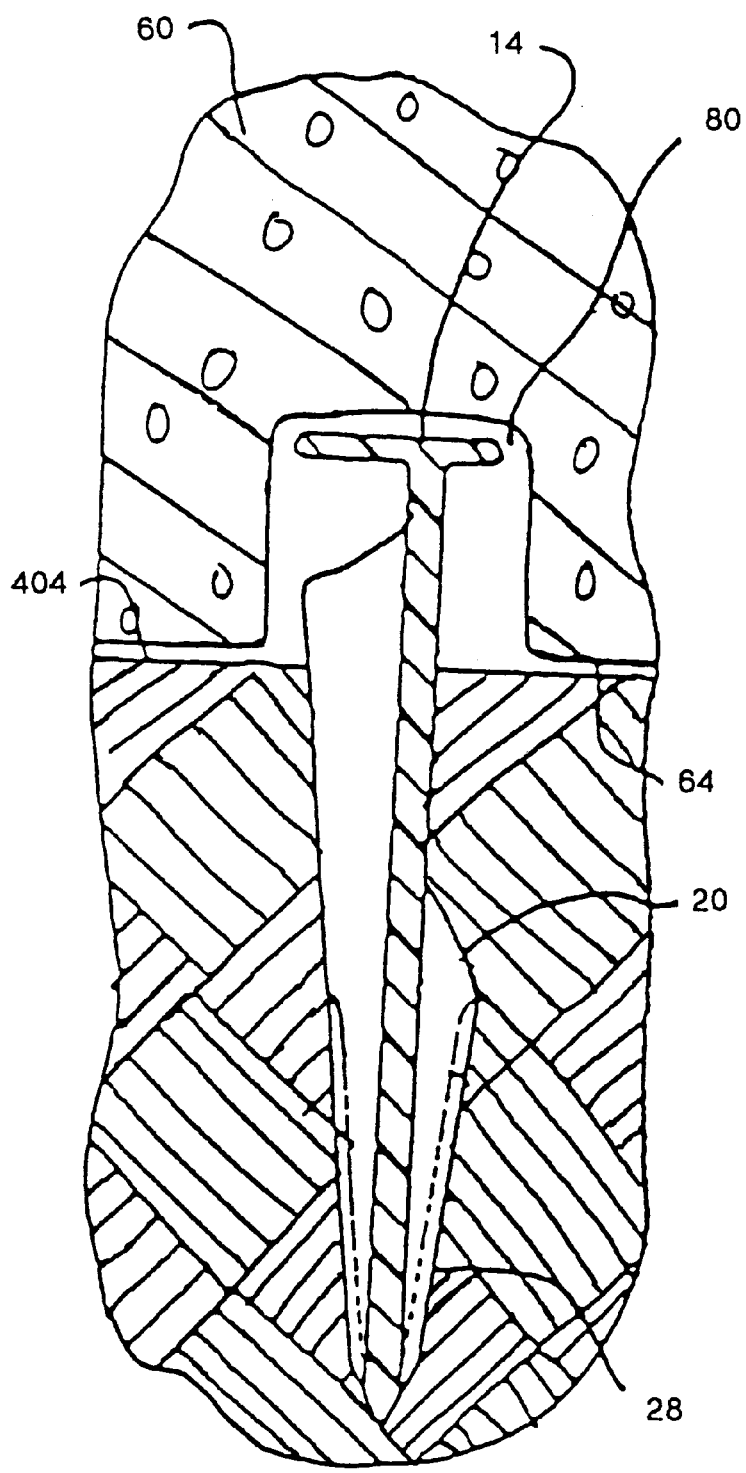
Figure 3:
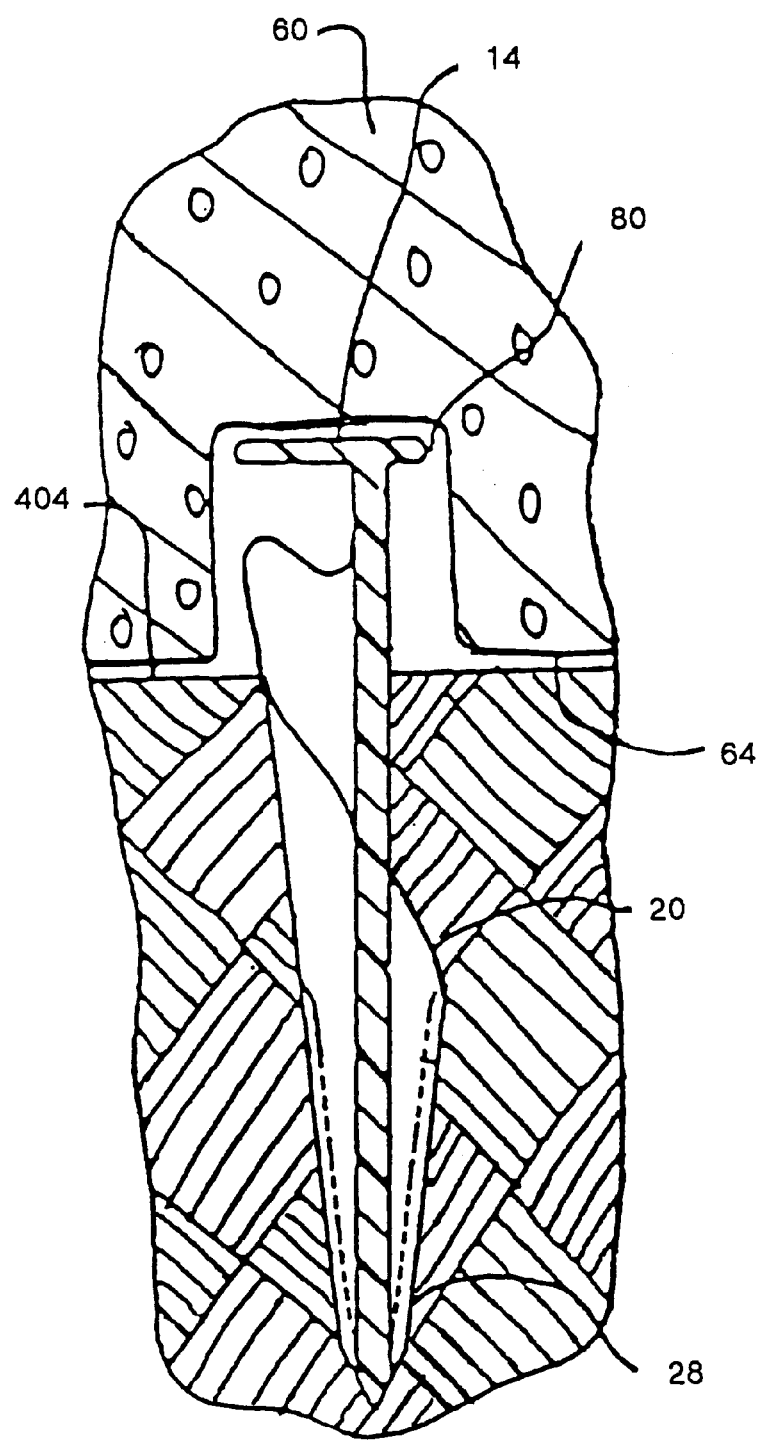
Figure 3:
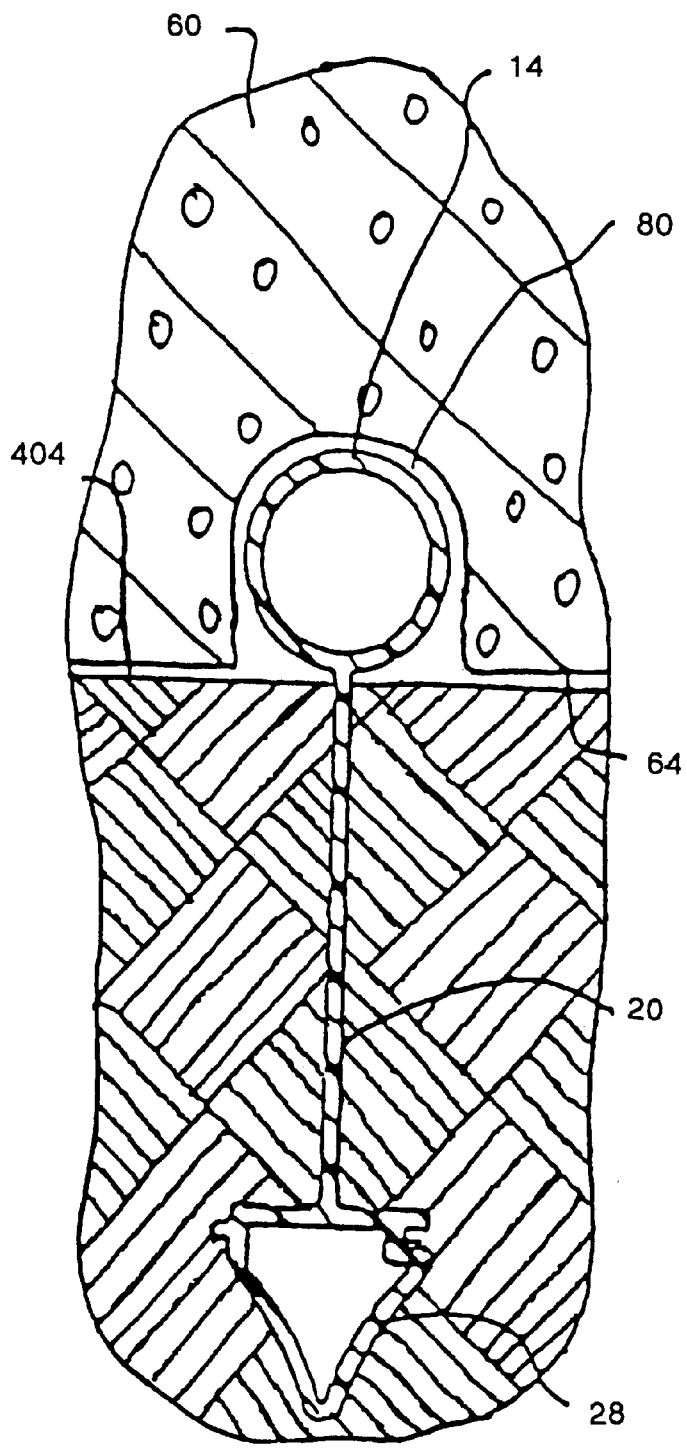
Figure 3:
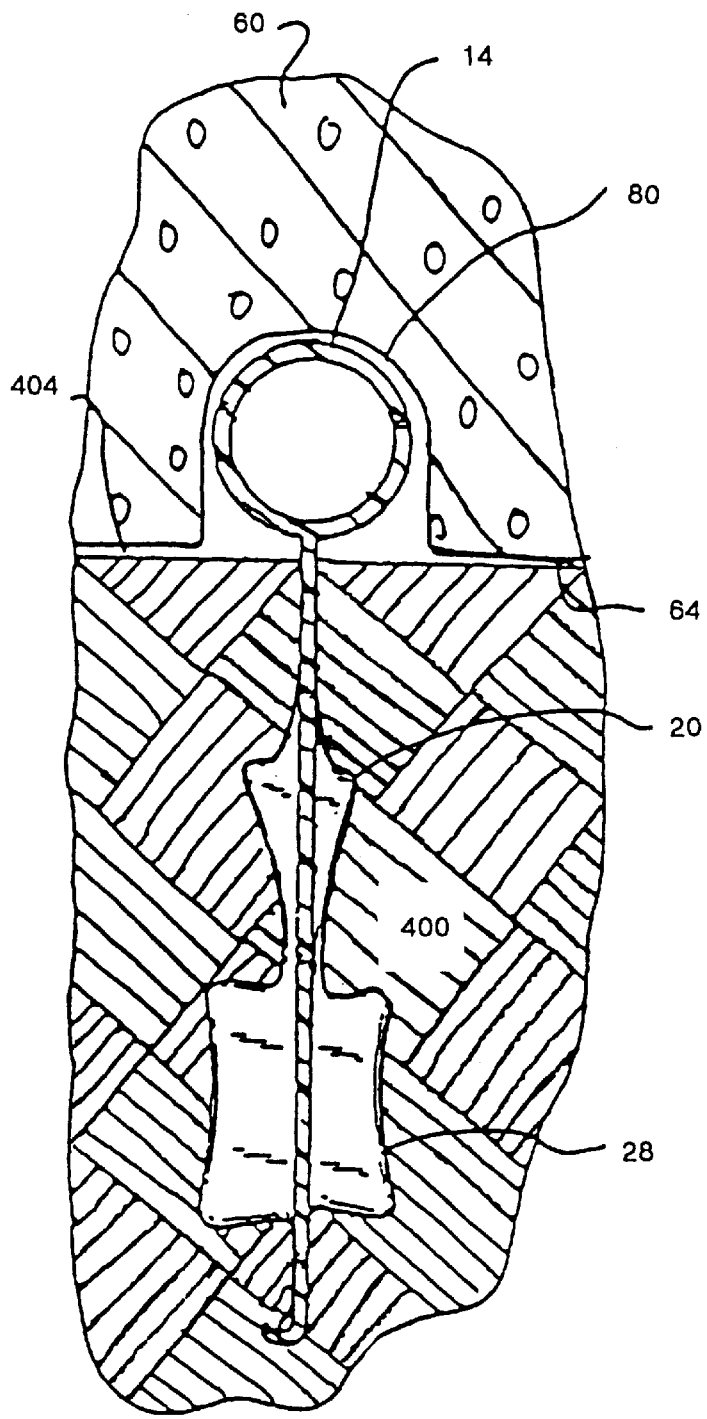
Figure 3:
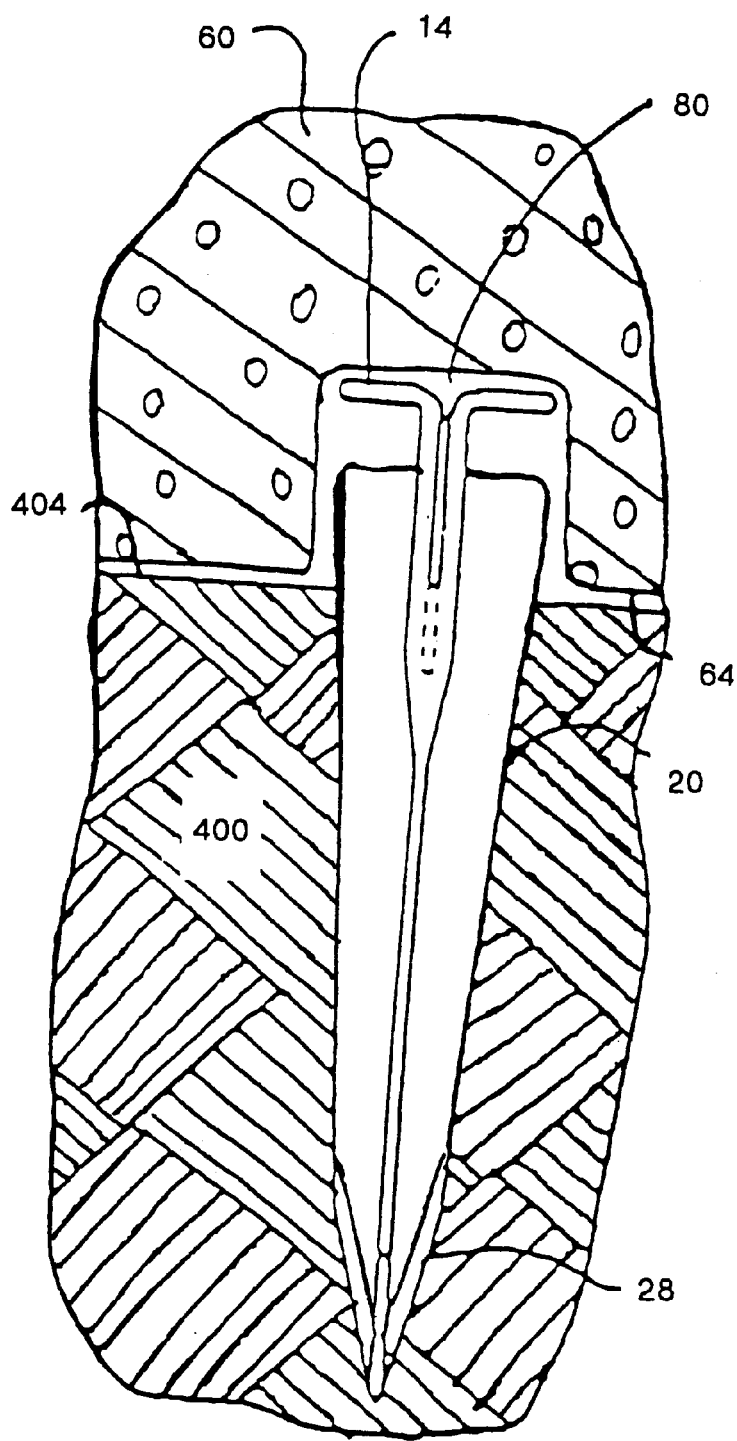
Figure 3:
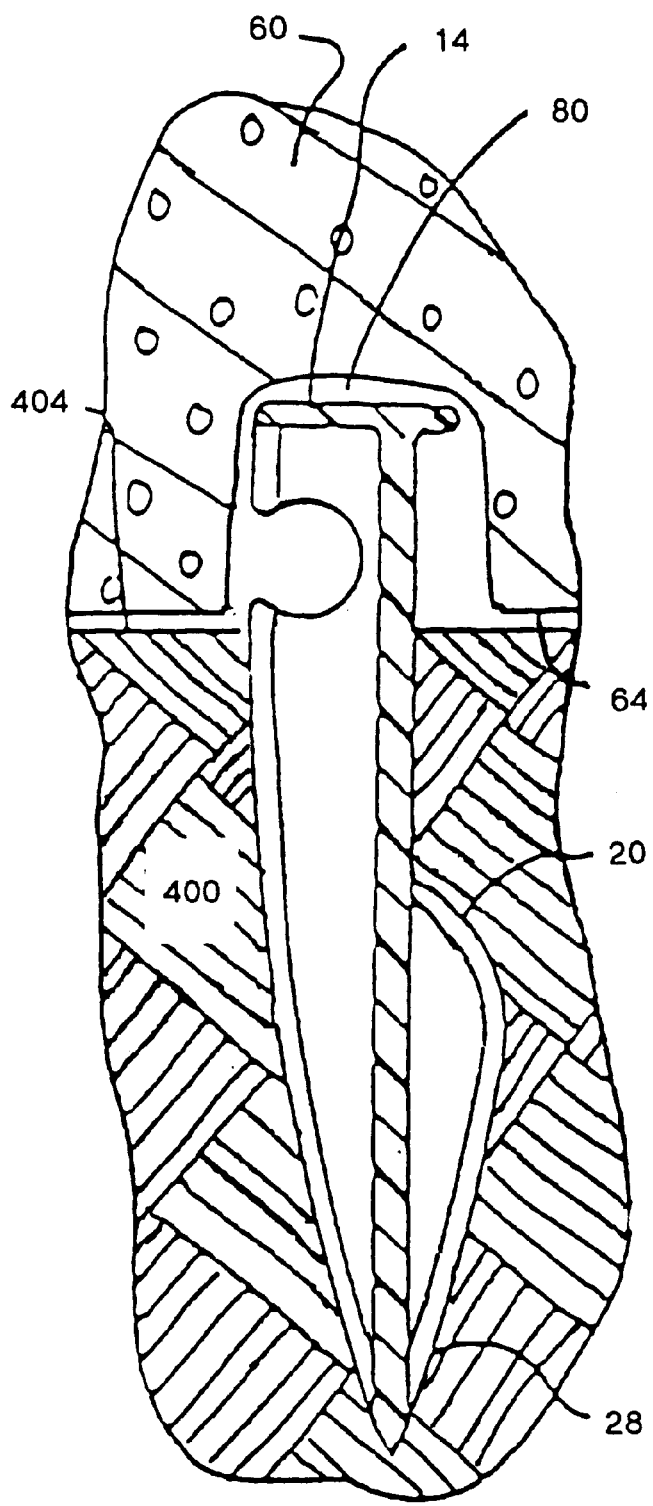
Figure 3:
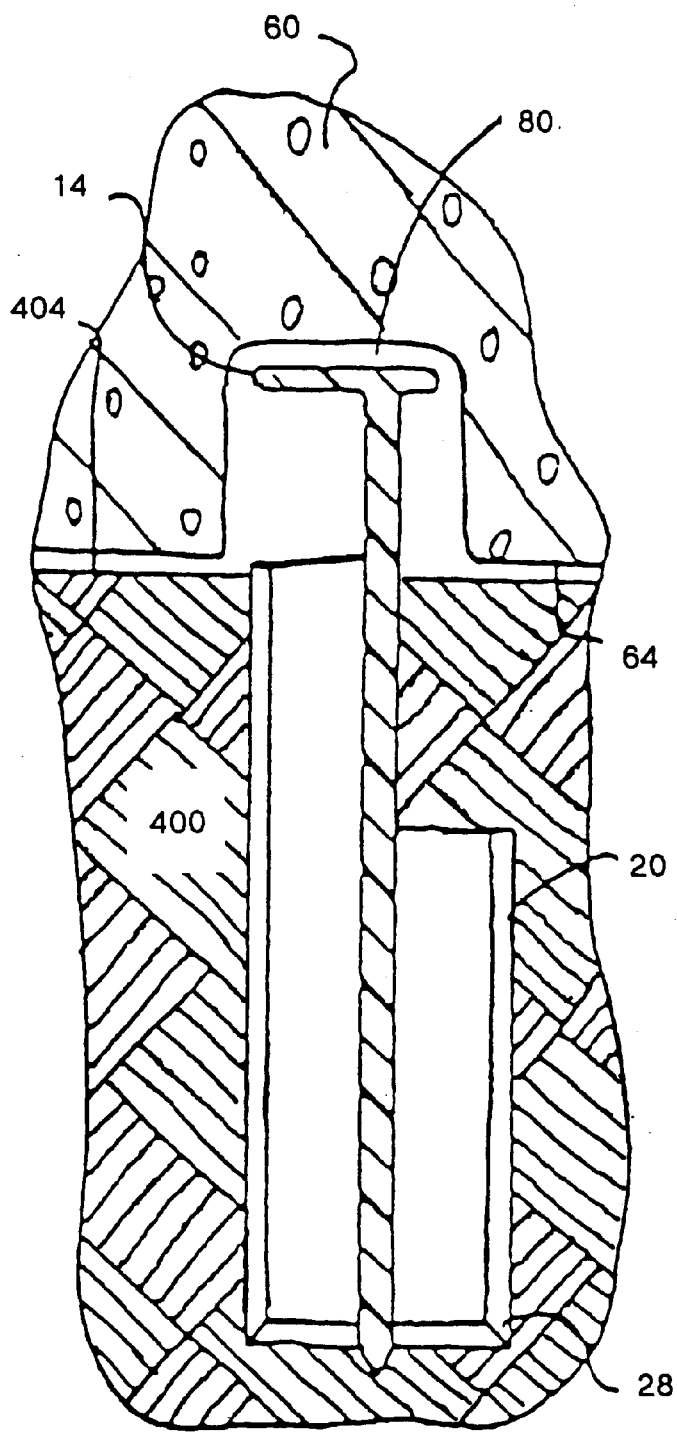
Figure 3:
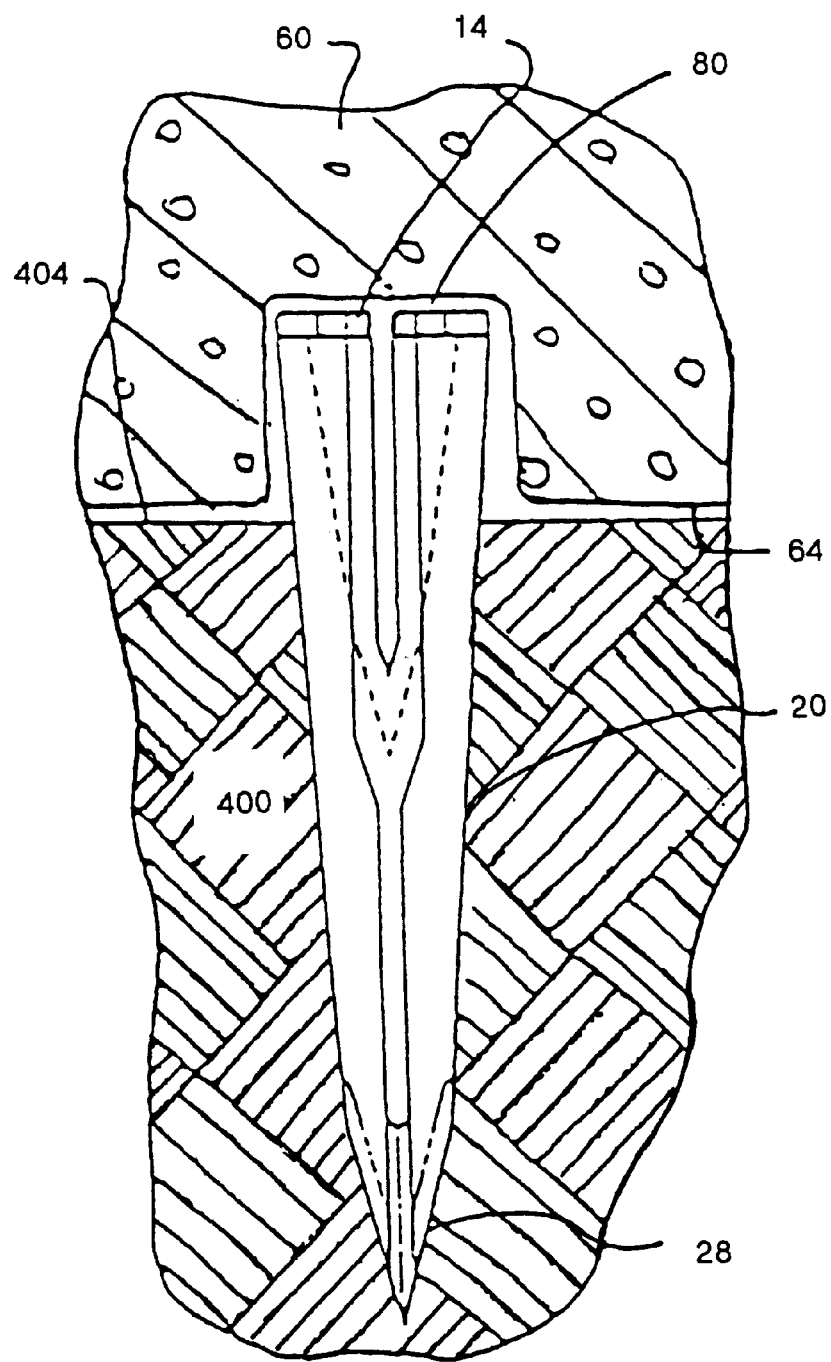
Figure 3:
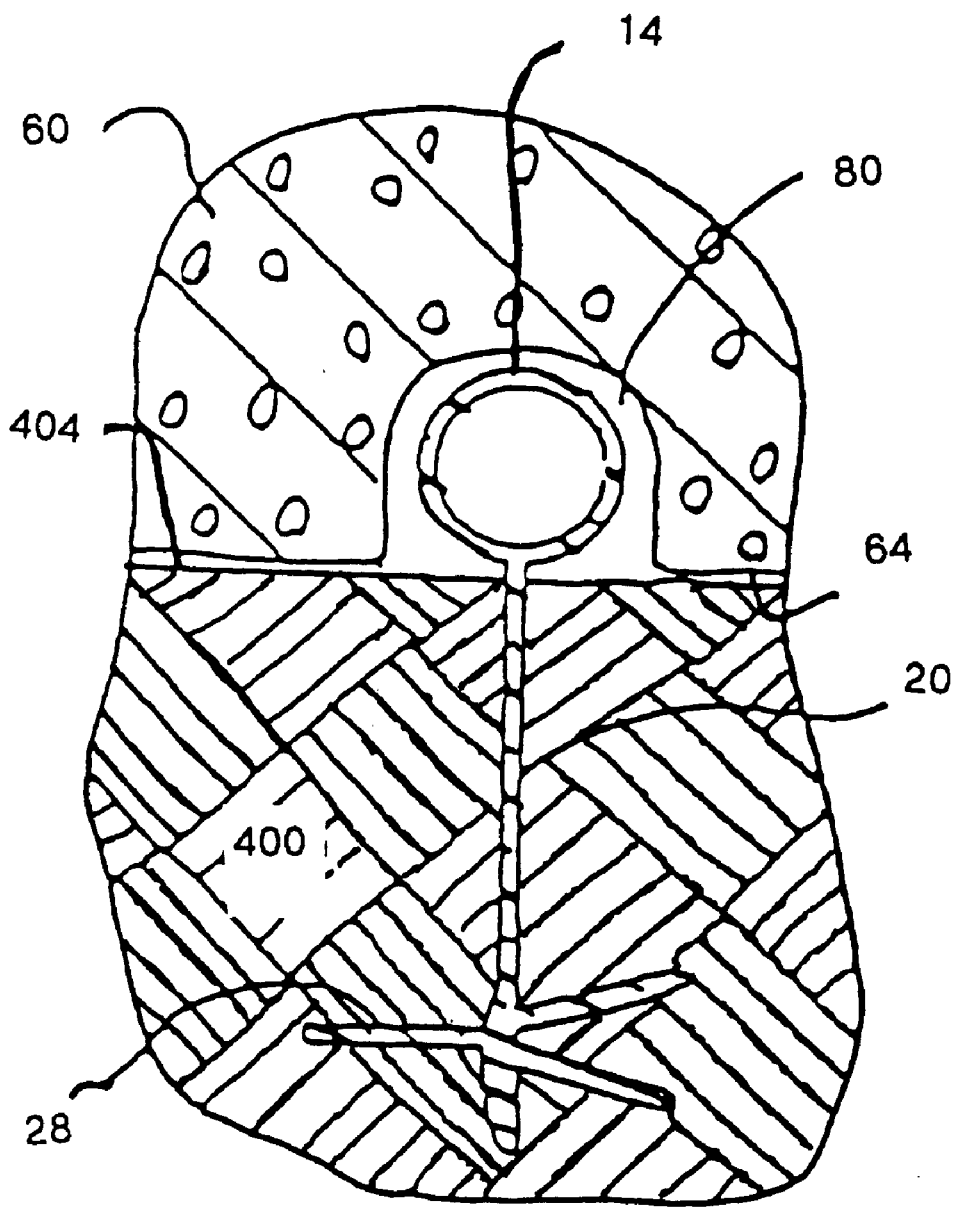
Figure 3:
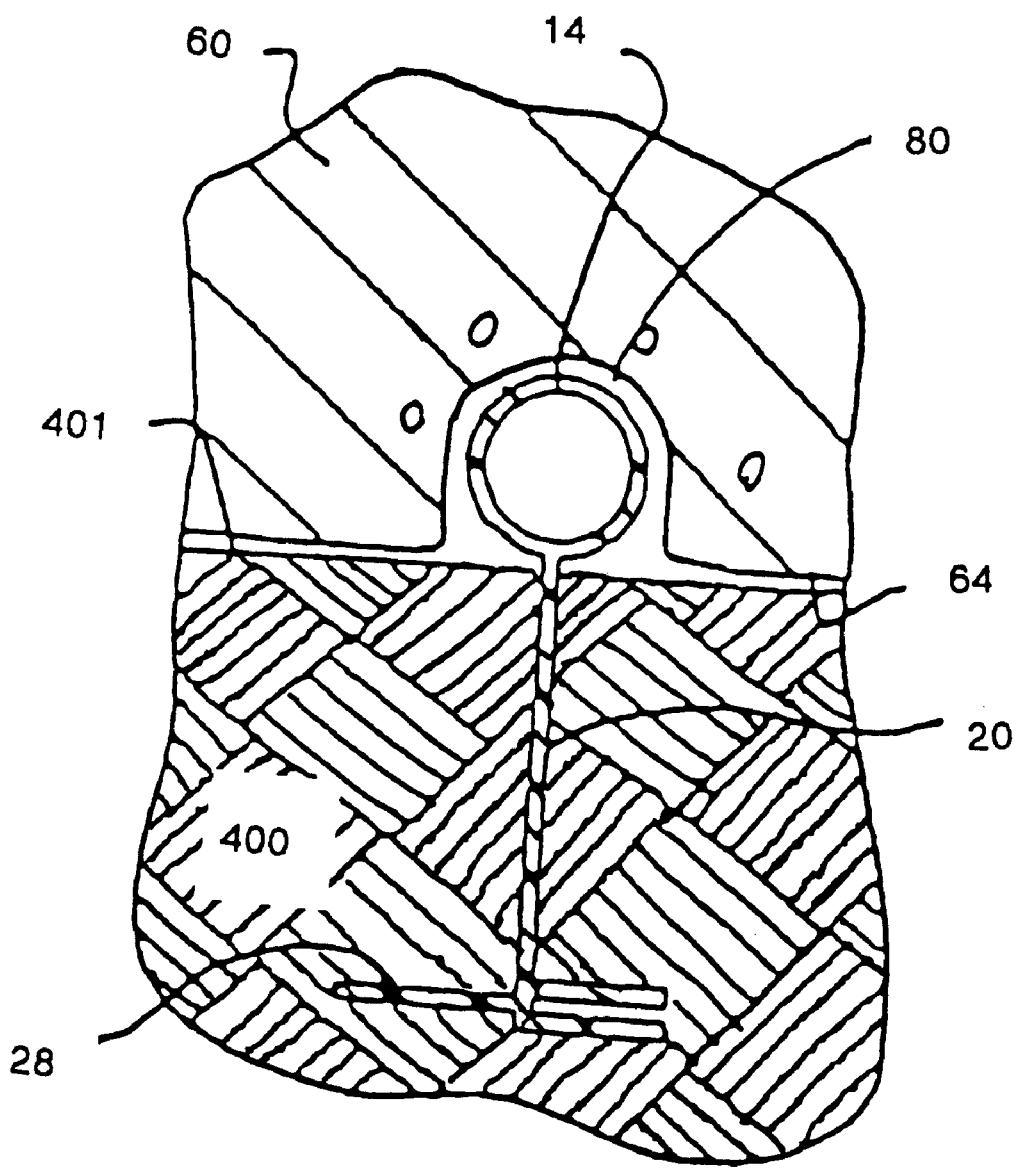
Figure 3:
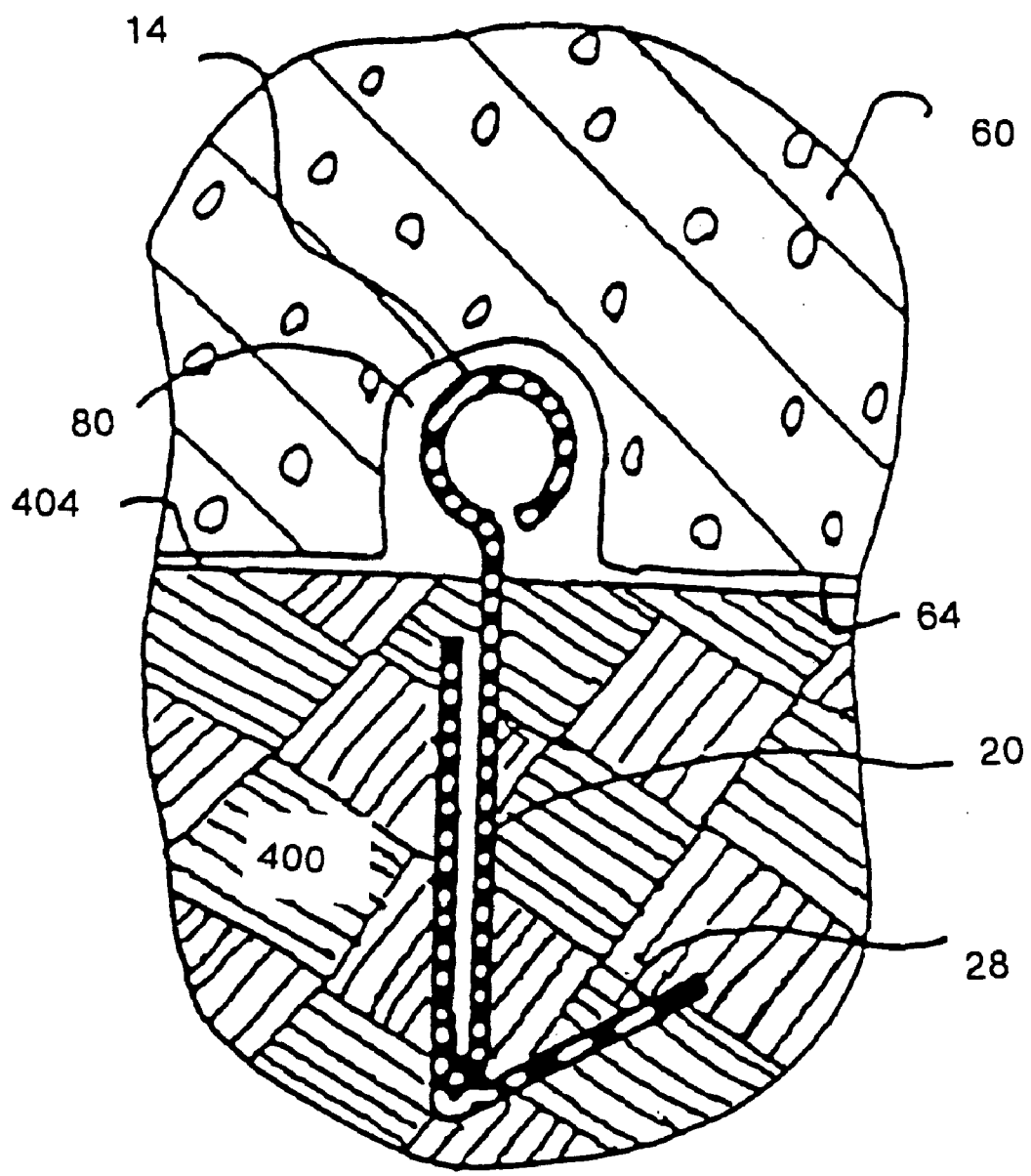
Figure 3:
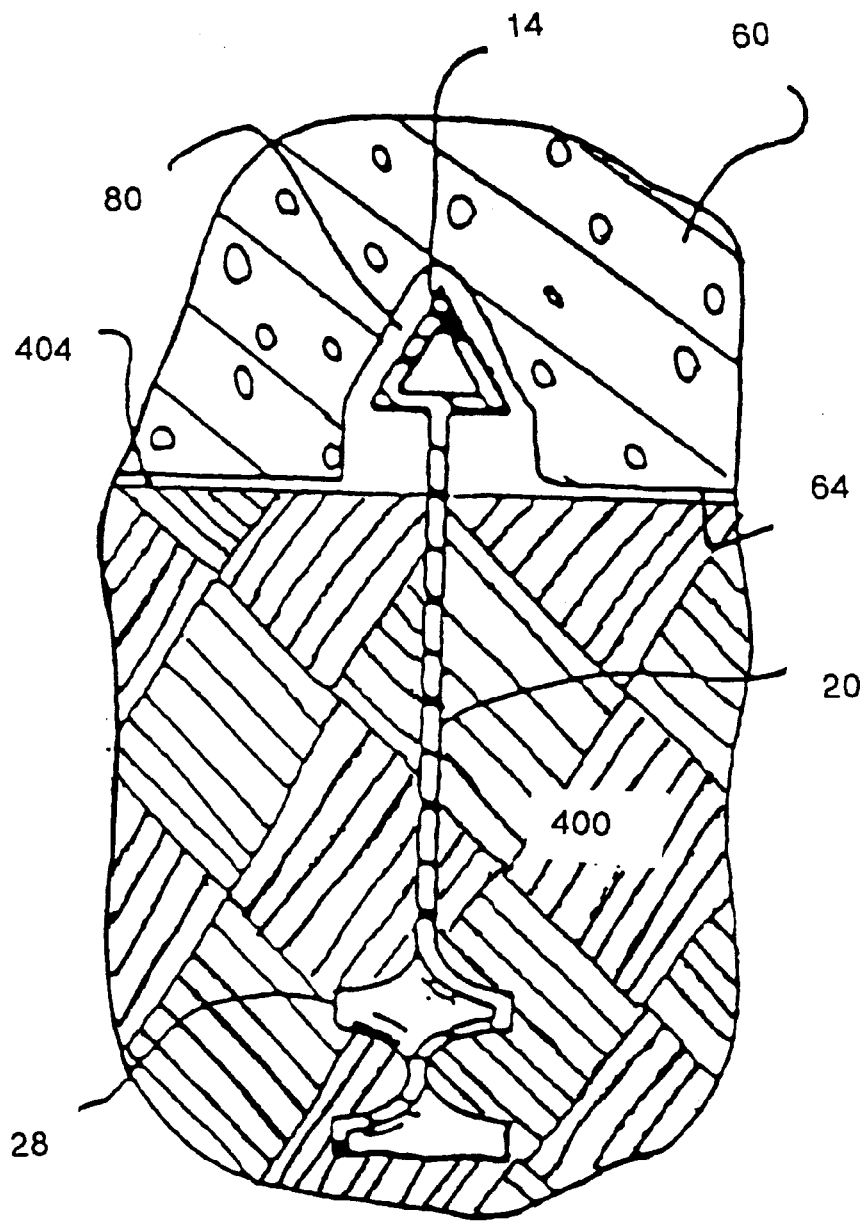
Figure 3:
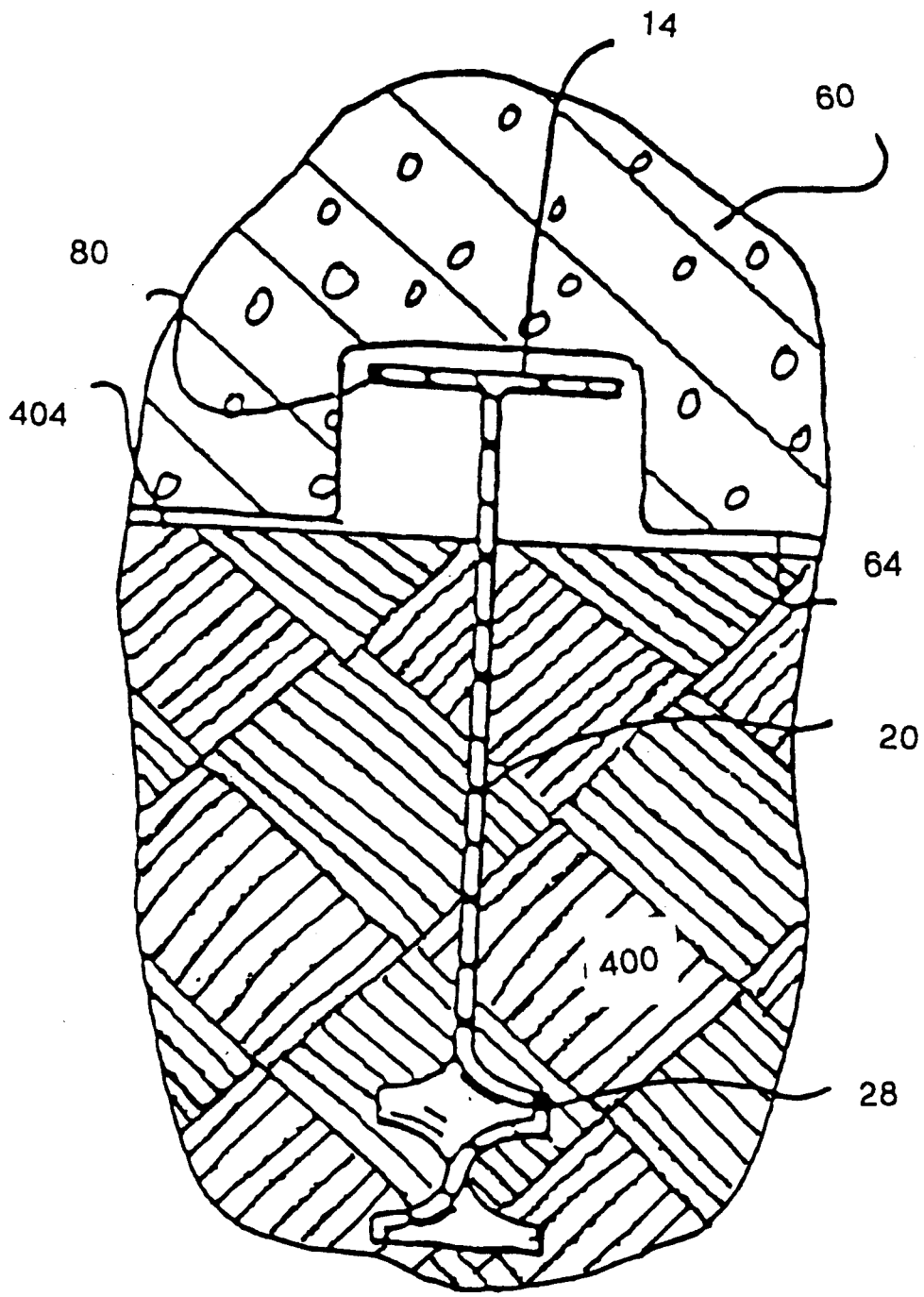
Figure 3:
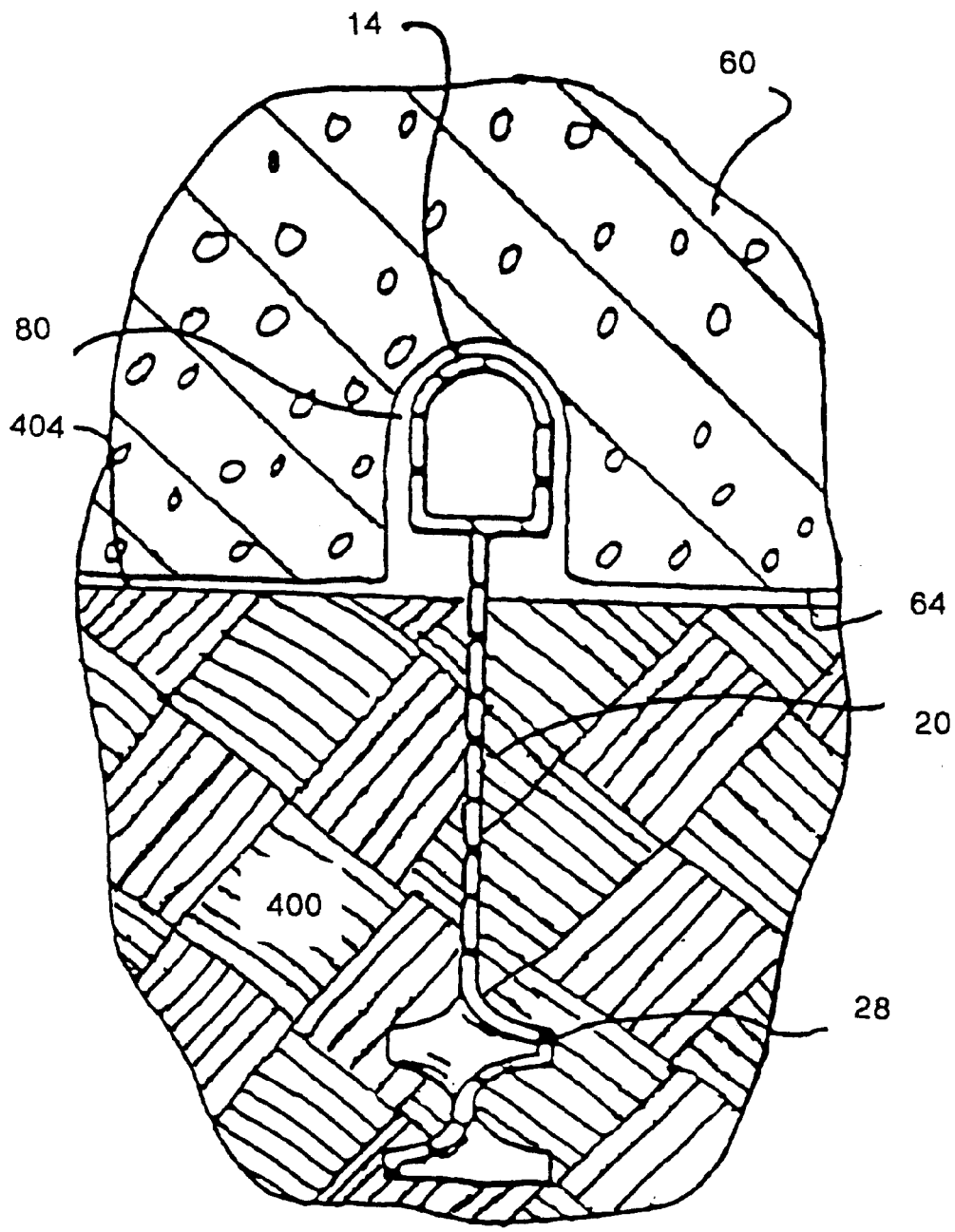
Figure 3:
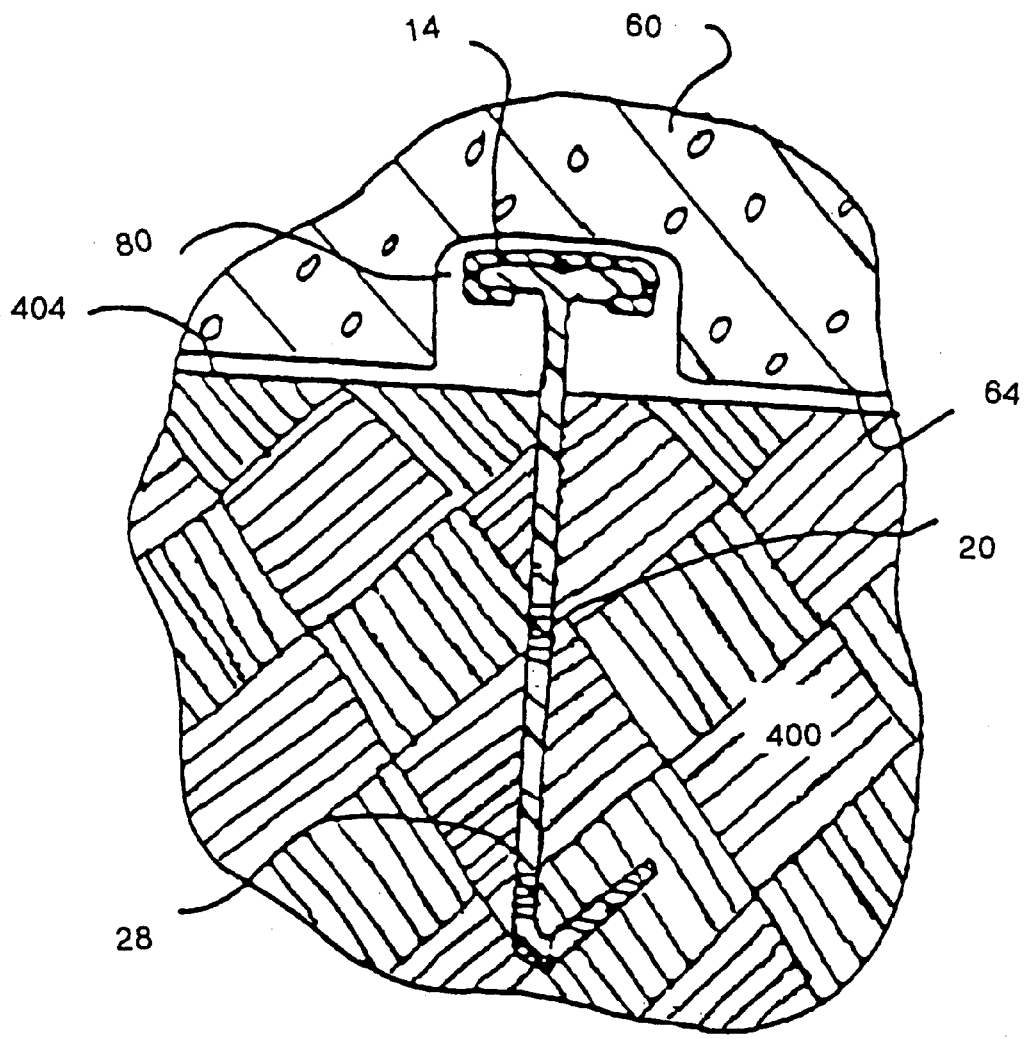
Figure 3:
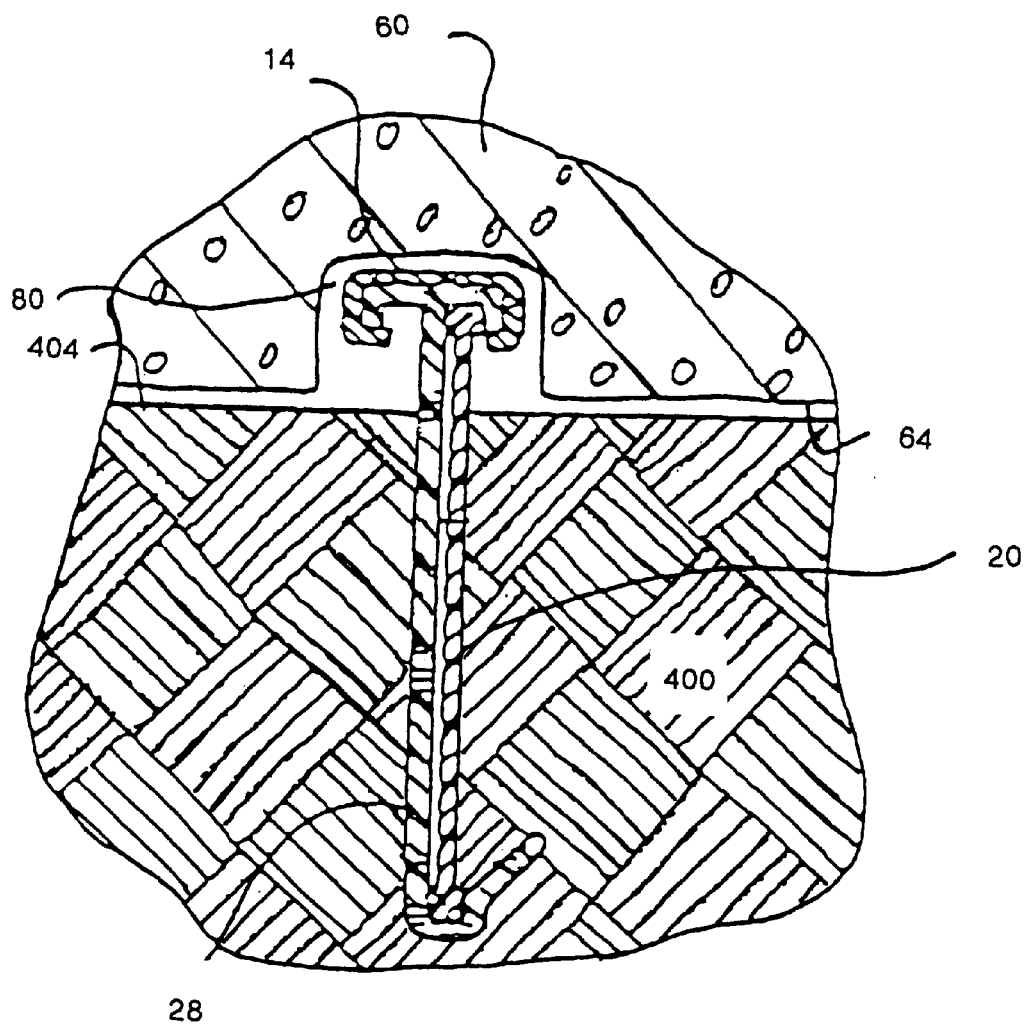

Lower portion 28 and central portion 30 of landscape edging member are most preferably shaped or configured to include means for anchoring landscape edging member 10 in ground 400. For example, lower portion 28 may include an anchor member having a triangular cross-section, wherein the apex of the triangle points downwardly as in U.S. Pat. Nos. 5,438,804 and 5,519,970 to Reum et al. See also, for example, FIGS. 2(a), 2(b), 2(e), 2(f), 2(h), 3(d) and 3(g) herein. In other embodiments of the present invention, however, and as shown in FIGS. 3(u) through 3(oo), recess 80 need not conform to the shape of at least the bottom portion of top rail 14. Instead, recess 80 may be configured to receive top rail loosely therein.

Central portion 30 and lower portion 28 may also have a plurality of hollow, molded projections extending from one or both faces, where the interior of each projection is open on the opposite face corresponding to the portion, and the portion forms a concave soil socket or nesting region that becomes filled with soil when landscape edging member 10 is installed in ground 400. See, for example, U.S. Pat. No. 5,201,154 to Thomas and U.S. Pat. No. 4,761,923 to Reum et al and FIGS. 2(c), 2(d), 2(f), 2(k), 2(l), 2(m), 3(c), 3(e), 3(f), 3(h), 3(i), 3(j), 3(k), 3(l), 3(p), 3(q) and 3(r) hereof.

Alternatively, central portion 30 or lower portion 28 may include a medial or longitudinal downwardly or upwardly pointing rib or end hook as in U.S. Pat. No. 5,410,458 to Bell. Blades, flanges, ears or securing lips of the types disclosed in U.S. Pat. No. 5,501,036 to Torp, Jr. et al., U.S. Pat. No. 3,788,001 to Balfanz, Jr., U.S. Pat. No. 4,644,685 to Tisbo and 4,281 to Emalfarb et al. may extend outwardly and upwardly or outwardly and downwardly from central portion 30 or lower portion 28 to form a means for anchoring landscape edging member 10 in ground 400. See, for example, FIGS. 2(e), 2(g), 2(j), 2(n), 2(o), 2(p), 2(t), 2(u), 3(a), 3(b), 3(o), 3(s) and 3(t) hereof.

Metal or plastic stakes may be driven at an oblique angle through barrier 20 after landscape edging member 10 has been installed in ground 400 to better secure landscape edging member 10 in the ground. See, for example, FIG. 2(s) herein.

Landscape edging member 10 is most preferably sufficiently flexible and structurally configured to permit ready packaging in coiled fashion. See, for example, U.S. Pat. No. 5,519,970 to Reum et al., where lawn or landscape edging members are disclosed that lend themselves particularly well to being packaged in coiled fashion. See also FIG. 2(l) herein.

Landscape edging member 10 may also form a strip of the type disclosed in U.S. Pat. No. 5,456,045 to Bradley et al., where top edge or rail 14 is configured for withstanding hammering, the bottom edge of lower portion 28 is configured for penetration in ground 400, and edging member 10 has ends constructed for interlocking with adjacent strips or members.

Figure 4A:
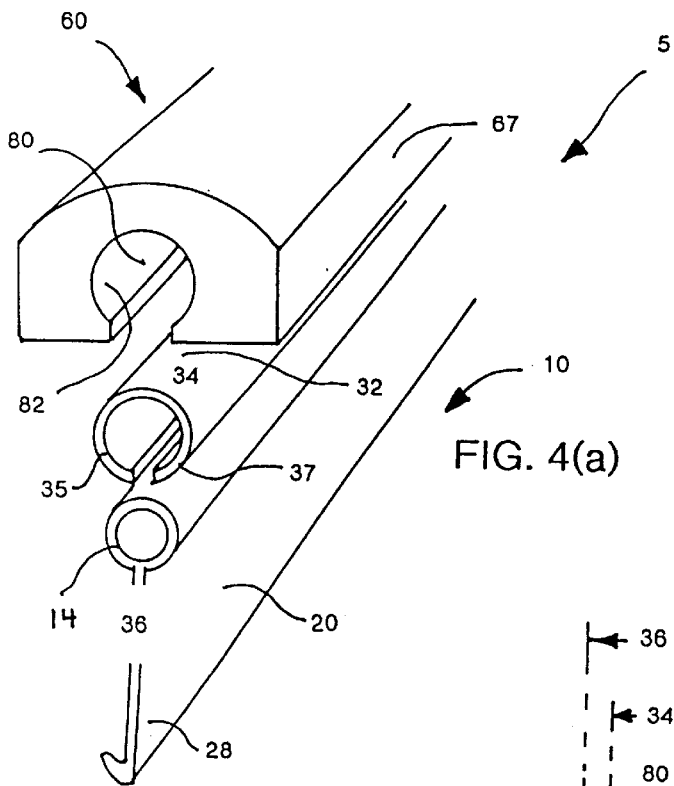
FIGS. 4(a) through 4(i) show variants of landscape edging system 5 of the present invention, where adapter clip 32 is disposed between inner sidewalls 82 of recess 80 and the outer surface of top rail 14.
Figure 4B:
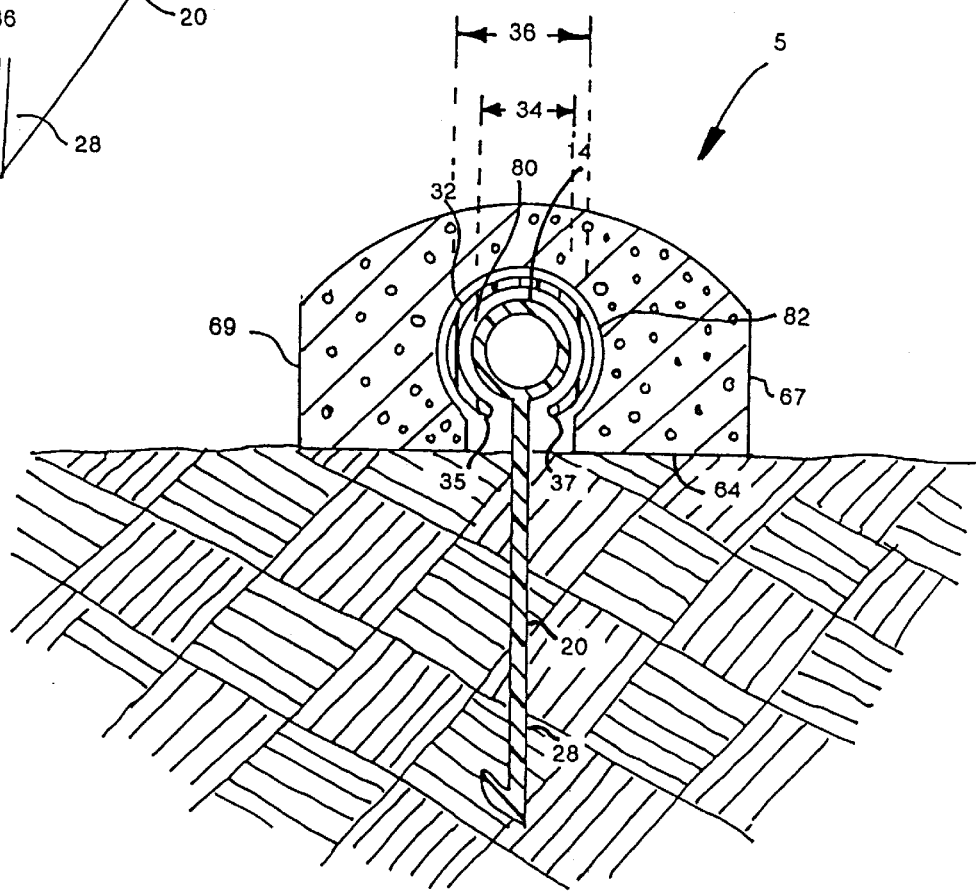
Figure 4C:
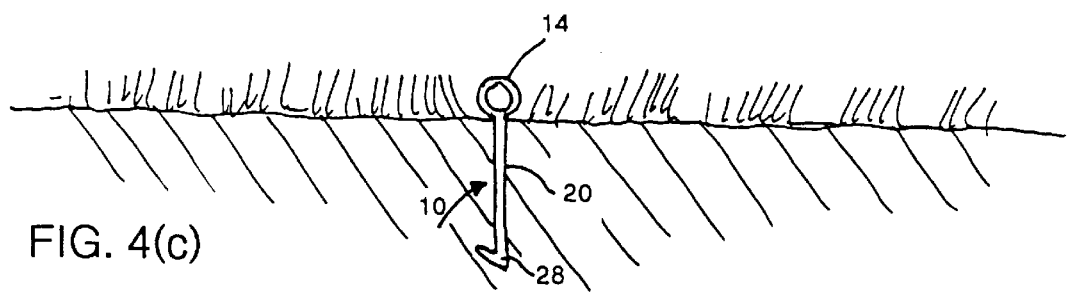
Figure 4D:
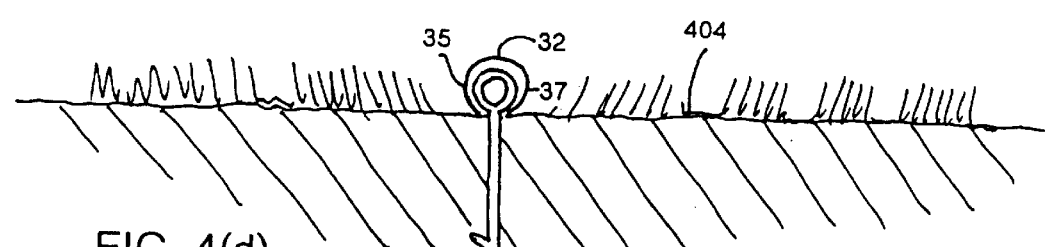
Figure 4E:
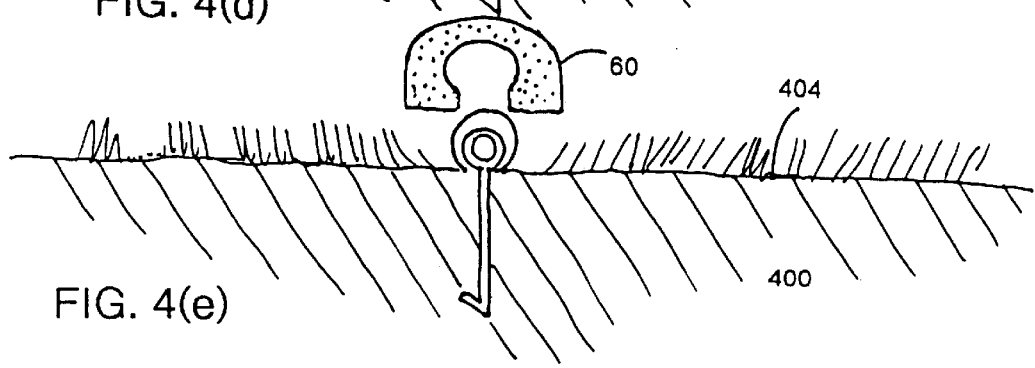
Figure 4F:
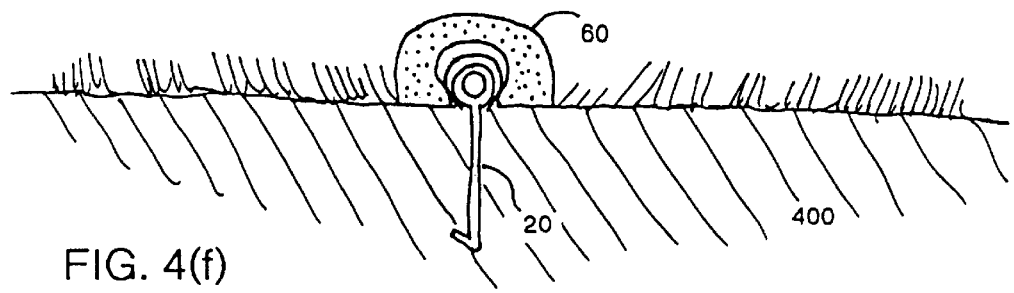
Figures 4G, 4H, 4I:
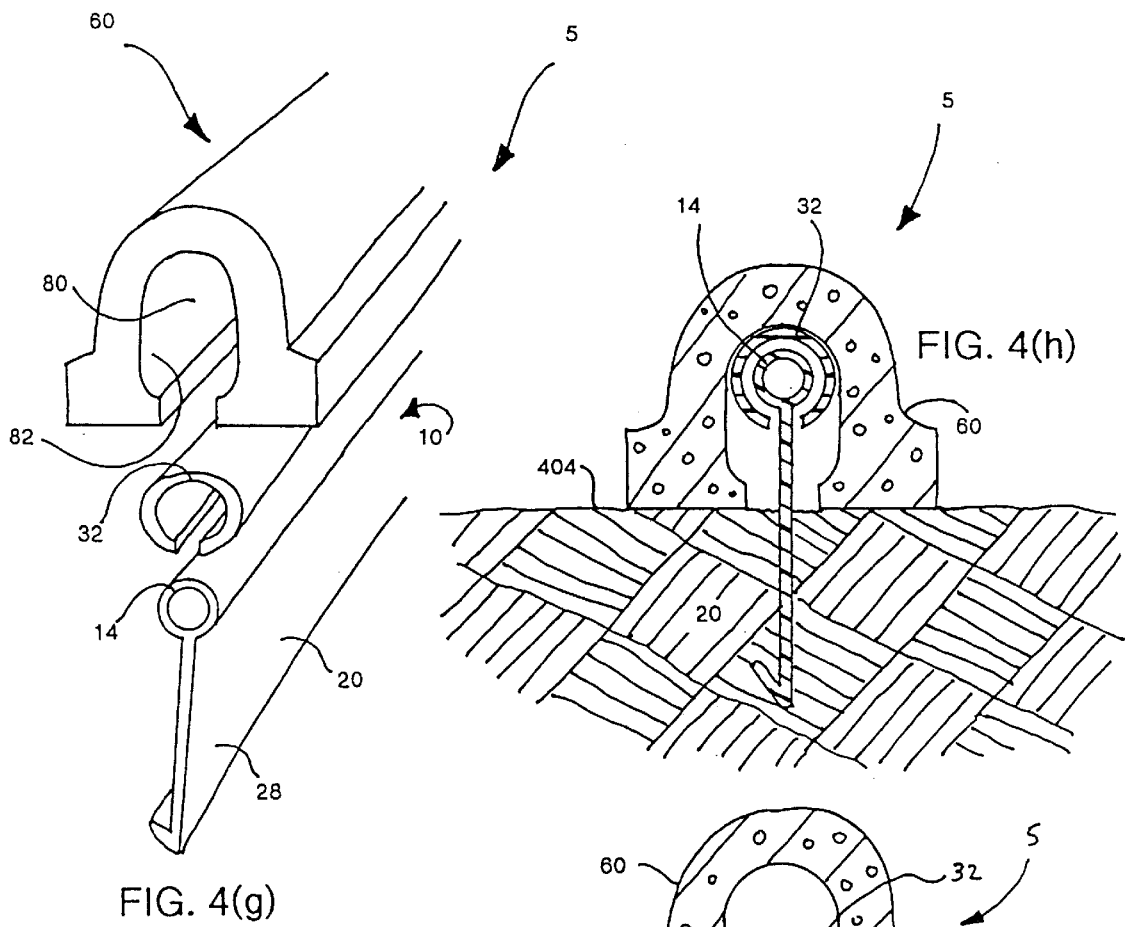

FIGS. 4(a) through 4(b) show a variant of landscape edging system 5 of the present invention, where adapter clip 32 is disposed between inner sidewalls 82 of recess 80 and the outer surface of top rail 14. Adapter clip 32 has arms 35 and 37 that expand apart to accept top rail 14 therebetween when adapter 32 is pushed downwardly onto top rail 14. Arms 35 and 37 also preferably engage inner sidewalls 82 of recess 80 when block 60 is disposed atop clip 32 and top rail 14. Adapter clip 32 is preferably configured to permit block 60 having recess 80 of width 84 to suitably interconnect with and engage top rail 14, regardless (within reasonable bounds) of width 36 of top rail 14. Thus, adapter clip 32 permits block 60 to be fitted onto the top rail of any of a number of various different commercially available brands of lawn edging, many of which share no common top rail width 36. It will become apparent to those of ordinary skill in the art that adapter clip 32 may be formed in many configurations other than C-shapes.

FIGS. 4(c) through 4(f) show steps for installing system 5 of FIGS. 4(a) and 4(b) in ground 400, where block 60 and adapter clip 32 are installed on existing landscape edging member 10. FIGS. 4(g) through 4(l) show a variant of the embodiment of the invention illustrated in FIGS. 4(a) through 4(f) where recess 80 is configured to permit compensation for vertical height shifts or changes in ground surface 404 to occur between or along blocks 60.

Figure 4J:
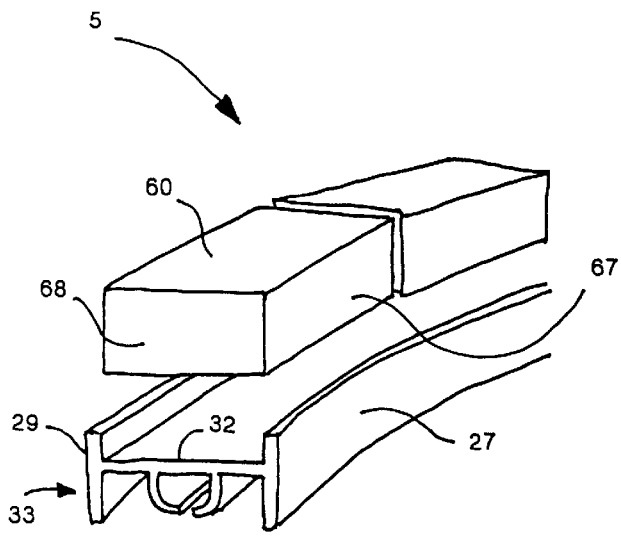
FIGS. 4(j) and 4(k) show another variant of landscape edging system 5 of the present invention, where clip-on adapter 33 is interposed between block 60 and rail 14.
Figure 4K:
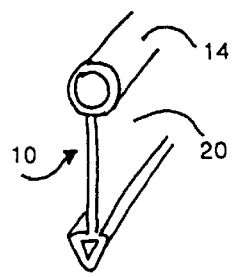
Figure 4K:
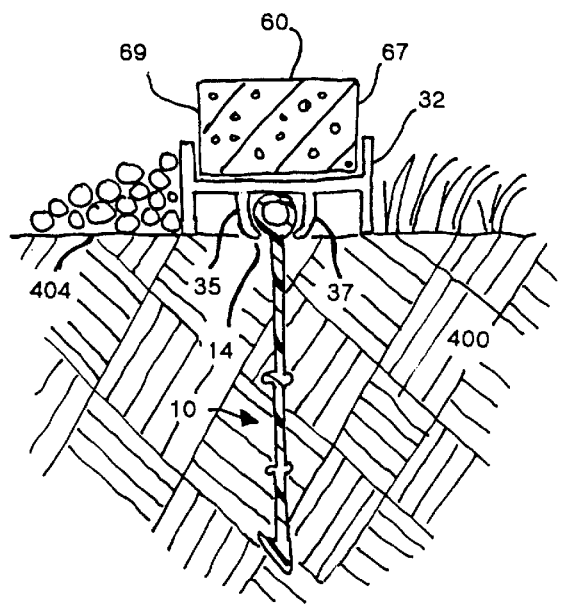

FIGS. 4(j) and 4(k) show another variant of landscape edging system 5 of the present invention, where clip-on adapter 33 is interposed between block 60 and rail 14. Clip 32 is preferably formed as a portion of clip 33, and snaps onto top rail 14. Block 60 may merely sit on adapter 33. Alternatively, and more preferably, recess 80 of block 60 may frictionally engage and receive adapter 33 therewithin. Siderails 27 and 29 receive and may frictionally engage the side portions of block 60.

Figure 5A:
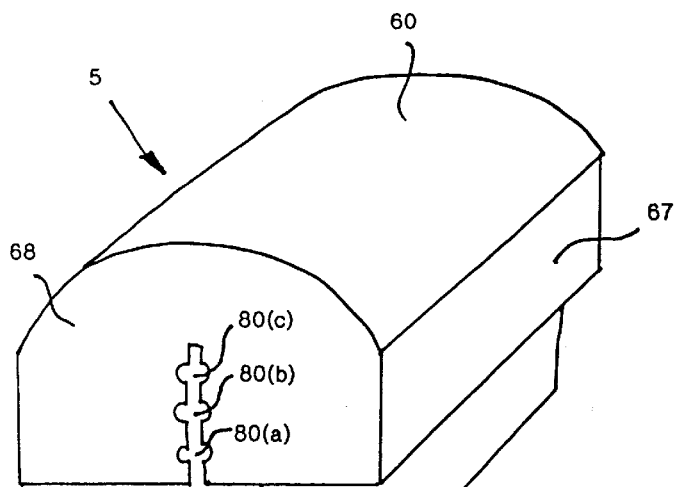
FIGS. 5(a) and 5(b) show an embodiment of landscape edging system 5 of the present invention, where block 60 has a plurality of vertically-aligned recesses 80(a), 80(b) and 80(c) formed therein.
Figure 5B:
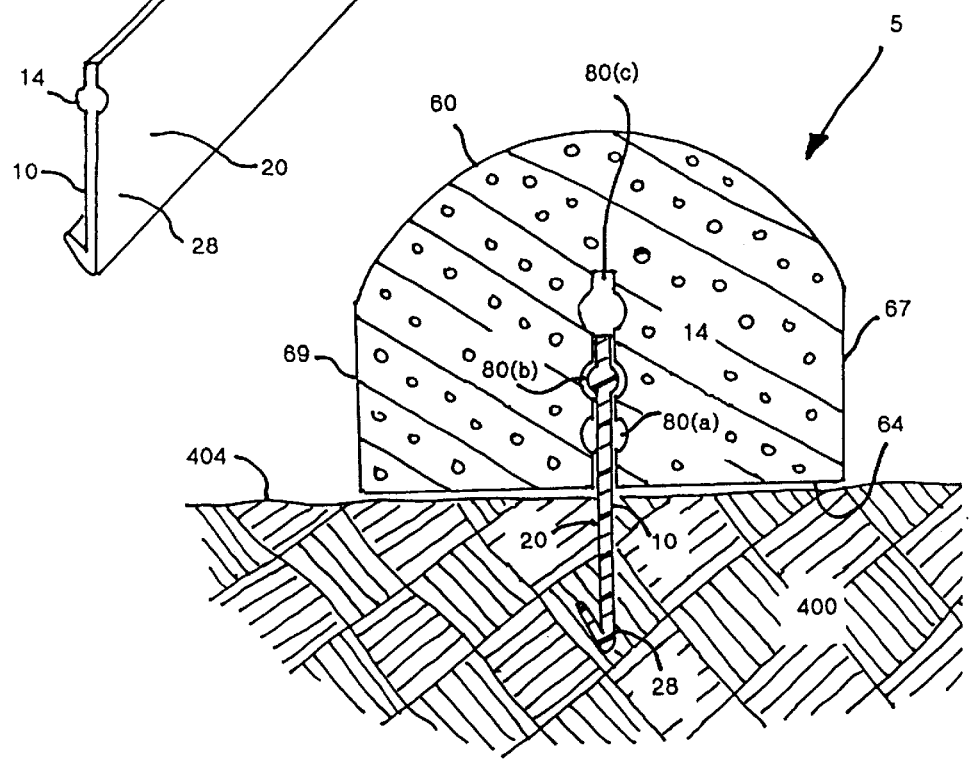

FIGS. 5(a) and 5(b) show another embodiment of the landscape edging system of the present invention, where block 60 has a plurality of vertically-aligned recesses 80(a), 80(b) and 80(c) formed therein. Those recesses permit bottom surface 64 of block 60 to conform snugly with the laterally changing elevations of ground surface 404 in respect of top rail 14. Recesses 80(a) through 80(c) also permit bottom surface 64 of block 60 to conform well with ground surface 404 despite variations in the depth to which downwardly extending barrier 20 is buried in ground 400.

In the embodiment of the landscape edging system of the present invention shown in FIGS. 5(a) and 5(b), top rail 14 is received within the highest recess top rail 14 can reach and engage. FIG. 5(a) shows an exploded perspective view of landscape edging system 5. FIG. 5(b) shows a cross-sectional view of landscape edging system 5 installed in ground 400, where top rail 14 engages recess 80(b). As shown in FIGS. 5(a) and 5(b), which of recesses 80(a), 80(b) or 80(c) top rail 14 most preferably fits within and engages depends upon the distance between top rail 14 and ground surface 404. In FIG. 5(a), top rail 14 barely protrudes above ground surface 404 and therefore most preferably engages recess 80(a). In FIG. 5(b), top rail 14 protrudes a large distance above ground surface 404 and therefore most preferably engages recess 80(c).

Figure 6A:
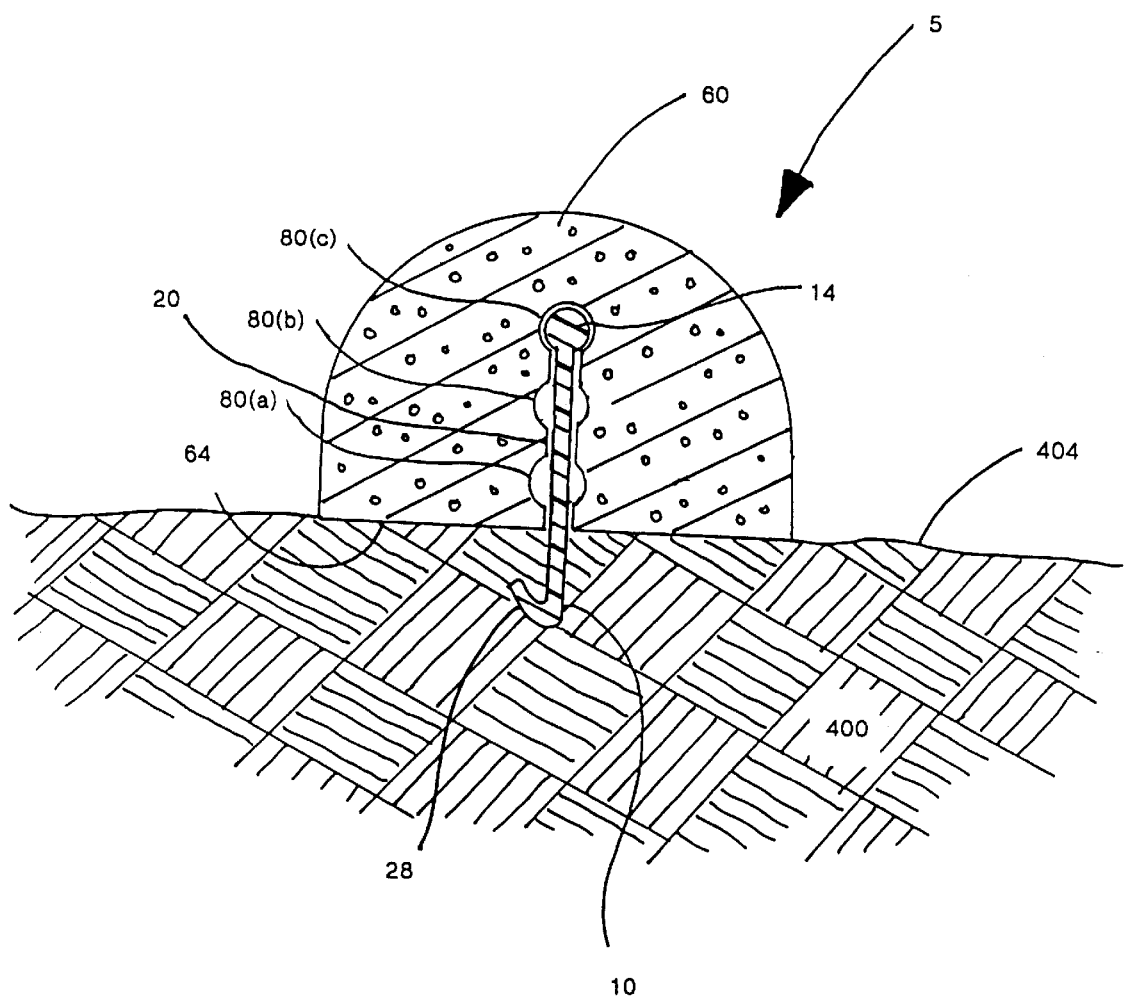
FIGS. 6(a) and 6(b) show another embodiment of the present invention, where landscape edging 10 has a longitudinally disposed rib or top rail 14 adapted to engage one of recesses 80(a), 80(b), 80(c) or 80(d), depending on the relative distance between top rail 14 and ground surface 404.
Figure 6B:
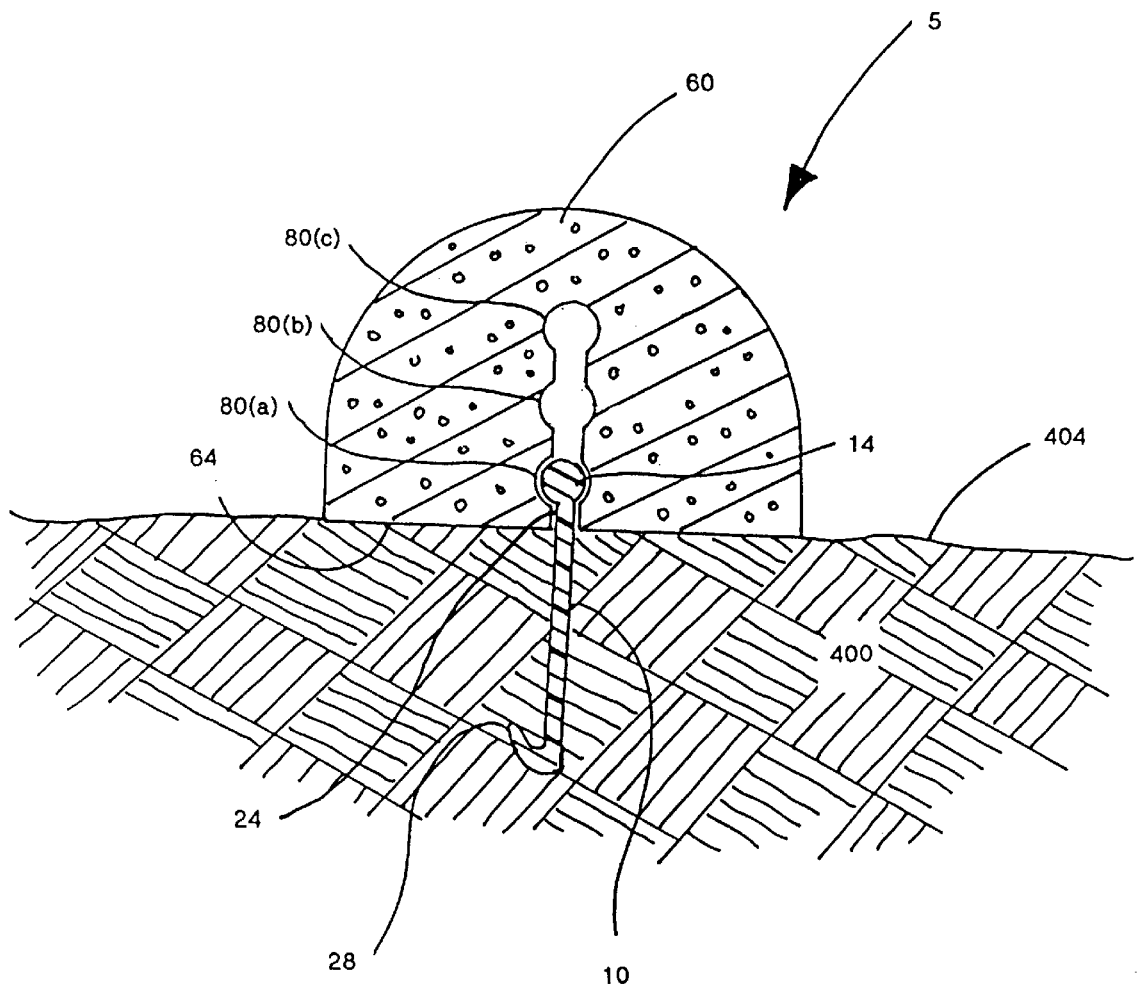

FIGS. 6(a) and 6(b) show yet another embodiment of the present invention. Landscape edging 10 has a longitudinally disposed rib or top rail 14 that is adapted to engage one of recesses 80(a), 80(b), 80(c) or 80(d), depending on the relative distance between top rail 14 and ground surface 404. In FIG. 6(a), rail 14 engages and fits most preferably in recess 80(a) owing to the large distance between top rail 14 and ground surface 404. In FIG. 6(b), rail 14 engages and fits most preferably in recess 80(c) owing to the small distance between top rail 14 and ground surface 404.

It will now become apparent to those of skill in the art from the foregoing teachings set forth herein that a virtually unlimited number of recesses 80 having different configurations, orientations, shapes and numbers, and various combinations thereof, may be disposed in block 60 and fall within the scope of the present invention.

Figure 7A:
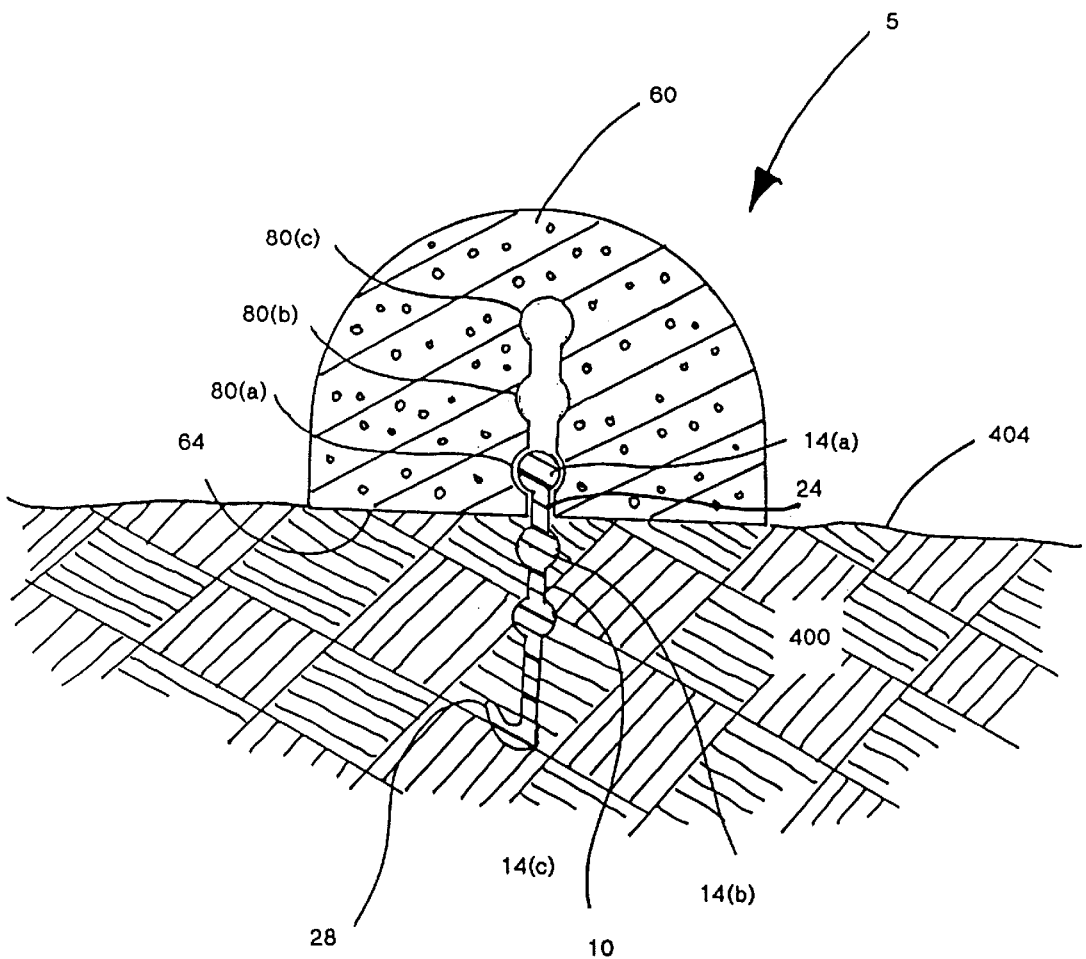
FIGS. 7(a) through 7(d) show other embodiments of the present invention, where landscape edging member 10 has a plurality of top rails 14 disposed thereon for engaging or fitting within one or more recesses 80 in block 60.
Figure 7B:
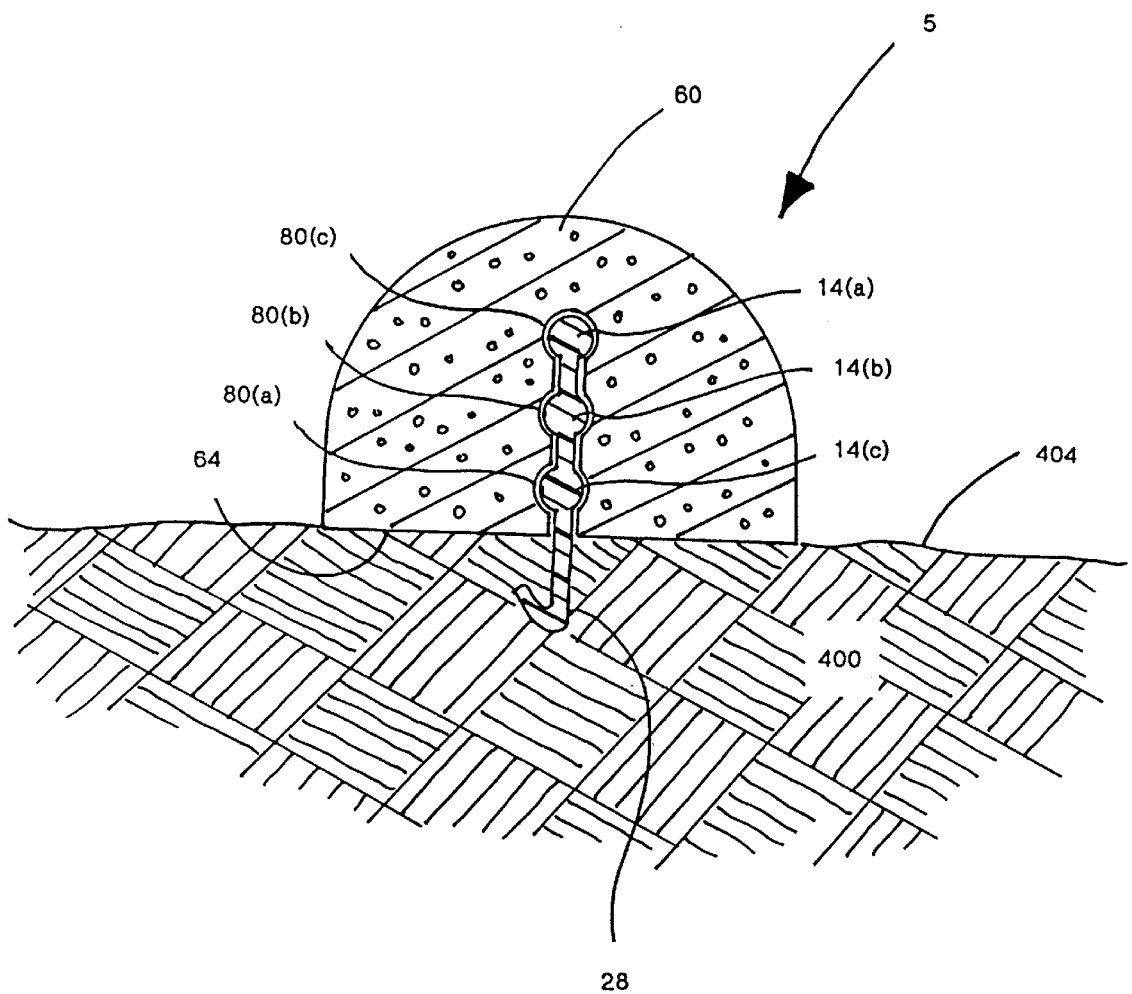

FIGS. 7(a) and 7(b) show another variant of the present invention, where landscape edging member 10 has a plurality of top rails 14 disposed thereon for engaging or fitting within one or more recesses 80 in block 60. In FIGS. 7(a) and 7(b), top rails 14(a), 14(b) and 14(c) most preferably form flexible or malleable ribs that are longitudinally disposed along upper portion 24 of barrier 20. Top rails 14(a), 14(b) and 14(c) are configured to fit within at least one of recesses 80(a), 80(b) and 80(c) according to the distance between top rail 14(a) and ground surface 404.

In FIG. 7(a), rail 14(a) most preferably engages and fits in recess 80(a) owing to the small distance between top rail 14(a) and ground surface 404; rails 14(b) and 14(c) fit within no recesses owing to the small distance. In FIG. 7(b), rail 14(a) engages and fits most preferably in recess 80(c) owing to the large distance between top rail 14(a) and ground surface 404; top rails 14(b) and 14(c) most preferably fit within and engage recesses 80(b) and 80(a), respectively. Rails 14(a) through 14(c) also preferably bias or grip block 60 downwardly or in proximity to ground surface 404 through the combined action of the downwardly angled ribs of top rails 14(a), 14(b) and 14(c) and corresponding recesses 80(a), 80(b) and 80(c).

Figure 7C:
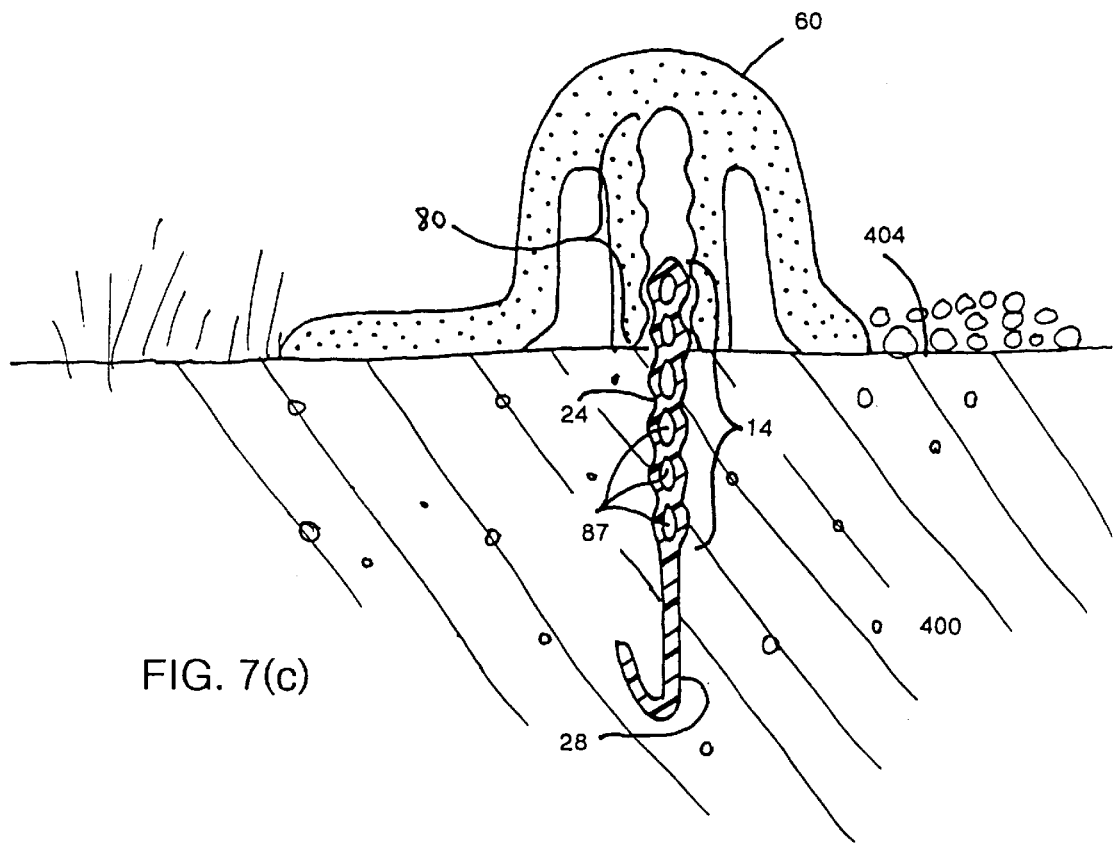
Figure 7D:
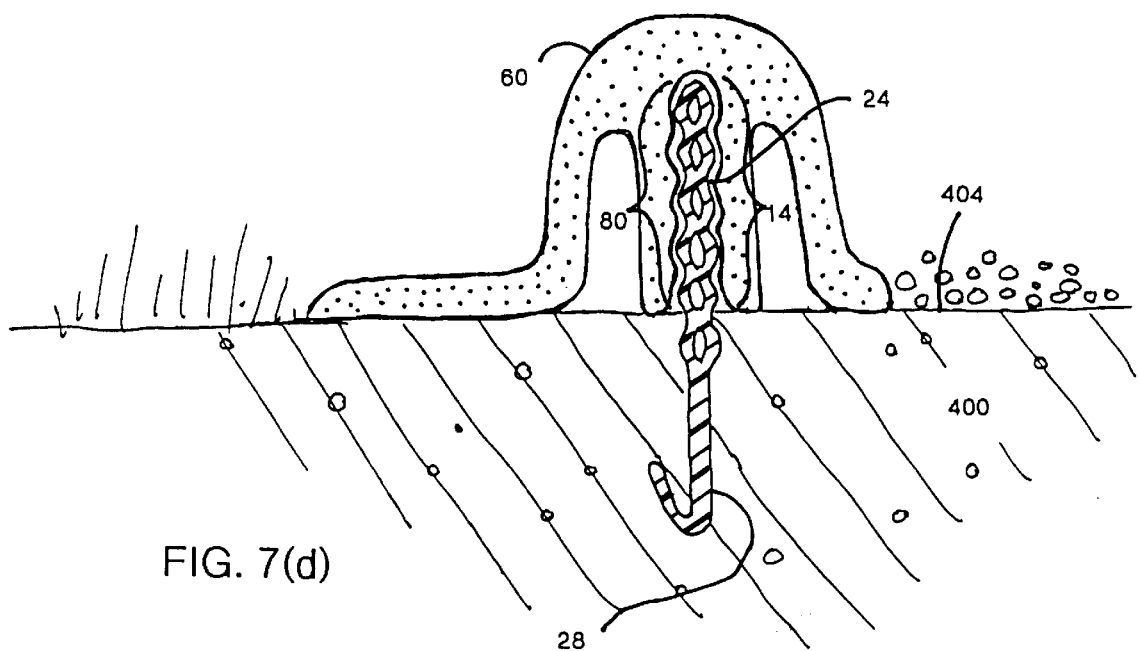

FIGS. 7(c) and 7(d) show yet another variant of the invention of FIGS. 7(a) and 7(b), where landscape edging member 10 has a plurality of top rails 14 disposed thereon for engaging or fitting within one or more recesses 80 in block 60. In FIGS. 7(c) and 7(d), the plurality of top rails 14 most preferably form flexible or malleable ribs that are longitudinally disposed along upper portion 24 of barrier 20. The plurality of top rails 14 are configured to fit within at least one of the plurality of recesses 80 according to the distance between top rails 14 and ground surface 404. Optional collapsible cores 87 permit top rail 14 to more snugly engage recess 80 through a frictional fit therewithin.

Figure 8:
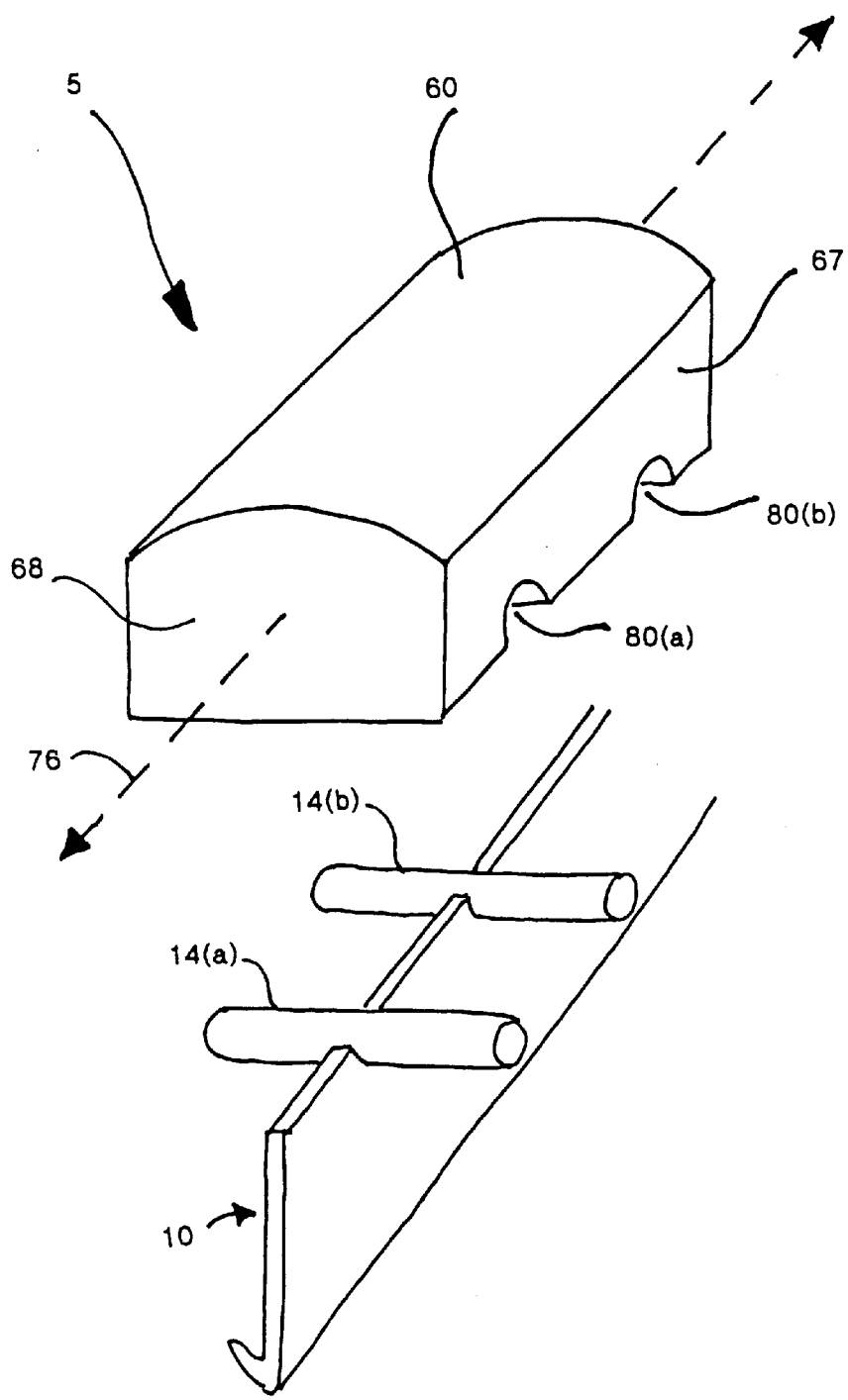
FIG. 8 shows another embodiment of the present invention, where recesses 80(a) and 80(b) in block 60 are oriented substantially perpendicular to imaginary axis 76 and receive therein corresponding top rails 14(a) and 14(b), also oriented substantially perpendicular to imaginary axis 76.

Another embodiment of the present invention includes that shown in FIG. 8, where recesses 80(a) and 80(b) in block 60 are oriented substantially perpendicular to imaginary axis 76 and receive therein corresponding top rails 14(a) and 14(b), also oriented substantially perpendicular to imaginary axis 76. Thus, recesses 80(a) and 80(b) and corresponding top rails 14(a) and 14(b) of the present invention may be oriented along any azimuth or direction, and are not limited to embodiments where recesses 80 and top rails 14 are disposed longitudinally or substantially parallel to imaginary axis 76.

FIGS. 9(a) through 9(l) show several additional embodiments of block 60 of the present invention, where blocks 60 have at least one additional recess 81 disposed therein, or an enlarged recess 80 disposed therein, for lightening and reducing the amount of material required to form blocks 60, for permitting landscape edging member 10 to bend more readily when imaginary axes 76 of blocks 60 are rotated respecting one another, or for accepting sprinkler fittings, sprinklers, plumbing means, electrical power cords or light emitting means therein.

Figure 9D:
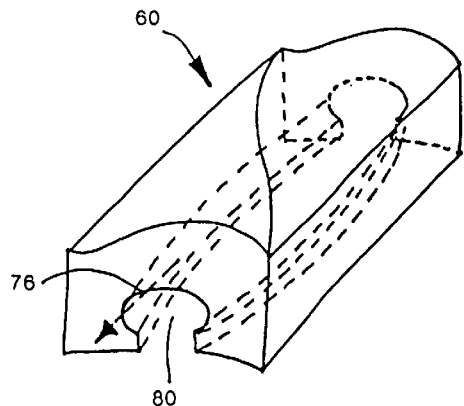
Figure 9E:
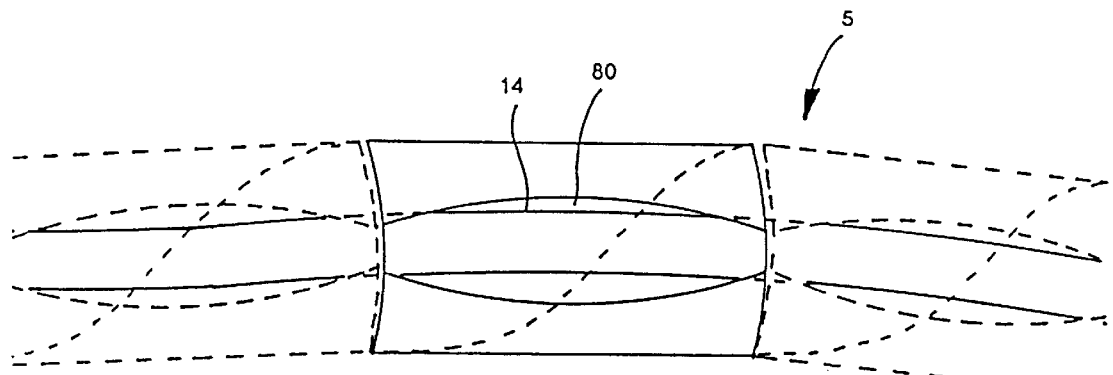
Figure 9F:
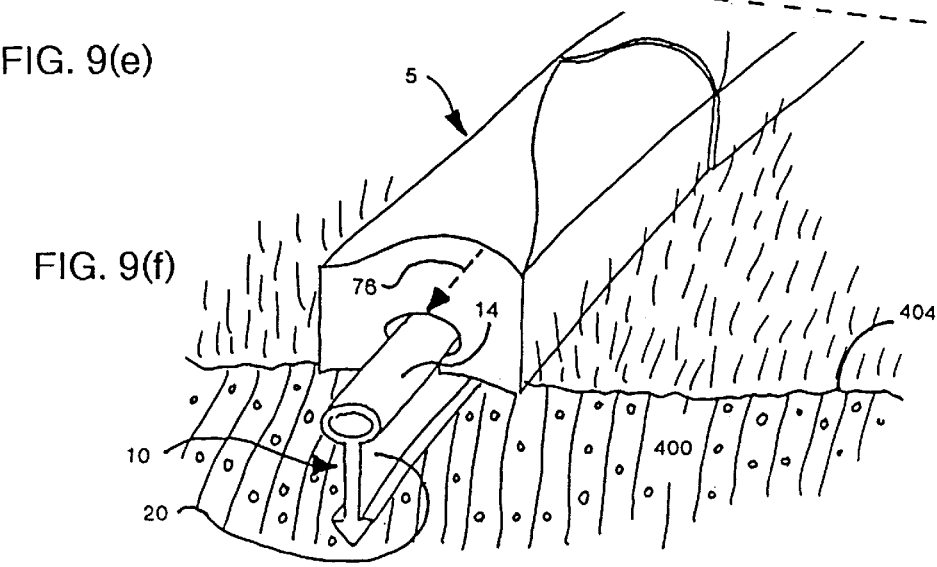
Figure 9G:
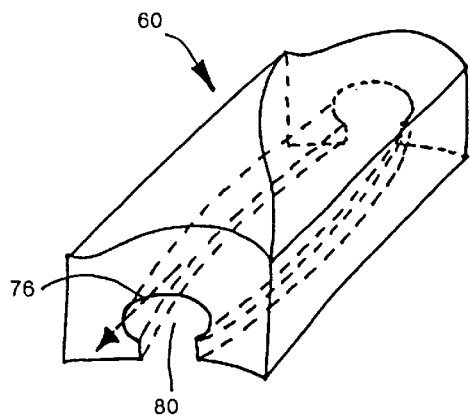
Figure 9H:
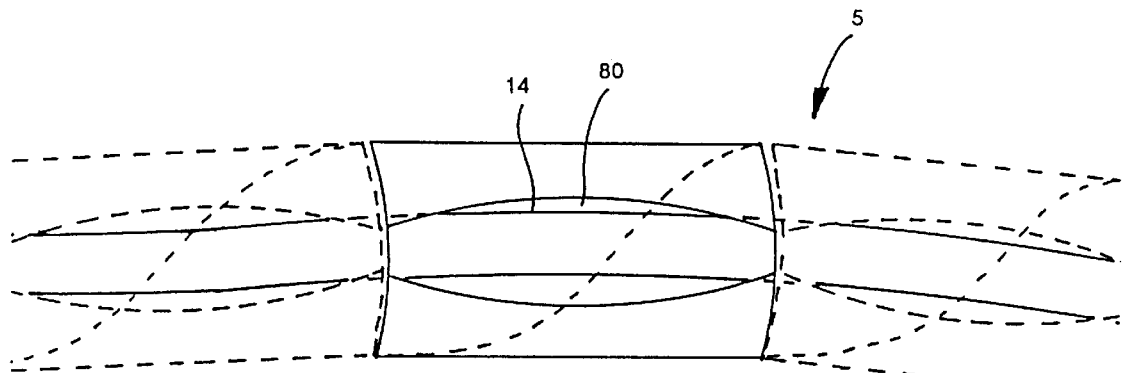
Figure 9I:
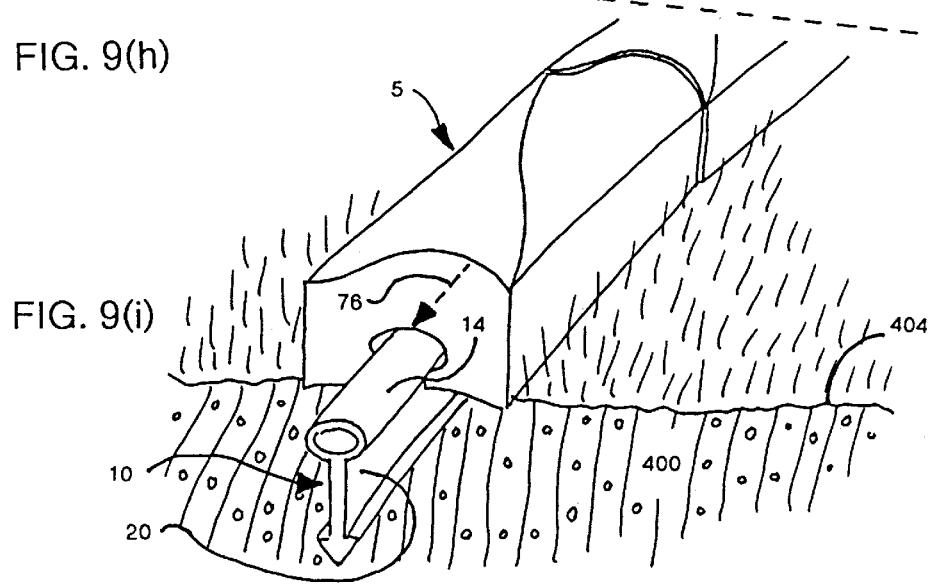

Blocks 60 shown in FIGS. 9(a) through 9(c) need not form a flat, substantially smooth surface for engaging ground surface 404. Instead, the various bottom surfaces 64 shown in FIGS. 9(a) through 9(c) provide vertical support for blocks 60 on ground surface 404 using legs 65 and 66, while recesses 80 extend downwardly from bodies 61 of blocks 60 for suitable engagement with top rails 14. The blocks shown in FIGS. 9(a) through 9(l) may provide landscape blocks of lighter weight. Additionally, those blocks generally require less material for their manufacture than do the blocks of FIGS. 1 through 8. Other methods and configurations for coring out block 60 to reduce weight and the amount of material required for its formation will now become apparent to those of skill in the art, such as those where bottom surface 65 is flat or substantially flat, but block 60 is nevertheless cored.

As shown in FIGS. 9(d) through 9(j), blocks 60 may be formed according to a number of alternative configurations or shapes to provide enlarged or specially shaped recesses 80 that permit edging member 10 to bend more readily when imaginary axes 76 of adjoining blocks 60 rotate respecting one another.

As shown in FIGS. 9(k) and 9(l), blocks 60 may be formed according to a number of alternative configurations or shapes to provide recesses 80 for accepting sprinkler fittings or sprinklers 105, plumbing means 103, electrical power cords 101 or light emitting means 173.

Blocks 60 of the present invention may be formed of any of a number of materials, including, but not limited to, ceramic, fired clay, glass, recycled glass, glass, stone, rock, cement, concrete, mortar, various suitable conglomerate materials, untreated wood, treated wood (including so-called brown and green treated wood), virgin plastic, recycled plastic, polyurethane, polyethylene, TREX® (a composite material sold by Mobil Corporation® for use in decking boards and the like), fiberglass, various composite or artificial materials such as low-to-medium density polyethylene combined with sawdust or the like, or fiberglass combined with sawdust or the like. Those of ordinary skill in the art will now appreciate that other materials than recited specifically herein find application in, and fall within the scope of, the present invention.

Interlocking or adjoining blocks of the type that may be adapted rather easily for particularly efficacious application in the present invention include, but are not limited to, those disclosed in U.S. Pat. No. 3,762,113 to O'Mullan et al.; U.S. Pat. No. 4,695,502 to Rush; U.S. Pat. No. 5,078,940 to Sayles; U.S. Pat. No. 5,080,523 to Steiner; U.S. Pat. No. 5,117,583 to Reum; U.S. Pat. No. 5,119,587 to Waltz; U.S. Pat. No. 5,133,163 to Christensen et al.; U.S. Pat. No. 5,217,630 to Sayles; U.S. Pat. No. 5,233,806 to Hightower et al.; U.S. Pat. No. 5,375,369 to VerHoeve; U.S. Pat. No. 5,414,956 to Kheradpir; U.S. Pat. No. 5,535,568 to Quinn; U.S. Pat. No. 5,564,240 to Dean, Jr. and Des. U.S. Pat. No. 335,429 to Scott, Jr. et al. Adjoining blocks 60 may interconnect by having adjoining surfaces that: (a) overlappingly engage one another; (b) laterally or horizontally engage one another; (c) both laterally and overlappingly engage one another; (d) vertically engage one another only, and do not overlap either overlappingly or laterally, and (e) otherwise engage, abut or rest propinquant to one another.

For example, as shown in FIG. 10(a), each block 60 may have relatively short length 77, correspondingly shaped vertical surfaces 68(a) and 68(b) and correspondingly shaped horizontal surfaces 72(a) and 72(b) for matingly or overlappingly engaging adjoining blocks 60. Short length 77 permits joints between adjoining blocks 60 to be less obvious than they would otherwise appear in the presence of rapid or large changes in the slope of ground 404.

Figure 10C:
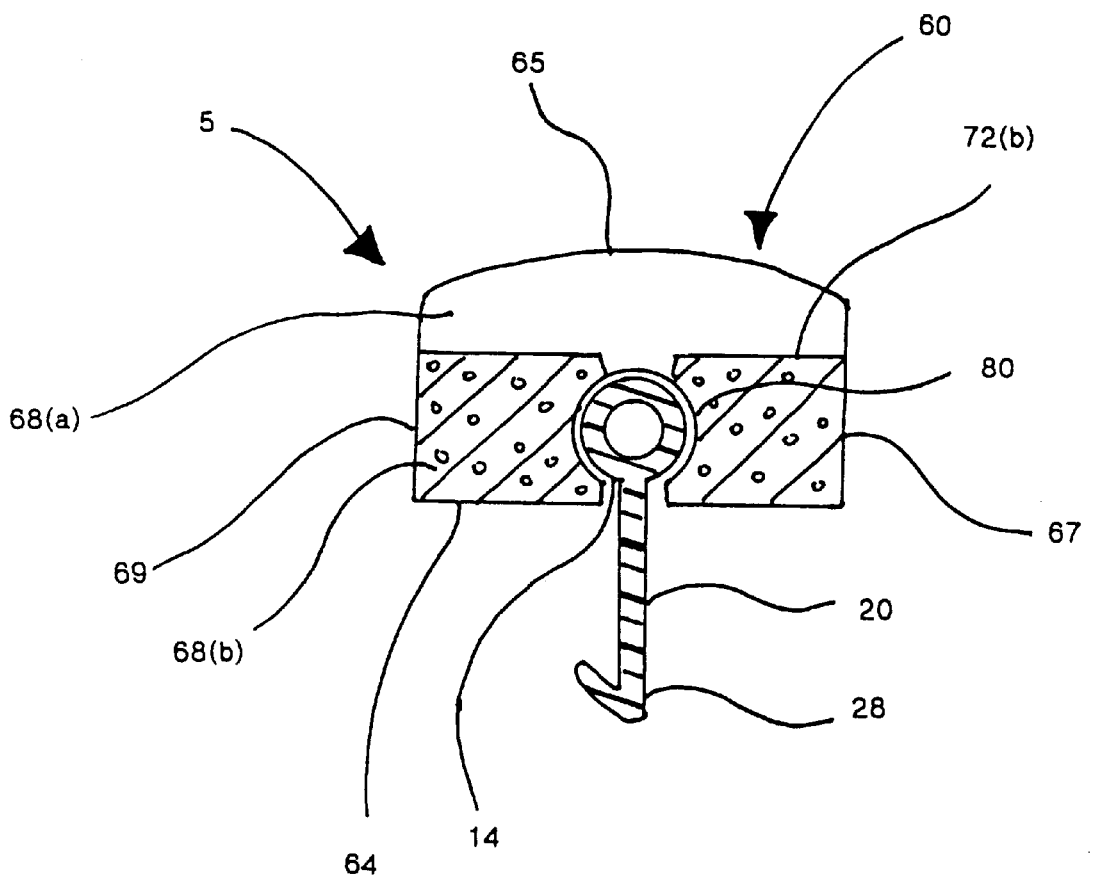
FIGS. 10(a) through 10(xxx) show various embodiments of block 60 of the present invention, including those suitable for use in herb or flower block system, trenchless landscape edging system, and soil containment or erosion control system embodiments of the present invention.
Figure 10D:
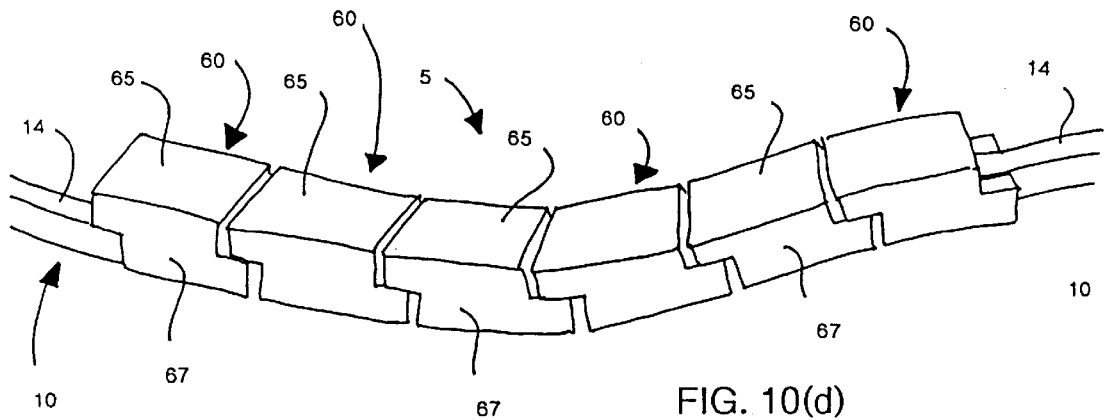
Figure 10E:
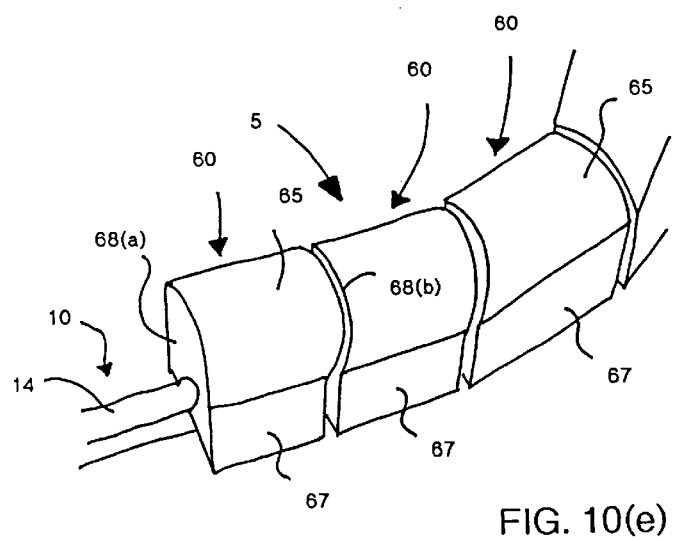
Figure 10F:
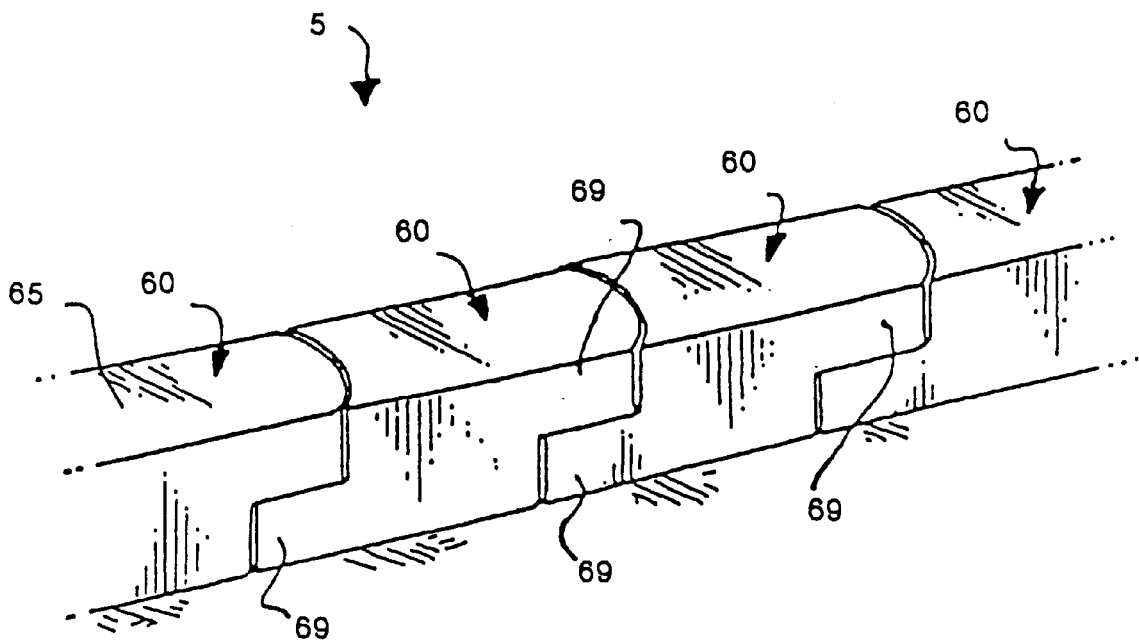
Figure 10G:
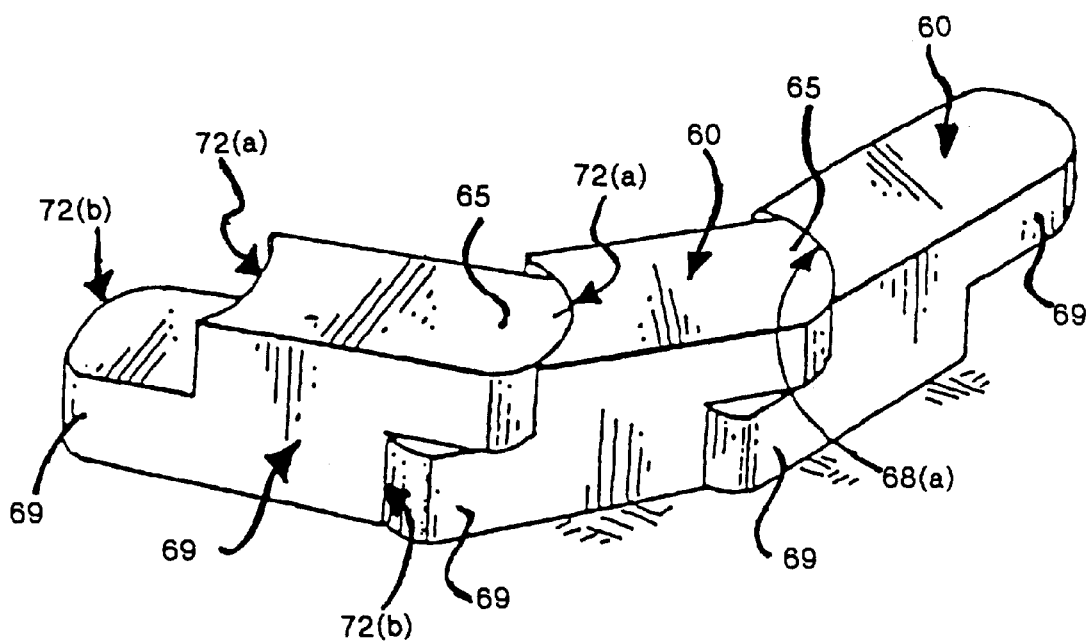
Figure 10H:
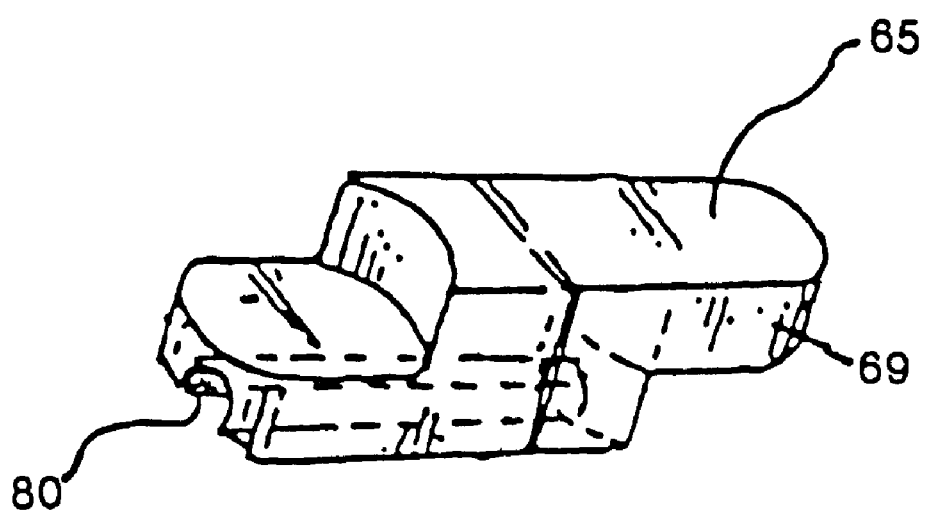
Figure 10I:
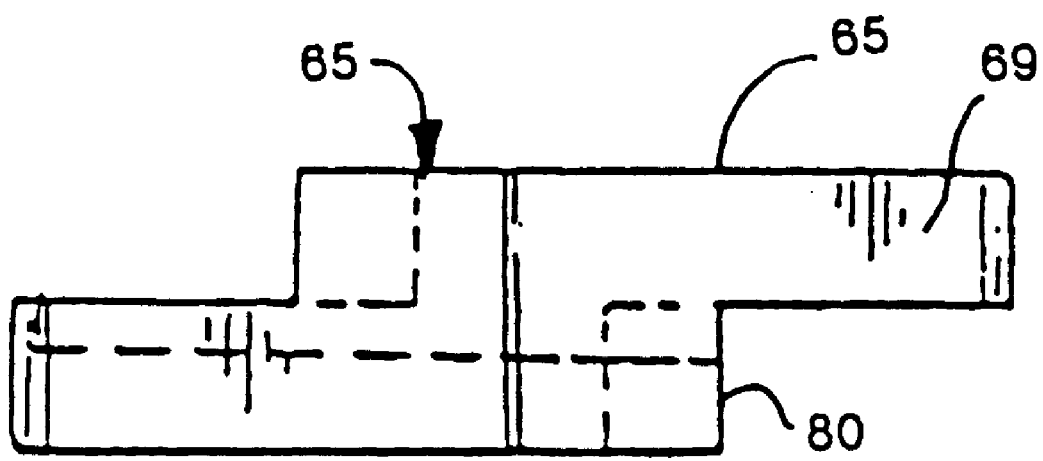
Figure 10J:
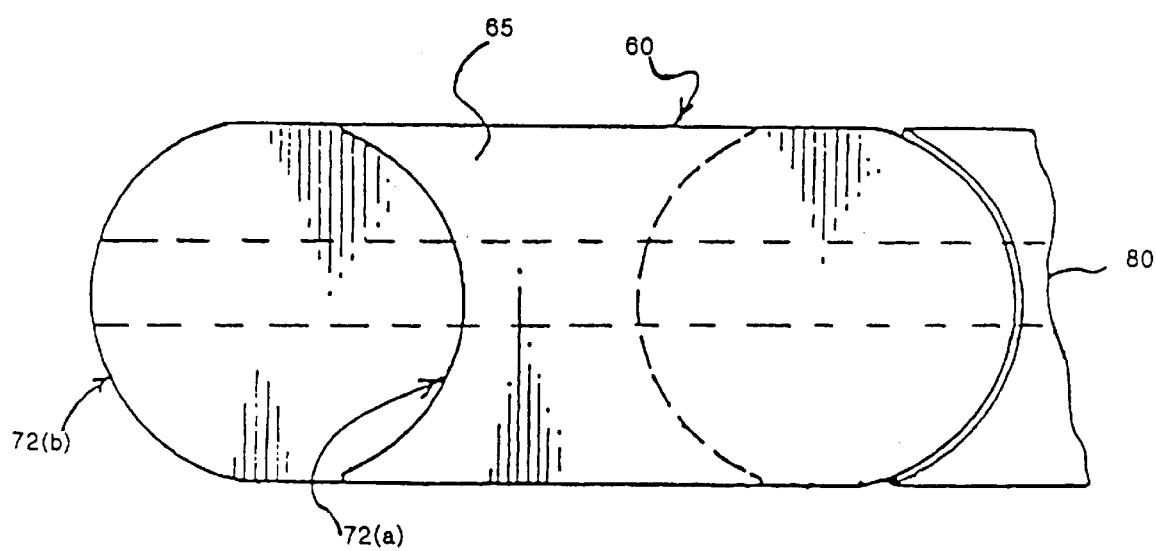
Figure 10K:
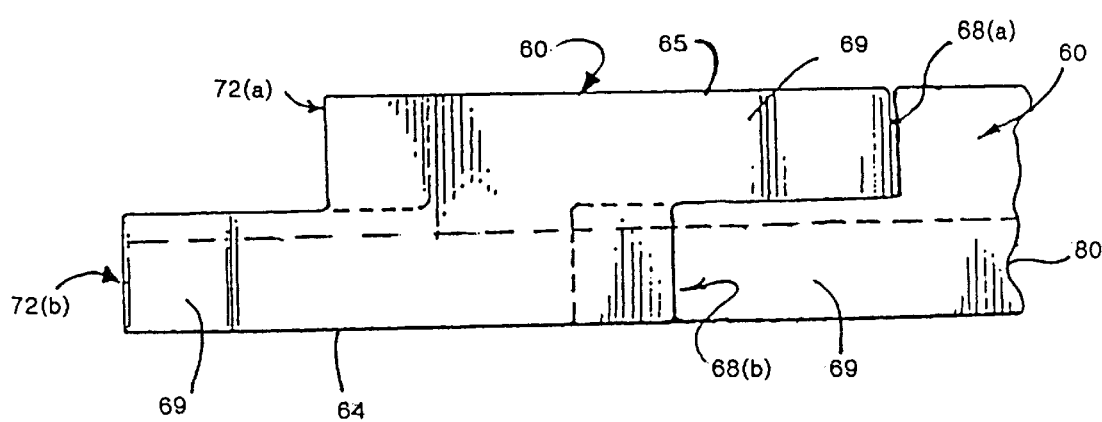
Figure 10I:
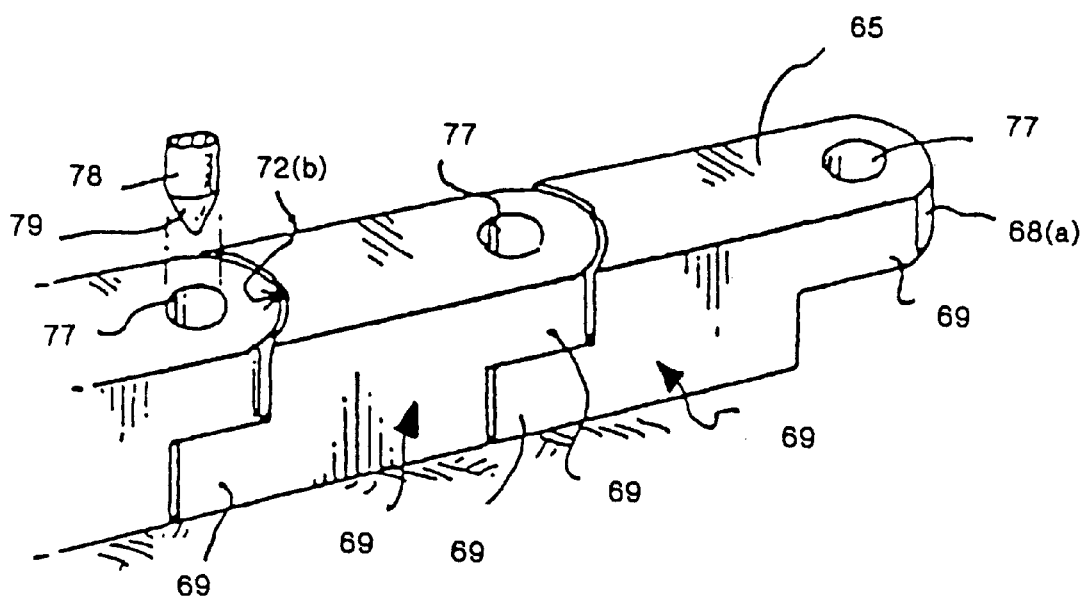
Figure 10M:
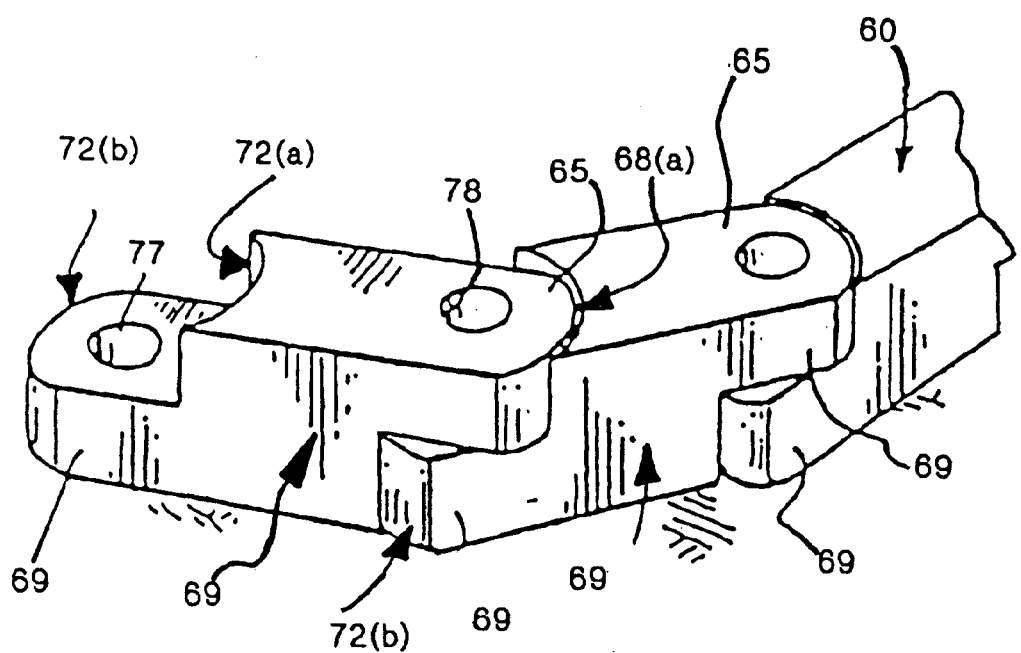
Figure 10N:
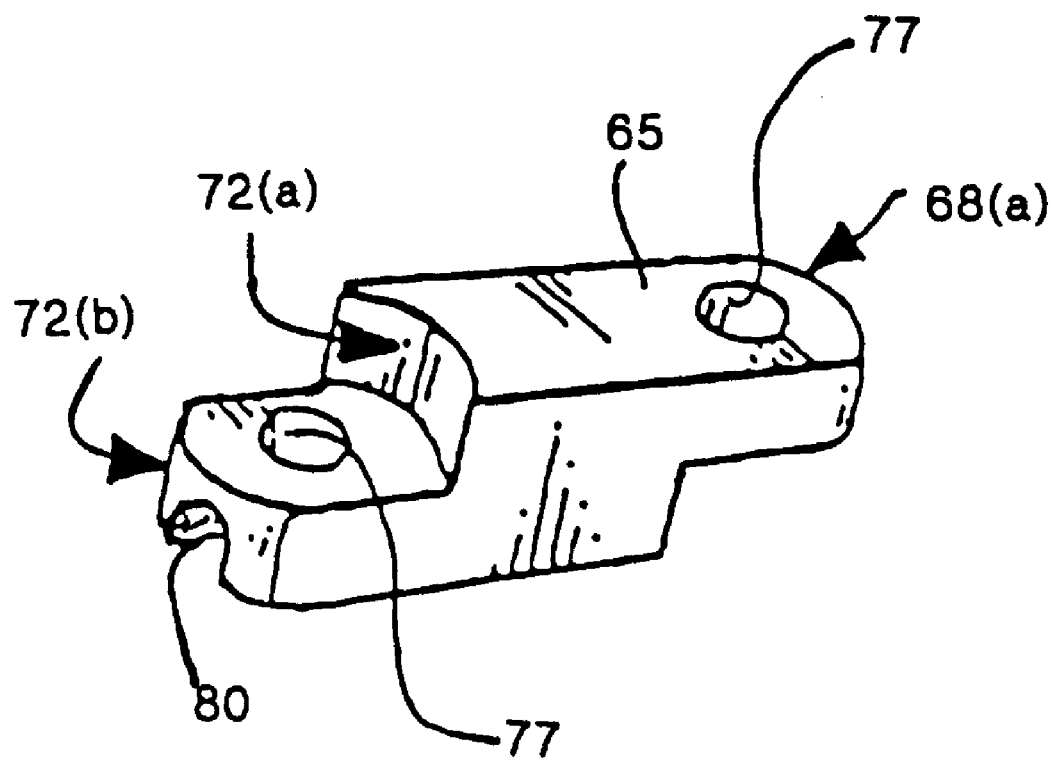
Figure 10O:
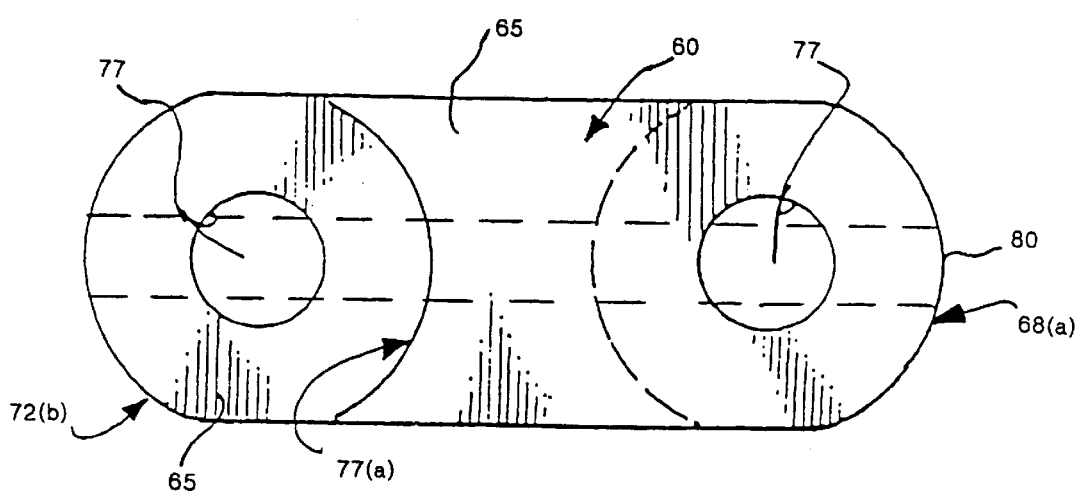
Figure 10P:
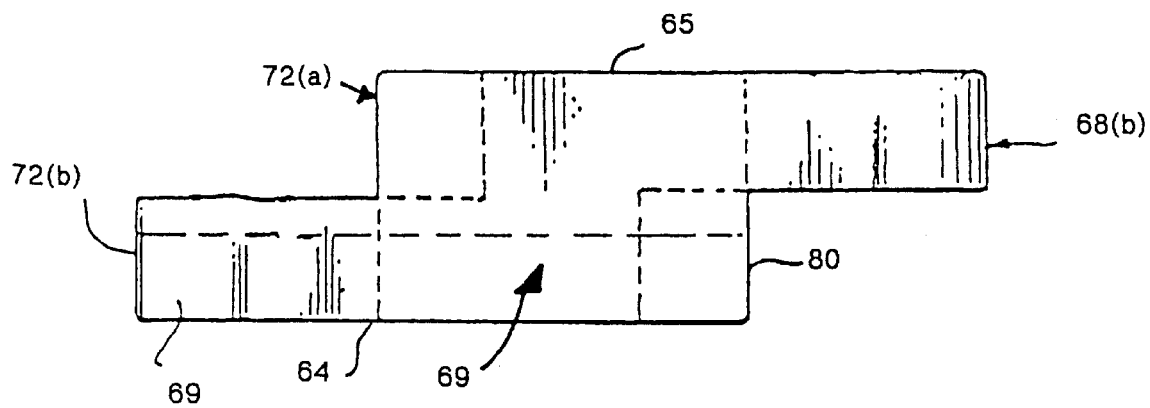
Figure 10Q:
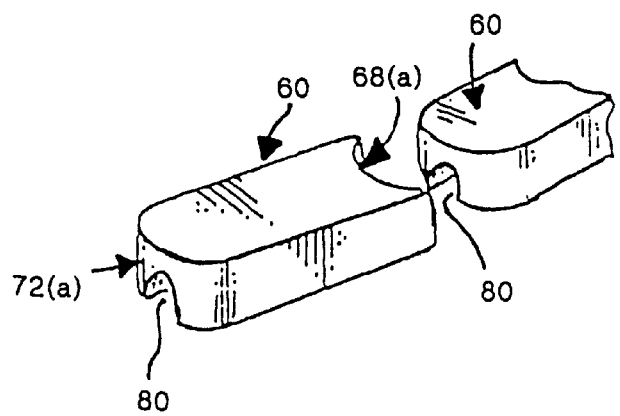
Figure 10S:
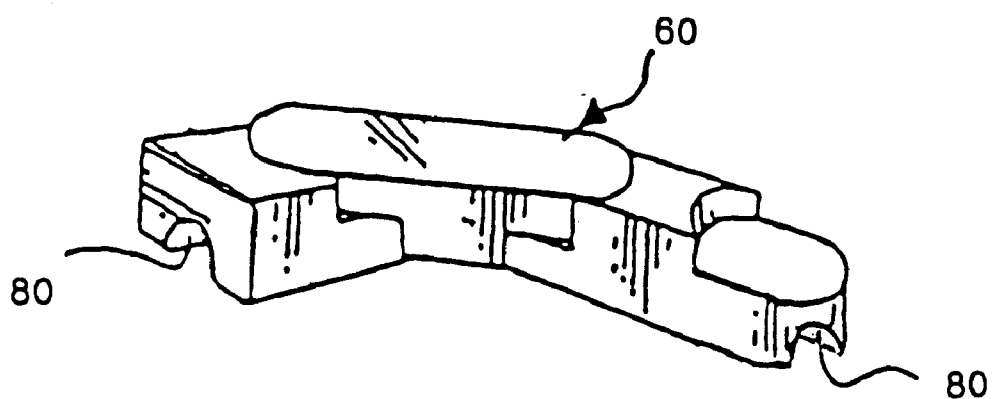
Figure 10T:
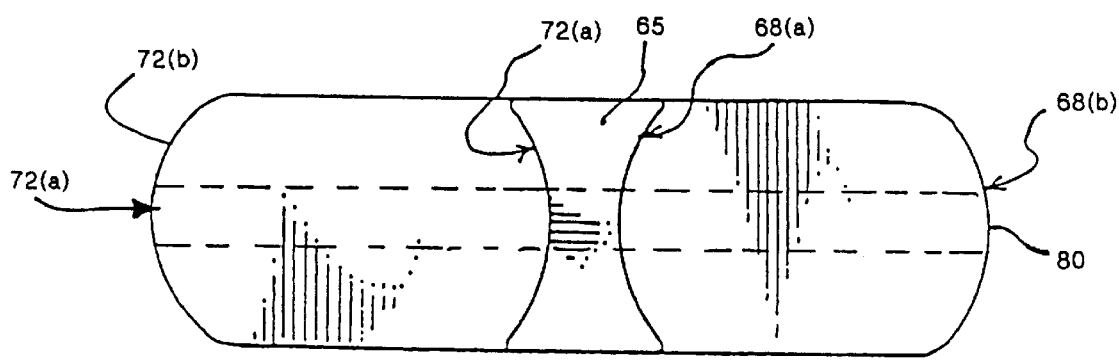
Figure 10U:
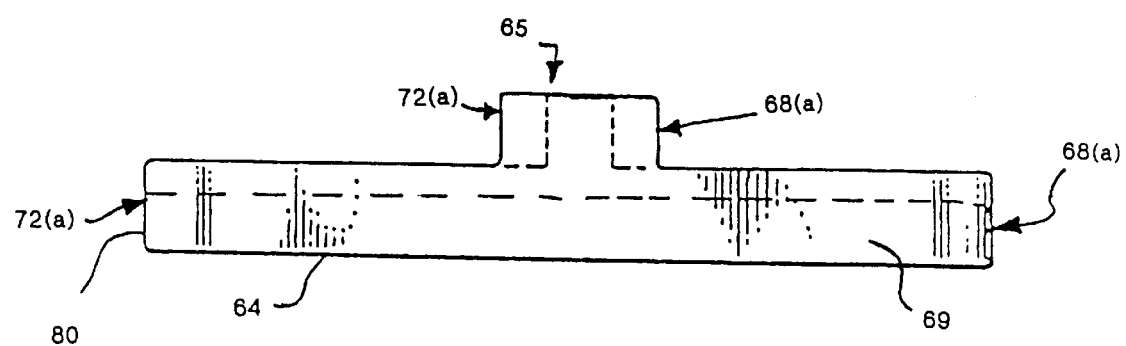
Figure 10V:
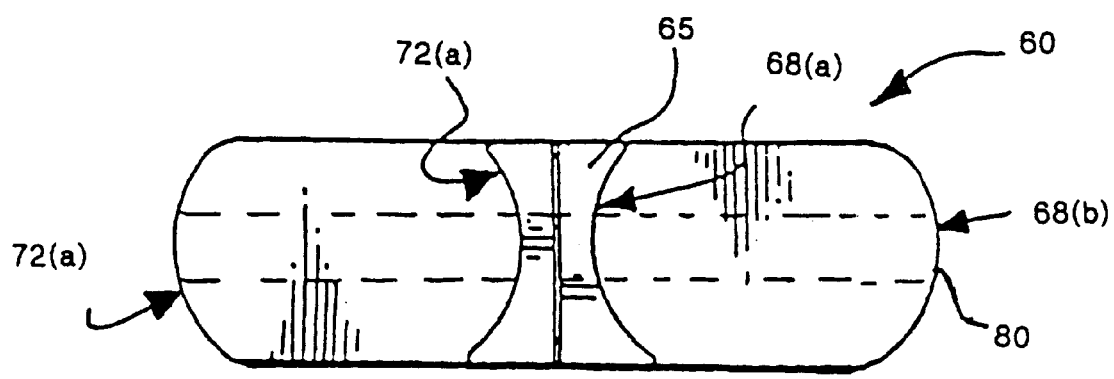
Figure 10W:
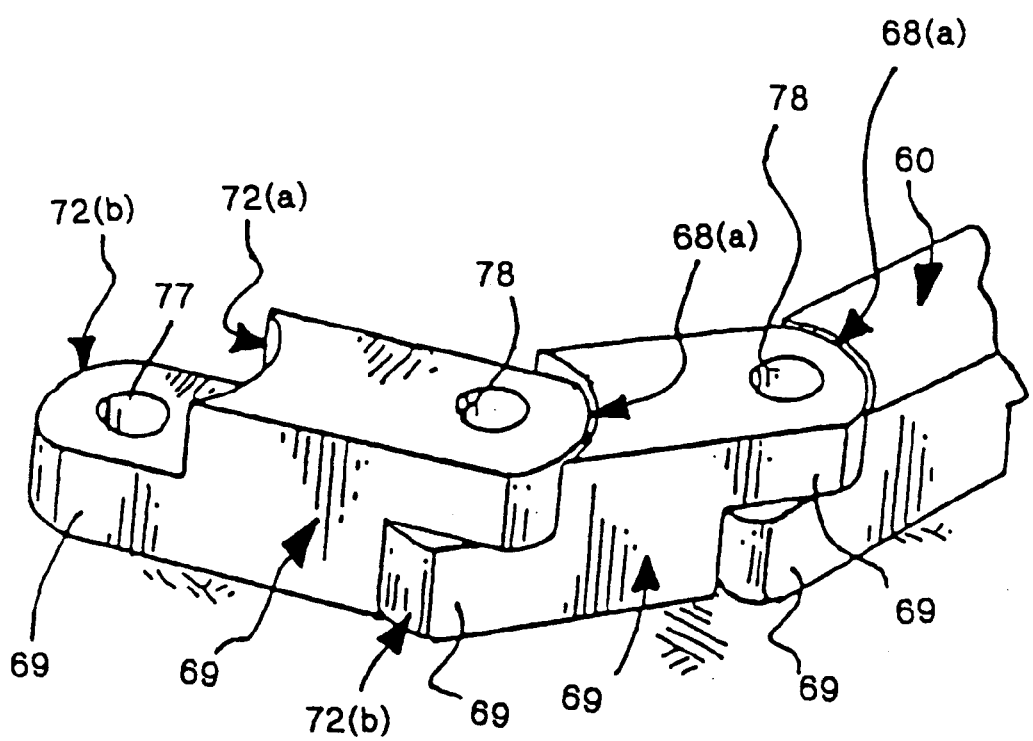

FIG. 10(b) shows compound lap joints in blocks 60 of the present invention, where adjoining vertical surfaces 68(a) and 68(b) are convex and concave, respectively, and horizontal surfaces 72(a) and 72(b) overlap one another. Like blocks 60 in FIG. 10(a), relatively large variations in elevation in ground surface 404 do not cause large or unsightly joints or cracks to appear between adjoining blocks 60 in FIG. 10(b). FIG. 10(c) shows a cross-sectional view of block 60 of FIG. 10(b). FIGS. 10(d), 10(e), 10(f) through 10(k), 10(r) through 10(v) and 10(x) show further embodiments of block 60 of the present invention, where adjoining blocks 60 overlap or otherwise engage one another.

Figure 10X:
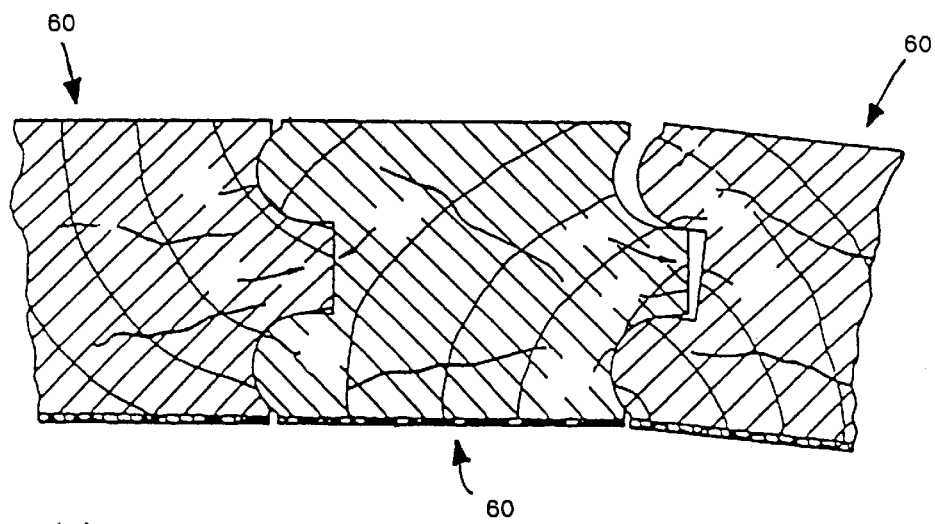
Figure 10Y:
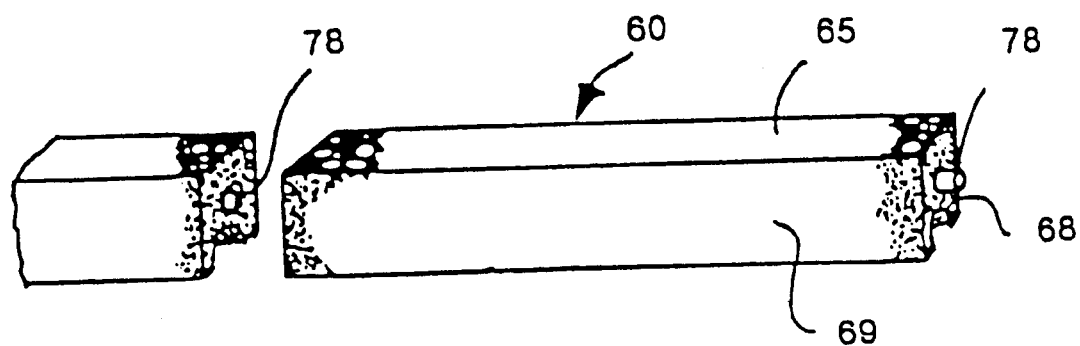

Alternatively, adjoining blocks 60 may have not only complementary shapes for engaging one another, but other structural features for positively securing one block to the next. For example, blocks 60 may have corresponding holes 77 and vertically-oriented pins 78 having optional tips 79 for engaging one another as shown in FIGS. 10(l) through 10(q) and 10(w). Blocks 60 may have horizontally-oriented pins 78, as shown in FIG. 10(x). In other embodiments of the present invention, blocks 60 interconnect by bolt and nut means or by screw means.

Another means of interconnecting blocks 60 of the present invention is by corresponding slot and tab means. In preferred embodiments of the present invention, adjoining or interconnecting blocks 60 may rotate at least slightly in respect of one another, thereby permitting blocks 60 to form a curved or winding border or barrier.

Figure 10Z:
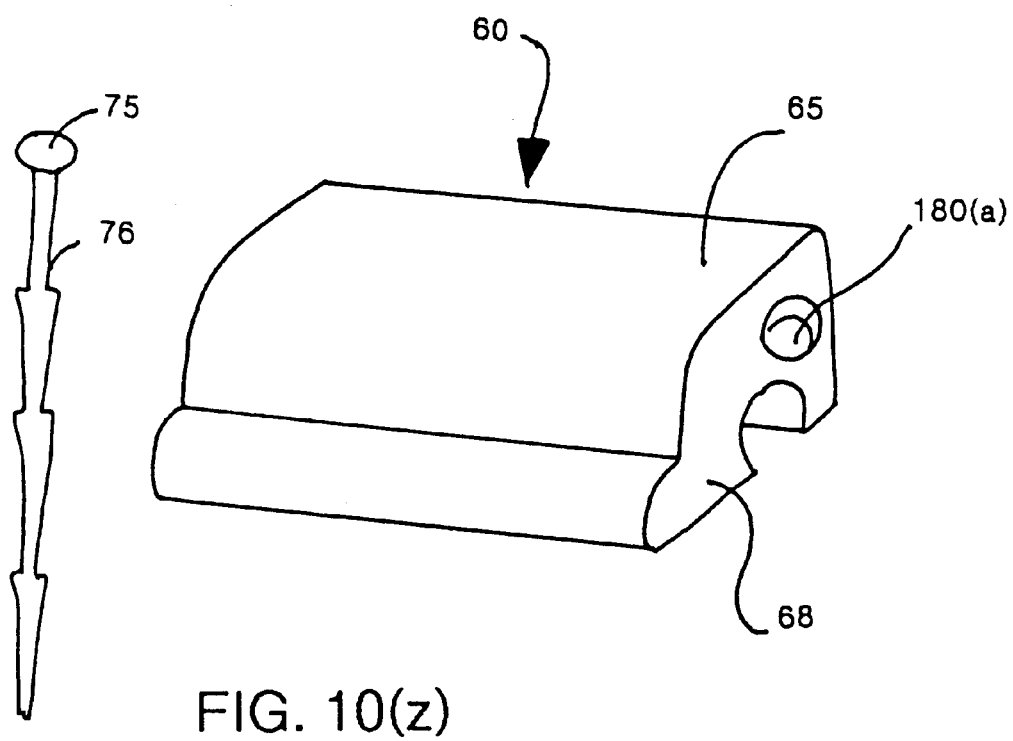
Figure 10:
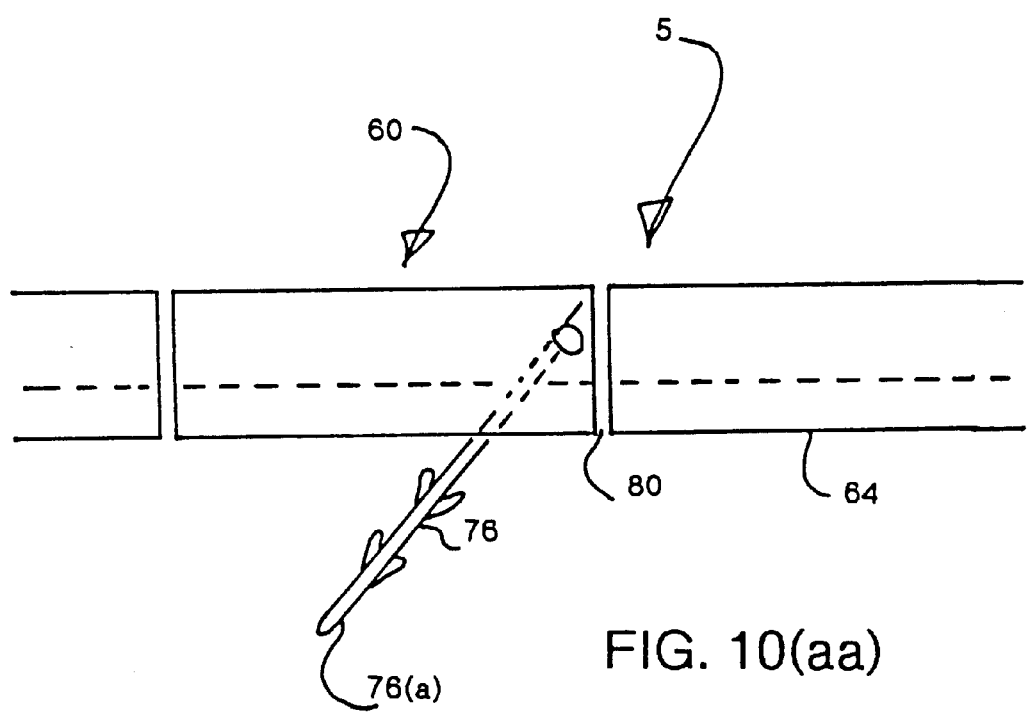
Figure 10:
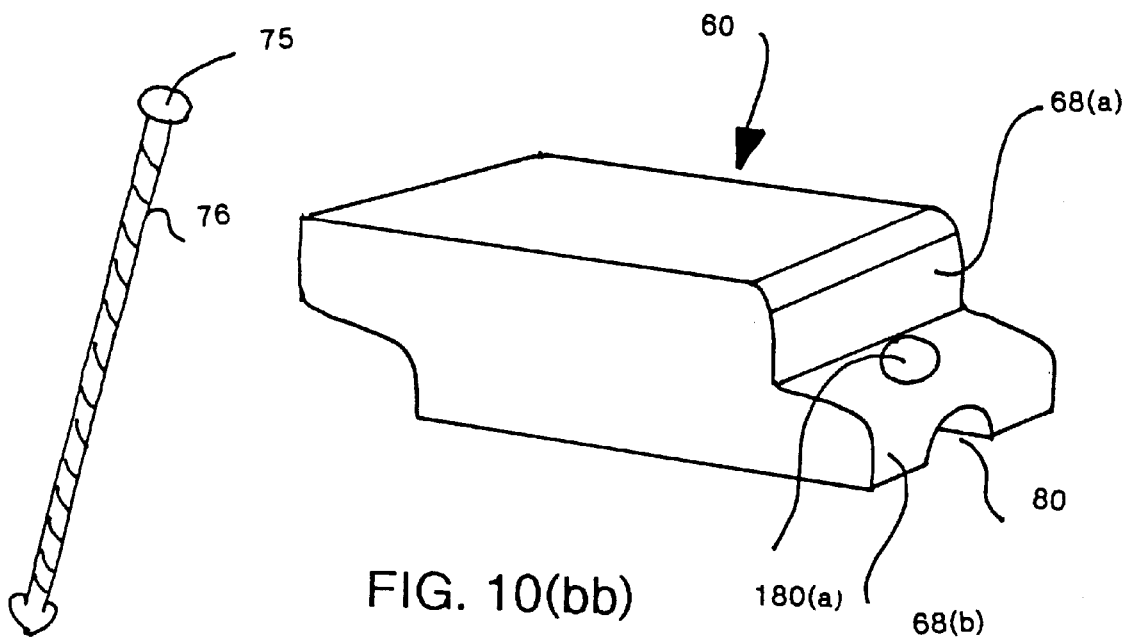
Figure 10:
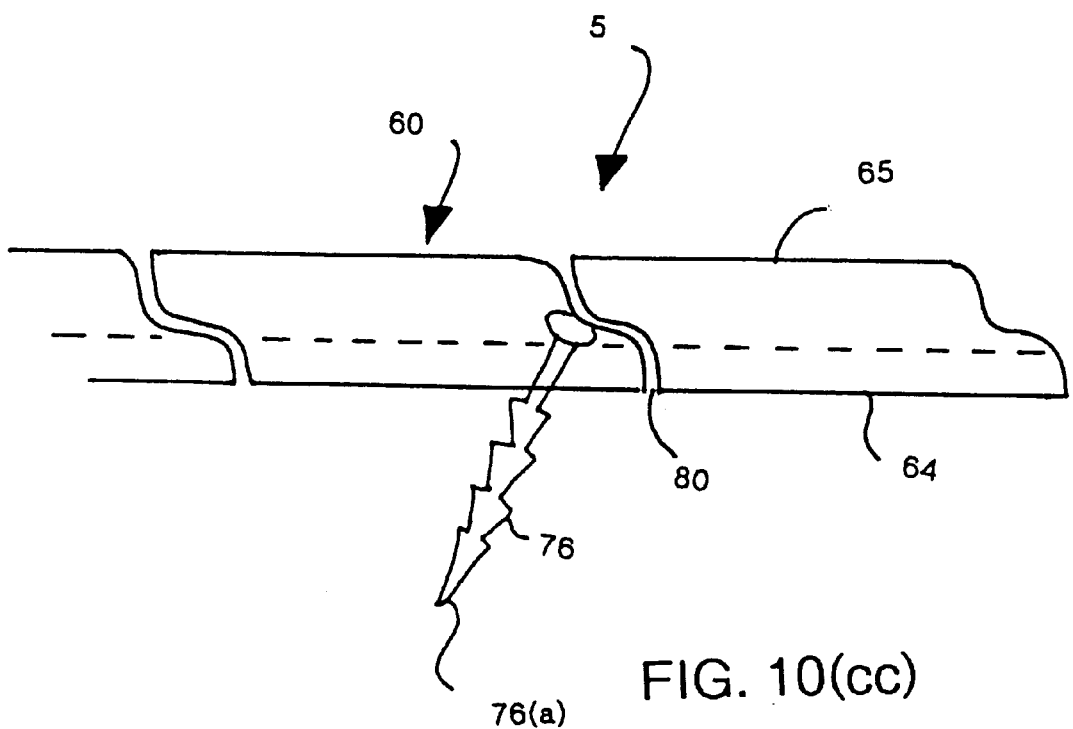
Figure 10:
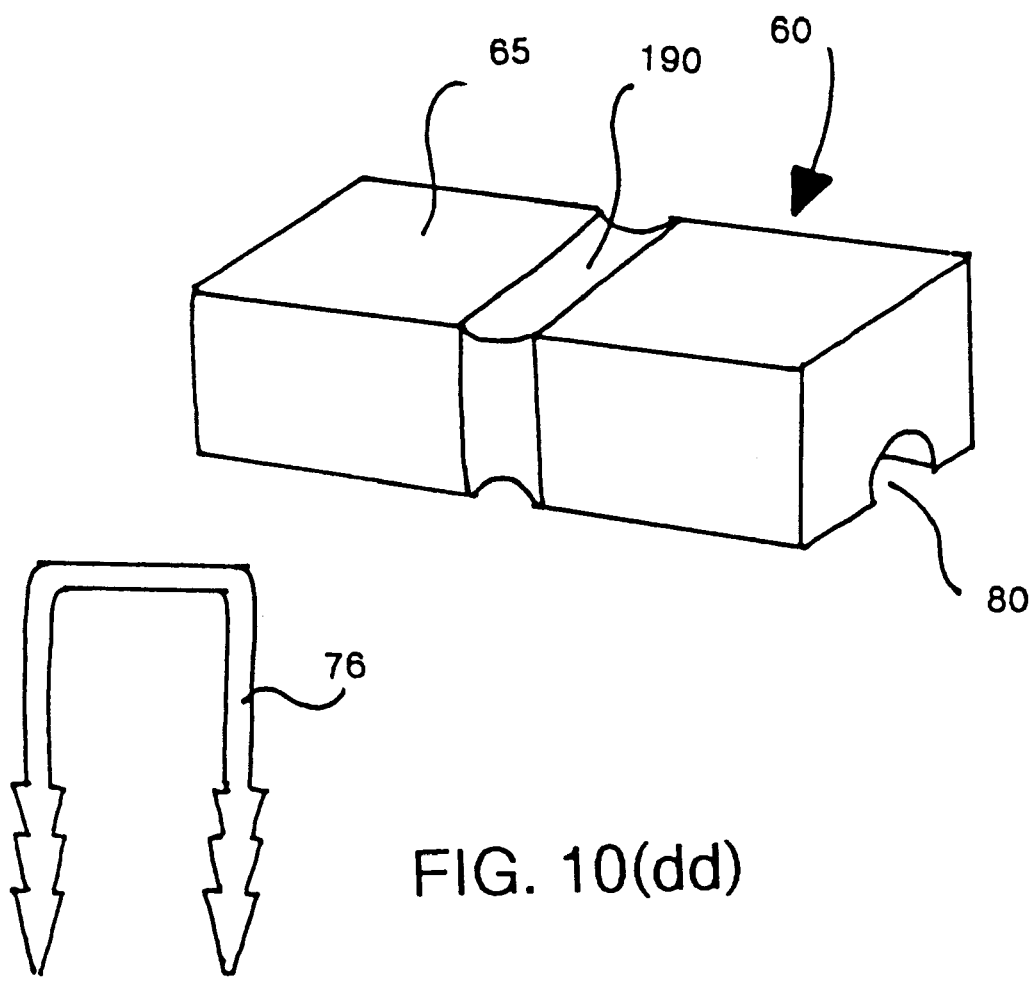
Figure 10:
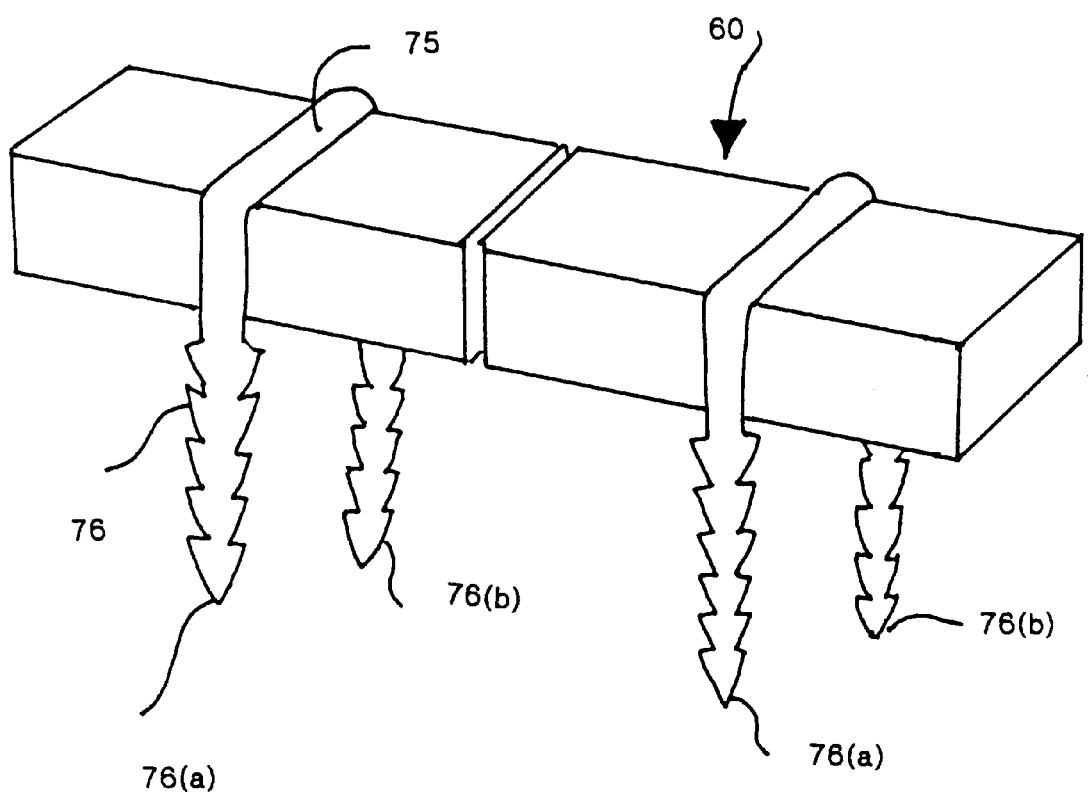
Figure 10:
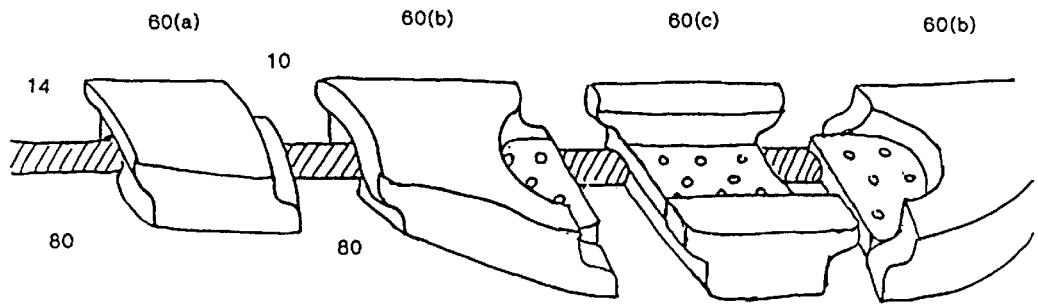
Figure 10:
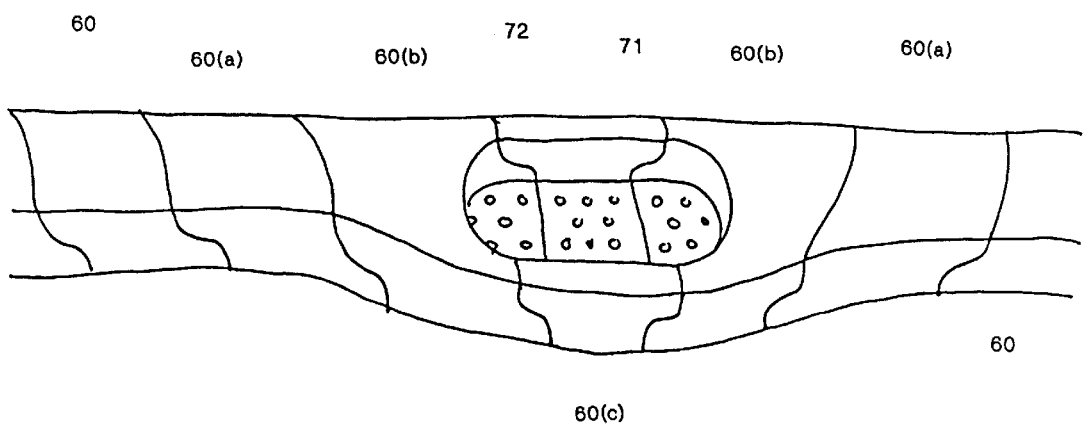
Figure 10:
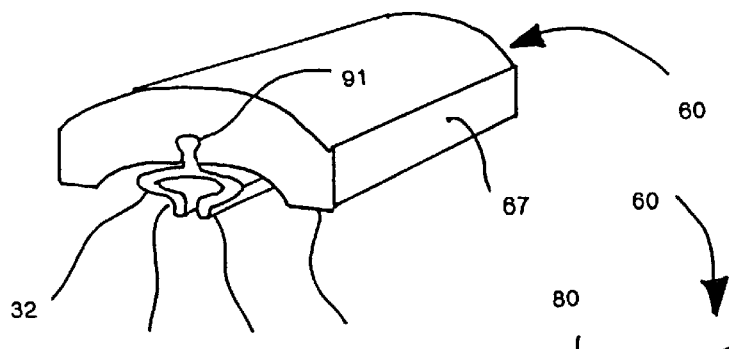
Figure 10:
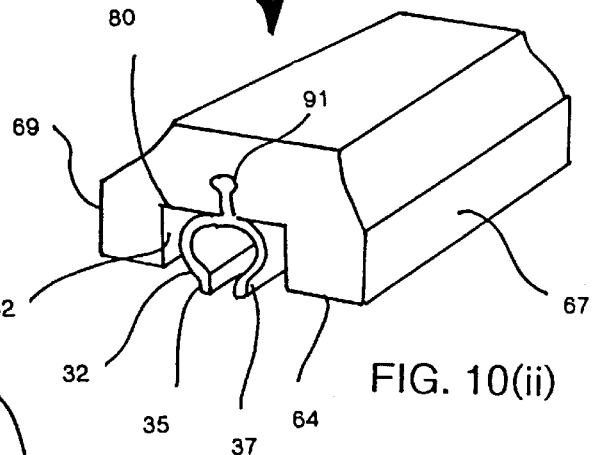
Figure 10:
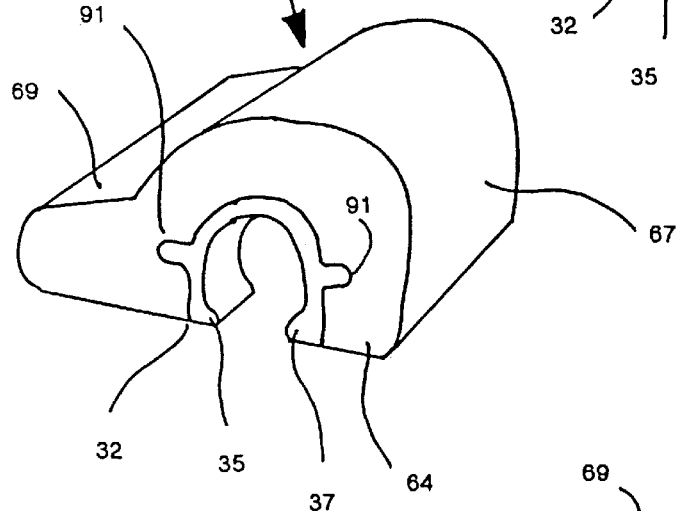
Figure 10:
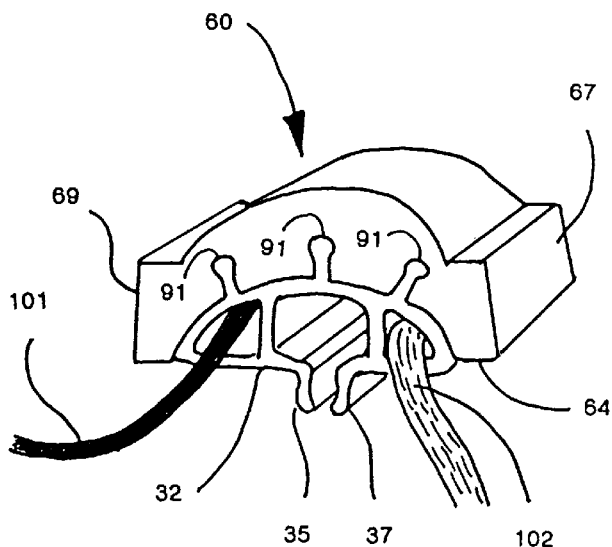
Figure 10:
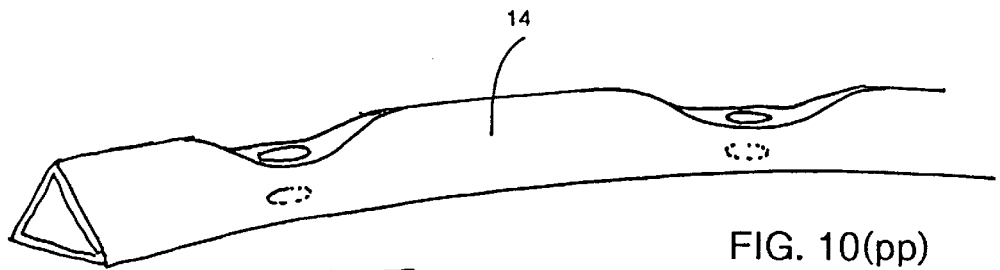
Figure 10:
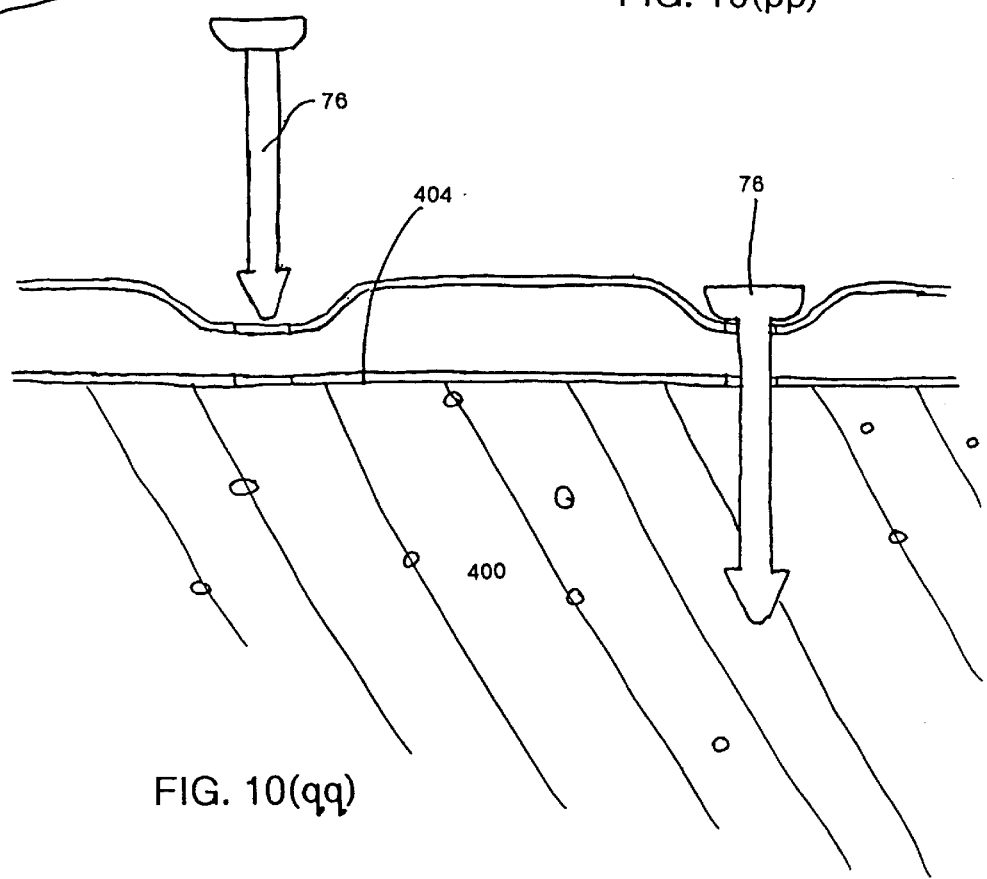
Figure 10:
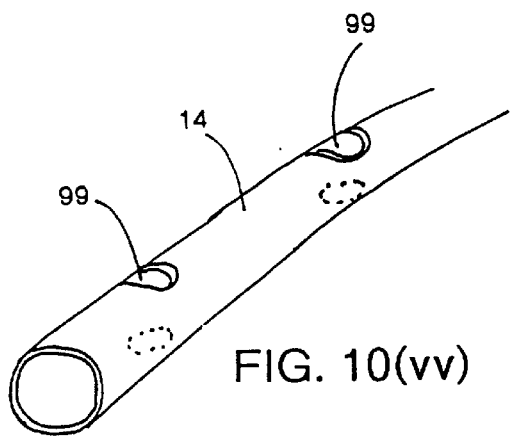
Figure 10:
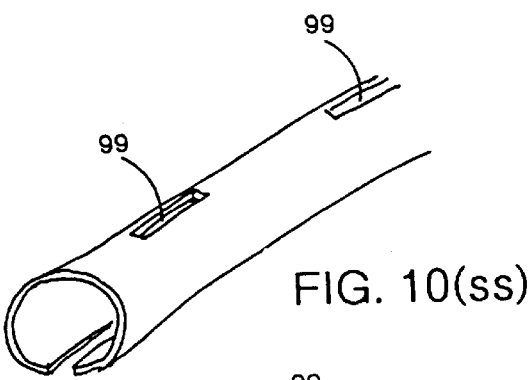
Figure 10:
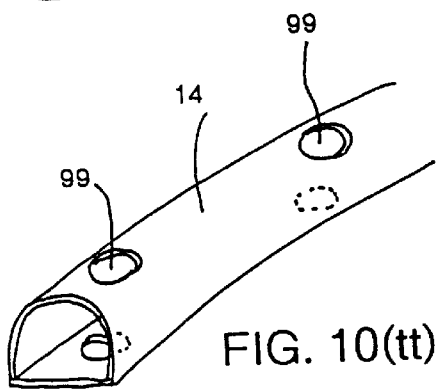
Figure 10:
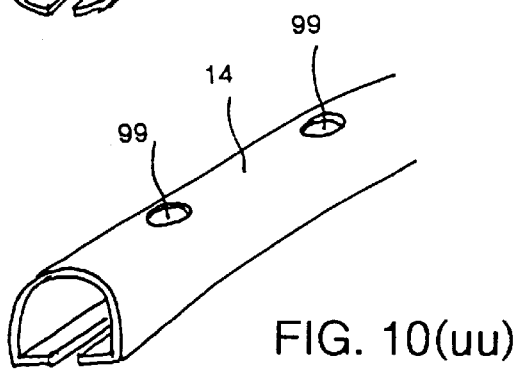
Figure 10W:
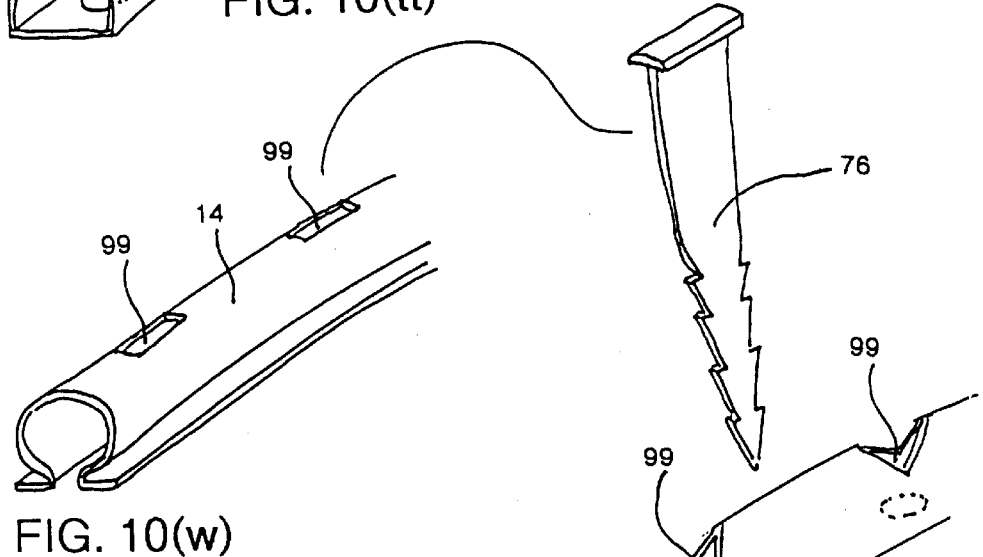
Figure 10:
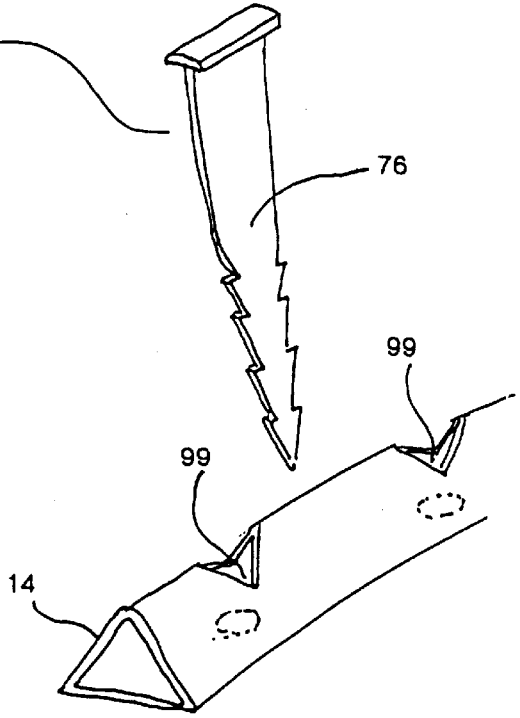
Figure 10:
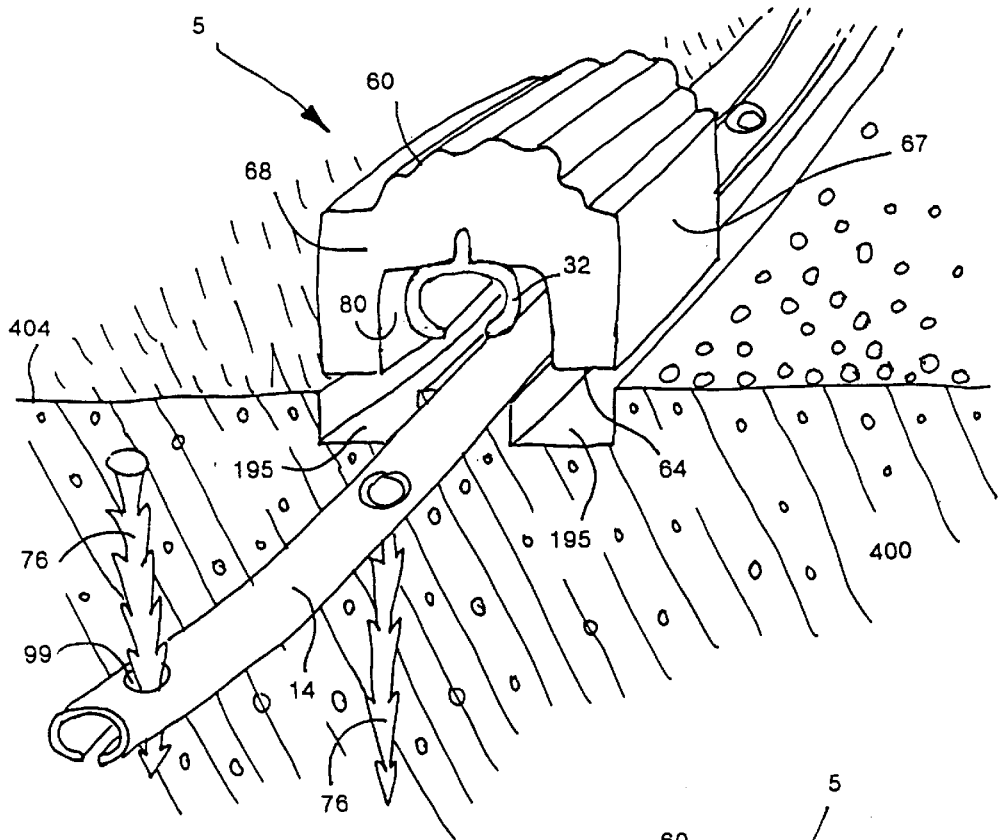
Figure 10:
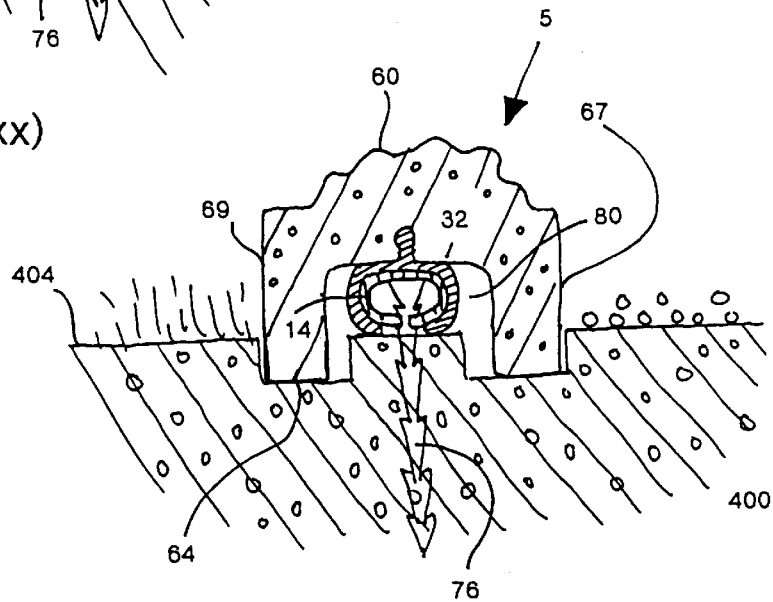
Figure 10:
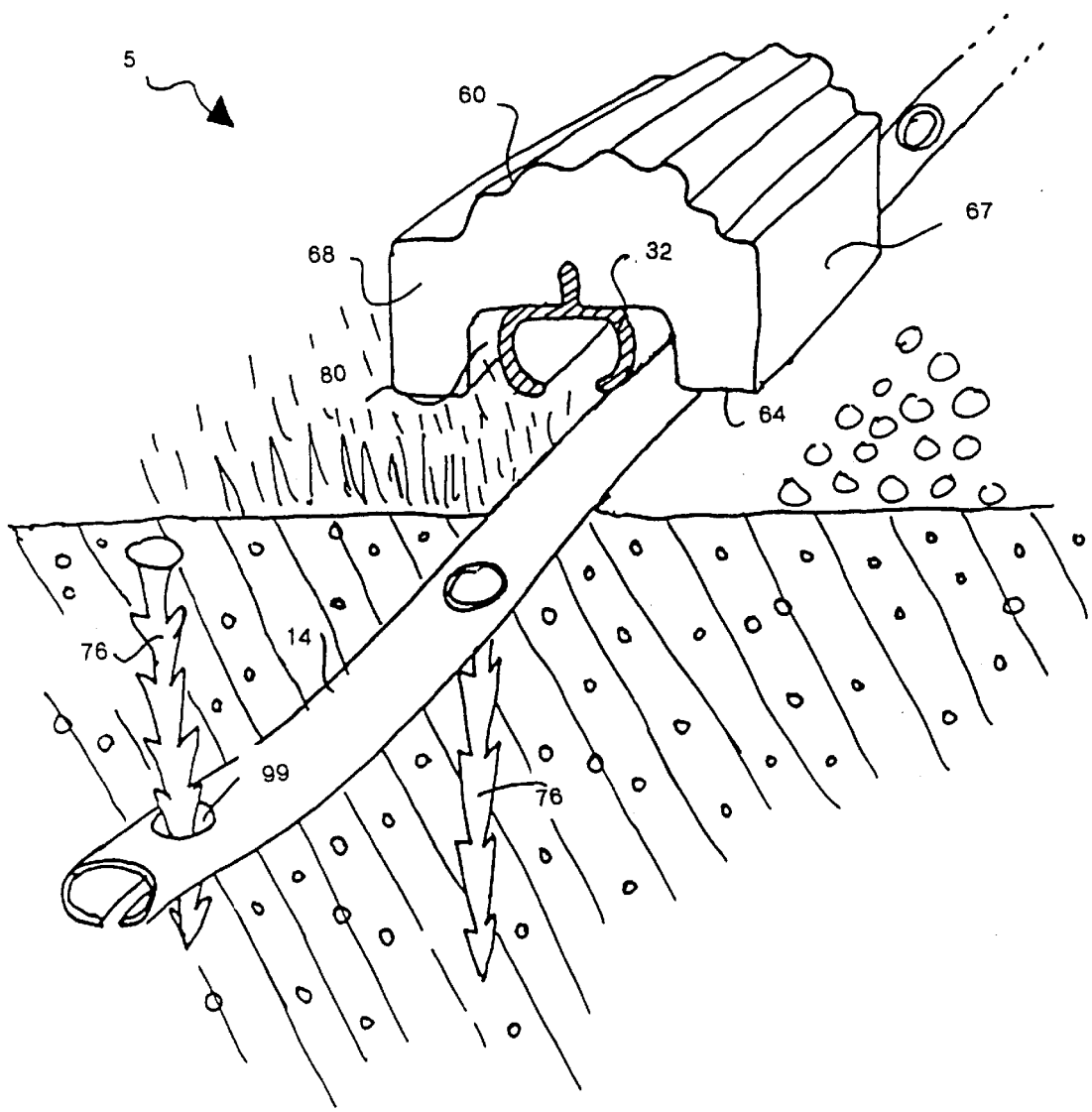

As shown in FIGS. 10(z) and 10(jj), some embodiments of block 60 of the present invention may have formed on one or both lateral or top surfaces thereof a lip or surface for receiving lawn mower wheels thereon. Such a construction permits lawn grass to be cut by a mower only, without any subsequent need to trim grass adjoining blocks 60 after mowing, or to be cut more easily by a power or hand lawn trimmer after mowing. Block 60 of the present invention may be configured to have mowing lips or surfaces of the types disclosed in U.S. Pat. No. 3,777,421 to Bomba et al., U.S. Pat. No. 5,517,867 to Fritch, U.S. Pat. No. 5,377,447 to Fritch, U.S. Pat. No. 5,544,445 to Mantilla.

FIGS. 10(z) through 10(cc) show adjoining blocks 60 being configured such that overlapping portions conceal or sit atop preferably at least partially planar top surfaces 75 of anchoring stakes 76 positioned in recesses 180(a), after installation has been completed. FIG. 10(ee) shows a variant of the present invention, where anchoring stake 76 is substantially U-shaped. Pointed ends 76(a) and 76(b) are inserted into soil 400 after recess 80 of block 60 has engaged top rail 14. Block 60 may be configured to receive more than one such U-shaped anchoring stake in sleeve 190.

FIGS. 10(ff) and 10(gg) show another embodiment of the present invention, where blocks 60(a), 60(b) and 60(c) form herb or flower blocks interposed between blocks 60. FIG. 10(ff) shows blocks 60, 60(a), 60(b) and 60(c) in an exploded perspective view. FIG. 10(gg) shows blocks 60, 60(a), 60(b) and 60(c) in an assembled or connected perspective view. Herb or flower blocks 60(a), 60(b) and 60(c) either singly or collectively form central recess 71 for receiving soil or mulch and accompanying flowers, herbs, small shrubs or small bushes therein. Central recess 71 most preferably has drain holes 72 formed on the bottom surface thereof.

As shown in FIGS. 10(ff) and 10(gg), blocks 60, 60(a), 60(b) and 60(c) most preferably have interlocking or overlapping joints at the abutting or adjoining ends thereof. In the embodiment of the present invention shown in FIGS. 10(ff) and 10(gg), edging member 10 may be terminated at either side of herb or flower blocks 60(a), 60(b) or 60(c). Alternatively, edging member 10 may extend through recesses 80 disposed in the bottom central portions of herb or flower blocks 60(a), 60(b) or 60(c). In the embodiment of the present invention shown in FIGS. 10(ff) and 10(gg), lawn edging member 10 preferably includes top rail 14, and need not include edging barrier 20.

Upon reading the specification of the present invention as disclosed herein, it will now be seen by those of skill in the art that many other variations and embodiments of blocks 60, 60(a), 60(b) or 60(c) are possible, and that those variations or embodiments likewise fall within the scope of the present invention.

FIGS. 10(*hh*) through 10(*kk*) show clips 32 disposed generally on bottom surfaces 64 of blocks 60 in recesses 80. Clips 32 have arms 35 and 37 that expand apart to accept top rail 14 therebetween when adapter 32 is pushed downwardly onto top rail 14. Arms 35 and 37 may or may not engage inner sidewalls 82 of recesses 80 when blocks 60 are disposed atop top rail 14. Clips 32 are preferably configured to permit block 60s having recesses 80 of various widths to suitably interconnect with and engage top rails 14, regardless (within reasonable bounds) of the width of top rail 14. Thus, clips 32 permit blocks 60 to be fitted onto the top rails of any of a number of various different commercially available brands of lawn edging, many of which share no common top rail width.

Tabs or projections 91 may be formed along the outer surfaces of clips 32 for securing blocks 60 to clips 32. As shown in FIGS. 10(*hh*) and 10(*ii*), clips 32 may have only one projection or tab 91 formed therein. Alternatively, and as shown in FIGS. 10(*jj*) and 10(*kk*), more than one tab or projection 91 may be formed in clips 32 of the present invention. Tabs or projections 91 may be inserted into corresponding recesses formed in undersides 64 of blocks 60 for frictional engagement therewith, or may be formed into block 60 at the time block 60 is formed from cement, plastic, mortar or the like. Alternatively, tabs or projections 91 may be glued or otherwise secured to blocks 60.

FIG. 10(*kk*) shows how clips 32 may be formed to provide not only means for securing blocks 60 to top rails 14, but also to provide means for housing electrical cable 101 or water hose 102. Electrical cable 101 may be routed through blocks 60 to illumination blocks (not shown) for providing light at dusk or nighttime to adjoining walkway or garden areas. Water hose 102 may be routed through blocks 60 to sprinkler fixtures (not shown) for providing water to adjoining garden or lawn areas.

FIGS. 10(*ll*) through 10(*oo*) illustrate embodiments of the present invention particularly well adapted to curved or winding installations. Front and rear surfaces 68 and 72 of blocks 60 are curved to permit ready installation of adjoining blocks 60 along winding or curved top rail 14, where downwardly extending barrier 20 may or may not depend therefrom. Optional sprinkler head 105 may be fitted in block 60, as may optional electric power cord 101 and water hose or plumbing means 103.

FIGS. 10(*ll*),10(*pp*) through 10(*aaa*), and 10(*ccc*) show embodiments of landscape edging system 5 of the present invention where edging members 10 have no or substantially no barrier member 20 extending downwardly therefrom. Instead, top rails 14 fit within recesses 80 of blocks 60 or are secured thereto by clips 32. Stakes 76 are optional, but preferably secure landscape edging member 10 and top rail 14 to ground surface 404. When stakes 76 are employed in conjunction with landscape edging member 10, it is preferred that member 10 be secured first to ground surface 404 by stakes 76, followed by blocks 60 and clips 32 being pushed downwardly onto top rail 14 for attachment thereto. Additionally, trenches 195 may be formed to receive bottom surfaces 64 of blocks 60 therein, or no such trenches may be formed such that system 5 is "trenchless."

FIG. 10(*bbb*) shows another embodiment of landscape edging system 5 of the present invention, where edging member 10 has horizontally-oriented ribs 11 disposed on edging barrier 20. Ribs 11 help edging member 10 remain secured in ground 400.

FIGS. 10(*eee*) through 10(*nnn*) show various embodiments of the present invention particularly well suited for erosion control or soil containment, and corresponding methods of installing same. FIGS. 10(*eee*) through 10(*kkk*) illustrate one method of the present invention where block 60 is installed on sloping ground surface 404 atop top rail 14 having no or substantially no downwardly extending barrier 20 depending therefrom. Block 60 is configured to retain garden soil 405 therein or prevent the downslope erosion thereof.

FIGS. 10(*lll*) through 10(*nnn*) illustrate another method of the present invention where block 60 is installed on sloping ground surface 404 using stake 76. Block 60 is configured to retain garden soil 405 therein or prevent the downslope erosion thereof. Stake 76 is received in a hole disposed through block 60 which permits stake 76 to be installed over a wide range of angles respecting the vertical.

FIGS. 10(*ooo*) through 10(*rrr*) show various alternative embodiments of blocks 60 having at least one attachment member 32 secured to the bottom surface 64 thereof. Each block 60 has bottom surface 64, two opposing ends 68 and 72, and imaginary longitudinal axis 76 extending between the two opposing ends. Bottom surface 64 has at least one attachment member 32 secured thereto and extending over at least a portion of bottom surface 64. At least one attachment member 32 receives at least a portion of top rail 14 therein. Two opposing ends 68 and 72 of each block 60 are configured to engage, abut, or interconnect with the corresponding opposing ends of other adjoining landscape edging blocks 60.

FIGS. 10(*ooo*) through 10(*rrr*) show that top rail 14 and at least one attachment member 32 are most preferably configured to prevent or impede block 60 from being removed from top rail 14 when an upward or lateral force is exerted upon block 60 and top rail 14 is disposed within attachment member 32. Such forces may be imparted by frost heave, lawn mower wheels, automobile wheels, children and the like. It is preferred that at least a portion of edging barrier 20 extend downwardly into ground 400 from bottom surface 64 of each block 60 when at least one attachment member 32 corresponding to each block 60 receives its corresponding at least portion of top rail 14 therein and bottom surfaces 64 of a plurality of engaging, abutting or interconnected landscape blocks 60 are disposed along or beneath ground surface 404.

Attachment member 32 may assume any of a number of different structural configurations, some of which are illustrated in FIGS. 10(*ooo*) through 10(*rrr*). FIG. 10(*ooo*) shows attachment member 32 forming a C-shaped tube connected to bottom surface 64 of block 60. FIG. 10(*ppp*) shows attachment member 32 forming a rail for receiving corresponding top rail 14 having a circular cross-section. FIG. 10(*qqq*) shows attachment member 32 being formed from one or a plurality of individual attachment components 32(*a*), 32(*b*) or 32(*c*) for engaging, gripping or otherwise securing top rail 14. FIG. 10(*rrr*) shows attachment member 32 forming a rail having a T-shaped recess disposed therein for receiving top rail 14 having a corresponding T-shaped cross-section. Many other similar configurations for attachment member 32 and top rail 14 will now be seen by those of skill in the art to be possible, and to likewise fall within the scope of the present invention.

In another embodiment of the landscape edging system of the present invention, and as shown in FIG. 10(*sss*), elongated landscape edging member 10 comprises top rail 14, top surface 15, bottom portion 28 and two opposing substantially vertically-oriented surfaces defining strip-shaped barrier member 20. Barrier member 20 extends downwardly from top rail 14 for placement in ground 400.

FIG. 10(*ttt*) shows a cross-sectional view of edging member 10 of FIG. 10(*sss*). In FIG. 10(*ttt*), recess 80 in block 60 receives at least a portion of top rail 14 therein. Recess 80 extends over at least a portion of bottom surface 64. Top rail 14 and recess 80 are most preferably (but not necessarily) configured to prevent or impede block 60 from being removed from top rail 14 when an upward or lateral force is exerted upon block 60 and top rail 14 is disposed in recess 80.

In the embodiment of the landscape edging system of the present invention shown in FIGS. 10(*sss*) and 10(*ttt*), landscape edging member 10 may be formed of corrugated metal or plastic strips having, for example, a T-shaped top rail 14. While edging members having such configurations are not at present manufactured in great volumes and therefore are not readily available to consumers at the present time, they nonetheless lend themselves particularly well to new installation applications where blocks 60 are not retrofitted on existing, installed landscape edging barriers having conventional circular cross-section top rails 14.

Top surface 15 of top rail 14 may also be configured and formed of a material suitable for receiving hammer blows thereon to ease installation of edging member 10 in ground 400. For example, T-shaped top rail 14 illustrated in FIGS. 10(*sss*) and 10(*ttt*) may be configured for receiving hammer blows on top surface 15, thereby easing the installation process in respect of conventional landscape edging barriers because no trench or only a shallow trench need be excavated for receiving landscape edging member 10.

FIG. 10(*uuu*) shows another embodiment of the present invention, where landscape edging member 10 is formed of metal or plastic. In this embodiment of the present invention, edging member 10 is most preferably formed from a corrugated galvanized metal strip that is resistant to corrosion and that lends itself to easy packaging.

FIG. 10(*vvv*) shows an embodiment of landscape edging system 5 of the present invention where edging member 10 has cut-out portions 17 formed along the top edge thereof. Cut-out portions 17 are formed most preferably by cutting or perforating strip 10 using a stamping die or the like. Cut-outs 17 are preferably configured to fold downwardly when a sideways or downward force F is applied thereto as shown in FIG. 10(*vvv*). As shown in FIG. 10(*www*), cut-out portions 17 form wings or tabs when after having been folded downwardly and outwardly. Wings or tabs 17 engage or fit within recess 80 of block 60. Cut-out portions 17 and top surface 16 most preferably form surfaces for receiving hammer blows thereon to ease installation. In accordance with other embodiments of the present invention disclosed herein, edging member 10 may include soil anchoring means such as pockets, concave dimples or harpoon-like bottom edge portion, or function in cooperation with anchoring stakes or other like devices.

FIG. 10(*xxx*) shows an embodiment of landscape edging system 5 of the present invention where top surface 15 of barrier member 10 has a plurality of pins or members 19 that extend upwardly therefrom. Upwardly extending members or pins 19 engage corresponding holes, recesses or slots 80 in block 60 that are appropriately configured for receiving pins or members 19. It will now become apparent to those skilled in the art that many possible structural configurations exist for upwardly extending member 19. Slots or recesses 80 are disposed along bottom surface 64 of block 60, and are configured to receive members 19. As shown in FIG. 10(*xxx*), upwardly extending members 19 most preferably have edges or ribs that grip or fit within corresponding edges or ribs disposed within recesses or slots 80 of block 60. Such ribs or edges downwardly bias block 60 against top surface 15 and ground surface 404 once block 60 has been positioned over members 19 and pressed downwardly thereupon.

Figure 11:
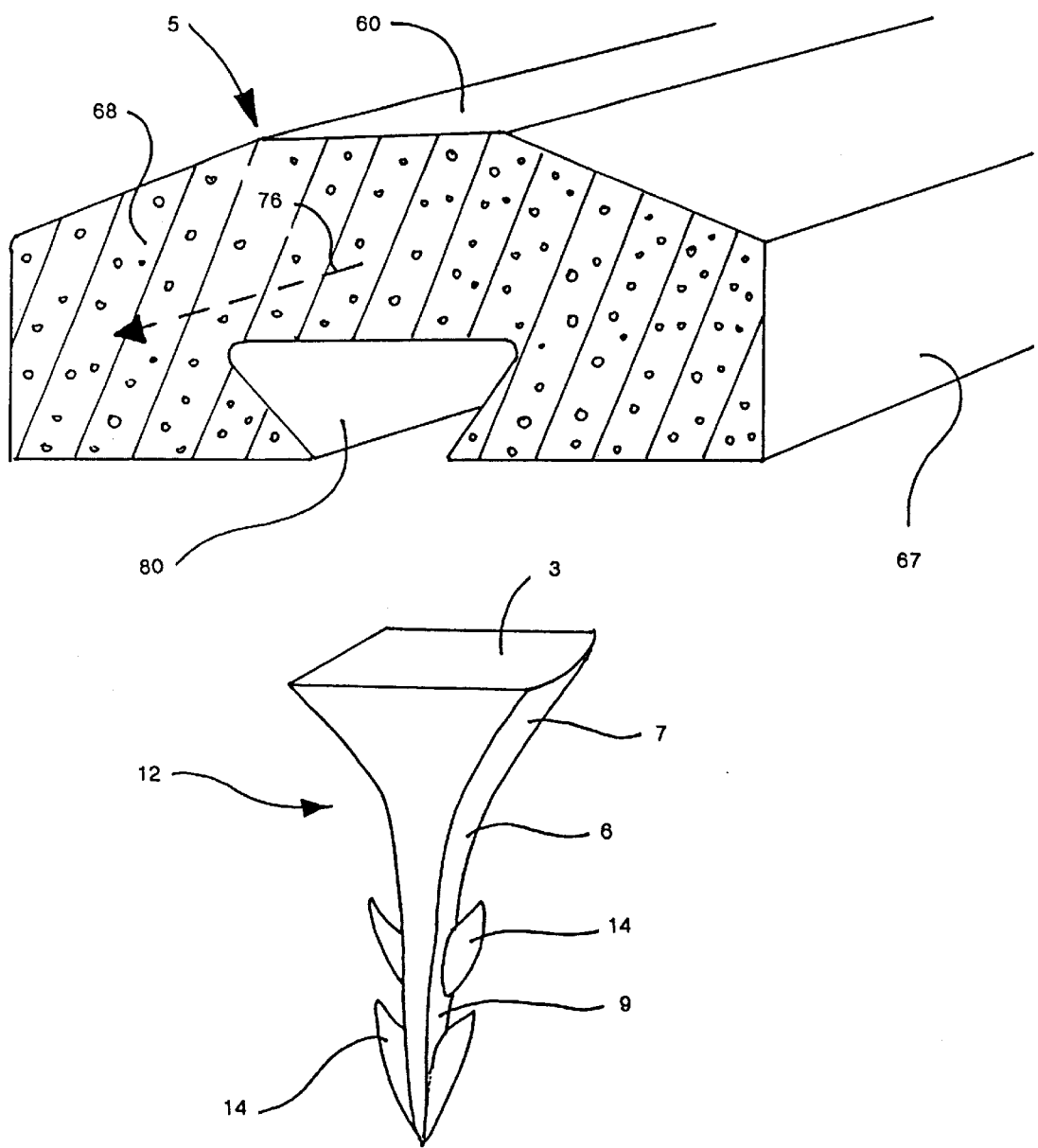
FIG. 11 shows another embodiment of landscape edging system 5 of the present invention, where landscape edging block anchoring member 12 secures landscape edging block 60 to ground surface 404.

Another embodiment of landscape edging system 5 of the present invention is illustrated in FIG. 11, where landscape edging block anchoring member 12 is employed to secure landscape edging block 60 to ground surface 404. Anchoring member 12 most preferably comprises upper portion 7 and lower portion 9 connected by central body portion 6. Upper portion 7 is configured to protrude or extend above ground surface 404 when lower portion 9 is positioned beneath ground surface 404 in ground 400. Upper portion 7 defines a predetermined shape in cross-section and most preferably an at least partially planar top surface 3 suitable for receiving blows from a hammer thereon. Lower portion 9 is most preferably pointed and shaped for insertion into the ground as blows from a hammer are received on the at least partially planar top surface 3 or as anchoring member 12 is otherwise pushed or forced into ground 400.

Anchoring member 12 is most preferably configured to prevent or impede block 60 from being removed from upper portion 7 of anchoring member 12 when an upward or lateral force is exerted upon block 60 and top portion 7 is disposed in recess 80. Anchoring member 12 is also most preferably formed of a material such as wood, plastic or metal that is sufficiently mechanically robust to withstand the forces ordinarily or typically associated with pushing, forcing or hammering anchoring member 12 into ground 400.

Anchoring member 12 may be disposed in recess 80 of block 60, where the major axis of recess 80 is aligned substantially parallel to imaginary longitudinal axis 76. Alternatively, anchoring member 12 may be disposed in a recess having a major axis that extends substantially perpendicular (or in any other direction) in respect of imaginary longitudinal axis 76. For example, a recess having a cross-sectional shape corresponding to the cross-sectional shape of anchoring member 12 and for receiving same therein may extend through block 60 at substantially right angles to imaginary longitudinal axis 76; at least partially planar top surface 3 of anchoring member 12 would then most preferably be co-planar with top surface 65 of block 60 upon being inserted in the recess.

In another embodiment of the present invention, anchoring member 12 is configured for use with at least one attachment member 32. Block 60 has bottom surface 64, two opposing ends 68 and 72, and imaginary longitudinal axis 76 extending between the two opposing ends. Bottom surface 64 has at least one attachment member 32 secured thereto and extending over at least a portion thereof. At least one attachment member 32 has recess 80 formed therein. The cross-sectional shape of recess 80 corresponds to at least a portion of the predetermined cross-sectional shape of upper portion 7 of anchoring member 12. Attachment member 32 is configured to receive at least a portion of upper portion 7 therein to permit anchoring member 12 to be secured to block 60.

Two opposing ends 68 and 72 of block 60 are configured to engage, abut, or interconnect with the corresponding opposing ends of other adjoining landscape edging blocks 60. Each block 60 is secured to ground surface 404 by its corresponding anchoring member 12 that extends downwardly therefrom into ground 400 from bottom surface 64 or attachment member 32 of each block 60. Bottom surfaces 64 of the plurality of engaging, abutting or interconnected landscape blocks are disposed along or beneath ground surface 404.

Anchoring member 12 may be formed of a substantially rigid material such as metal or any of a number of suitable metal alloys, or of a somewhat pliable material such as SANTOPRENE®, neoprene, or any of a number of suitable plastics, synthetic rubbers, plastics, polyethylene, polyurethane, neoprene, ethylene vinyl acetate, elastomeric material, polymeric material, metal, metal alloy, galvanized steel, untreated wood, treated wood, and the like. If a somewhat pliable material is employed to form anchoring member 12, a trowel or other suitable tool may be used to excavate a hole in soil 400 for receiving anchoring member 12 therein, thereby obviating the need to pound anchoring member 12 into soil 400 by striking at least partially planar top surface 3.

As shown partially in FIG. 11, anchoring member 12 may have at least one or a plurality of barbed members, harpoon-like members 14, soil pockets, ribs, ridges, concave dimples, nesting regions, blades, flanges, ears, securing lips, or end hooks disposed thereon for securing anchoring member 12 in ground 400. More preferably yet, lower or central portions 9 or 6 may include soil pockets, ribs or ridges for securing anchoring member 12 in ground 400.

FIGS. 12(*a*) and 12(*b*) show an embodiment of the present invention particularly well adapted for paving block walkway or driveway applications. FIG. 12(*a*) shows an exploded perspective view of paving block system 130. FIG. 12(*b*) shows a perspective view of assembled system 130. Blocks 60 are disposed atop bottom barriers 140 and adjacent one another to form a driveway or walkway whose edges are defined by optional side barriers 135. Top rails 14 of bottom barriers 140 engage and are received within corresponding recesses 80 of blocks 60 to thereby secure blocks 60 to bottom barriers 140. Adjoining side and bottom barriers 135 and 140 interconnect with one another. Paving block system 130 need not include optional side barriers 135.

In a preferred embodiment of the present invention. bottom barriers 140 are configured for horizontal placement on excavated ground surface 404(*b*). Side barriers 135 are most preferably configured to extend upwardly and vertically such that its uppermost surface is flush or protrudes a slight distance above ground surface 404(*a*). Bottom barriers 140 may also be placed on a ground surface that is not excavated; side barrier 135 in such a case would extend upwardly from ground surface 404.

Substantially vertically oriented side barriers 1:35 attach to substantially horizontally oriented bottom barrier by means of interconnecting tabs 151 and slots 152, where tabs 151 slide into and are biasingly engaged within correspondingly disposed slots 152 in bottom barriers 140 when tabs 151 are inserted substantially completely into slots 152. Adjoining substantially horizontally oriented bottom barriers 140 similarly attach to one another by means of interconnecting tabs 151 and slots 152. Adjoining substantially vertically oriented side barriers 135 likewise attach to one another by means of interconnecting tabs 151 and slots 152.

FIGS. 12(*c*) and 12(*d*) show another embodiment of the present invention particularly well adapted for paving block patio, walkway or driveway applications. FIG. 12(*c*) shows an exploded perspective view of another embodiment of the paving block system 130. FIG. 12(*d*) shows a perspective view of assembled system 130 of FIG. 12(*c*). Blocks 60 are disposed atop bottom barriers 140 and adjacent one another to form a patio, walkway or driveway whose edges are defined by optional side barriers 135. Top rails 14(*a*) of bottom barriers 140 engage and are received within corresponding recesses 80(*a*) of blocks 60 to thereby secure blocks 60 to bottom barriers 140. Side rails 14(*b*) of blocks 60 engage and are received within recesses 80(*b*) of adjoining blocks 60 or side barrier 135. Side barrier 135 shown in FIGS. 12(*c*) and 12(*d*) has side rail 14(*c*) for engaging and being received within corresponding recess 80(*b*) of block 60. Adjoining side and bottom barriers 135 and 140 interconnect with one another. Paving block system 130 shown in FIGS. 12(*c*) and 12(*d*) need not include optional side barriers 135.

The embodiment of the present invention shown in FIGS. 12(*c*) and 12(*d*) provides superior structural integrity to paving block system 130 owing to the manner in which most or all components of the system interlock or interconnect to one another. Such a system provides superior resistance over time to undesired displacement forces such as frost heave. It will now become apparent to those skilled in the art that many variants of the respective geometries of the recess and corresponding rail system illustrated are possible, and that such variants fall within the scope of the present invention.

The present invention includes within its scope any of a wide variety of different means for interconnecting bottom and side barriers 140 and 135, such as means for screwably, glueably, pinnably, tongue and groovably interconnecting such barriers to one another. It will now become apparent to those skilled in the art that many other means for interconnecting side and bottom barriers 135 and 140 may be employed, and that such alternative means fall within the scope of the present invention.

Bottom and side barriers 140 and 135 may form one contiguous piece, or may form separate pieces or components. Likewise, a plurality of bottom barriers 140 or side barriers 135 may be formed into a single contiguous sheet, or may form separate components as shown in FIGS. 12(*a*) and 12(*b*). FIGS. 12(*a*) and 12(*b*) show left-hand substantially vertically oriented side barriers 135, but do not show corresponding right-hand substantially vertically oriented side barriers 135 for defining the width of paving system 130. We note that such right-hand substantially vertically oriented side barriers 135 should have slots 152 disposed therein, as opposed to tabs 151 (as shown in FIG. 12(*a*)), for receiving tabs projecting horizontally from bottom barriers 140.

A user may select the number of bottom barriers 140 required to form a patio, walkway or driveway of a desired width. Likewise, a user may select the number of bottom barriers 140 and side barriers 135 required to form a patio, walkway or driveway of a desired length. In a preferred embodiment of the present invention, bottom barriers 140 and side barriers 135 have drainage holes formed through the surfaces thereof to permit rain water and the like to drain therethrough. In a manner similar to the structures shown in FIGS. 2(*s*), 10(*z*) through 10(*ee*), 10(*mm*), 10(*nn*), and 11, anchoring stakes may be driven through bottom barriers 140, side barriers 135 or blocks 60 to secure those components to ground surface 404. It is also contemplated in the present invention that side and bottom barriers 135 and 140 have optional edging barriers 20 (not shown in FIGS. 12(*a*) or 12(*b*)) depending downwardly therefrom for better securing system 130 to ground surface 404.

It is preferred that side and bottom barriers 135 and 140 be configured and interconnect in such a way that the major axis azimuth or orientation 160 of a first width-wise course of bottom and side barriers 140 and 135 may differ at least slightly from the major axis azimuth or orientation 160 of an adjacent second width-wise course of bottom and side barriers 140 and 135, thereby permitting system 130 to form a winding or curving walkway or driveway. End surfaces 68 and 72 of blocks 60 may also be shaped or configured to permit changes in orientation from one width-wise course to the next by, for example, rounding surfaces 68 and 72 as shown in FIGS. 10(b), 10(e), 10(f) through 10(w). Many other means of permitting such changes in orientation from one width-wise course of paving blocks to the next will now become apparent to those skilled in the art.

Figure 12A:
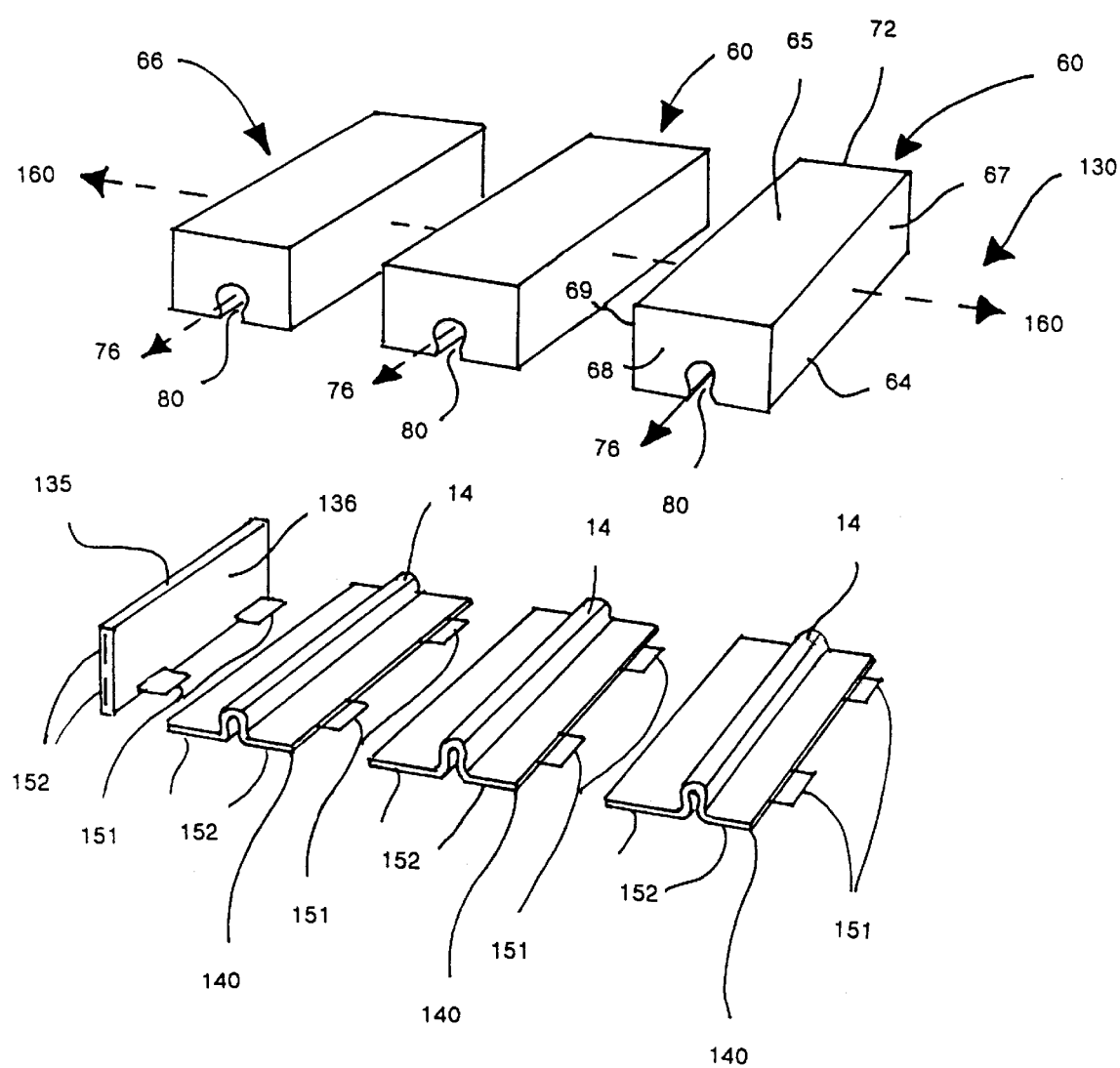
FIGS. 12(a) and 12(b) show an embodiment of the present invention particularly well adapted for paving block walkway, patio or driveway applications.
Figure 12B:
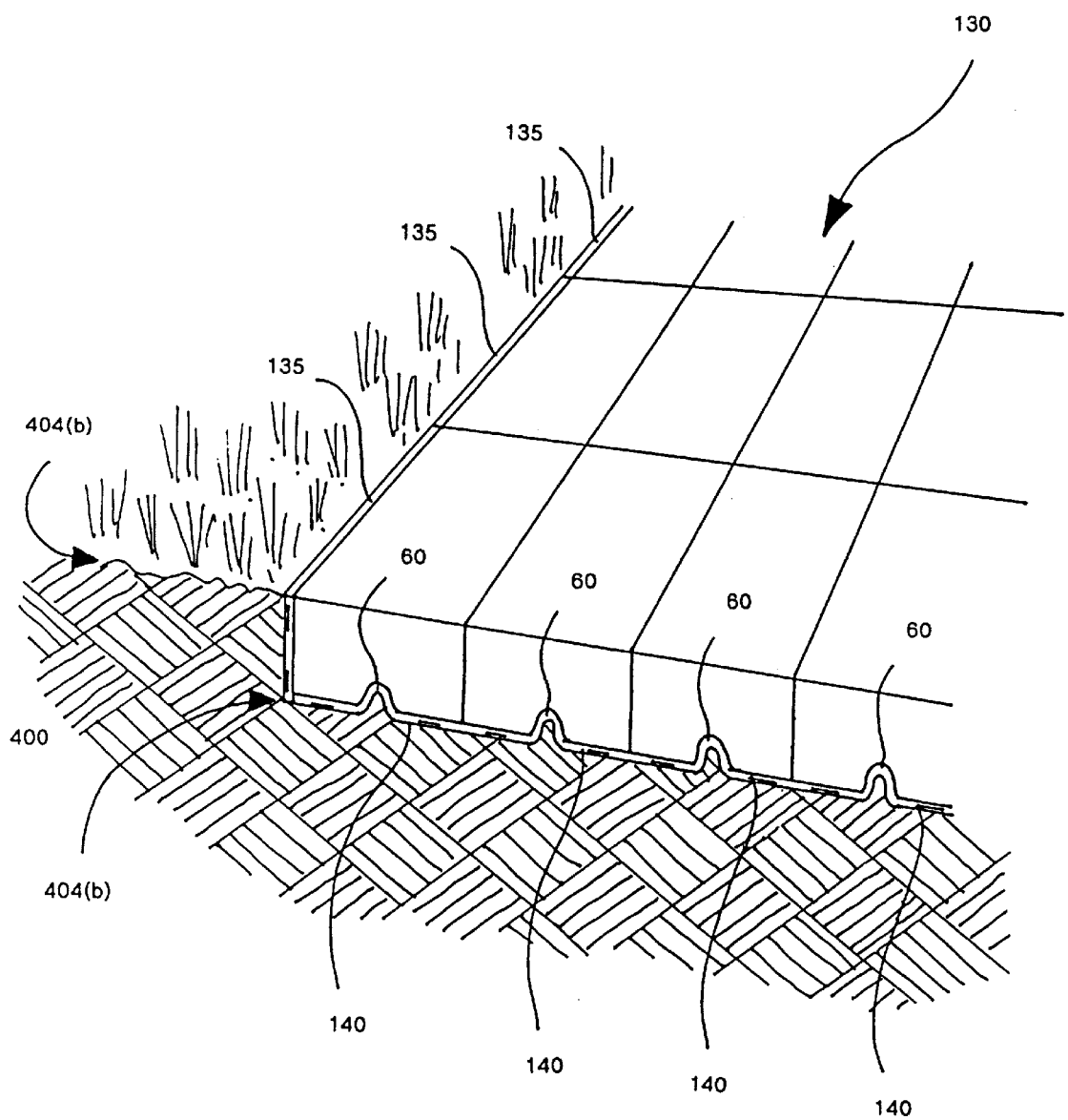
Figure 12C:
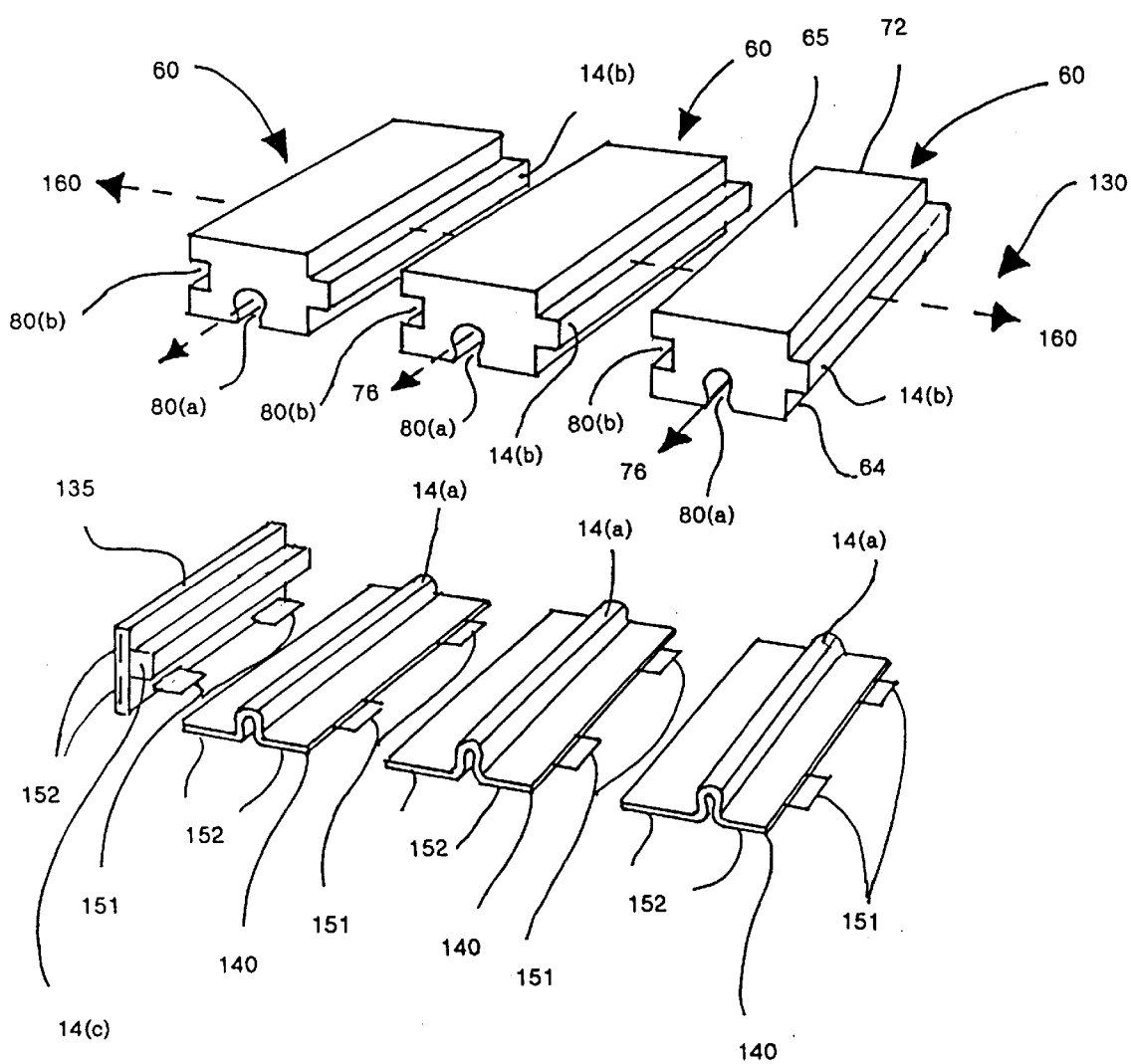
FIG. 12(c) and 12(d) show another embodiment of the present invention particularly well adapted for paving block walkway, patio or driveway applications.
Figure 12D:
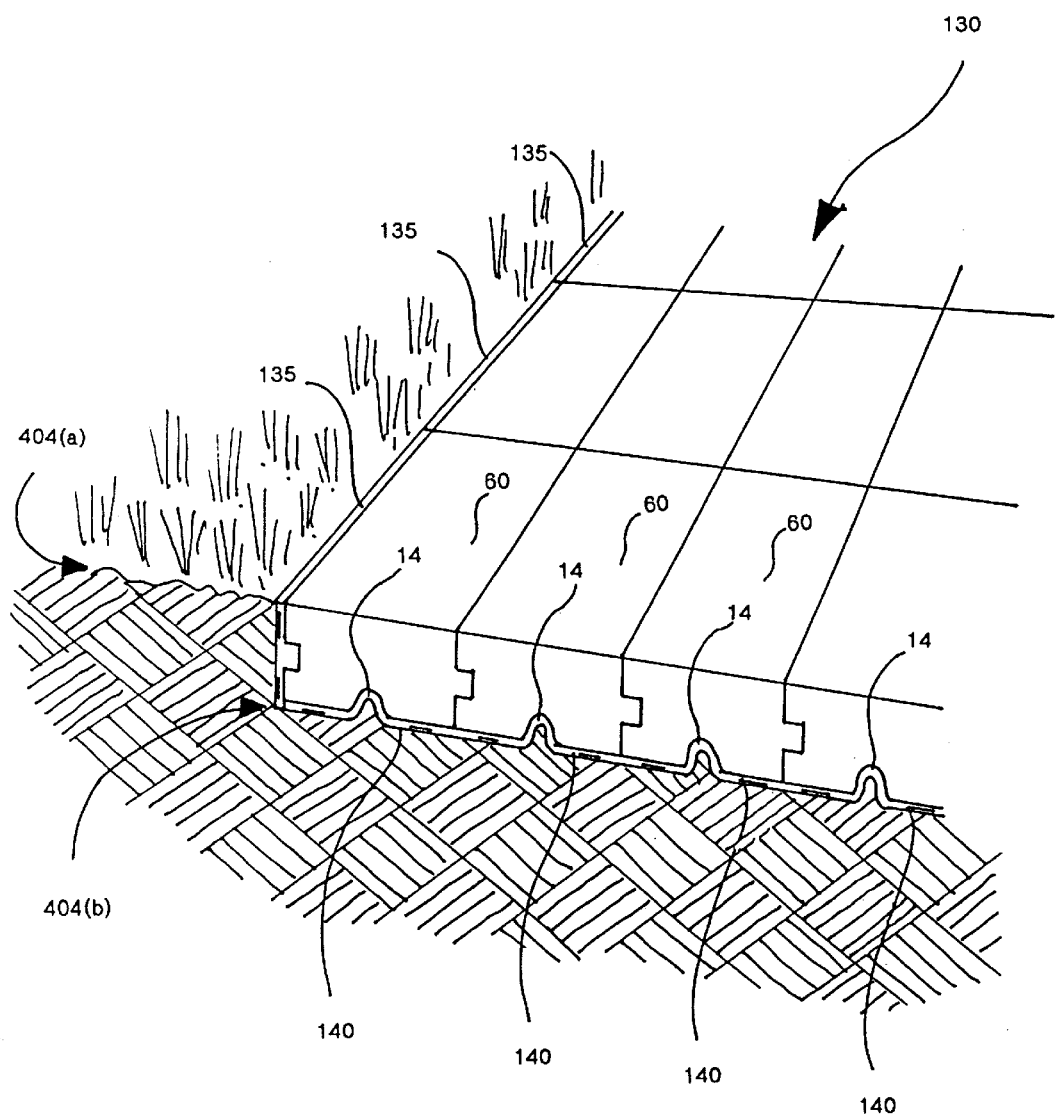

Bottom barriers 140 have may top rails 14 formed in the top surfaces thereof. If so, top rails 14 are disposed along azimuths or imaginary axes corresponding to the orientations of axes 76 of blocks 60 and recesses 80. Azimuths and orientations of top rail 14 other than those shown in FIGS. 12(a) and 12(b) are contemplated in the present invention. For example, top rails 14 may be oriented perpendicular to axes 76 in a manner similar to that shown in FIG. 8.

FIGS. 12(a) and 12(b) further show a plurality of paving blocks 60 in system 130. Each block 60 has top surface 65, bottom surface 64, two opposing end surfaces 68 and 72, and two opposing side surfaces 67 and 69. Two opposing end surfaces 68 and 72 and bottom surface 64 most preferably have a longitudinally disposed recess 80 formed therein for receiving at least a portion of top rail 14 therewithin to secure block 60 to bottom barrier 140. Other azimuths or orientations of recess 80 are contemplated in the present invention. Two opposing end surfaces 68 and 72 of each block 60 are most preferably configured to engage, abut, or interconnect with corresponding opposing end surfaces of other adjoining landscape edging blocks 60 attached to top rail 14 by their respective recesses 80.

Inside surface 136 of side barrier 135 is configured to receive thereagainst side surfaces 67 or 69 of blocks 60 aligned end to end, while bottom barrier 140 is configured to receive thereon bottom surfaces 64 of blocks 60. At least a portion of bottom barrier 140 or side barrier 135 extends downwardly for placement in soil 400. For walkway and driveway applications, blocks 60 are most preferably formed of materials resistant to hot, dry, wet and cold climates and suitable for paving applications such as fired clay, formed concrete and the like.

It will now become apparent to those skilled in the art that paving block system 130 of the present invention may form a structurally robust paving block underlayment and restraint system. Moreover, top rails 14 and recesses 80 in blocks 60 of system 130 most preferably function to prevent or impede dislodgment of blocks 60. The various components of system 130 most preferably interact and function together in such a manner to ameliorate the deleterious effects of frost heave by preventing or impeding the movement of blocks 60.

Figure 12E:
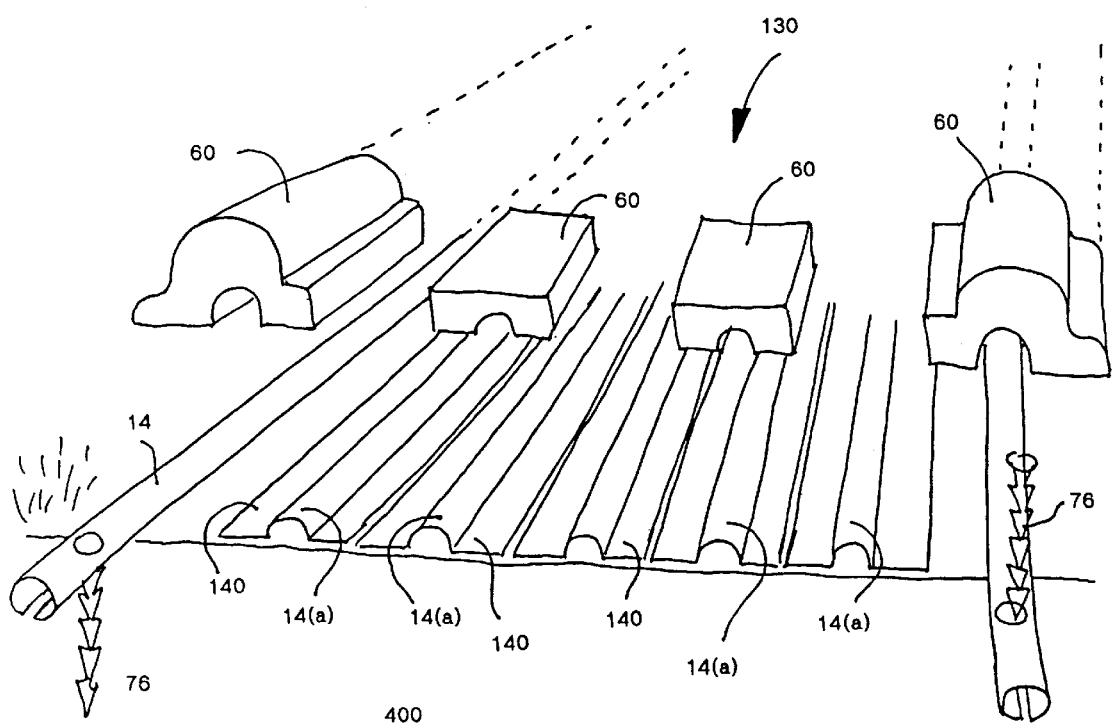
FIGS. 12(e) through 12(h) show further embodiments of the present invention particularly well adapted for paving block walkway, patio or driveway applications.
Figure 12F:
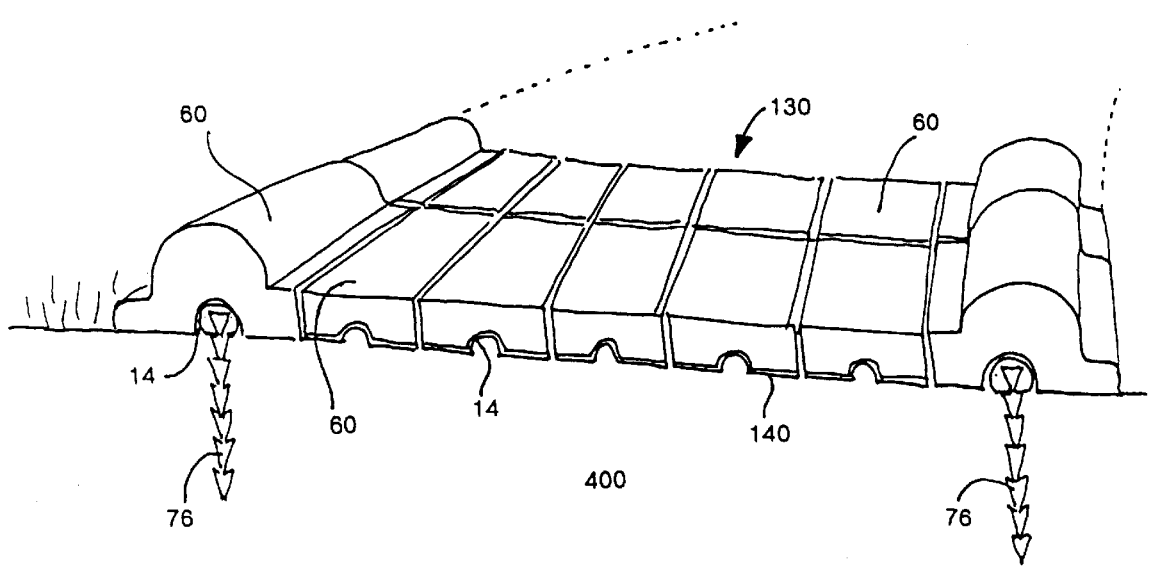

Further embodiments yet of the paving block system of the present invention are illustrated in FIGS. 12(e) through 12(h). FIG. 12(e) shows an exploded perspective view of one embodiment of system 130 of the present invention. FIG. 12(e) shows a perspective view of the system of FIG. 12(e) installed in ground 400.

Figure 12G:
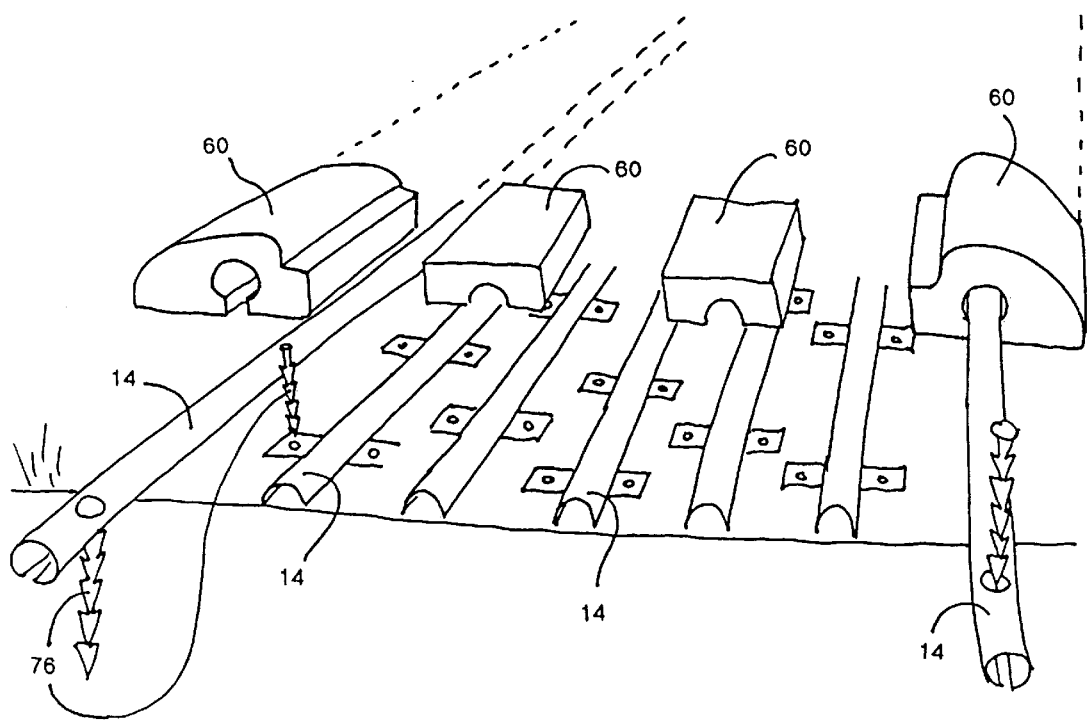

System 130 of FIG. 12(g) is particularly well adapted to permitting trouble-free rapid installation of a winding or curving walkway or driveway owing to bendable rails 14 being disposed a sufficient distance from one another so as not to engage one another, and no rigid or substantially rigid bottom barrier 140 being required.

Figure 12H:
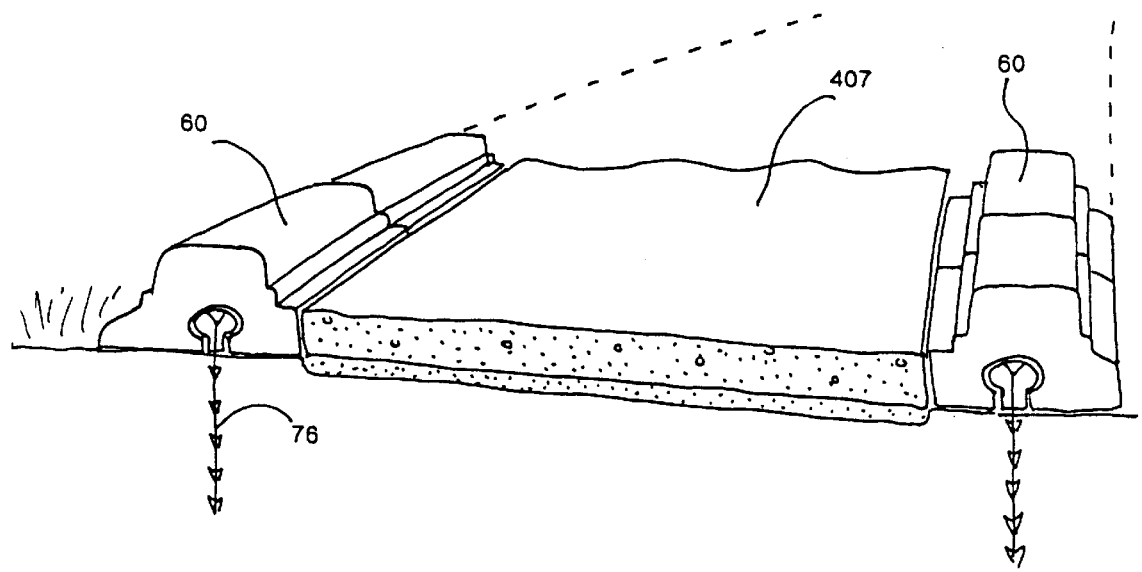

The embodiment of system 130 of the present invention shown in FIG. 12(h) permits rapid installation of a border for a walkway or patio, wherein the borders formed by blocks 60 contain sand, gravel, soil, wood chips or the like 407 therebetween. Additional paving blocks may be installed easily atop sand, gravel or soil and between border blocks 60 once border blocks 60 of FIG. 12(h) have been installed. Alternatively, border blocks 60 of FIG. 12(h) may be emplaced rapidly to form a containment volume into which concrete may be poured for forming a driveway, patio or walkway.

Any of the various preceding embodiments of the present invention may be adapted to accommodate electrical wiring and lights for lighting applications or hose, conduit or sprinklers for sprinkling or watering systems. As shown in FIGS. 9(a) through 9(l), 10(hh) through 10(kk) and 10(ddd), it is preferred that blocks 60 be cored or otherwise have recesses or holes disposed therein sufficiently large or numerous to accommodate electrical wiring, water hose, metal pipe or PVC, or plastic conduit for electrical or plumbing applications. As mentioned hereinabove, coring of, or recesses disposed in, blocks 60 can provide the additional advantages of reducing block material costs and lowering block weights. Top rails 14 and edging barriers 20 of the present invention may also be configured to receive electrical wiring, water hose, metal pipe or PVC, or plastic conduit for electrical or plumbing applications, therein.

Figure 13A:
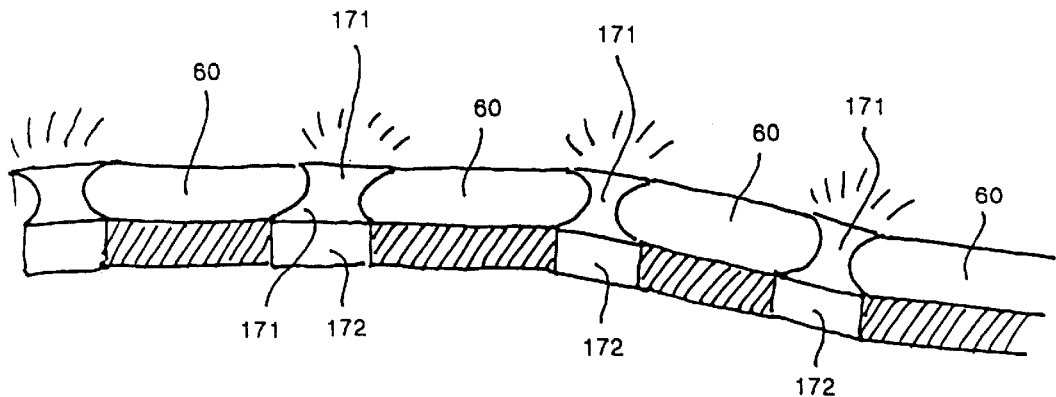
FIGS. 13(a) through 13(c) show preferred embodiments of the present invention, where illumination block 170 has an at least partially translucent top surface 171 or side surface 172 for permitting the passage of light therethrough.
Figure 13B:
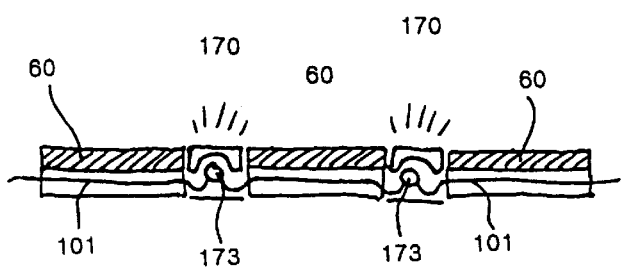
Figure 13C:
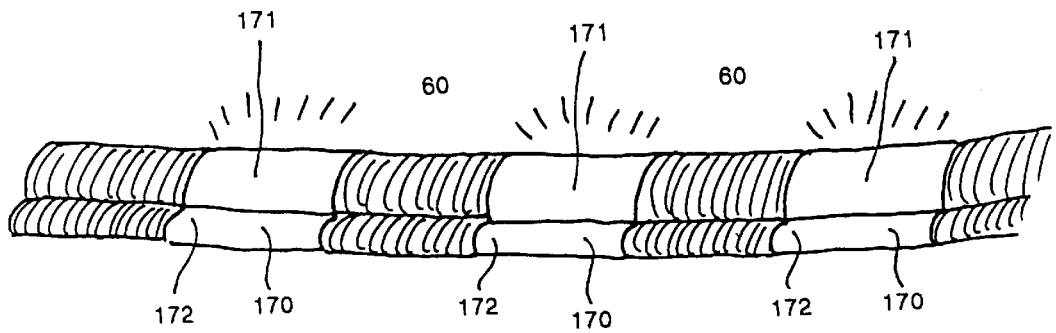

FIGS. 13(a) through 13(c) show preferred embodiments of the present invention, where illumination block 170 has an at least partially translucent top surface 171 or side surface 172 for permitting the passage of light therethrough, the light being generated by a lighting member 173 housed within illumination block 170, lighting member 173 being provided ac electric power by power cord 101. U.S. Pat. No. 3,495,352 to Sbare and U.S. Pat. No. 5,535,545 to Matz disclose lighting structures and components that may be adapted readily for use in conjunction with the components or system of the present invention. The foregoing '352 and '545 patents are hereby incorporated herein in their respective entireties.

The present invention also includes within its scope sprinkler blocks having sprinkler fittings 105 disposed thereon for sprinkling water in areas adjacent blocks 60. Blocks 60 may have water hose 103 or other plumbing means disposed therewithin or thereon for supplying water to such sprinkler fittings 105, as shown in FIG. 10(kk). Additionally, edging barriers 20 and top rails 14 of the present invention may be configured to receive therein and distribute therefrom water provided by conduits disposed in those same components, or in or on block 60. U.S. Pat. No. 3,387,786 to Rynberk; U.S. Pat. No. 3,485,449 to Wilson; U.S. Pat. No. 4,391,983 to Wilson and U.S. Pat. No. 5,535,545 to Matz disclose sprinkler structures and components that may be adapted readily for use in conjunction with the components or system of the present invention. The foregoing '786, '449, '983 and '545 patents are hereby incorporated herein in their respective entireties.

One method of the present invention comprises the steps of: (a) providing at least one elongate landscape edging member having a top rail for separating adjacent lawn, garden, walkway or patio areas, the top rail having an edging barrier extending downwardly therefrom for placement in the ground, at least a portion of the top rail being affixed to or forming part of an upper portion of the edging barrier such that the top rail protrudes or extends above the ground surface when at least a lower portion of the edging barrier is positioned beneath the ground surface in the ground, the barrier having a bottommost portion; (b) providing a plurality of landscape edging blocks, each block having a bottom surface, two opposing ends and an imaginary longitudinal axis extending between the two opposing ends, the bottom surface having a longitudinally disposed recess formed therein, the recess being configured to receive at least a portion of the top rail therein and extending over at least a portion of the bottom surface, the top rail and recess being configured to prevent or impede the block from being removed from the top rail when an upward or lateral force is exerted upon the block and the top rail is disposed in the recess, the two opposing ends of each block being configured to engage, abut, or interconnect with the corresponding opposing ends of other adjoining landscape edging blocks attached to the top rail by their respective recesses; (c) forming a trench having a bottom in the ground by excavating soil therefrom, the trench being of sufficient depth and width to receive at least a portion of the at least one elongate landscape edging barrier therein; (d) placing the bottommost portion of the barrier at the bottom of the trench; (e) backfilling at least some of the excavated soil in the trench to secure the barrier in the ground, and (f) placing the bottom surface of each block on the top rail such that the top rail is received in the recess.

Another method of the present invention is similar to the above-described method but permits easier formation of a trench for receiving edging barrier 20. More particularly, trench formation devices 190 and corresponding installation methods shown in FIGS. 14(*a*) through 14(*uu*) may be employed by a user to aid in forming one or more trenches 195 in ground 400.

Figure 14A:
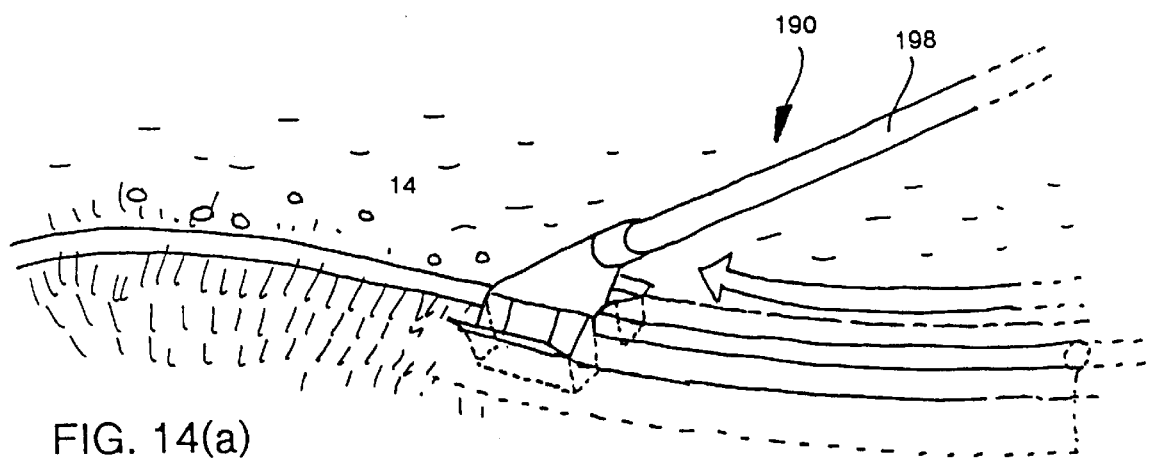
FIGS. 14(a) through 14(uu) illustrate various trench formation devices 190 of the present invention for excavating or forming trench 195 in ground 400, and methods of installing various embodiments of landscape edging system 5 of the present invention.
Figure 14B:
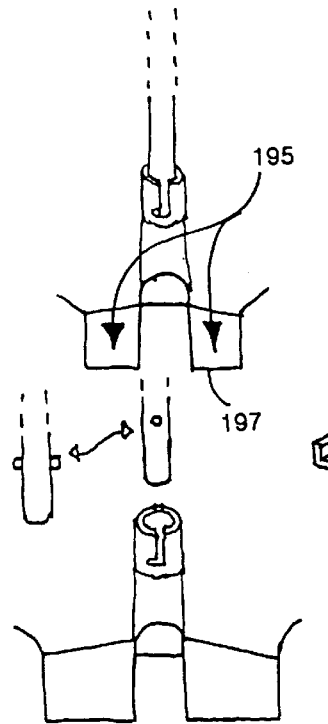
Figure 14C:
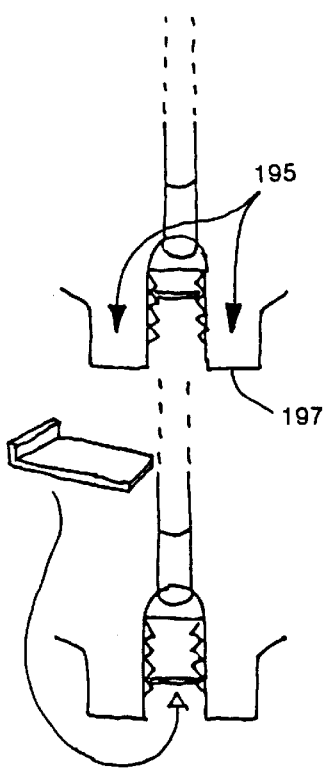
Figure 14D:
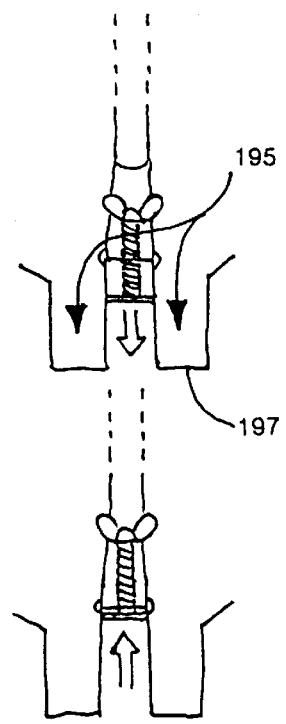
Figures 14E, 14F, 14G, 14H:
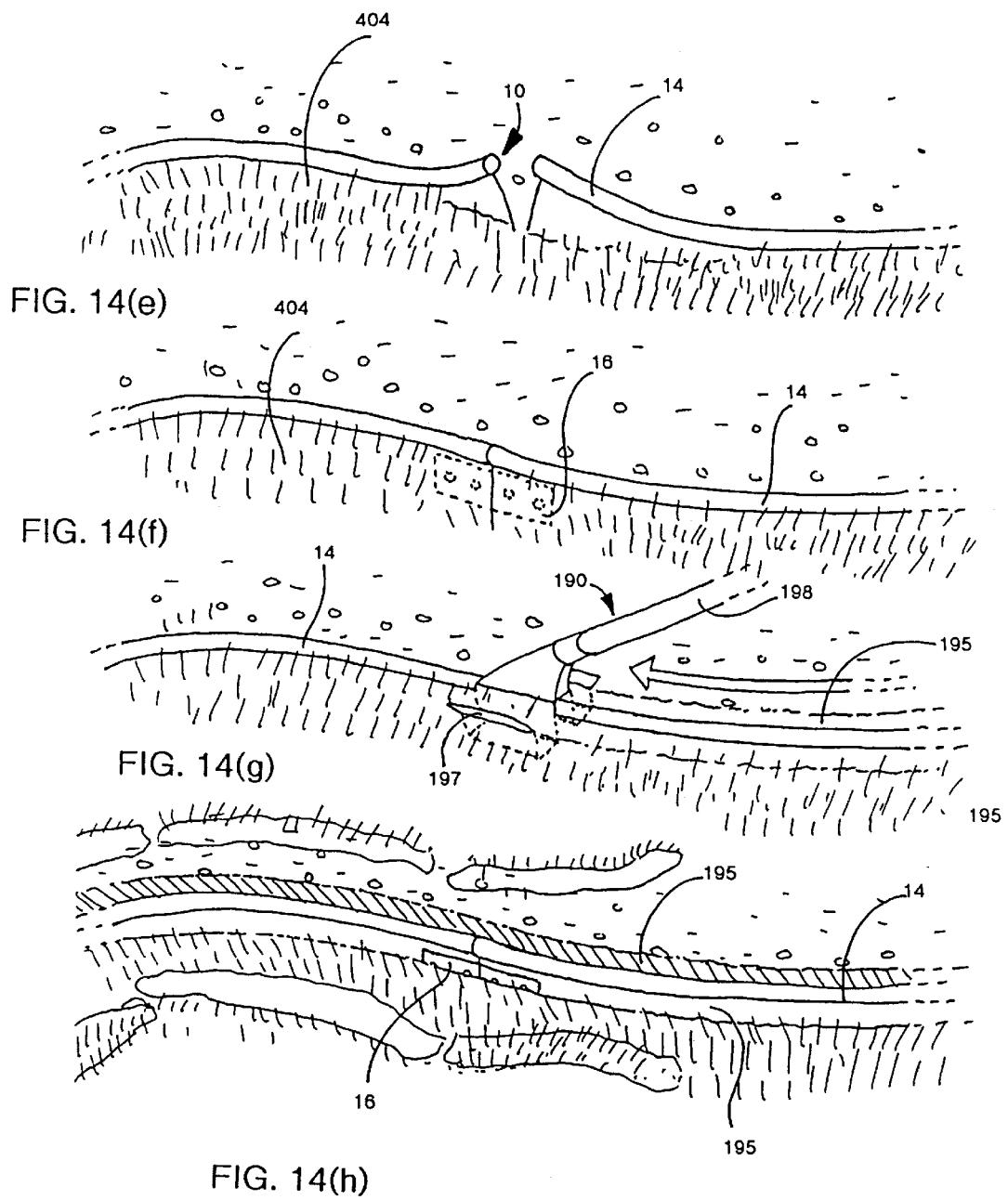
Figure 14I:
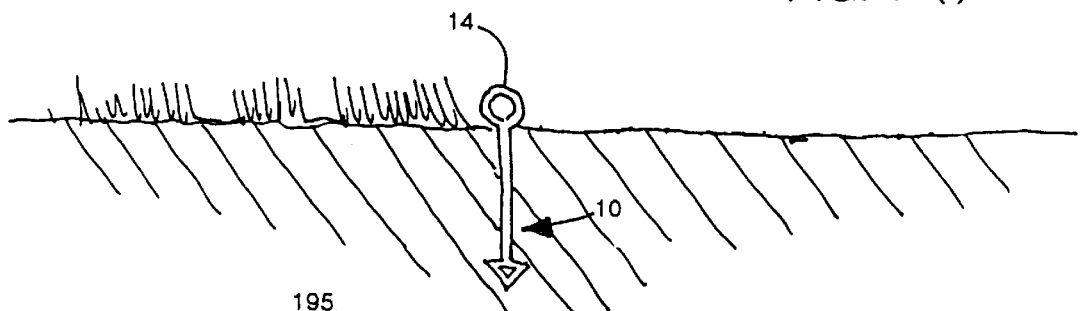
Figure 14J:
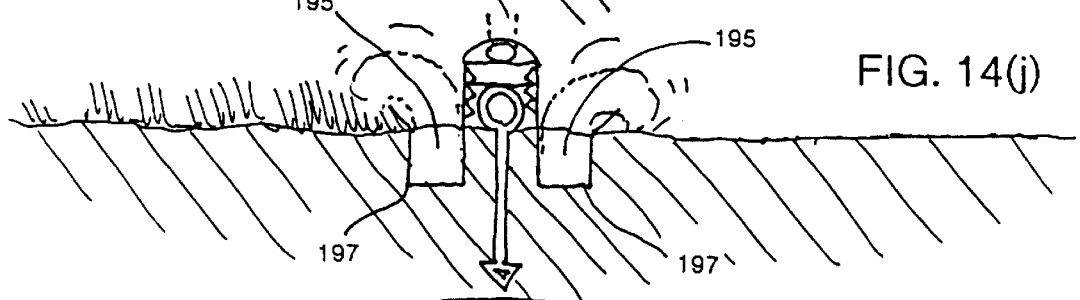
Figure 14K:
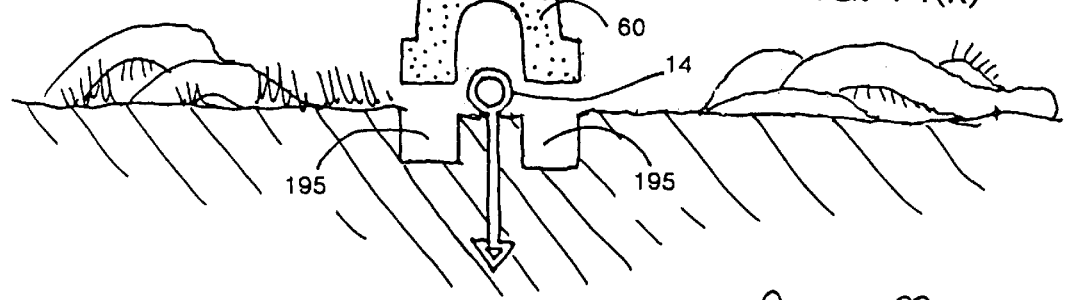
Figure 14L:
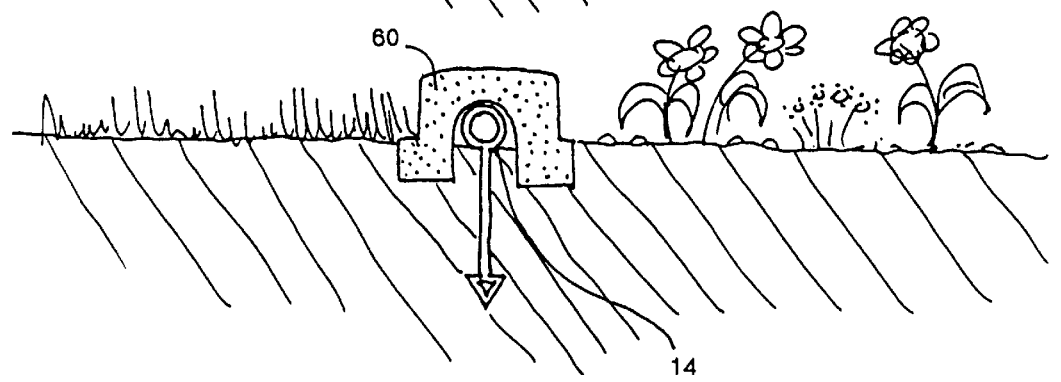
Figure 14M:
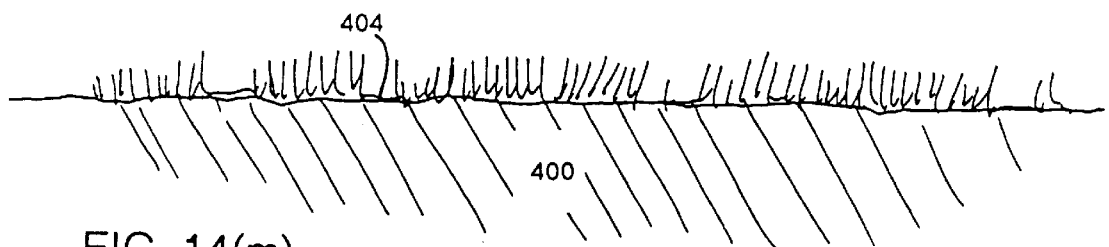
Figure 14N:
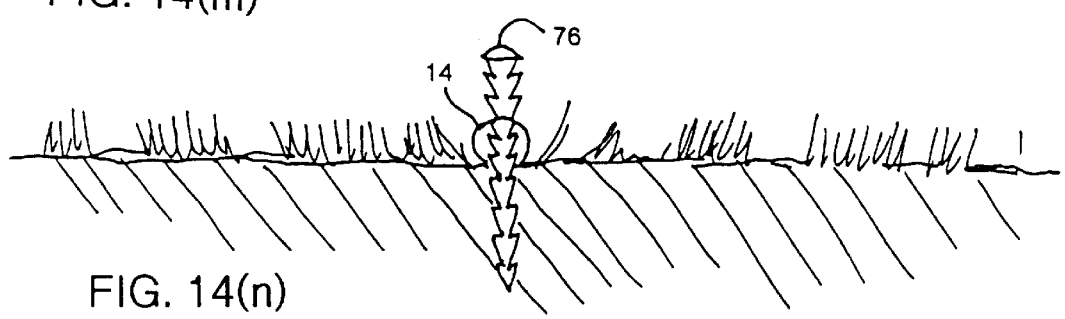
Figure 14O:
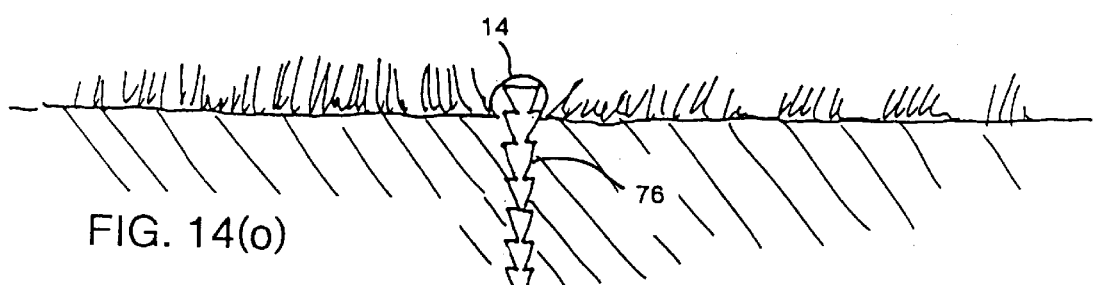
Figure 14P:
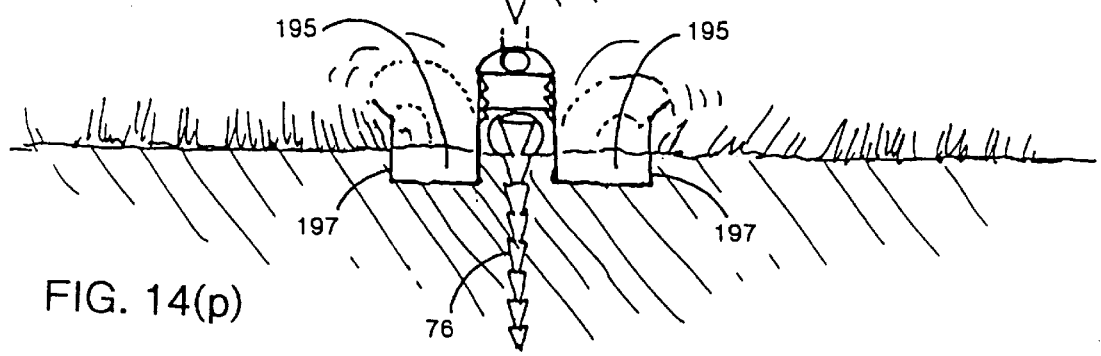
Figure 14Q:
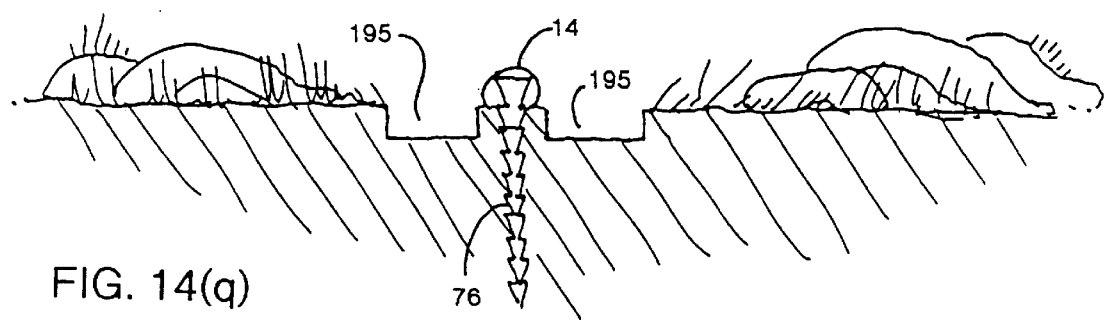
Figure 14R:
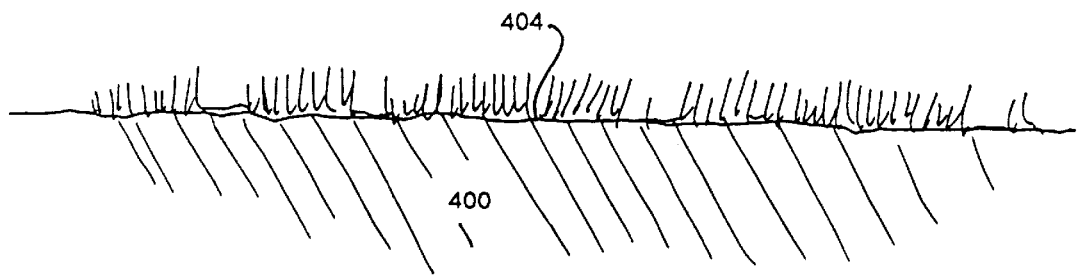
Figure 14S:
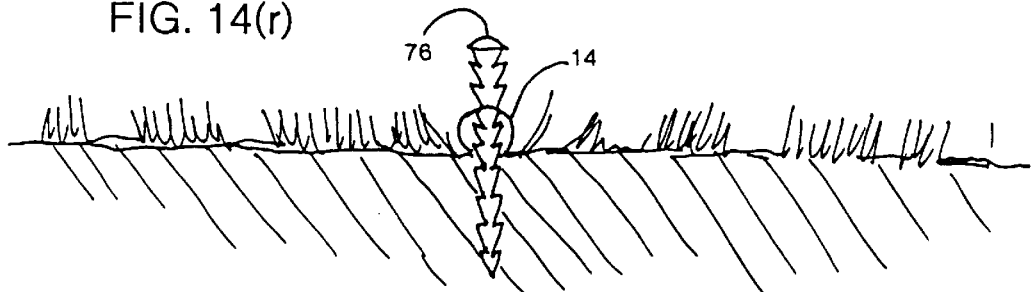
Figure 14T:
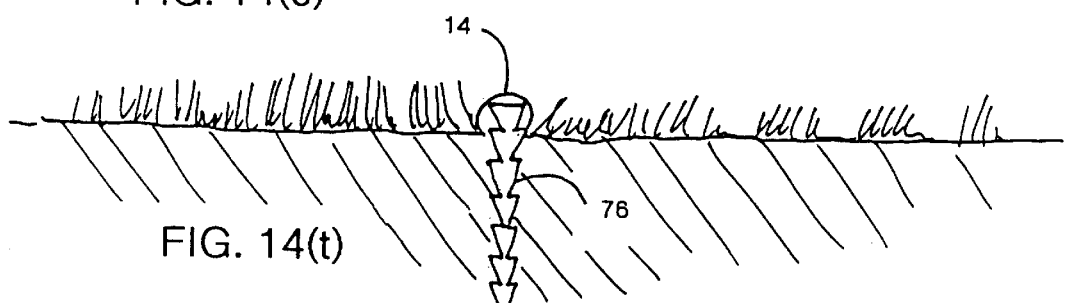
Figure 14U:
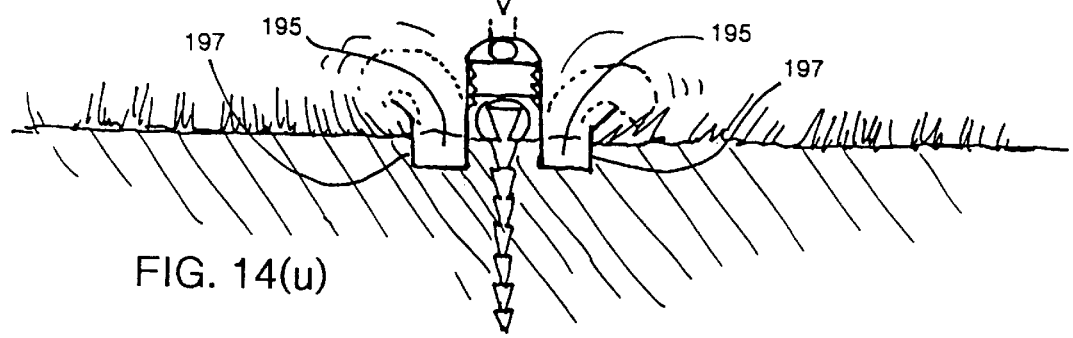
Figure 14V:
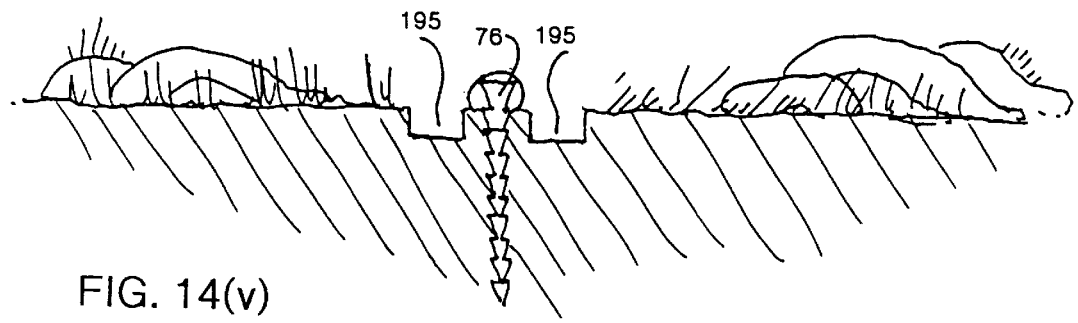
Figure 14W:
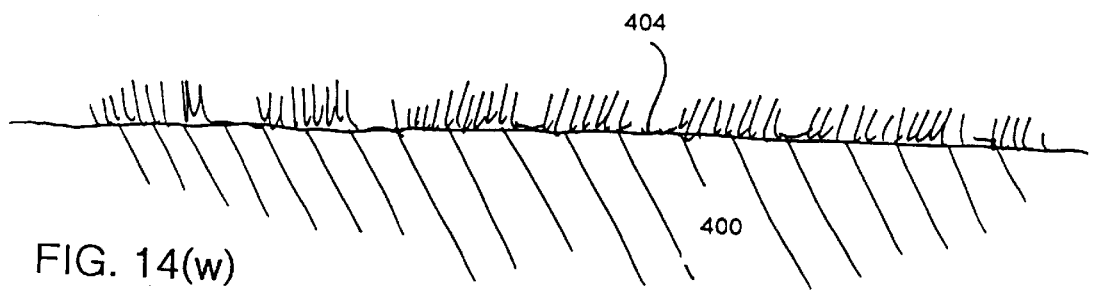
Figure 14X:
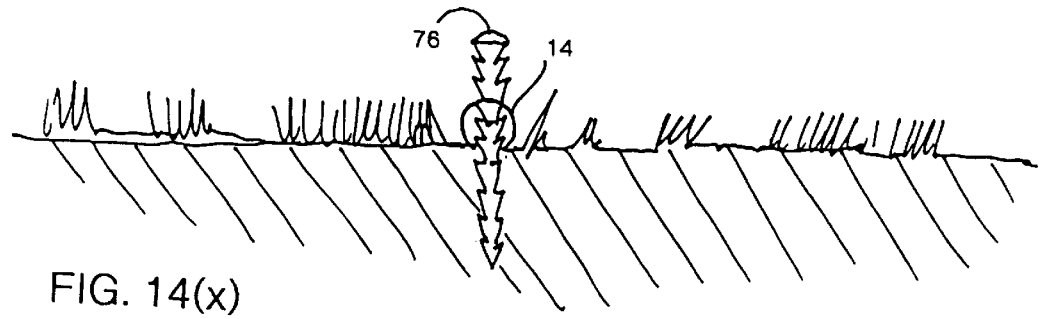
Figure 14Y:
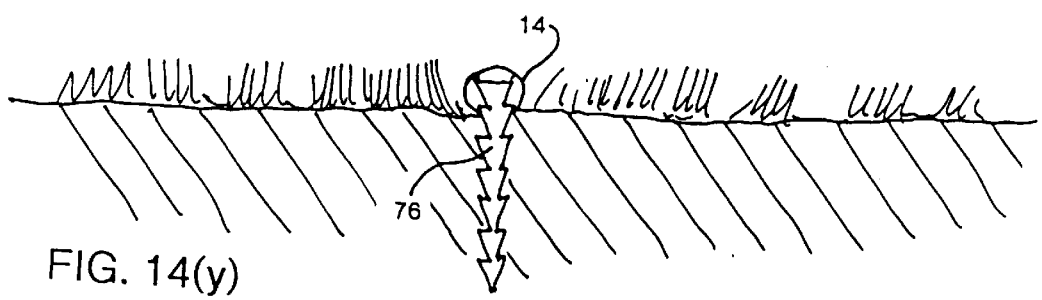
Figure 14Z:
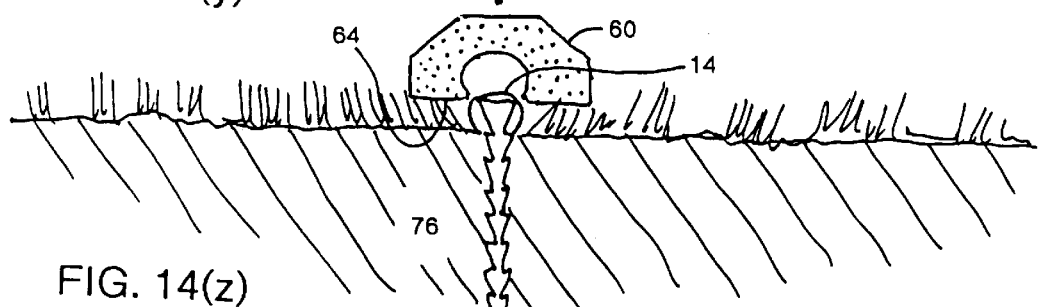
Figure 14:
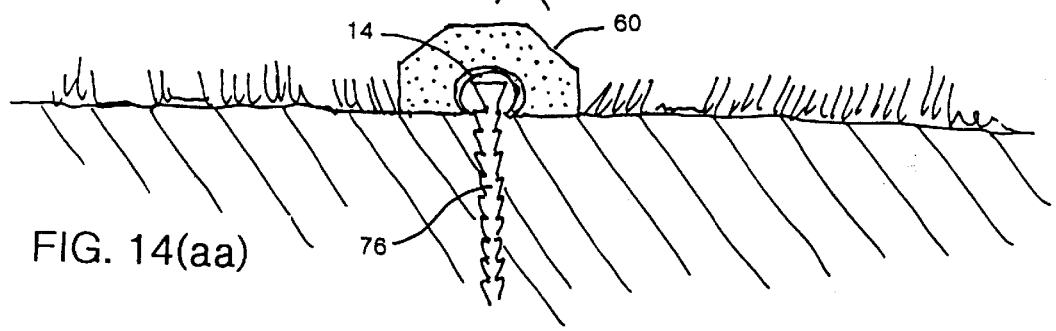
Figure 14:
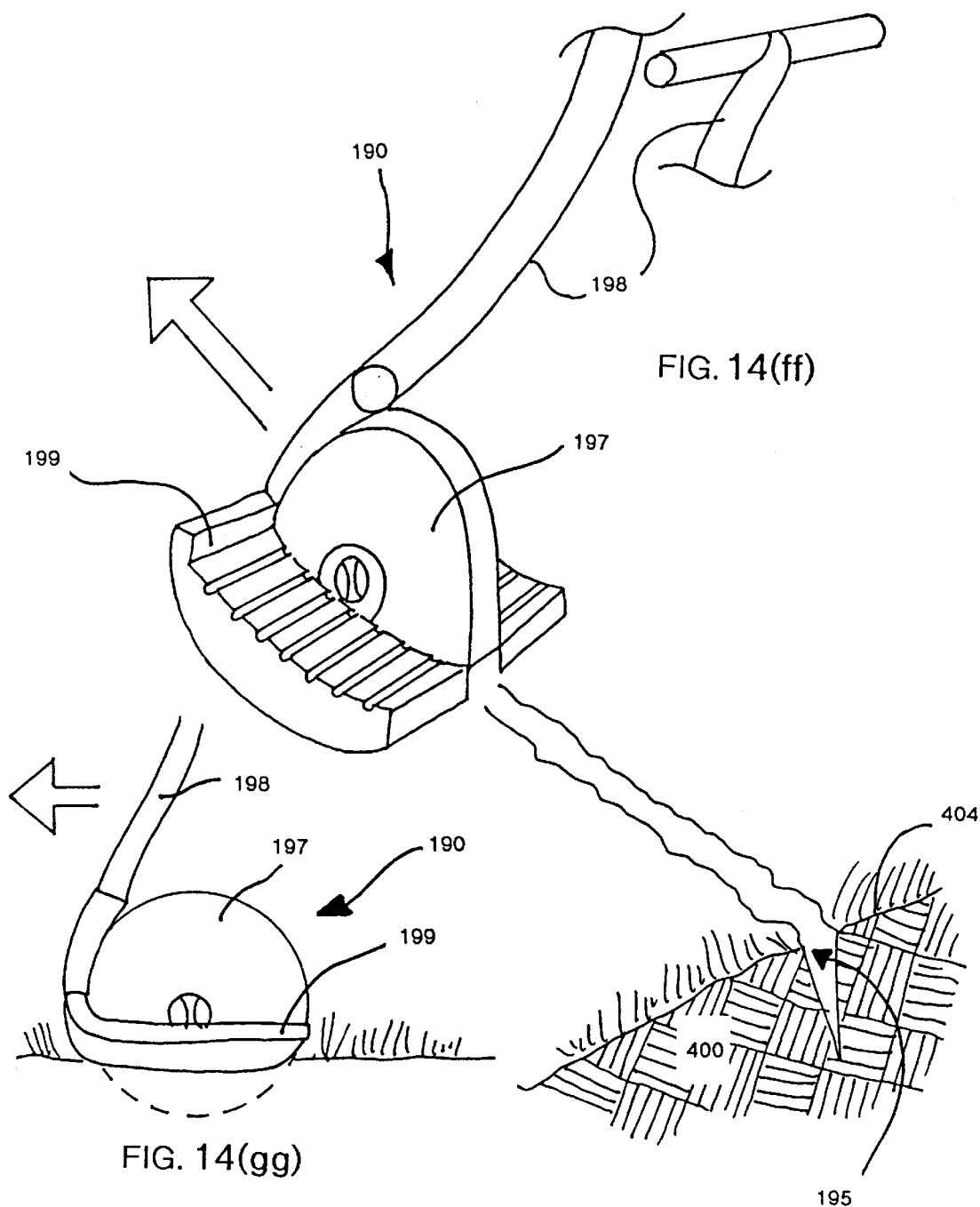
Figure 14:
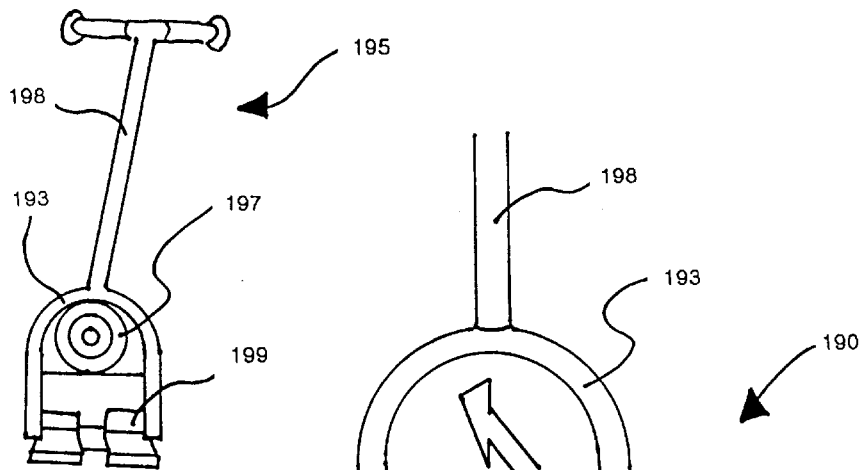
Figure 14:
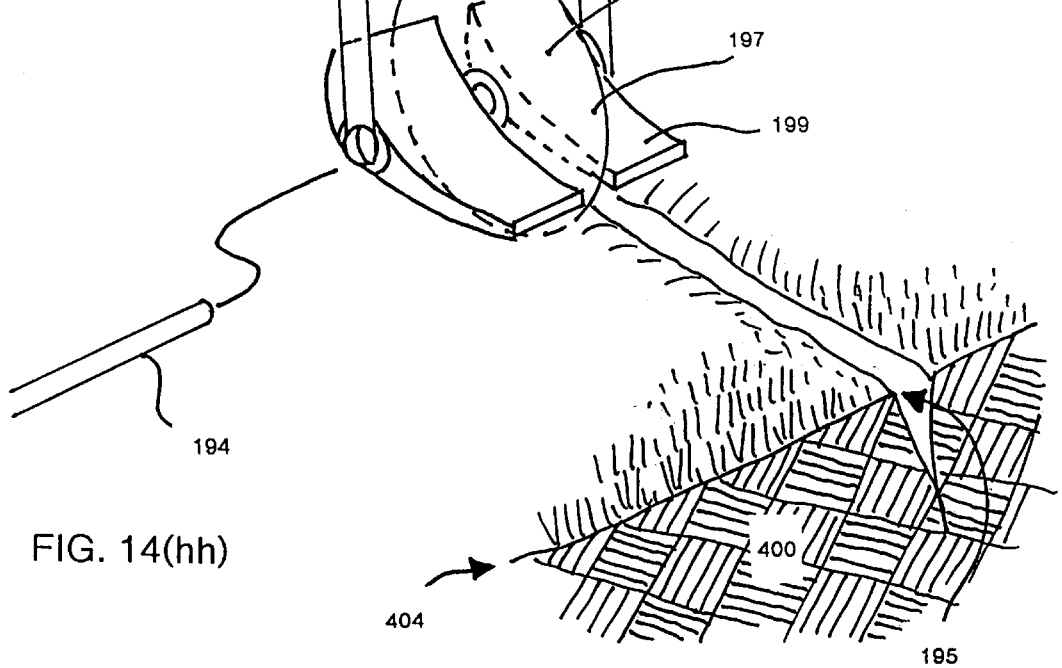
Figure 14:
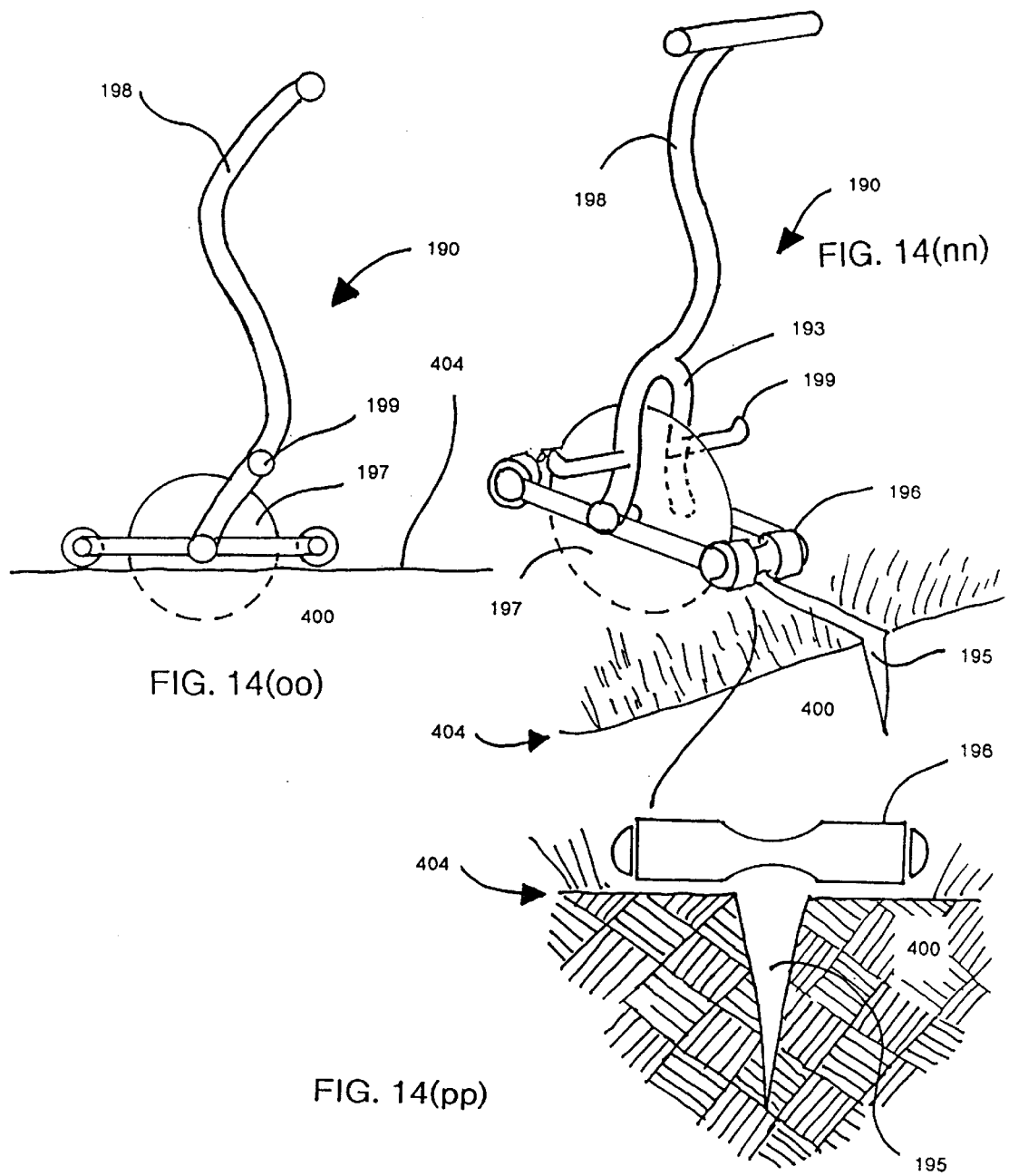
Figure 14:
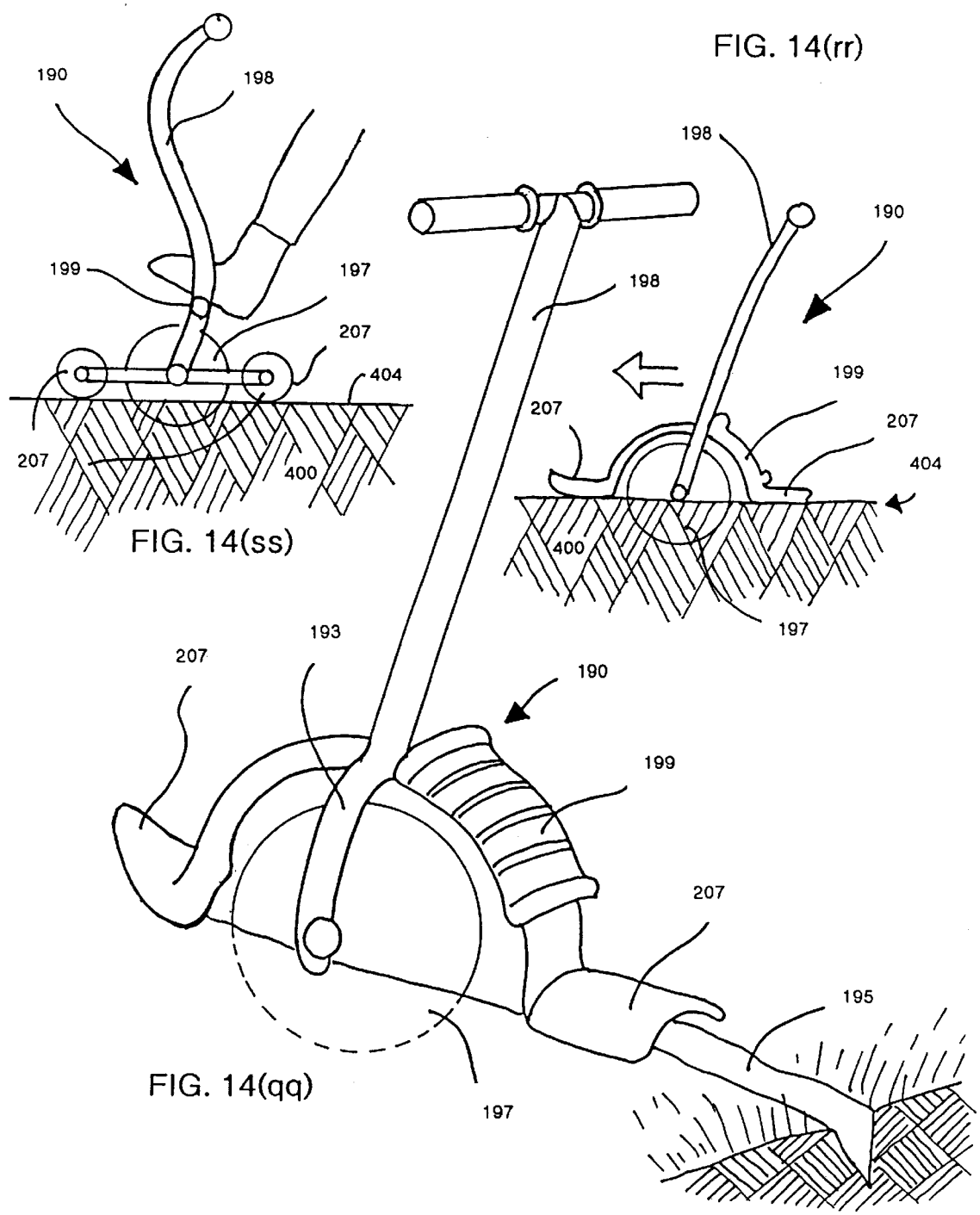

In FIG. 14(*a*), cutting member 197 forms a portion of device 190, and is received by or attached to handle 198. As a user pushes device 190 along surface 404 using handle 198, cutting member 197 slices into ground 400 and forms twin trenches 195. FIGS. 14(*b*) through 14(*d*) show various mans for attaching handle 198 to cutting member 197.

FIGS. 14(*e*) through 14(*h*) show one method of forming twin trenches 195 using tool 190, where tool 190 is guided along top rail 14 of existing edging member 10. As often occurs in conventional edging systems, the points at which adjoining strips of edging member interconnect are frost heaved to the surface as shown in FIG. 14(*e*). Connecting member 16 may be employed to reconnect the adjoining strips of edging, as illustrated in FIG. 14(*f*). In FIG. 14(*g*), tool 190 is pushed along top rail 14 to form twin trenches 195 shown in FIG. 14(*h*). FIG. 14(*i*) through 14(*l*) show steps corresponding to a method of installing one embodiment of system 5 of the present invention atop existing pre-installed edging member 10.

FIGS. 14(*m*) through 14(*q*), 14(*r*) through 14(*v*), 14(*w*) through 14(*aa*), 14(*bb*) through 14(*ee*) illustrate yet further methods and embodiments of the present invention. In FIGS. 14(*m*) through 14(*q*) and 14(*r*) through 14(*v*) tool 190 is employed to form twin trenches 195 for receiving undersides 64 of blocks 60 therein, and edging member 10 has no or substantially no bottom barrier extending downwardly therefrom. In FIGS. 14(*w*) through 14(*aa*), no tool 190 is employed to form trenches 195. Instead, stakes 76 are driven through top rail 14 having no or substantially no bottom barrier extending downwardly therefrom, no trench is dug or excavated, and blocks 60 are disposed atop top rail 14 once stake 76 has been driven through the top surface of top rail 14. In FIGS. 14(*bb*) and 14(*cc*), and FIGS. 14(*dd*) and 14(*ee*), tool 190 may or may not be employed to form twin trenches 195 for receiving undersides 64 of block 60 therewithin.

In FIG. 14(*ff*), cutting member 197 is a disk, forms a portion of device 190, is received by or attached to handle 198. As a user pushes device 190 along surface 404 using handle 198, cutting member 197 slices into ground 400 and forms trench 195. Footrest 199 permits device 190 to be pushed along top rail with relative ease. FIG. 14(*gg*) shows a cross-sectional view of FIG. 14(*ff*). FIG. 14(*hh*) shows a variant of the invention shown in FIGS. 14(*ff*) and 14(*gg*). As shown in FIG. 14(*ii*), disk or cutting member 197 may be stowed in a sideways storage position against handle 198 when not in use. As shown in FIG. 14(*hh*), pin 194 may be employed to interconnect disk 197, frame 193, and optional foot rest 199.

Device 190 may, of course, be motorized simply enough be providing an appropriate internal combustion or electric motor and corresponding transmission means for driving cutting member 197 or for pushing device 190 forwardly. For example, known rotary tilling machines may be modified in accordance with the teachings presented herein to replace their rotary tilling blades and means with a rotating trench formation blade 197 which cuts trench 195 in soil 400. Optionally, such a motorized device may be driven forwardly by motorized drive means as trench 195 is cut.

Disks having different diameters may be received by device 190 to permit trenches having different depths to be formed as shown in FIGS. 14(*jj*) through 14(*mm*). Trench formation device 190 may be configured to accommodate different size disks or cutting members 197 as shown in FIGS. 14(*ll*) and 14(*oo*). FIGS. 14 (*nn*) and 14(*pp*) show grooved roller 196 which may be included in device 190. It is preferred that disk 197 have a V-shaped or wedge-shaped cross-section such that it forms a trench having a top portion of greater width than the bottom portion. Following formation of trench 195 by device 190, the bottommost portion of edging barrier 20 may be placed at the bottom of trench 195, the trench backfilled to secure barrier 20 in ground 400, and the bottom surface of each block 60 placed on top rail 14 such that top rail 14 is received in recess 80.

FIGS. 14(*tt*) and 14(*uu*) show another means of adjusting the depth of trench 195, where locking teeth 202 in hub 203 permit variable height arms 201 to be locked into various positions respecting one another. The greater the angles arms 202 form respecting ground surface 404, the greater the height device 190 assumes respecting ground surface 404, and the shallower disk 197 cuts into soil 400. Foot rest 199 may also act as a trench depth limiting device by defining the depth to which cutting member 197 may penetrate the ground.

FIGS. 14(*qq*) through 14(*ss*) show another embodiment of trench formation device 190, where device 190 has front or rear rollers or skids 207 for guiding disk 197 in a desired direction. Foot rest 199 may be disposed atop or to the rear of disk 197.

As shown in FIGS. 14(*nn*) through 14(*pp*), foot rests 199 may also form pegs or push bars extending laterally and outwardly away from frame 193 and disk 197. Handle 198 may also be formed to curve backwardly toward a user to aid the user in assuming a correct position for pushing device 190 in a forward direction. Grooved rollers 196 may help prevent compression of trench 195.

The preceding specific embodiments are illustrative of the practice of the invention. It is to be understood, therefore, that other expedients known to those skilled in the art or disclosed herein, may be employed without departing from the invention or the scope of the appended claims.

In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts a nail and a screw are equivalent structures.

All patents or other printed publications disclosed hereinabove, including all patents listed in Table 1, are hereby incorporated by reference into the specification hereof, each in its respective entirety.

What is claimed is:

1. A landscape edging system for separating adjacent lawn, garden, walkway or patio areas, the system comprising:
   (a) a plurality of substantially rigid landscape edging blocks, each block comprising a first material and a bottom surface, two opposing ends and a longitudinally disposed recess contiguous with at least a portion of the bottom surface and the two opposing ends, the two opposing ends being configured to engage, abut or interconnect corresponding opposing ends of like adjoining landscape edging blocks;
   (b) at least one elongated flexible landscape edging member suitable and configured for use in cooperation with the plurality of landscape edging blocks, the landscape edging member comprising a second material different from the first material and a top rail and an edging barrier extending downwardly therefrom, the top rail attaching to the edging barrier in an intersection region, at least a bottom portion of the edging barrier being configured and suitable for placement beneath a ground surface in soil;
   wherein the recesses are configured to receive at least portions of the top rail therein such that the top rail may extend between landscape blocks having engaging, abutting or interconnected opposing ends when at least portions of the top rail are disposed in the recesses, the top rail and recesses being configured to prevent or impede the top rail from being removed from the recesses when a lateral or upward displacement force is exerted upon one or more of the plurality of blocks when at least portions of the top rail are disposed within the recesses, and further wherein when at least the bottom portion of the edging barrier is positioned beneath the ground surface in soil, the recesses receive at least portions of the tup rail therein, and the bottom surfaces of the plurality of engaging, abutting or interconnected landscape blocks are disposed atop and not beneath the ground surface, the intersection region of the landscaping member is disposed propinquant to the bottom surfaces of the blocks and the recesses of the blocks receive the top rail therein such that blocks are secured to the top rail, the ground surface need not be disturbed nor need soil be removed therebeneath to permit the recesses of the plurality of blocks to receive at least portions of the top rail therein.

2. The landscape edging system of claim 1, wherein the opposing ends of adjoining blocks have complementary shapes for engaging one another.

3. The landscape edging system of claim 1, wherein the top rail has a cross-sectional shape, and the recesses of the plurality of landscape edging blocks have corresponding cross-sectional shapes for receiving the top rail selected from the group consisting of T-shaped, cross-shaped, round, elliptical, triangular, square, rectangular and rib-shaped cross-sections.

4. The landscape edging system of claim 1, wherein the second material is selected from the group consisting of polyethylene, polyurethane, ethylene vinyl acetate, plastic, elastomeric material, polymeric material, metal and galvanized steel.

5. The landscape edging system of claim 1, wherein the first material is selected from the group consisting of stone, rock, cement, concrete, mortar, conglomerate masonry materials, untreated wood, treated wood, virgin plastic, recycled plastic, polyurethane, composite decking material, fiberglass, polyethylene combined with wood byproducts and fiberglass combined with wood byproducts.

6. A landscape edging system for separating adjacent lawn, garden, walkway or patio areas, comprising:
   (a) at least one elongated flexible landscape edging member comprising a first material and a top edge, a bottom edge and two opposing substantially vertically-oriented surfaces defining a strip-shaped barrier member, the barrier member having upper, central and lower portions, the top and bottom edges being connected, respectively, to the upper and lower portions, the barrier member extending downwardly from the top edge and being suitable and configured for placement beneath a ground surface in soil, at least a portion of the top edge being affixed to or forming part of the upper portion such that the top edge is configured to protrude or extend above the ground surface when the lower portion is positioned beneath the ground surface in soil, the top edge being affixed to or contiguous with the top portion in an intersection region, and
   (b) a plurality of substantially rigid landscape edging blocks, each block comprising a second material different from the first material and a bottom surface, two opposing ends and an imaginary longitudinal axis extending between the two opposing ends, the bottom surface of each block having a longitudinally disposed recess formed therein, each recess extending over at least a portion of its corresponding bottom surface, the two opposing ends of each block being configured to engage, abut, or interconnect with the corresponding opposing ends of like adjoining landscape edging blocks attached to the top rail by their respective recesses;
   wherein the recesses are configured to receive at least portions of the top edge therein such that the top edge may extend between engaging, abutting or interconnected landscape blocks when at least portions of the top edge are disposed in the recesses, the top edge and recesses being configured to prevent or impede the top edge from being removed from the recesses when a lateral or upward displacement force is exerted upon one or more of the plurality of blocks when at least portions of the top edge are disposed within the recesses, and further wherein when at least the bottom portion of the edging barrier is positioned beneath the ground surface in soil, the recesses of the blocks receive at least portions of the top edge therein, and the bottom surfaces of the plurality of engaging, abutting or interconnected landscape blocks are disposed atop and not beneath the ground surface, the intersection region of the landscaping member is disposed propinquant to the bottom surfaces of the blocks and the recesses of the blocks receive the top edge therein such that the blocks are secured to the top edge and the ground surface need not be disturbed nor need soil be removed therebeneath to permit the recesses of the plurality of blocks to receive at least portions of the top edge therein.

7. The landscape edging system of claim 6, wherein the opposing ends of adjoining blocks have complementary shapes for engaging one another.

8. The landscape edging system of claim 6, wherein the top edge has a cross-sectional shape, and the recesses of the landscape edging blocks have corresponding cross-sectional shapes for receiving the top edge, selected from the group consisting of T-shaped, cross-shaped, round, elliptical, triangular, square, rectangular and rib-shaped cross-sections.

9. The landscape edging system of claim 6, wherein the first material is selected from the group consisting of polyethylene, polyurethane, ethylene vinyl acetate, plastic, elastomeric material, polymeric material, metal and galvanized steel.

10. The landscape edging system of claim 6, wherein the second material is selected from the group consisting of stone, rock, cement, concrete, mortar, conglomerate masonry materials, untreated wood, treated wood, virgin plastic, recycled plastic, polyurethane, composite decking material, fiberglass, polyethylene combined with wood byproducts and fiberglass combined with wood byproducts.

11. A landscape edging system for separating adjacent lawn, garden, walkway or patio areas, comprising:
   (a) at least one elongated flexible means for providing landscape edging comprising a first material and a top edge, a bottom edge, and two opposing substantially vertically-oriented surfaces defining a strip-shaped barrier means, the barrier means having an upper portion, a central portion and a lower portion, the top and bottom edges being connected, respectively, to the upper and lower portions, the barrier means extending downwardly from the top edge for placement in the ground, at least a portion of the top edge being affixed to or forming part of the upper portion such that the top edge protrudes or extends above the ground surface when the lower portion is positioned beneath the ground surface in the ground, and
   (b) a plurality of substantially rigid landscape edging block means, each block means comprising a second material different from the first material and a bottom surface, two opposing ends and an imaginary longitudinal axis extending between the two opposing ends, the bottom surface having a longitudinally disposed means for receiving the top edge therein, the receiving means being configured to receive at least a portion of the top edge therein and extending over at least a portion of the bottom surface, the two opposing ends of each block means being configured to engage, abut, or interconnect with the corresponding opposing ends of other adjoining block means attached to the top edge by their respective receiving means;
   wherein the receiving means of the blocks are configured to receive the top edge therein such that the top edge may extend between engaging, abutting or interconnected landscape block means when at least portions of the top edge are disposed in the receiving means, the top edge and receiving means being configured to prevent or impede the top edge from being removed from the receiving means when a lateral or upward displacement force is exerted upon one or more of the plurality of block means when at least portions of the top edge are disposed in the receiving means, and further wherein when at least the bottom portion of the barrier means is positioned beneath the ground surface in soil, the receiving means receive at least portions of the top edge therein, and the bottom surfaces of the plurality of engaging, abutting or interconnected landscape block means are disposed atop and not beneath the ground surface, and the receiving means receive the top edge therein such that the block means are secured to the top edge and the ground surface need not be disturbed nor need soil be removed therebeneath to permit the receiving means of the plurality of blocks to receive at least portions of the top edge therein.

12. The landscape edging system of claim 11, wherein the opposing ends of adjoining blocks have complementary shapes for engaging one another.

13. The landscape edging system of claim 11, wherein the top edge has a cross-sectional shape, and the longitudinally disposed means of the block means have corresponding cross-sectional shapes for receiving the top edge, selected from the group consisting of T-shaped, cross-shaped, round, elliptical, triangular, square, rectangular and rib-shaped cross-sections.

14. The landscape edging system of claim 11, wherein the first material is selected from the group consisting of polyethylene, polyurethane, ethylene vinyl acetate, plastic, elastomeric material, polymeric material, metal and galvanized steel.

15. The landscape edging system of claim 11, wherein the second material is selected from the group consisting of stone, rock, cement, concrete, mortar, conglomerate masonry materials, untreated wood, treated wood, virgin plastic, recycled plastic, polyurethane, composite decking material, fiberglass, polyethylene combined with wood byproducts and fiberglass combined with wood byproducts.

16. A landscape edging system for separating adjacent lawn, garden, walkway or patio areas, comprising:
   (a) at least one elongated flexible landscape edging member comprising a first material, a top rail and an edging barrier extending downwardly therefrom, and
   (c) a plurality of substantially rigid landscape edging blocks, each block comprising a second material different from the first material and a bottom surface, two opposing ends and an imaginary longitudinal axis extending between the two opposing ends, the bottom surface of each block having a recess formed therein, each recess being configured to receive at least a portion of the top rail therein and extending over at least a portion of the bottom surface of its corresponding block, the two opposing ends of each block being configured to engage, abut, or interconnect with the corresponding opposing ends of other like adjoining landscape edging blocks attached to the top rail by their respective recesses;
   wherein the recesses are configured to receive the at least portions of the top rail therein such that the top rail may extend between engaging, abutting or interconnected landscape blocks while the at least portions of the top rail are disposed in the recesses, the top rail and recesses being configured to prevent or impede the top rail from being removed from the recesses when a lateral or upward displacement force is exerted upon one or more of the plurality of blocks when the at least portions of the top rail are disposed within the recesses, and further wherein when at least a bottom portion of the edging barrier is positioned beneath the ground surface in soil, the recesses of the blocks receive the at least portions of the top rail therein, and the bottom surfaces of the plurality of engaging, abutting or interconnected landscape blocks are disposed atop and not beneath the ground surface, the top rail is disposed propinguant to the bottom surfaces of the blocks and the recesses of the blocks receive the top rail therein such that the blocks are secured to the top rail and the ground surface need not be disturbed nor need soil be removed therebeneath to permit the recesses of the plurality of blocks to receive the at least portions of the top rail therein.

17. The landscape edging system of claim 16, wherein the top rail has a cross-sectional shape, and the recess of each block has a corresponding cross-sectional shape for receiving the top rail, selected from the group consisting of T-shaped, cross-shaped, round, elliptical, triangular, square, rectangular and rib-shaped cross-sections.

18. The landscape edging system of claim 16, wherein the first material is selected from the group consisting of polyethylene, polyurethane, neoprene, synthetic rubber, ethylene vinyl acetate, plastic, elastomeric material, polymeric material, metal and galvanized steel.

19. The landscape edging system of claim 16, wherein the second material is selected from the group consisting of stone, rock, cement, concrete, mortar, conglomerate masonry materials, untreated wood, treated wood, virgin plastic, recycled plastic, polyurethane, composite decking material, fiberglass, polyethylene combined with wood byproducts and fiberglass combined with wood byproducts.

20. The landscape edging system of claim 11, wherein the recess is longitudinally disposed.

21. The landscape edging system of claim 11, wherein adjoining blocks have complementary shapes for engaging one another.

22. The landscape edging system of claim 11, wherein the edging barrier has a lower portion and a central portion, at least one of the lower portion and the central portion having means for anchoring the edging member in the ground attached thereto or forming part thereof.

23. The landscape edging system of claim 22, wherein the means for anchoring is selected from the group consisting of triangular cross-sections of the lower portion, concave dimples, soil pockets, nesting regions, blades, ridges, flanges, ears, securing lips, stakes, ribs, barbs, end hooks, harpoon-like members and horizontally-oriented ribs.

24. The landscape edging system of claim 16, wherein the edging member forms a strip.

25. A landscape edging system for separating adjacent lawn, garden, walkway or patio areas, comprising:
(a) at least one elongated flexible means for providing landscape edging comprising a first material, a top rail means and a bottom portion, and
(b) a plurality of substantially rigid landscape edging block means, each block means comprising a second material different from the first material, a bottom surface, two opposing ends and an imaginary longitudinal axis extending between the two opposing ends, the bottom surface having a means formed therein for receiving the top rail means therein, the receiving means being configured to receive at least a portion of the top rail moans therein and extending over at least a portion of the bottom surface, the two opposing ends of each block being configured to engage, abut, or interconnect with the corresponding opposing ends of other adjoining landscape edging block means attached to the top rail means by their respective receiving means,
wherein the receiving means of the blocks are configured to receive the top rail means therein such that the top rail means may extend between engaging, abutting or interconnected landscape block means when at least portions of the top rail means are disposed in the receiving means, the top rail means and receiving means being configured to prevent or impede the top rail means from being removed from the receiving means when a lateral or upward displacement force is exerted upon one or more of the plurality of block means when at least portions of the top rail means are disposed in the receiving means, and further wherein when at least the bottom portion of the barrier means is positioned beneath the ground surface in soil, the receiving means receive at least portions of the top edge therein, and the bottom surfaces of the plurality of engaging, abutting or interconnected landscape block means are disposed atop and not beneath the ground surface, and the receiving means receive the top rail means therein such that the block means are secured to the top rail means and the ground surface need not be disturbed nor need soil be removed therebeneath to permit the receiving means of the plurality of blocks to receive at least portions of the top rail means therein.

26. The landscape edging system of claim 25, wherein the receiving means is longitudinally disposed.

27. The landscape edging system of claim 25, wherein adjoining block means have complementary shapes for engaging one another.

28. The landscape edging system of claim 25, wherein the top rail means has an edging barrier means extending downwardly therefrom for placement in the ground, at least a portion of the top rail means being affixed to or forming part of an upper portion of the edging barrier means such that the top rail means is configured and suitable for protruding or extending above the ground surface when at least the lower portion of the edging barrier means is positioned beneath the ground surface in soil.

29. The landscape edging system of claim 28, wherein the edging barrier means has a central portion, at least one of the bottom portion and the central portion having means for anchoring the edging member in the ground attached thereto or forming a portion thereof.

30. A landscape edging system for separating adjacent lawn, garden, walkway or patio areas, the system comprising:
(a) a plurality of substantially rigid landscape edging blocks, each block comprising a first material and a bottom surface, two opposing ends and a longitudinally disposed recess contiguous with at least a portion of the bottom surface and the two opposing ends, the two opposing ends being configured to engage, abut or interconnect corresponding opposing ends of like adjoining landscape edging blocks;
(b) at least one elongated flexible landscape edging member suitable and configured for use in cooperation with the plurality of landscape edging blocks, the landscape edging member comprising a second material different from the first material and a top rail and an edging barrier extending downwardly therefrom, at least a bottom portion of the edging barrier being configured and suitable for placement beneath a ground surface in soil;
wherein the recesses are configured to receive at least portions of the top rail therein such that the top rail may extend between landscape blocks having engaging, abutting or interconnected opposing ends when at least portions of the top rail are disposed in the recesses, the top rail and recesses being configured to prevent or impede the top rail from being removed from the recesses when a lateral or upward displacement force is exerted upon one or more of the plurality of blocks when at least portions of the top rail are disposed within the recesses, and further wherein when at least the bottom portion of the edging barrier is positioned beneath the ground surface in soil, the recesses receive at least portions of the top rail therein, and the bottom surfaces of the plurality of engaging, abutting or interconnected landscape blocks are disposed atop and not beneath the ground surface, the top rail is disposed propinquant to the bottom surfaces of the blocks and the recesses of the blocks receive the top rail therein such that blocks are secured to the top rail, the ground surface need not be disturbed nor need soil be removed therebeneath to permit the recesses of the plurality of blocks to receive at least portions of the top rail therein.

* * * * *